(12) United States Patent
Schlicht et al.

(10) Patent No.: US 8,060,017 B2
(45) Date of Patent: Nov. 15, 2011

(54) METHODS AND SYSTEMS FOR A MOBILE, BROADBAND, ROUTABLE INTERNET

(75) Inventors: Ludger Schlicht, Boca Raton, FL (US); Peter Atwal, Longwood, FL (US); Scott Y. Seidel, Fairfax, VA (US); Gregory C. Copeland, Plano, TX (US); Victor M. T. Pataca, Merrimack, NH (US); Rajesh K. Mishra, Westford, MA (US); Jeffrey E. Smith, Nashua, NH (US)

(73) Assignee: Powerwave Cognition, Inc., Santa Ana, CA (US)

( * ) Notice: Subject to any disclaimer, the term of this patent is extended or adjusted under 35 U.S.C. 154(b) by 392 days.

(21) Appl. No.: 12/418,363

(22) Filed: Apr. 3, 2009

(65) Prior Publication Data

US 2009/0252134 A1 Oct. 8, 2009

Related U.S. Application Data

(60) Provisional application No. 61/042,431, filed on Apr. 4, 2008, provisional application No. 61/042,442, filed on Apr. 4, 2008, provisional application No. 61/074,930, filed on Jun. 23, 2008, provisional application No. 61/082,618, filed on Jul. 22, 2008, provisional application No. 61/082,642, filed on Jul. 22, 2008, provisional application No. 61/086,242, filed on Aug. 5, 2008, provisional application No. 61/084,738, filed on Jul. 30, 2008, provisional application No. 61/084,773, filed on Jul. 30, 2008, provisional application No. 61/094,394, filed on Sep. 4, 2008, provisional application No. 61/094,546, filed on Sep. 5, 2008, provisional application No. 61/118,232, filed on Nov. 26, 2008, provisional application No. 61/094,584, filed on Sep. 5, 2008, provisional application No. 61/094,591, filed on Sep. 5, 2008, provisional application No. 61/094,594, filed on Sep. 5, 2008, provisional application No. 61/094,611, filed on Sep. 5, 2008, provisional application No. 61/095,298, filed on Sep. 8, 2008, provisional application No. 61/095,310, filed on Sep. 9, 2008, provisional application No. 61/094,183, filed on Sep. 4, 2008, provisional application No. 61/094,203, filed on Sep. 4, 2008, provisional application No. 61/094,279, filed on Sep. 4, 2008, provisional application No. 61/094,294, filed on Sep. 4, 2008, provisional application No. 61/094,231, filed on Sep. 4, 2008, provisional application No. 61/094,247, filed on Sep. 4, 2008, provisional application No. 61/094,310, filed on Sep. 4, 2008, provisional application No. 61/103,106, filed on Oct. 6, 2008, provisional application No. 61/111,384, filed on Nov. 5, 2008, provisional application No. 61/112,131, filed on Nov. 6, 2008, provisional application No. 61/121,169, filed on Dec. 9, 2008.

(51) Int. Cl.
*H04W 40/00* (2009.01)

(52) U.S. Cl. .................................. 455/41.2; 370/338

(58) Field of Classification Search ................. 455/41.2; 370/338, 345, 310, 347, 400, 328, 329; 709/205; 725/68, 110, 119
See application file for complete search history.

(56) References Cited

U.S. PATENT DOCUMENTS

| | | | |
|---|---|---|---|
| 6,487,500 B2 | 11/2002 | Lemelson et al. | |
| 6,889,372 B1 | 5/2005 | Teig et al. | |
| 6,977,938 B2 * | 12/2005 | Alriksson et al. | 370/401 |
| 7,333,026 B2 | 2/2008 | Hunzinger | |
| 7,367,039 B2 | 4/2008 | Allen | |
| 2001/0000959 A1 | 5/2001 | Campana | |
| 2003/0036374 A1 | 2/2003 | English et al. | |
| 2004/0146007 A1 | 7/2004 | Saadawi et al. | |
| 2004/0203820 A1 | 10/2004 | Billhartz et al. | |
| 2005/0186933 A1 | 8/2005 | Trans | |
| 2006/0083205 A1 | 4/2006 | Buddhikot et al. | |
| 2006/0280201 A1 | 12/2006 | Hammel et al. | |
| 2007/0087756 A1 | 4/2007 | Hoffberg | |
| 2007/0248061 A1 | 10/2007 | Poston et al. | |

| | | | |
|---|---|---|---|
| 2008/0049776 A1 | 2/2008 | Wiley et al. | |
| 2008/0089298 A1 | 4/2008 | Anschutz | |
| 2009/0252102 A1 | 10/2009 | Seidel et al. | |

FOREIGN PATENT DOCUMENTS

| | | |
|---|---|---|
| WO | WO-2007031958 A2 | 3/2007 |
| WO | WO-2009/108858 A2 | 9/2009 |
| WO | WO-2009/108858 A3 | 12/2009 |
| WO | WO-2009/146132 A2 | 12/2009 |
| WO | WO-2009/146132 A3 | 12/2009 |

OTHER PUBLICATIONS

"International Application No. PCT/US2009/056130, Search Report and Written Opinion mailed Dec. 22, 2009", PCT/US2009/056130, 20 pgs.

"International Application Serial No. PCT/US09/35465, Search Report and Written Opinion mailed Oct. 12, 2009", 12.

"International Application Serial No. PCT/US2009/056134, Search Report and Written Opinion mailed Oct. 29, 2009".

"International Application Serial No. PCT/US2009/056126, Search Report and Written Opinion mailed Oct. 29, 2009".

"International Application Serial No. PCT/US2009/039479, Search Report and Written Opinion mailed Nov. 20, 2009", 11.

Akyildiz, I. F., "NeXt generation/dynamic spectrum access/cognitive radio wireless networks", *Computer Networks* vol. 50, No. 13, pp. 2127-2159, May 17, 2006, 2127-2159.

\* cited by examiner

*Primary Examiner* — Stephen Jones

(74) *Attorney, Agent, or Firm* — Strategic Patents, P.C.

(57) ABSTRACT

In embodiments of the present invention improved capabilities are described for a mobile broadband routable internet (MBRI) providing for carrier-grade, networked, broadband, IP-routable communication among a plurality of mobile devices, where the mobile devices may represent a plurality of nodes that are linked together through a mobile ad-hoc network (MANET). Mobile devices may operate as peers in a peer-to-peer network, with full IP routing capabilities enabled within each mobile device, thereby allowing routing of IP-based traffic, including deployment of applications, to the mobile device without need for infrastructure conventionally required for mobile ad hoc networks, such as cellular telephony infrastructure. Full IP-routing to mobile devices may allow seamless integration to the fixed Internet, such as through fixed or mobile access points, such as for backhaul purposes. Thus, the MBRI may function as a standalone mobile Internet, without connection to the fixed Internet, or as an IP-routable extension of another network, whether it be the Internet, a local area network, a wide area network, a cellular network, a personal area network, or some other type of network that is capable of integration with an IP-based network.

40 Claims, 93 Drawing Sheets

FIG. 53  SLSR link cost based routing – Protocol with extra information

Layer 2 forwarding – Header table

| Field Name | Data Type | # of Bytes | Description |
|---|---|---|---|
| Destination NodeId | NODE_ID | 5 | Node Id of Destination for this datagram |
| Next Hop NodeId | NODE_ID | 5 | Node Id of the next hop node for this datagram |
| Source NodeId | NODE_ID | 5 | Node Id of the source node for this datagram |
| QoS | Byte | 1 | QoS parameter for this datagram. This QoS is derived from TOS |
| TTL | Byte | 1 | Time to live |
| Payload Type | Byte | 1 | Payload Type<br>•UDP<br>•TCP<br>•Broadcast<br>•… |
| Spare | Byte[] | 2 | Make it align to 4 byte boundary |

METHODS AND SYSTEMS FOR A MOBILE, BROADBAND, ROUTABLE INTERNET

CROSS-REFERENCE TO RELATED APPLICATIONS

This application claims the benefit of the following patent applications, each of which is hereby incorporated by reference in its entirety:
U.S. Provisional App. No. 61/042,431 filed Apr. 4, 2008; U.S. Provisional App. No. 61/042,442 filed Apr. 4, 2008; U.S. Provisional App. No. 61/074,930 filed Jun. 23, 2008; U.S. Provisional App. No. 61/082,618 filed Jul. 22, 2008; U.S. Provisional App. No. 61/082,642 filed Jul. 22, 2008; U.S. Provisional App. No. 61/086,242 filed Aug. 5, 2008; U.S. Provisional App. No. 61/084,738 filed Jul. 30, 2008; U.S. Provisional App. No. 61/084,773 filed Jul. 30, 2008; U.S. Provisional App. No. 61/094,394 filed Sep. 4, 2008; U.S. Provisional App. No. 61/094,546 filed Sep. 5, 2008; U.S. Provisional App. No. 61/118,232 filed Nov. 26, 2008; U.S. Provisional App. No. 61/094,584 filed Sep. 5, 2008; U.S. Provisional App. No. 61/094,591 filed Sep. 5, 2008; U.S. Provisional App. No. 61/094,594 filed Sep. 5, 2008; U.S. Provisional App. No. 61/094,611 filed Sep. 5, 2008; U.S. Provisional App. No. 61/095,298 filed Sep. 8, 2008; U.S. Provisional App. No. 61/095,310 filed Sep. 9, 2008; U.S. Provisional App. No. 61/094,183 filed Sep. 4, 2008; U.S. Provisional App. No. 61/094,203 filed Sep. 4, 2008; U.S. Provisional App. No. 61/094,279 filed Sep. 4, 2008; U.S. Provisional App. No. 61/094,294 filed Sep. 4, 2008; U.S. Provisional App. No. 61/094,231 filed Sep. 4, 2008; U.S. Provisional App. No. 61/094,247 filed Sep. 4, 2008; U.S. Provisional App. No. 61/094,310 filed Sep. 4, 2008; U.S. Provisional App. No. 61/103,106 filed Oct. 6, 2008; U.S. Provisional App. No. 61/111,384 filed Nov. 5, 2008; U.S. Provisional App. No. 61/112,131 filed Nov. 6, 2008; and U.S. Provisional App. No. 61/121,169 filed Dec. 9, 2008.

FIELD OF THE INVENTION

The invention herein disclosed generally refers to networking, and more particularly to mobile networking.

BACKGROUND

Existing wireless communications used in carrier-grade networks typically consist of a cell-based infrastructure where all mobile subscriber nodes must communicate directly with a network base station. As an alternative, wireless communications may utilize a mobile ad-hoc network, where any mobile node can communicate with any other node, either directly or through multiple hops across the network topology. However, existing mobile ad-hoc networks sometimes operate without any network infrastructure on a single fixed spectrum channel. Currently used techniques do not provide sufficient Quality of Service (QoS) needed to offer carrier-grade service in a heterogeneous broadband media environment containing both delay-sensitive (e.g., voice over Internet Protocol, VoIP) and delay-tolerant (e.g., internet browsing) traffic. Therefore, there exists a need to provide carrier-grade QoS in mobile networks.

SUMMARY

In embodiments of the present invention improved capabilities are described for a mobile broadband routable internet (MBRI) providing for carrier-grade, networked, broadband, IP-routable communication among a plurality of mobile devices, where the mobile devices may represent a plurality of nodes that are linked together through a mobile ad-hoc network (MANET). Mobile devices may operate as peers in a peer-to-peer network, with full IP routing capabilities enabled within each mobile device, thereby allowing routing of IP-based traffic, including deployment of applications, to the mobile device without need for infrastructure conventionally required for mobile ad hoc networks, such as cellular telephony infrastructure. Full IP-routing to mobile devices may allow seamless integration to the fixed Internet, such as through fixed or mobile access points, such as for backhaul purposes. Thus, the MBRI may function as a standalone mobile Internet, without connection to the fixed Internet, or as an IP-routable extension of another network, whether it be the Internet, a local area network, a wide area network, a cellular network, a personal area network, or some other type of network that is capable of integration with an IP-based network. The present invention may be implemented as a method on the machine, as a system or apparatus as part of or in relation to the machine, or as a computer program product embodied in a computer readable medium executing on one or more of the machines.

In embodiments, a mobile, broadband, routable internet may be provided, in which a plurality of mobile devices interact as sending and receiving nodes in a mobile ad hoc network and in which packets are IP routable to the individual devices independent of fixed infrastructure elements; providing routing priority within the network, wherein the routing priority is provided by granting channel access to a node for which prioritized routing is identified and sending delay-sensitive data from the node before sending delay-tolerant data from the node.

In embodiments, a mobile, broadband, routable internet may be provided, in which a plurality of mobile devices interact as nodes in a mobile ad hoc network and in which packets are IP routable to the individual device independent of fixed infrastructure elements; and providing support for peer-to-peer traffic within the network.

In embodiments, a mobile, broadband, routable internet may be provided, in which a plurality of mobile devices interact as nodes in a mobile ad hoc network and in which packets are IP routable to the individual device independent of fixed infrastructure elements; and providing peer to peer connectivity within the mobile broadband routable internet.

In embodiments, a mobile, broadband, routable internet may be provided, in which a plurality of mobile devices interact as nodes in a mobile ad hoc network and in which packets are IP routable to the individual device independent of fixed infrastructure elements; and providing file sharing over the mobile broadband routable internet.

In embodiments, a mobile, broadband, routable internet may be provided, in which a plurality of mobile devices interact as nodes in a mobile ad hoc network and in which packets are IP routable to the individual device independent of fixed infrastructure elements; and providing user-generated applications over the mobile broadband routable internet.

In embodiments, a mobile, broadband, routable internet may be provided, in which a plurality of mobile devices interact as nodes in a mobile ad hoc network and in which packets are IP routable to the individual device independent of fixed infrastructure elements; and providing peer-to-peer applications over the mobile broadband routable internet.

In embodiments, a mobile, broadband, routable internet may be provided, in which a plurality of mobile devices interact as nodes in a mobile ad hoc network and in which packets are IP routable to the individual device independent of fixed infrastructure elements; and providing direct device-to-device peering with symmetrical throughput between at least two nodes of the mobile broadband routable internet.

In embodiments, a mobile, broadband, routable internet may be provided, in which a plurality of mobile devices interact as nodes in a mobile ad hoc network and in which packets are IP routable to the individual device independent of fixed infrastructure elements; and facilitating direct-to-device application deployment over the mobile broadband routable internet.

In embodiments, a mobile, broadband, routable internet may be provided, in which a plurality of mobile devices interact as nodes in a mobile ad hoc network and in which packets are IP routable to the individual device independent of fixed infrastructure elements; and providing a facility for distributing data among a plurality of mobile broadband routable internet devices.

In embodiments, a mobile, broadband, routable internet may be provided, in which a plurality of mobile devices interact as nodes in a mobile ad hoc network and in which packets are IP routable to the individual device independent of fixed infrastructure elements; and providing a facility for distributing application components among a plurality of mobile broadband routable internet devices.

In embodiments, a mobile, broadband, routable internet may be provided, in which a plurality of mobile devices interact as nodes in a mobile ad hoc network and in which packets are IP routable to the individual device independent of fixed infrastructure elements; and providing multicast routing within the network by allowing a data object to be transmitted by a device to a plurality of destinations over a plurality of routes.

In embodiments, a mobile, broadband, routable internet may be provided, in which a plurality of mobile devices interact as nodes in a mobile ad hoc network and in which packets are IP routable to the individual device independent of fixed infrastructure elements; and providing remote monitoring of at least one of software and services associated with the network.

In embodiments, a mobile, broadband, routable internet may be provided, in which a plurality of mobile devices interact as nodes in a mobile ad hoc network and in which packets are IP routable to the individual device independent of fixed infrastructure elements; and providing remote control of at least one of software and services associated with the network.

In embodiments, a mobile, broadband, routable internet may be provided, in which a plurality of mobile devices interact as nodes in a mobile ad hoc network and in which packets are IP routable to the individual device independent of fixed infrastructure elements; and providing remote upgrade of at least one of software and services associated with the network.

In embodiments, a mobile, broadband, routable internet may be provided, in which a plurality of mobile devices interact as nodes in a mobile ad hoc network and in which packets are IP routable to the individual device independent of fixed infrastructure elements; and providing an adaptive transmit power control facility for a device within the network, the adaptive transmit power control facility adapted to adjust transmission power of the device based on at least one of the density of proximate devices in the network, the condition of a neighboring device on the network, a channel condition of the network, a service level condition, a network performance condition, an environmental condition of the device and an application requirement of the device.

In embodiments, a mobile, broadband, routable internet may be provided, in which a plurality of mobile devices interact as nodes in a mobile ad hoc network and in which packets are IP routable to the individual device independent of fixed infrastructure elements; and providing forwarding error correction on at least long IP packets.

In embodiments, a mobile, broadband, routable internet may be provided, in which a plurality of mobile devices interact as nodes in a mobile ad hoc network and in which packets are IP routable to the individual device independent of fixed infrastructure elements; and providing a facility for enabling adaptation of the data rate provided for links among devices within the network, the adaptation based on at least one of the density of devices in the network, the condition neighboring devices in the network, a channel condition of the network, a service level condition, a network performance condition, an environmental condition and an application requirement.

In embodiments, a mobile, broadband, routable internet may be provided, in which a plurality of mobile devices interact as nodes in a mobile ad hoc network and in which packets are IP routable to the individual device independent of fixed infrastructure elements; and providing dynamic spectrum access capabilities within the network by determining communication spectrum quality and adjusting use of time frequency rectangles within the communication spectrum based on the determination.

In embodiments, a mobile, broadband, routable internet may be provided, in which a plurality of mobile devices interact as nodes in a mobile ad hoc network and in which packets are IP routable to the individual device independent of fixed infrastructure elements; and communicating among the plurality of devices over a radio communication spectrum and reusing portions of the spectrum for communication based on availability of time frequency rectangles within portions of the spectrum.

In embodiments, a mobile, broadband, routable internet may be provided, in which a plurality of mobile devices interact as nodes in a mobile ad hoc network and in which packets are IP routable to the individual device independent of fixed infrastructure elements; and communicating wirelessly among at least a portion of the plurality of mobile devices, wherein the at least a portion of the plurality of mobile devices communicate independent of which radio frequency is used for the wireless communication.

In embodiments, a mobile, broadband, routable internet may be provided, in which a plurality of mobile devices interact as nodes in a mobile ad hoc network and in which packets are IP routable to the individual device independent of fixed infrastructure elements; and providing geo-location coding of device nodes in the network, wherein geo-location is based at least in part based on a network location of a device node relative to other devices in the network.

In embodiments, a mobile, broadband, routable internet may be provided, in which a plurality of mobile devices interact as nodes in a mobile ad hoc network and in which packets are IP routable to the individual device independent of fixed infrastructure elements; and providing multimedia support within the network through a hybrid frame structure that includes variable slot duration and sub-channelization of bandwidth.

In embodiments, a mobile, broadband, routable internet may be provided, in which a plurality of mobile devices interact as nodes in a mobile ad hoc network and in which packets are IP routable to the individual device independent of fixed infrastructure elements; and providing time synchronization among nodes of the network, wherein the time synchronization is provided by communicating a representation of network timing at all the nodes with sufficient accuracy to enable reliable communications.

In embodiments, a mobile, broadband, routable internet may be provided, in which a plurality of mobile devices interact as nodes in a mobile ad hoc network and in which packets are IP routable to the individual device independent of fixed infrastructure elements; and providing seamless outdoor and indoor operation over the network.

In embodiments, a mobile, broadband, routable internet may be provided, in which a plurality of mobile devices interact as nodes in a mobile ad hoc network and in which packets are IP routable to the individual device independent of fixed infrastructure elements; and providing fixed radio installations that facilitate connection of the plurality of mobile devices, wherein the fixed radio installations are based at least in part on meeting a criteria associated with network radio propagation and performance.

In embodiments, a mobile, broadband, routable internet may be provided, in which a plurality of mobile devices interact as nodes in a mobile ad hoc network and in which packets are IP routable to the individual device independent of fixed infrastructure elements; and providing an IP-compatible plug connection to at least one wired infrastructure type.

In embodiments, a mobile, broadband, routable internet may be provided, in which a plurality of mobile devices interact as nodes in a mobile ad hoc network and in which packets are IP routable to each of the devices independent of fixed infrastructure elements; and providing multiple fixed-network gateway interfaces connecting the mobile ad hoc network to a fixed network.

In embodiments, a mobile, broadband, routable internet may be provided, in which a plurality of mobile devices interact as nodes in a mobile ad hoc network and in which packets are IP routable to each of the devices independent of fixed infrastructure elements; and providing an automated network design tool to facilitate low cost and fast network design engineering and deployment planning of the fixed infrastructure elements of the network.

In embodiments, a mobile, broadband, routable internet may be provided, in which a plurality of mobile devices interact as nodes in a mobile ad hoc network and in which packets are IP routable to each of the devices independent of fixed infrastructure elements; and deploying a plurality of low cost mesh access points to provide network coverage in a geography.

In embodiments, a mobile, broadband, routable internet may be provided, in which a plurality of mobile devices interact as nodes in a mobile ad hoc network and in which packets are IP routable to each of the devices independent of fixed infrastructure elements; and providing small form factor nodes that allow for low cost and fast capacity expansion and network upgrade.

In embodiments, a mobile, broadband, routable internet may be provided, in which a plurality of mobile devices interact as nodes in a mobile ad hoc network and in which packets are IP routable to each of the devices independent of fixed infrastructure elements; and routing communications between a mobile device and a device on a remote network so as to substantially favor routes through the mobile, broadband, routable Internet that have fewer hops between the mobile device and a backhaul access point.

In embodiments, a mobile, broadband, routable internet may be provided, in which a plurality of mobile devices interact as nodes in a mobile ad hoc network and in which packets are IP routable to each of the devices independent of fixed infrastructure elements; and providing a user deployable access point that connects to the network.

In embodiments, a mobile, broadband, routable internet may be provided, in which a plurality of mobile devices interact as nodes in a mobile ad hoc network and in which packets are IP routable to each of the devices independent of fixed infrastructure elements; and providing at least one base station controller function in at least one subscriber device, the base station controller function including at least one of an air interface management function, a signaling function, a concentration logic function, and a signal processing function.

In embodiments, a mobile, broadband, routable internet may be provided, in which a plurality of mobile devices interact as nodes in a mobile ad hoc network and in which packets are IP routable to each of the devices independent of fixed infrastructure elements; and providing service provider tools to manage resource consumption of at least one device on the ad hoc network, wherein the tools are deployed on at least one of the plurality of mobile devices and use at least one management path for reporting usage of the at least one device.

In embodiments, a mobile, broadband, routable internet may be provided, in which a plurality of mobile devices interact as nodes in a mobile ad hoc network and in which packets are IP routable to each of the devices independent of fixed infrastructure elements; and providing full radio resource management functions in at least one device, the radio resource management functions including at least one of radio management, handover, handoff, and foreign device cooperation functions, wherein the at least one device is a subscriber device.

In embodiments, a mobile, broadband, routable internet may be provided, in which a plurality of mobile devices interact as nodes in a mobile ad hoc network and in which packets are IP routable to each of the devices independent of fixed infrastructure elements; and providing multi-session functions in at least one of the plurality of devices, wherein the at least one device is a subscriber device.

In embodiments, a mobile, broadband, routable internet may be provided, in which a plurality of mobile devices interact as nodes in a mobile ad hoc network and in which packets are IP routable to each of the devices independent of fixed infrastructure elements; and providing cost-based routing functions in the network through dynamic forming and reforming of links and routes, wherein the cost-based routing functions are provided in a plurality of subscriber devices.

In embodiments, a mobile, broadband, routable internet may be provided, in which a plurality of mobile devices interact as nodes in a mobile ad hoc network and in which packets are IP routable to each of the devices independent of fixed infrastructure elements; and providing IP router functions at individual mobile devices of the network, wherein the individual mobile devices are subscriber devices.

In embodiments, a mobile, broadband, routable internet may be provided, in which a plurality of mobile devices interact as nodes in a mobile ad hoc network and in which packets are IP routable to each of the devices independent of fixed infrastructure elements; and providing, in at least one of the plurality of mobile devices, media access control layer capabilities including sub-network layer convergence functions selected from a list consisting of segmentation and reassembly, quality of service, throughput fairness, adaptive data rate control, and transmit power control, wherein the at least one mobile device is a subscriber device.

In embodiments, a mobile, broadband, routable internet may be provided, in which a plurality of mobile devices interact as nodes in a mobile ad hoc network and in which packets are IP routable to each of the devices independent of fixed infrastructure elements; and providing route diversity within the network to facilitate assurance of packet communication, wherein route diversity is based at least on a number of network devices in a geographic area.

In embodiments, a mobile, broadband, routable internet may be provided, in which a plurality of mobile devices interact as nodes in a mobile ad hoc network and in which packets are IP routable to each of the devices independent of fixed infrastructure elements; and allowing layer 2 forwarding among at least some of the plurality of mobile devices.

In embodiments, a mobile, broadband, routable internet may be provided, in which a plurality of mobile devices interact as nodes in a mobile ad hoc network and in which packets are IP routable to each of the devices independent of fixed infrastructure elements; and providing the routable internet to a node in the network, wherein the node also communicates with a cellular network through at least one of the fixed infrastructure elements and the routable internet is provided outside the cellular network.

In embodiments, a mobile, broadband, routable internet may be provided, in which a plurality of mobile devices interact as nodes in a mobile ad hoc network and in which packets are IP routable to each of the devices independent of fixed infrastructure elements; and providing IP application deployment to a device in the network, wherein the device also communicates with a cellular network through at least one of the fixed infrastructure elements and the IP application is deployed outside the cellular network.

In embodiments, a mobile, broadband, routable internet may be provided, in which a plurality of mobile devices interact as nodes in a mobile ad hoc network and in which packets are IP routable to each of the devices independent of fixed infrastructure elements; and routing data packets through the mobile ad hoc network.

In embodiments, a mobile, broadband, routable internet may be provided, in which a plurality of mobile devices interact as nodes in a mobile ad hoc network and in which packets are IP routable to each of the devices independent of fixed infrastructure elements; and routing data packets through the mobile ad hoc network absent communications with the fixed infrastructure elements.

In embodiments, a mobile, broadband, routable internet may be provided, in which a plurality of mobile devices interact as nodes in a mobile ad hoc network and in which packets are IP routable to each of the devices independent of fixed infrastructure elements, communications to the nodes having a throughput of at least 768 kbit/sec during normal operation.

In embodiments, a mobile, broadband, routable internet may be provided, in which a plurality of mobile devices interact as nodes in a mobile ad hoc network and in which packets are IP routable to each of the devices independent of fixed infrastructure elements, communications to the nodes having a throughput of at least 768 kbit/set when the nodes are in motion at vehicular speeds.

In embodiments, a mobile, broadband, routable internet may be provided, in which a plurality of mobile devices interact as nodes in a mobile ad hoc network and in which packets are IP routable to each of mobile devices of fixed infrastructure elements.

In embodiments, a mobile, broadband, routable internet may be provided, in which a plurality of mobile devices interact as nodes in a mobile ad hoc network and in which packets are IP routable to each of the devices independent of fixed infrastructure elements; and applying swarm intelligence to determine at least some parts of at least some routes through the mobile, broadband, routable internet.

BRIEF DESCRIPTION OF THE FIGURES

The invention and the following detailed description of certain embodiments thereof may be understood by reference to the following figures:

FIG. 73 depicts an embodiment of a header table for layer 2 forwarding.

DETAILED DESCRIPTION

Figure 1B:
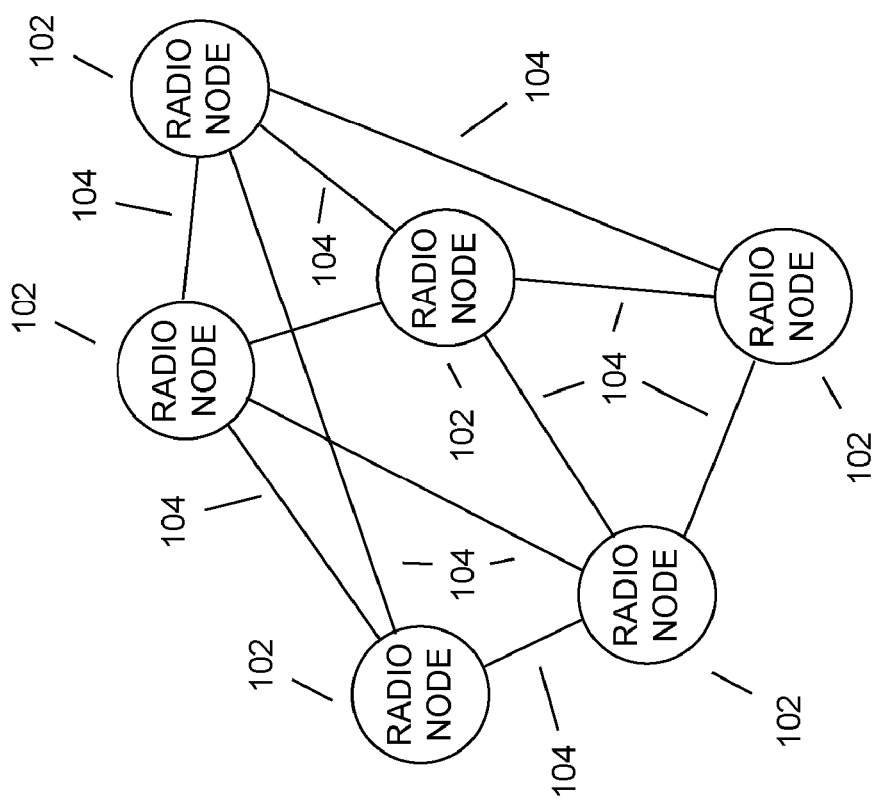
FIG. 1B depicts an embodiment of a collection of wireless radio nodes in a mobile ad-hoc wireless network according to an embodiment of the present invention, where the radio nodes are shown as nodes linked together into the mobile ad-hoc wireless network.

The features of the present invention, which are believed to be novel, are set forth with particularity in the appended claims. The invention may best be understood by reference to the following description, taken in conjunction with the accompanying drawings.

While the specification concludes with the claims defining the features of the invention that are regarded as novel, it is believed that the invention will be better understood from a consideration of the following description in conjunction with the drawings figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defied as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

The present disclosure provides a mobile broadband routable internet (MBRI) for providing carrier-grade, networked, broadband, IP-routable communication among a plurality of mobile devices, where the mobile devices may represent a plurality of nodes that are linked together through a mobile ad-hoc network (MANET). Mobile devices, also referred to herein where context permits as subscriber devices, may operate as peers in a peer-to-peer network, with full IP routing capabilities enabled within each subscriber device, thereby allowing routing of IP-based traffic, including deployment of applications, to the subscriber device without need for infrastructure conventionally required for wireless networks, such as cellular telephony infrastructure. Full IP-routing to subscriber devices allows seamless integration to the fixed Internet, such as through fixed or mobile access points, such as for backhaul purposes. Thus, the MBRI may function as a standalone mobile Internet, without connection to the fixed Internet, or as an IP-routable extension of another network, whether it be the Internet, a local area network, a wide area network, a cellular network, a personal area network, or some other type of network that is capable of integration with an IP-based network. The capabilities that enable the MBRI are disclosed herein, such capabilities including the software, technology components and processes for physical layer, MAC layer, and routing layer capabilities that allow all IP-based traffic types and applications to use the MBRI, embodied across a set of mobile devices, as if it were an 802.1 through 802.3 compliant fixed network, without reliance on, or intervention by, fixed network infrastructure components such as application-specific Internet servers or cellular infrastructure components.

In contrast to existing wireless and fixed wired access networks, MBRI may provide a solution where every subscriber device and infrastructure node may have routing capabilities to allow for intelligent routing decisions, enabling intra-network peer to peer communications. Traffic between nodes of the MBRI may not need to leave the MANET network for routing or switching purposes. Instead, because MBRI is routing enabled, local traffic including required signaling may stay within the MBRI. In addition, because of its neighbor discovery management, adaptive data rate power management, and the like capabilities as described further herein, the MBRI may enable local intelligence to be shared across its member nodes, leading to the creation and deployment of new classes of services and applications. Further, because of its MANET characteristic the MBRI may be independent of fixed traffic aggregation points such as base stations or cell towers, and instead may leverage multiple backhaul access points in a load leveling and self-healing manner. Because of the MANET waveform characteristics and the MANET architectural flexibility to deploy additional backhaul access points (BAP) or to upgrade existing MANET Access Points with backhaul capability, the MBRI may better assure broadband bandwidth to the individual nodes, such as in excess of conventional 3G/4G networks. Further, if combined with dynamic spectrum access (DYSAN) technology the MBRI may coexist within existing defined spectrum with associated active network operations.

In embodiments, the MBRI may be implemented in a plurality of configurations, such as an MBRI basic configuration including the MANET protocol stack that may bring Internet access and routing capability to a subscriber device; an MBRI enhanced configuration that takes the MBRI basic configuration and combines it with selected media transport enhancements, such as to improve multimedia transport of the MBRI network; an MBRI comprehensive configuration that may consist of a the MBRI basic configuration with transport enhancements targeted at high quality service, such as for multimedia, multi-session applications, and the like; an MBRI comprehensive configuration with dynamic spectrum awareness, which may consist of enhancements to the MANET protocol stack to allow for spectrum co-sharing between non-cooperative spectrum users or dissimilar spectrum technologies, and coordination between cooperative systems; and the like.

In embodiments, the MBRI basic configuration may include a plurality of capabilities, such as ad-hoc network creation and self forming, self healing, load leveling, packet size indifference, unicast, routing enabled, peer-to-peer communications, mobility, broadband, Internet protocol plug compatible, neighbor aware, geo location, radio resource management, openness for Java web applications, enablement for private and public networks, security, spectrum independence, scalability (e.g., for bandwidth, backhaul, users, and the like), structured or unstructured network architecture, different levels of network spanning, waveform variants (e.g., such as slotted/half duplex, synchronization on each slot separately, and the like), multi-session capability, and the like.

In embodiments, the MBRI enhanced configuration may include MBRI basic capabilities, plus a plurality of enhancements, such as adaptive data rate (ADR), quality of service (QoS), flexible transport (such as for both sensitive and delay tolerant traffic, sub-queues, traffic based scheduling, optimized short/medium/large packet support, and the like), scoped link state routing (SLSR) link cost based routing, SLSR domain management, multicasting, layer 2 forwarding, layer 3 fast pipe, segmentation and reassembly (SAR), hybrid slot structure, multi-channel MAC, adaptive power control (APC), distributed data for web applications in an MBRI device, local intelligence (such as through caching, local content and services, and the like), distributed applications, vehicular mobility vector based routing, sleep mode, assured bandwidth, admission control, traffic policing, traffic shaping (such as per flow, per node, per MAP, per BAP, and the like), automatic retransmission request (ARQ), forward error correction (FEC) on long IP packets, proactive router handoff, and the like.

In embodiments, mobile devices, and other hardware devices, may be enabled by MBRI, such as chips, chip sets, a personal computer manufacturer communications interface adaptor (PCMCIA) card, network components, a personal portal (e.g., a chip that may go in any device), an ASIC, and the like. In embodiments the MBRI may be provided connectivity to fixed communication facilities through a backhaul access point (BAP). In addition, connections from the MBRI network to the BAP may be made through a MANET or mesh access point (MAP), a customer access point (CAP), and the like. In addition, the BAP may attach to a fiber access point (FAP), and the like, In embodiments, a BAP may be a network access point with wire-line backhaul capabilities, such as via fiber, wired, microwave, and the like; a MAP may be a network access point with wireless relay capabilities, such as to a BAP; a CAP may be a customer device with mains power and capable of connecting to a BAP; and the like. In embodiments, the MBRI may provide significant advantages over current mobile network systems, where MBRI capabilities, MBRI enabled devices, and MBRI access point facilities may enable improved performance and quality of service to users.

In embodiments, the use of CAPs may provide for a more robust MBRI system, where a CAP may be owned by a customer but remains an integral part of the MANET network. The CAP may allow 'hopping' of other network traffic through it, and thus providing additional route diversity for network traffic. This system of CAPS may extend the network coverage into new areas and also enable new traffic routes that can avoid occlusions and provide additional route diversity security. The CAP may contain a MANET radio, power supply, antennae, power outlet, and the like. In embodiments, the CAP may be an indoor unit and thus provide coverage in the customer premises as well as access to other MANET radios. By utilizing a customer-owned device for a CAP, the cost of deploying a network for the network builder may be reduced at the same time as the coverage is extended to places where the customer particularly wants coverage. In embodiments, the CAP may be self-installed by the customer, self-configured to operate on a MANET network, act as a node on the network by allowing network traffic from other sources to 'hop' through the CAP, provide greater network coverage and route diversity that improves quality of service, and the like.

Figure 1A:
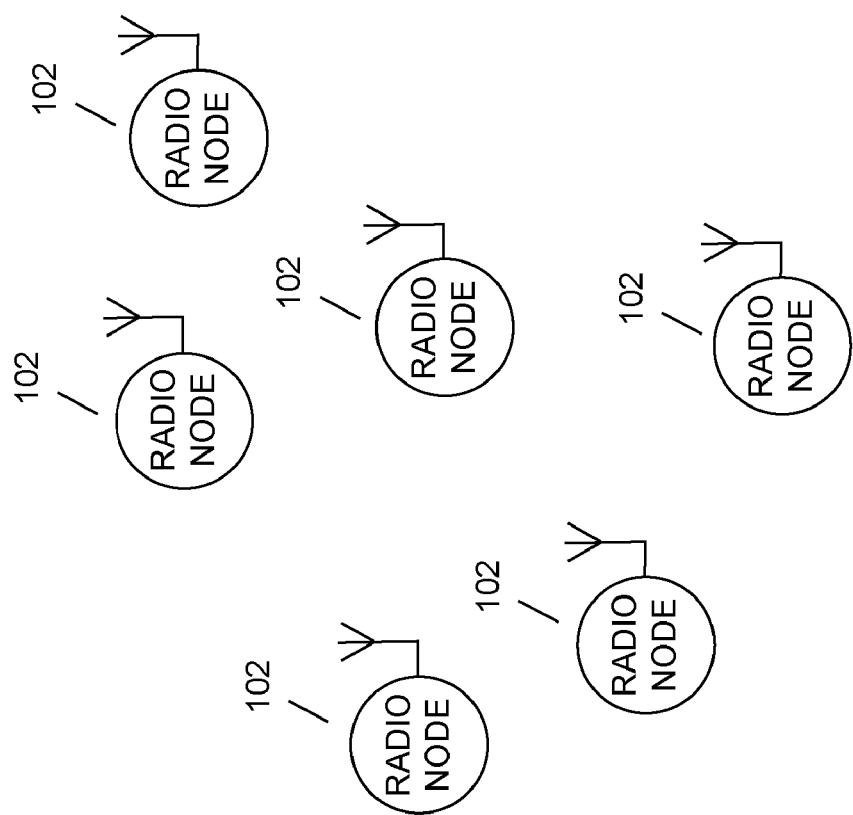
FIG. 1A depicts an embodiment of a collection of wireless radio nodes in a mobile ad-hoc wireless network according to an embodiment of the present invention.

FIG. 1A illustrates a mobile ad-hoc wireless network according to an embodiment of the present invention. As shown in FIG. 1A, the wireless network may have a set of wireless devices capable of communicating wirelessly. Each wireless device may be termed as a node 102. A node 102 may communicate with any other node 102, and as shown in FIG. 1B, links 104 may be formed between nodes 102. The mobile ad-hoc network may include nodes 102 that are mobile, as well as nodes 102 that are fixed. In embodiments, the fixed nodes may enable the creating of a spanning network to establish initial wireless coverage across a geographic area. In addition, a subset of these nodes 102 may have connectivity to a fixed (i.e., wired) network. In a mobile ad-hoc wireless network, routing through the network may find the 'best' path to destination including 'multi-hop' relay across multiple wireless nodes. The wireless network may be capable of autonomously forming and re-forming links and routes through the network. This dynamic forming and re-forming of links 104 and routes may be made to adjust to changing conditions resulting from node mobility, environmental conditions, traffic loading, and the like. Thus, mobile ad-hoc wireless network's wireless topology may change rapidly and unpredictably.

Establishing a quality of service may be an essential quality for the mobile ad-hoc wireless network. In embodiments, quality of service for a mobile ad-hoc wireless network may be measured in terms of the amount of data which the network successfully transfers from one place to another over a period of time. Currently used mobile ad-hoc networks may have a number of issues with respect to network quality of service, such as application routing-focused communication without the ability to provide service-level agreements for quality-of-service, providing only unicast services, link-focused power control, providing a single data rate only, providing contention-based access (e.g., focus on inefficient unlicensed band radios), focused on military or public safety applications, congestion and dynamic and unpredictable latency (especially with multi-hop scenarios), and the like. In embodiments the present invention may provide for a mobile ad-hoc network that significantly improves on the shortcomings of current systems.

Figure 2B:
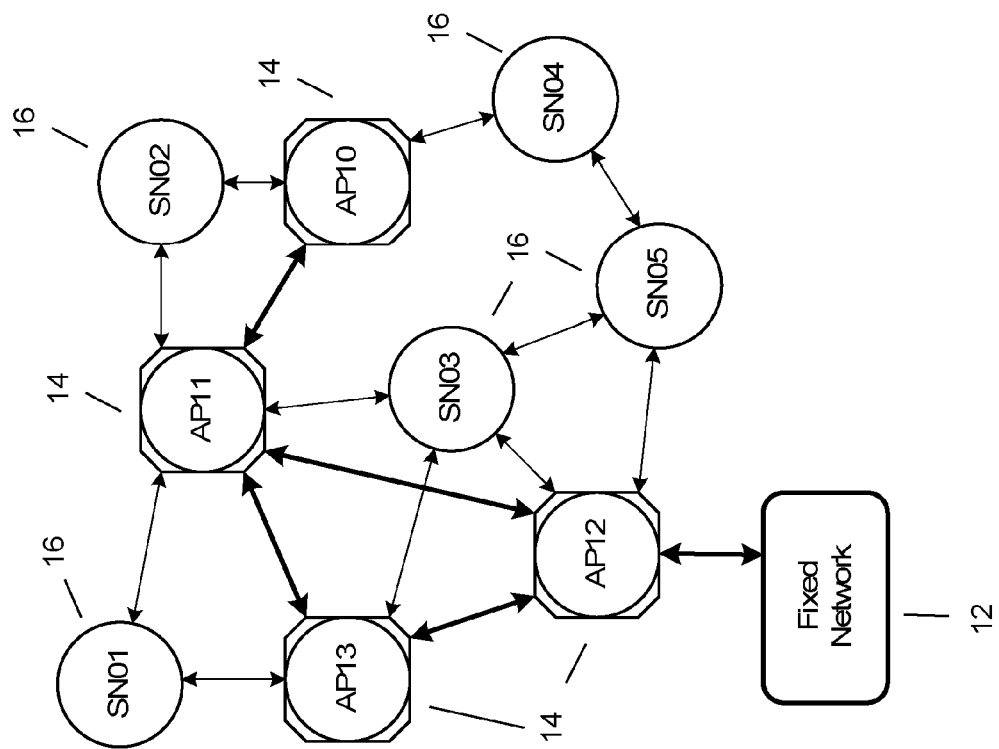
FIG. 2B depicts embodiment of a wireless mesh network according to an embodiment of the present invention, where subscriber nodes are shown linked to access points.
Figure 2A:
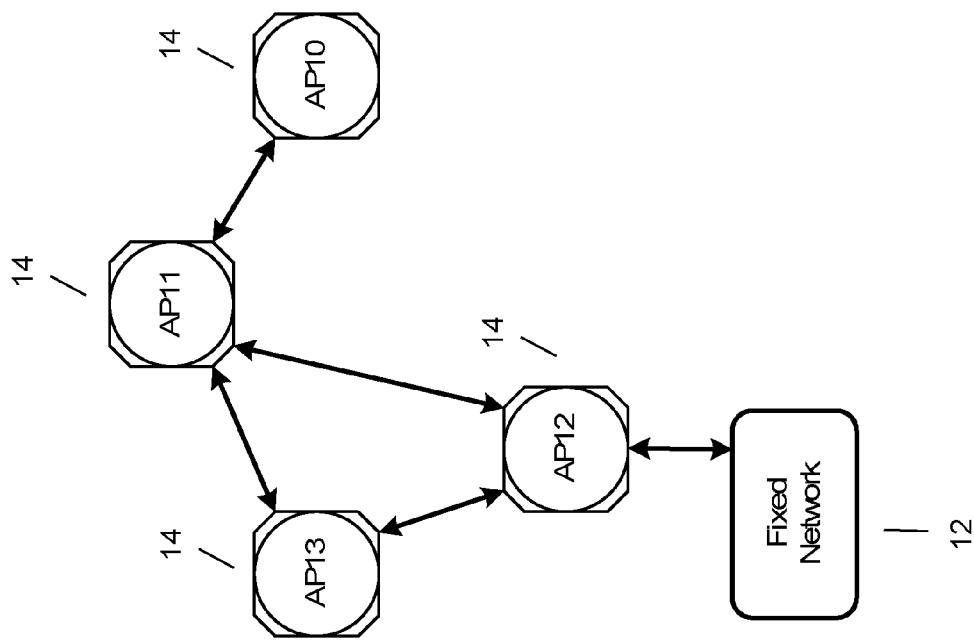
FIG. 2A depicts an embodiment of a wireless mesh network according to an embodiment of the present invention, where access points are shown in relation to the network's connection to a fixed network.

FIGS. 2A and 2B illustrate a wireless mesh network according to an embodiment of the present invention. The wireless mesh network may be a type of wireless ad-hoc network which allows multi-hop routing. A wireless mesh network architecture may sustain communications by breaking long distances into a series of shorter hops. As shown in FIG. 2A, the wireless mesh network may have a subset of nodes 102 designated as access points 14 to form a spanning network to establish initial wireless network coverage across a geographical area. In an embodiment, one or more access points may have a connection interface to a fixed network 12. In embodiments, the fixed network 12 that the access points 14 connect to may be any known fixed network, such as the Internet, a LAN, a WAN, a cell network, and the like. As shown in FIG. 2B, a subset of nodes 102 may be designated as 'subscriber nodes' 16 that may form links 104 among themselves and to the spanning network to augment wireless coverage. This may allow nodes 102 connectivity to the fixed network 12 via multiple hops across wireless topology. This topology may also change with node mobility. In embodiments, a wireless mesh network may be termed as a mobile ad-hoc network if the nodes 102 in a wireless mesh network are mobile.

Figure 3:
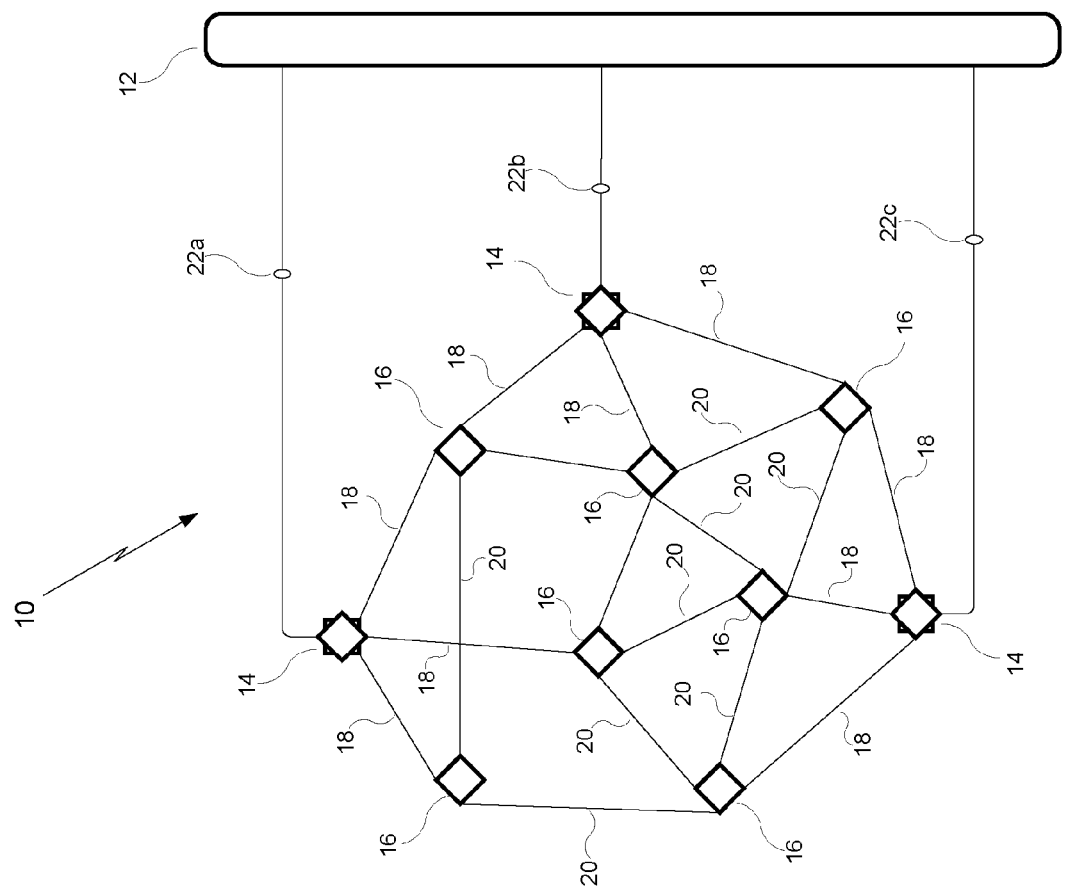
FIG. 3 depicts an embodiment of a wireless network with access points back to the fixed Internet.
Figure 4:
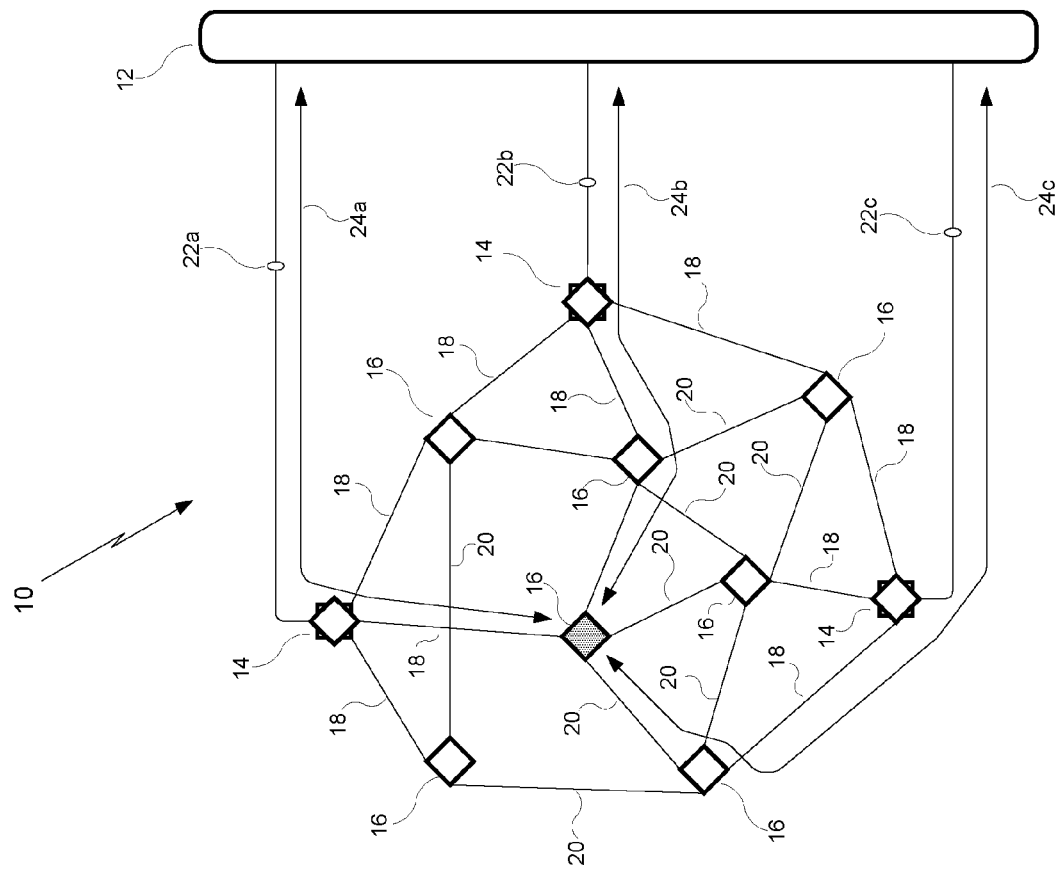
FIG. 4 depicts an embodiment of a wireless network showing multiple pathways from a particular mobile network node to the fixed Internet.

FIG. 3 depicts a mobile ad-hoc network with backhaul 10 to a fixed network 12. Here, the mobile ad-hoc network is shown to include a plurality of mobile nodes 16, a plurality of fixed nodes 14, a plurality of access points 14, a plurality of mobile node to fixed node links 18, a plurality of mobile node to mobile node links 20, the fixed network 12, and a plurality of fixed node to fixed network links 22a-c. In embodiments, the fixed nodes 14 may provide network structure, such as to provide a spanning network that enables the establishment of the ad-hoc network, as well as connectivity to the fixed network. Mobile nodes 16 may then establish links 18 to both fixed nodes 14 and to other mobile nodes 20, where all of the nodes 14,16 and links 18, 20 establish the mobile ad-hoc network with links 22a-c to the fixed network 12. FIG. 4 illustrates three example network pathway routings 24a-c for a mobile node 16 establishing connectivity to the fixed network 12, including a link combination 24a from the fixed network 12 to a fixed node 14 and then to the destination mobile node 16, a link combination 22b to a fixed node 14 through an intermediate mobile node 16 and then to the destination mobile node, and an alternate link combination 22c to a fixed node 14 through an intermediate mobile node 16 and then to the destination mobile node. In embodiments, the link combinations may include any number of mobile nodes 16, fixed nodes 14, subscriber nodes, access points, and the like.

In embodiments, the mobile ad-hoc network may also provide a plurality of network services and attributes, such as autonomous neighbor discovery and maintenance, distributed network timing reference dissemination, dynamic frame structure, distributed scheduling with dynamic selection of scheduling algorithms (e.g., such as based on network topology, traffic load, spectrum availability), link-by-link autonomous data rate selection, traffic differentiation across the protocol stack (e.g. priority queuing and priority channel access), ARQ automatic repeat and request capability, geolocation capability for E-911 and location-based services, power control for intra-network interference management and spectrum reuse, unicast and multicast routing, interfacing in a standard way to existing IP core network nodes, encryption and authentication, OSS with EMS and NMS, and the like.

Figure 5:
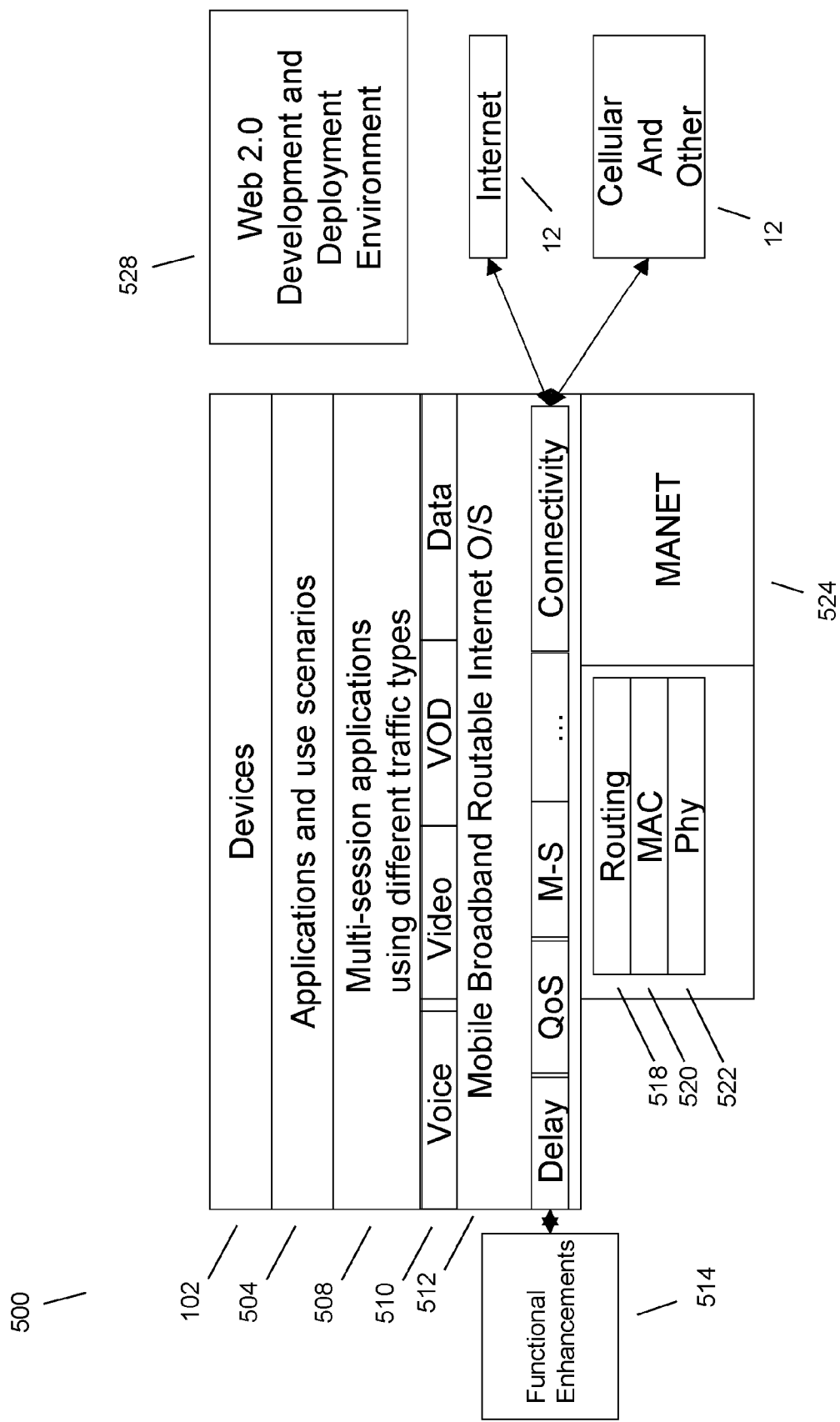
FIG. 5 depicts an embodiment of the MBRI stack showing layers from device down to physical layer.

FIG. 5 depicts the MBRI as a hierarchical stack 500. At the top of the MBRI stack are the devices 102, including mobile subscriber devices (SD) 16, fixed node communication devices, access points 14, and the like. The next two layers down represent applications and use scenarios 504, and multi-session applications using different traffic types 508, which may be utilized or executed by the devices 502 in conjunction with the MBRI. Continuing down to the next layer, are data applications that may be carried 510 across the MBRI, including data, voice, video, video on demand (VOD), and the like. Next is the MBRI operating system 512. Next, the MBRI stack shows a representative subset of the MBRI functional enhancements 514, as described herein, which may be provided as optional elements in the MBRI system. The MBRI thus far, may then be enabled from the stack elements below, including a core stack of routing 518, MAC 520, and physical layers 522, as shown in the middle, which may provide fixed Internet equivalency in a mobile ad-hoc network 524. In addition, connectivity is also shown to other communication facilities, such as the fixed networks 12 as described herein. In embodiments, the MBRI may be built up from various combinations and sub-combinations of the various components of the MBRI stack, which may enable various applications, devices, and the like, the ability to deploy applications directly to the device. In embodiments, the MBRI stack may provide a solution with high quality of service transport for multi-session applications, replicate functions that may be effectively analogous to the foundation standards of the IETF defined internet within the mobility sector, enable functions analogous to each of the functions in the IETF 802.1-3 fixed Internet stack provide services associated with Web 2.0 development and deployment environment 528, and the like. In embodiments, the MBRI may represent a mobile ad-hoc network with true Internet routing capability.

Figure 6:
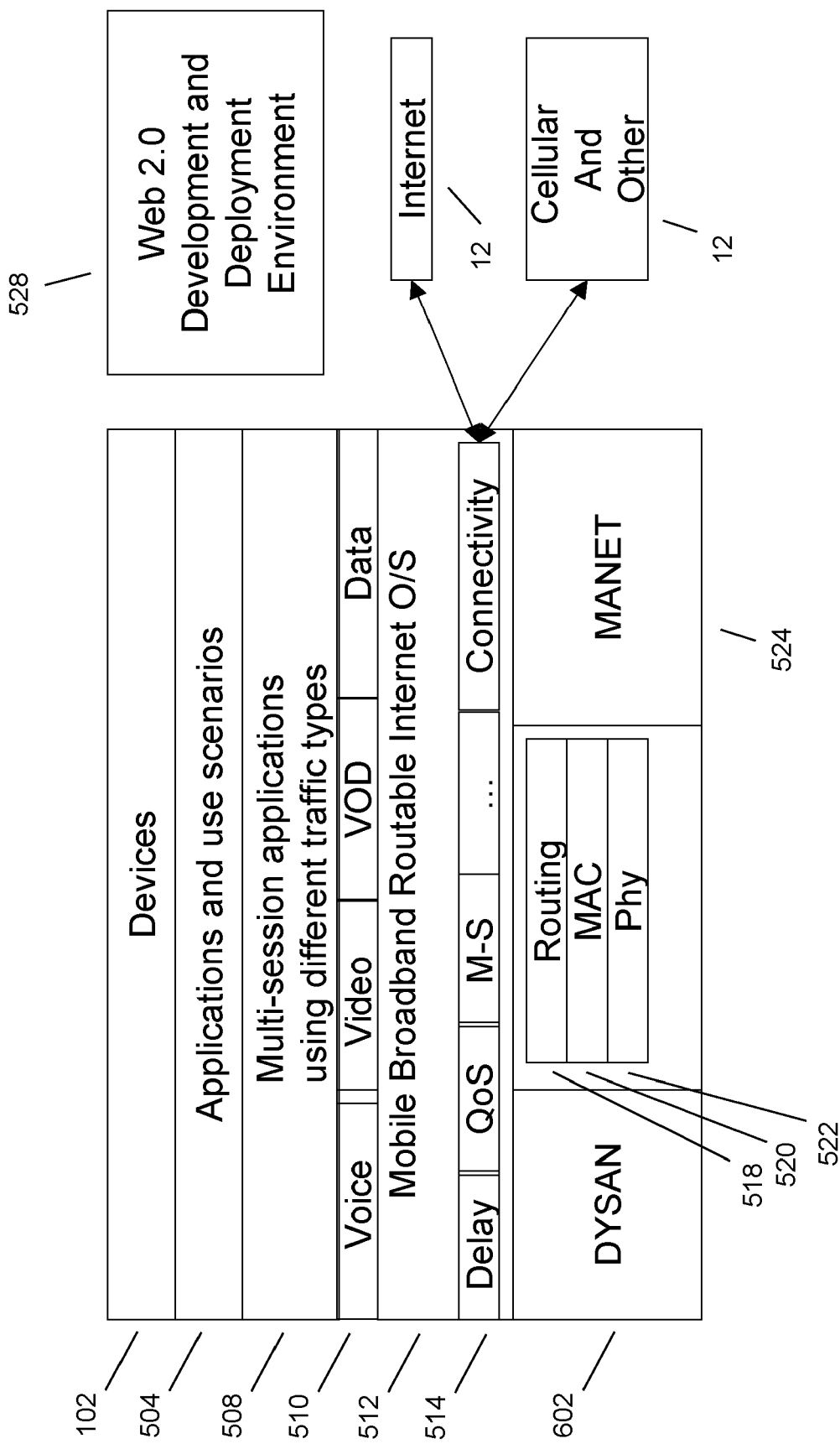
FIG. 6 depicts an embodiment of the MBRI stack showing the addition of DYSAN capabilities.

FIG. 6 shows the MBRI stack as introduced in FIG. 5, but with dynamic spectrum access (DYSAN) 602 added as an option. Currently dynamic spectrum access technologies may be focused on limited aspects of network performance, such as on TV bands, finding spectrum for the whole network, trying to avoid interference through power control, and the like. Dynamic spectrum access 602, as a part of MBRI may provide spectrum used to communicate wirelessly between nodes changes in a non-pre-determined manner in response to changing network and spectrum conditions. In embodiments, the time scale of dynamics may be typically less than can be supported by engineering analysis, network re-planning, optimization, and the like. For instance, in response to manual or automated decisions, where there may be centralized decisions (e.g., network partitioning) or distributed local decisions of the individual nodes. Dynamic spectrum access may be able to avoid interference to/from geographically proximate spectrum users internal or external to their own wireless network. Dynamic spectrum access 602 may also be able to access and utilize spectrum otherwise unavailable for wireless network use. In embodiments, local spectrum decisions may be coordinated and/or communicated using a fixed or logical control channel in an over-the-air wireless network.

Figure 7:
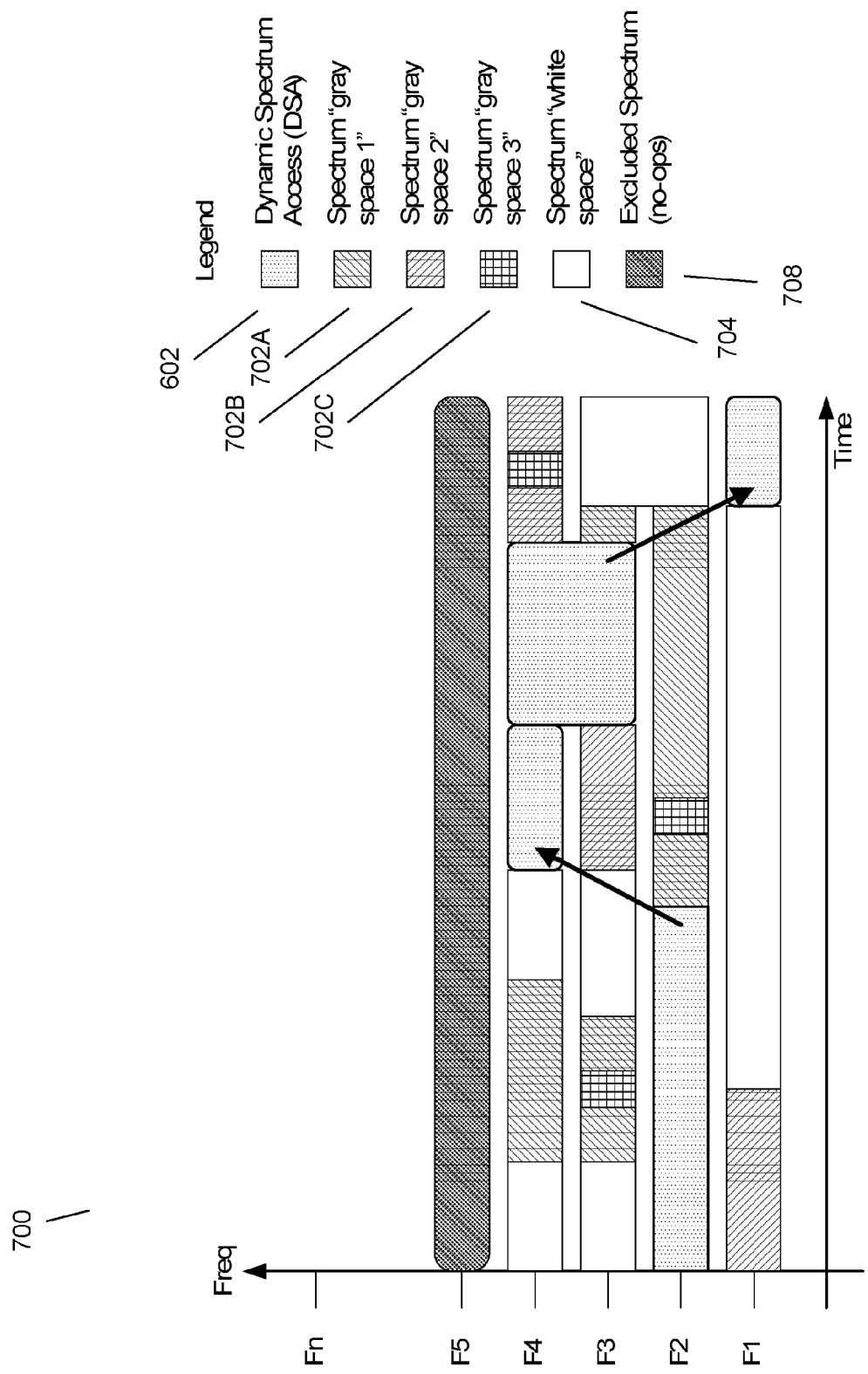
FIG. 7 depicts an embodiment of the use of dynamic spectrum access technology to wireless communication according to an embodiment of the present invention.

FIG. 7 illustrates the use of dynamic spectrum access technology 700 to wireless communication according to an embodiment of the present invention. A wireless network may use dynamic spectrum access that provides a dynamic allocation of wireless spectrum to network nodes, such as between the different frequencies F1, F2, F3, F4, and F5. The spectrum may be used to communicate wirelessly between nodes 102 in a non-pre-determined manner in response to changing network and spectrum conditions. Dynamic spectrum access technology may use the methodology of coordination of a collection of wireless nodes 16 to adjust their use of the available RF spectrum. In embodiments, the spectrum may be allocated in response to manual or automated decisions, such as to dynamic spectrum access 602, spectrum gray space 702A,B,C, spectrum white space 704, excluded spectrum 708 (e.g. no ops). The spectrum may be allocated in a centralized manner (e.g., network partitioning) or in a distributed manner between individual nodes. The spectrum may be allocated dynamically such that interference to/from geographically proximate spectrum users internal or external to the wireless network may be avoided. The local spectrum decisions may be coordinated/communicated using a fixed or logical control channel in the over-the-air wireless network. This may increase the performance of wireless networks by intelligently distributing segments of available radio frequency spectrum to wireless nodes. Dynamic spectrum access may provide an improvement to wireless communications and spectrum management in terms of spectrum access, capacity, planning requirements, ease of use, reliability, avoiding congestion, and the like.

Figure 8:
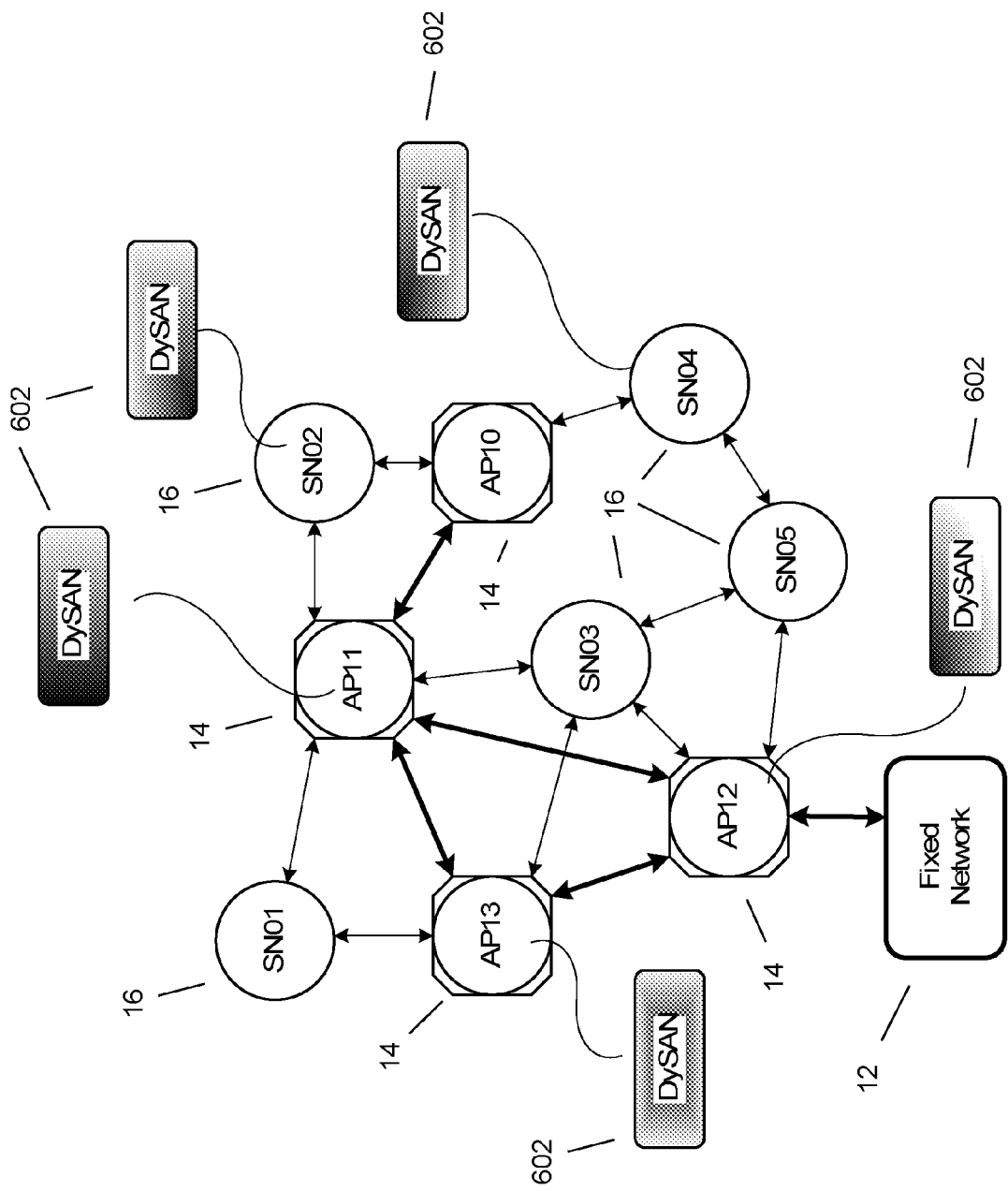
FIG. 8 depicts an embodiment of the mobile ad-hoc wireless network using dynamic spectrum access technology according to an embodiment of the present invention.
Figure 9:
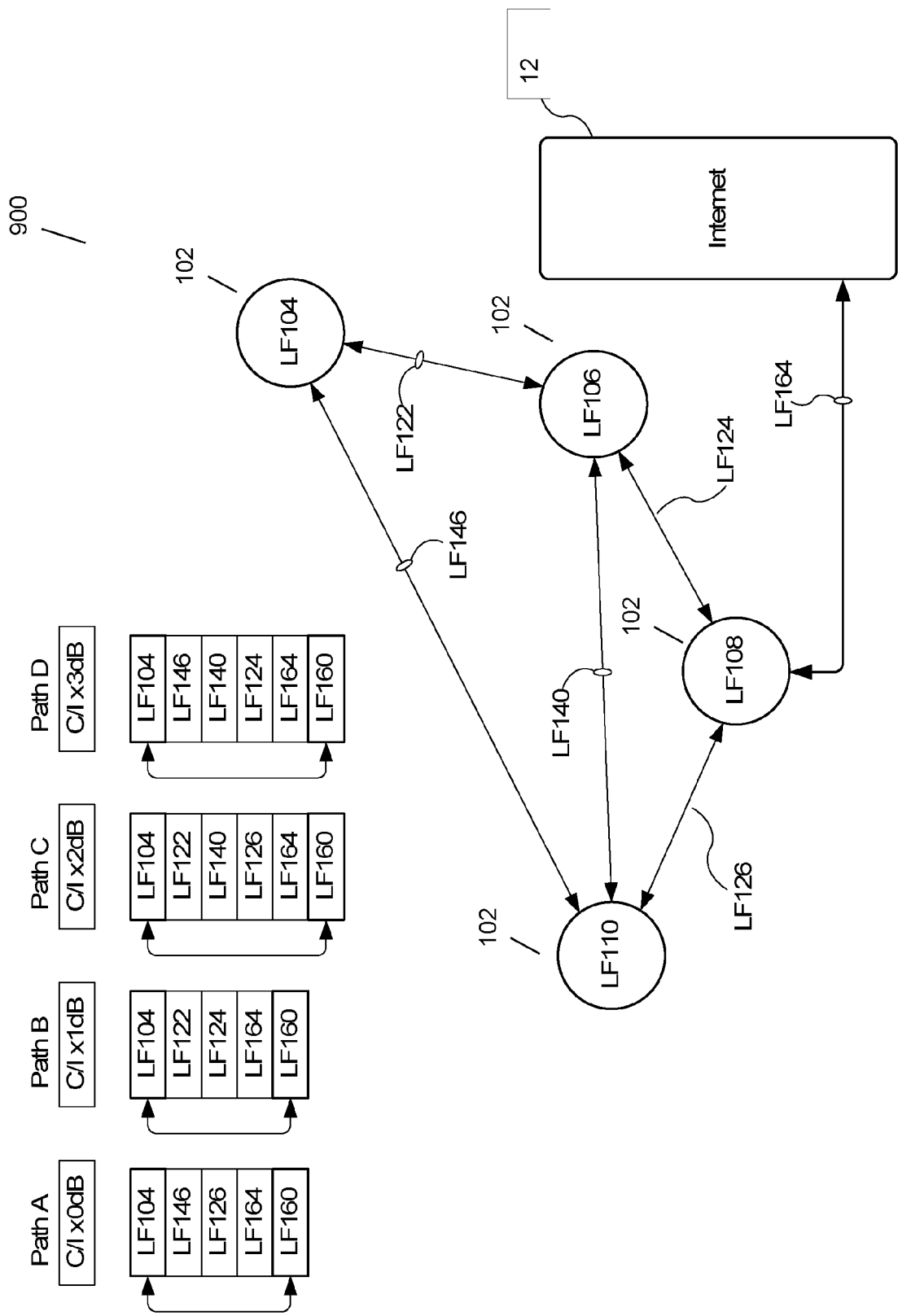
FIG. 9 depicts an embodiment of DYSAN spectrum aware routing.

FIG. 8 illustrates a mobile ad-hoc wireless network using dynamic spectrum access technology 602 according to an embodiment of the present invention. In this embodiment, a mobile ad-hoc wireless network may be used in conjunction with dynamic spectrum access technology 602 to provide carrier grade quality of service. A collection of wireless nodes 14, 16 in a mobile ad-hoc network is shown dynamically adapting spectrum usage according to network and spectrum conditions. Individual nodes in the mobile ad-hoc wireless network may make distributed decisions regarding local spectrum usage. In embodiments, quality of service for a mobile ad-hoc wireless network may be measured in terms of the amount of data which the network may successfully transfer from one place to another in a given period of time, and DYSAN 602 may provide this through greater utilization of the available spectrum. In embodiments, the dynamic spectrum access technology may provide a plurality of network services and attributes such as, coordinated and uncoordinated distributed frequency assignment, fixed or dynamic network coordination control channel, assisted spectrum awareness (knowledge of available spectrum), tunable aggressiveness for co-existence with uncoordinated external networks, policy-driven for time-of-day frequency and geography, partitioning with coordinated external networks, integrated and/or external RF sensor, and the like. FIG. 9 shows how a spectrum aware path may be selected based on carrier-to-interference ratio 900, in this instance measured in dB (x0 to x3). BER may be used as well.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; enhancing MBRI operation through the use of dynamic adaptation of the operating spectrum; and disseminating spectrum access decisions through use of a logical control channel. In embodiments, adaptation decisions may be made by a centralized controller, in a distributed manner, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; the network capable of enhancing MBRI operation through the use of dynamic adaptation of the operating spectrum; and the network capable of disseminating spectrum access decisions through use of a logical control channel. In embodiments, adaptation decisions may be made by a centralized controller, a distributed manner, and the like.

In embodiments, the MBRI may provide enhancements that better enable carrier-grade service, such as through prioritization of latency-sensitive traffic across multiple layers of the networking protocols to reduce end-to-end latency and jitter (such as by providing priority queuing within node, priority channel access at MAC across nodes and priority routing across topology), providing network support for peer-to-peer connections bypassing network infrastructure, unicast and multicast routing with multiple gateway interfaces to fixed (i.e., wired) network, providing security to protect control-plane and user data and prevent unauthorized network access, traffic shaping and policing to prevent users from exceeding authorized network usage, remote monitoring, control, and upgrade of network devices, automatic re-transmission of loss-sensitive traffic, transparent link and route maintenance during periods of spectrum adaptation, rapid autonomous spectrum adaptation to maintain service quality, avoid interference, and maximize capacity, scalability of network protocols for reliable operation with node densities (e.g., hundreds to thousands of nodes per sq. km.) and node mobilities (e.g., to 100 mph) consistent with commercial wireless networks, using adaptive wireless network techniques to maximize scalable network capacity (e.g., adaptive transmit power control to reduce node interference footprint, adaptive link data rate, dynamic hybrid frame structure, dynamic distributed scheduling techniques, multi-channel operation using sub-channels and super-channels, load-leveling routing), simultaneous support of multiple broadband, high mobility network subscribers, interfaces with fixed carrier network (e.g., to support VoIP, SIP, etc.), and the like.

Figure 10:
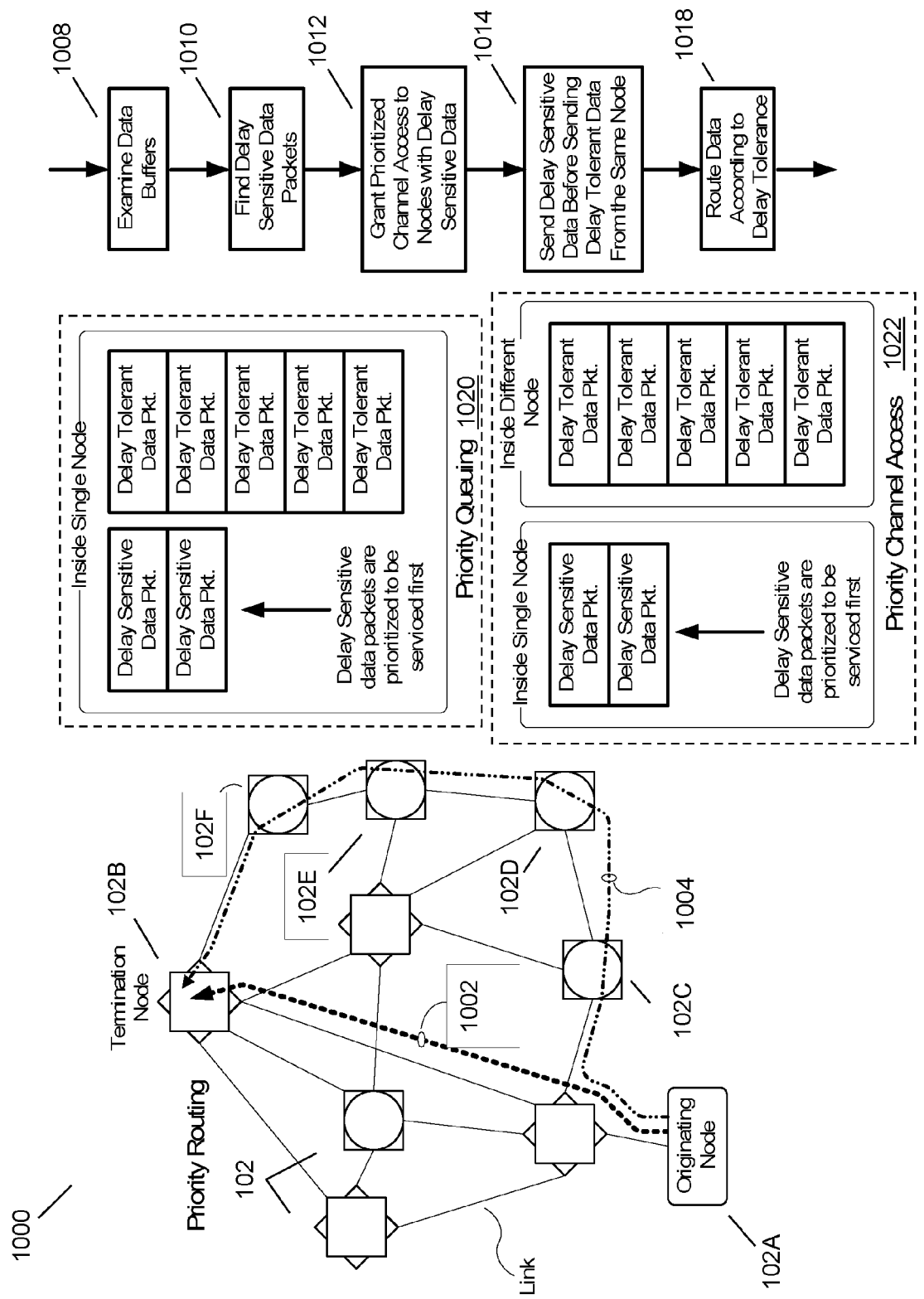
FIG. 10 depicts an embodiment for providing prioritization of delay-sensitive traffic across the network protocol stack in a mobile ad-hoc wireless network according to an embodiment of the present invention.
Figure 11:
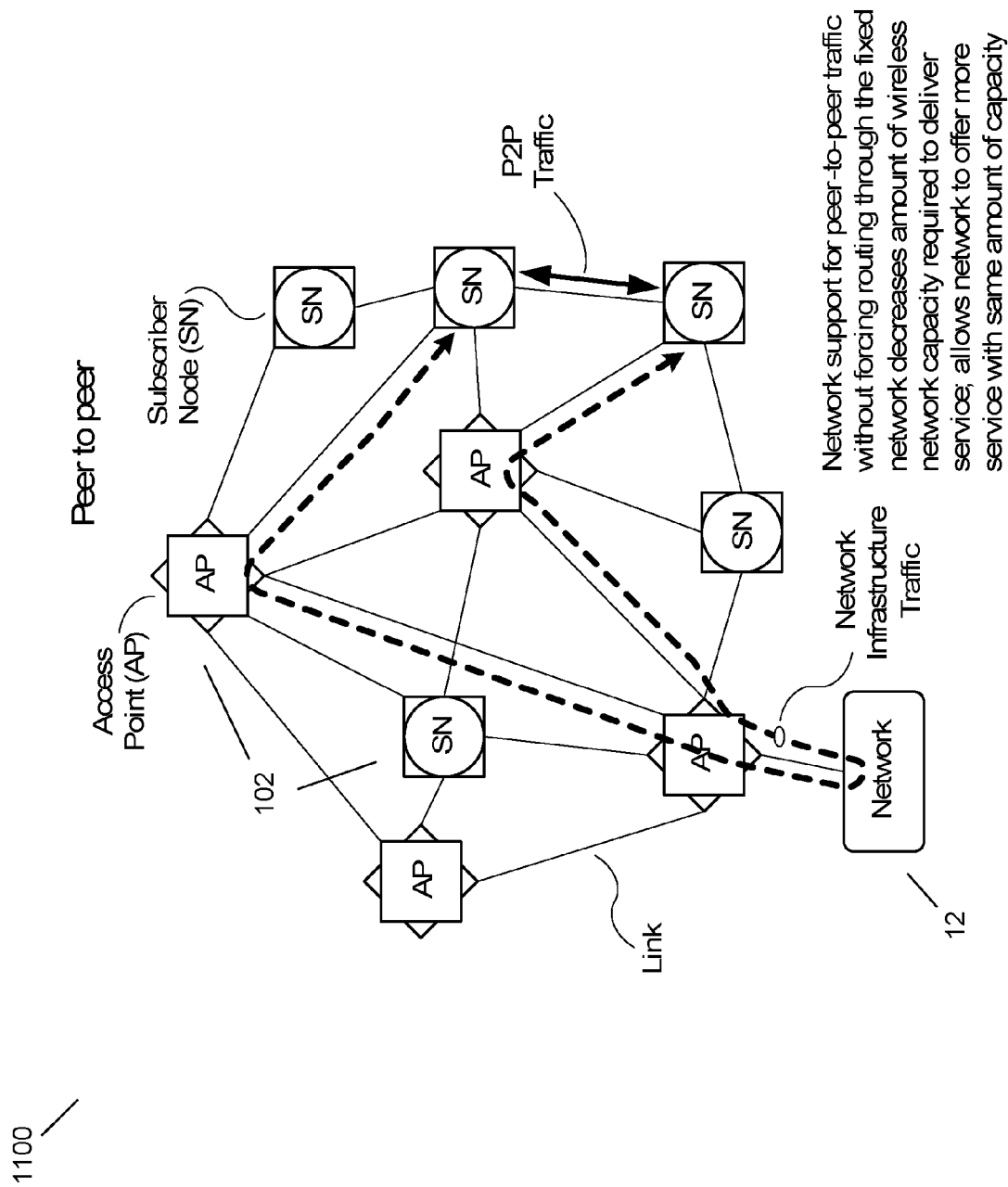
FIG. 11 depicts a graphical representative embodiment for providing network support for peer-to peer traffic in a MANET according to an embodiment of the present invention.
Figure 12:
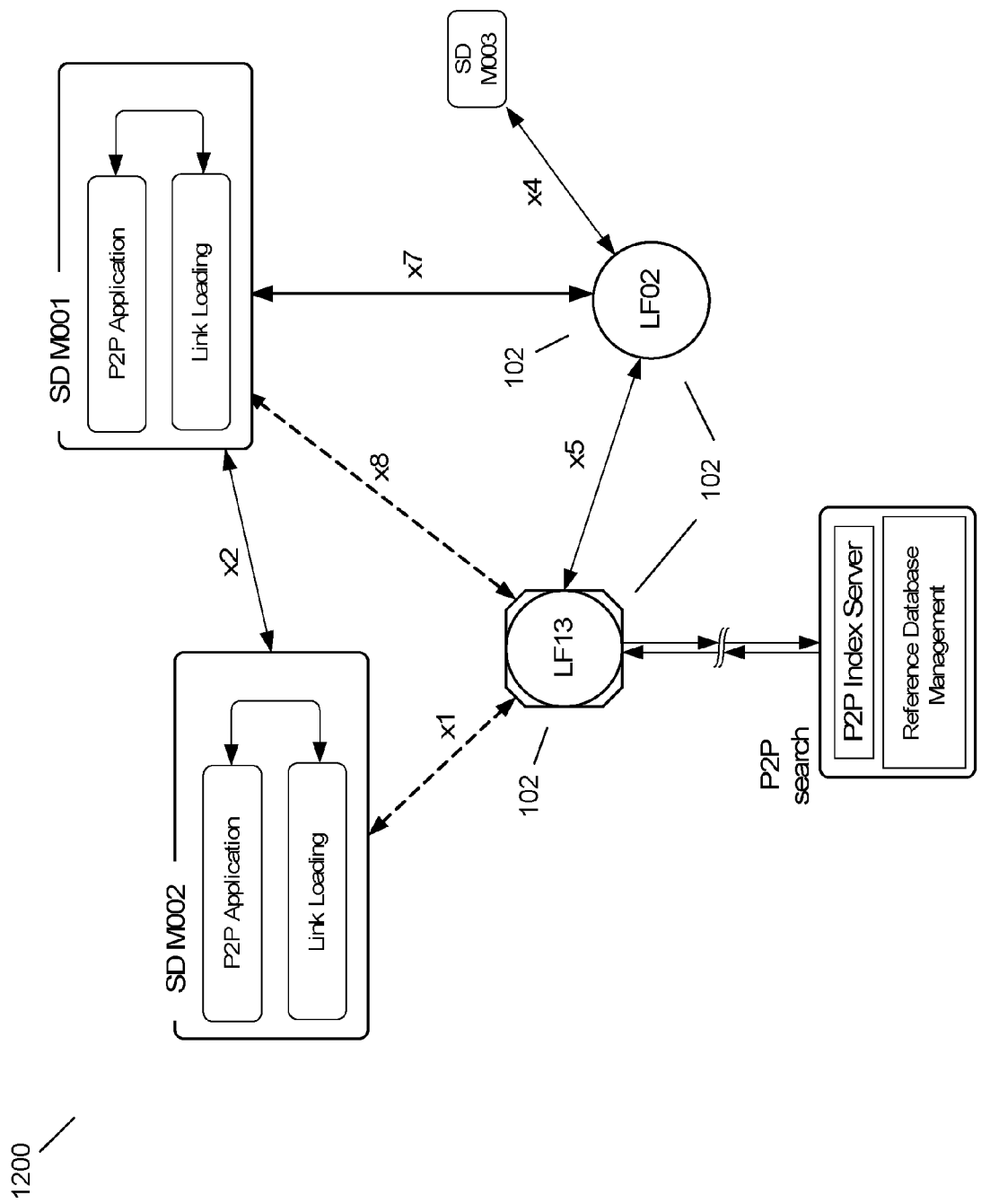
FIG. 12 depicts an embodiment for providing a peer-to-peer routing between nodes in a MANET.

In embodiments, an enhancement may be prioritization. FIG. 10 illustrates a method of providing prioritization of delay-sensitive traffic across the network protocol stack 1000 in a mobile ad-hoc wireless network according to an embodiment of the present invention. As shown, the prioritization of delay-sensitive traffic may be done by granting prioritized channel access 1022 to nodes 102A with delay-sensitive data and sending the delay sensitive data before sending the delay tolerant data 1004 from the same node 102A. For example, delay-sensitive data may be sent first, and possibly by a shorter route 1002, say directly from node 102A to node 102B, while delay-tolerant data may be sent afterwards, and possibly by a longer route 1004. This may enable the provision of service level performance agreements. In embodiments, the prioritization may be done across multiple layers of the networking protocols in order to reduce end-to-end latency and jitter. In an example process for prioritization of delay sensitive traffic, data buffers may be examined to find delay sensitive data packets. Thereafter, prioritized channel access may be granted to nodes with delay-sensitive data. This may include sending delay-sensitive data before sending delay-tolerant data from the same node. In addition to sending delay-sensitive data first, the process may route data according to delay-tolerance. In embodiments, priority queuing 1020 may be used within a node which may include using strict priority and weighted round-robin (WRR) techniques. Prioritization may include providing priority channel access at MAC across the nodes in the network. Prioritization may further include priority routing across topology. Further, the prioritization of delay sensitive traffic across the network protocol stack may enable service-level performance agreements. In an example flow of the process, the node 102A may first examine data buffers 1008, find delay sensitive data packets 1010, grant prioritized channel access to nodes with delay sensitive data 1012, send delay sensitive data before sending delay tolerant data from the same node 1014, and route data according to delay tolerance 1018, In embodiments, an enhancement may be network support for peer-to-peer traffic. FIG. 11 illustrates a method of providing network support for peer-to peer traffic in a mobile ad-hoc wireless network 1100 according to an embodiment of the present invention. Providing network support for peer-to-peer traffic without forcing routing through the fixed network may decrease the amount of wireless network capacity required to deliver service. This may allow the network to offer more service with the same amount of capacity. FIG. 12 illustrates one embodiment of how peer to peer MANET may be utilized in MBRI 1200.

Figure 13:
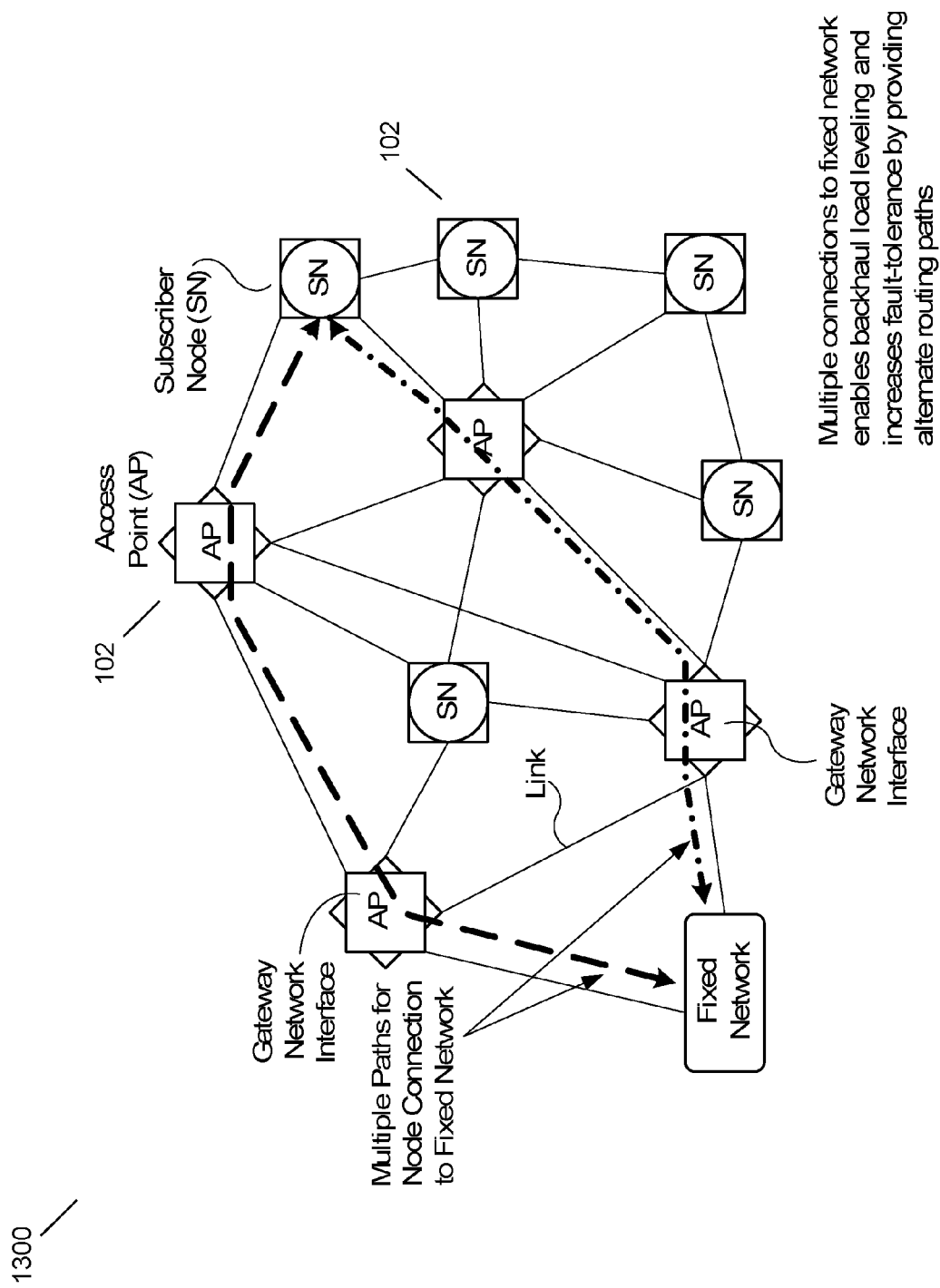
FIG. 13 depicts an embodiment for providing multiple fixed network gateway interfaces in a mobile ad-hoc wireless according to an embodiment of the present invention.
Figure 14:
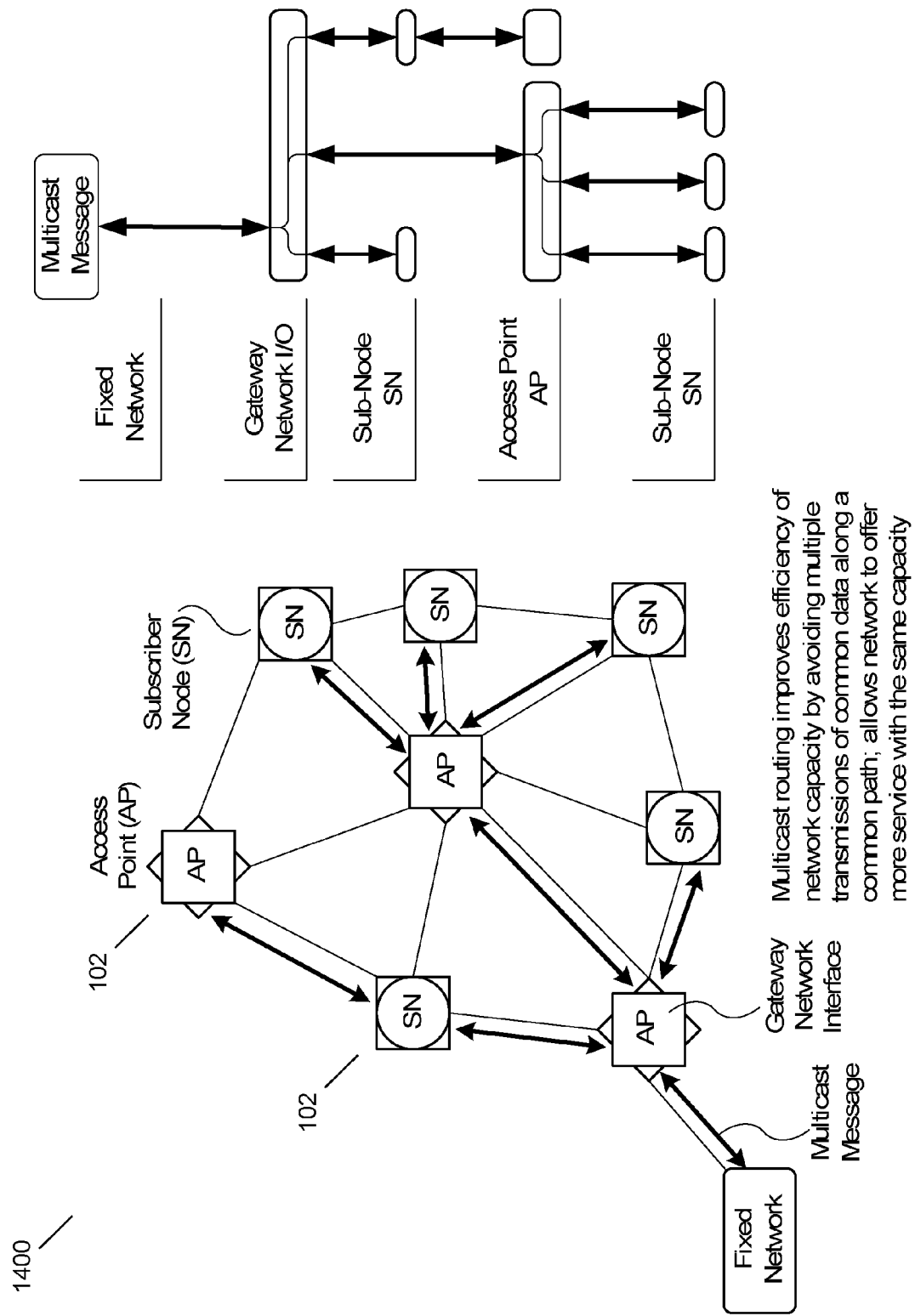
FIG. 14 depicts an embodiment for providing multicast routing in a mobile ad-hoc wireless according to an embodiment of the present invention.

In embodiments, an enhancement may be multiple fixed network gateway interfaces. FIG. 13 illustrates providing multiple fixed network gateway interfaces in a mobile ad-hoc wireless 1300 according to an embodiment of the present invention. In this embodiment, multiple connections to the fixed network may enable backhaul load leveling, and increases fault-tolerance by providing alternate routing paths.

Figure 15:
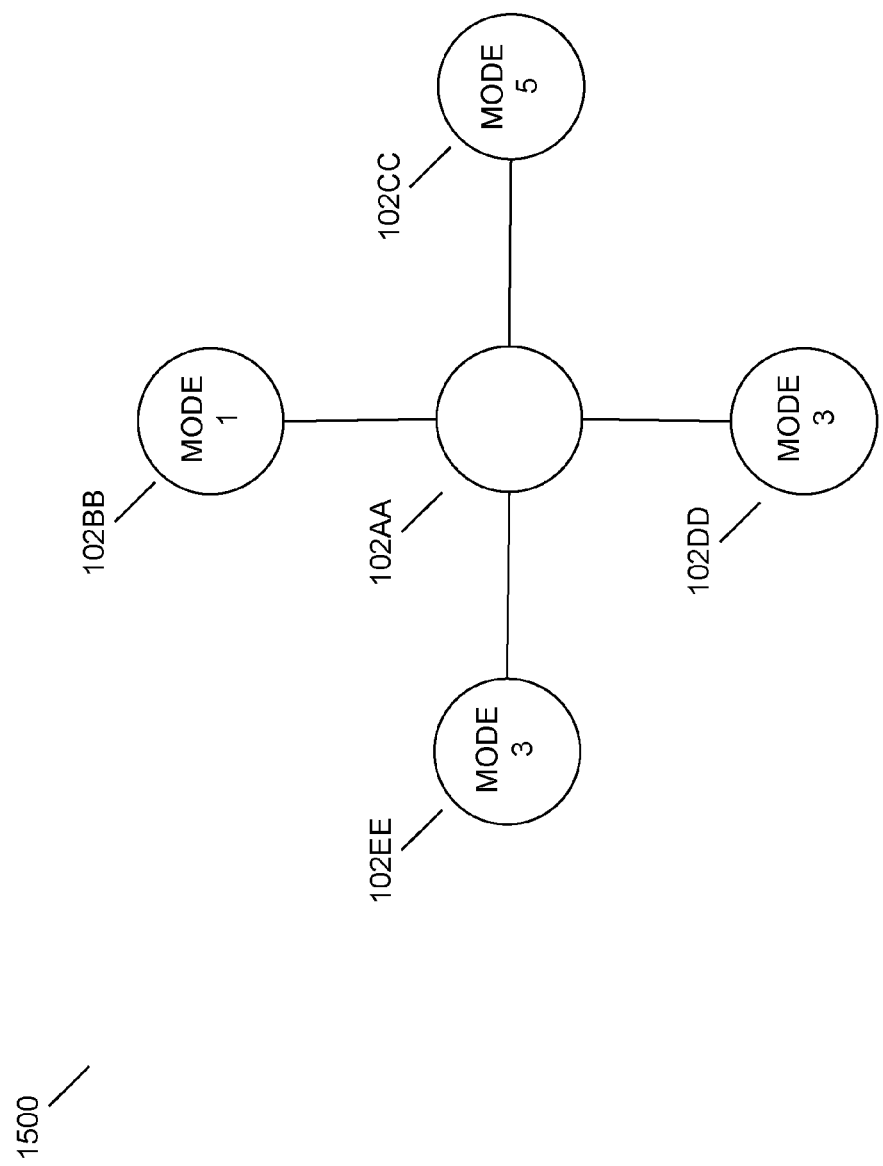
FIG. 15 depicts an embodiment representation of a receiver oriented multicast.
Figure 16:
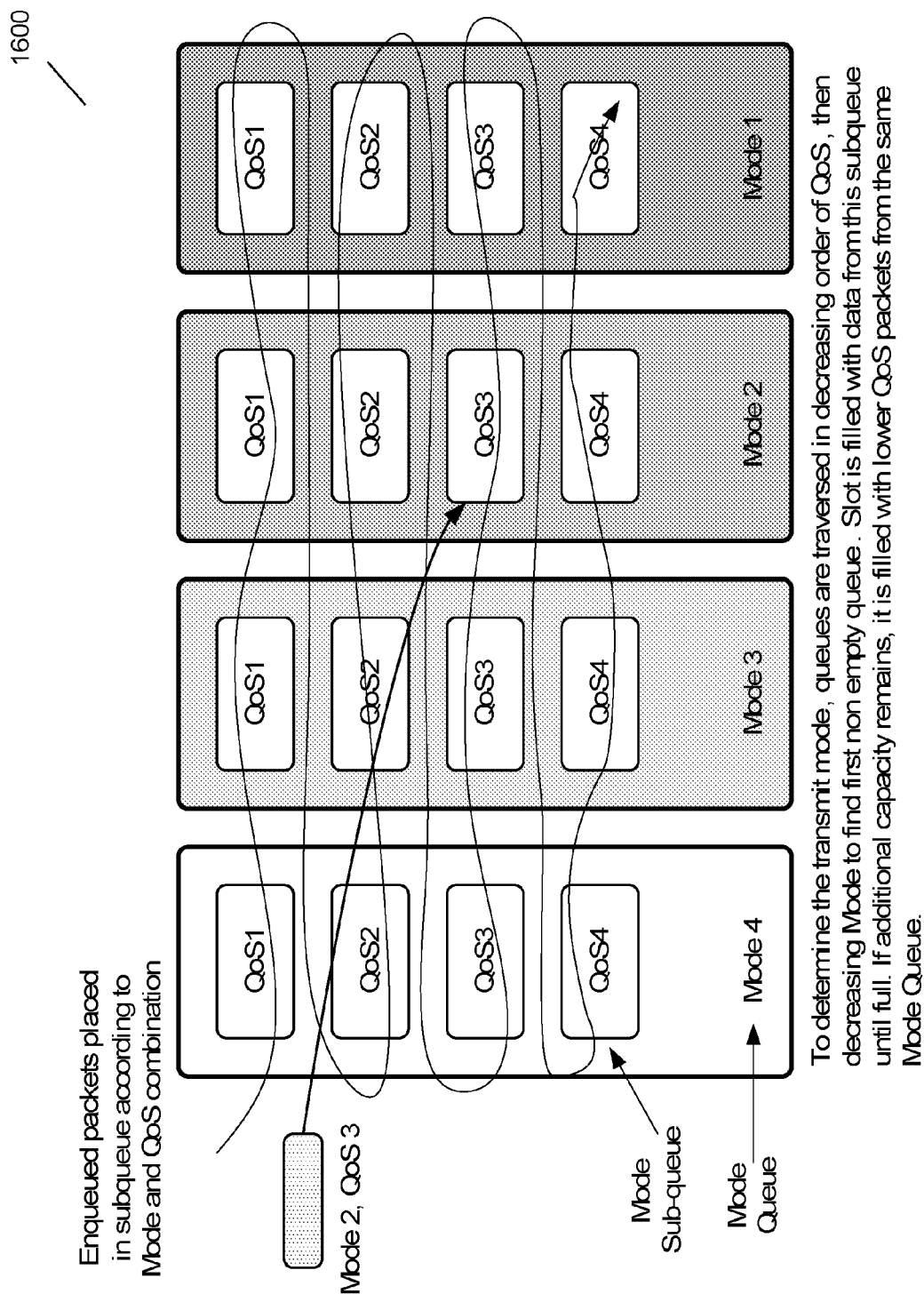
FIG. 16 depicts an embodiment representation of a receiver oriented multicast with multiple mode queues.
Figure 17:
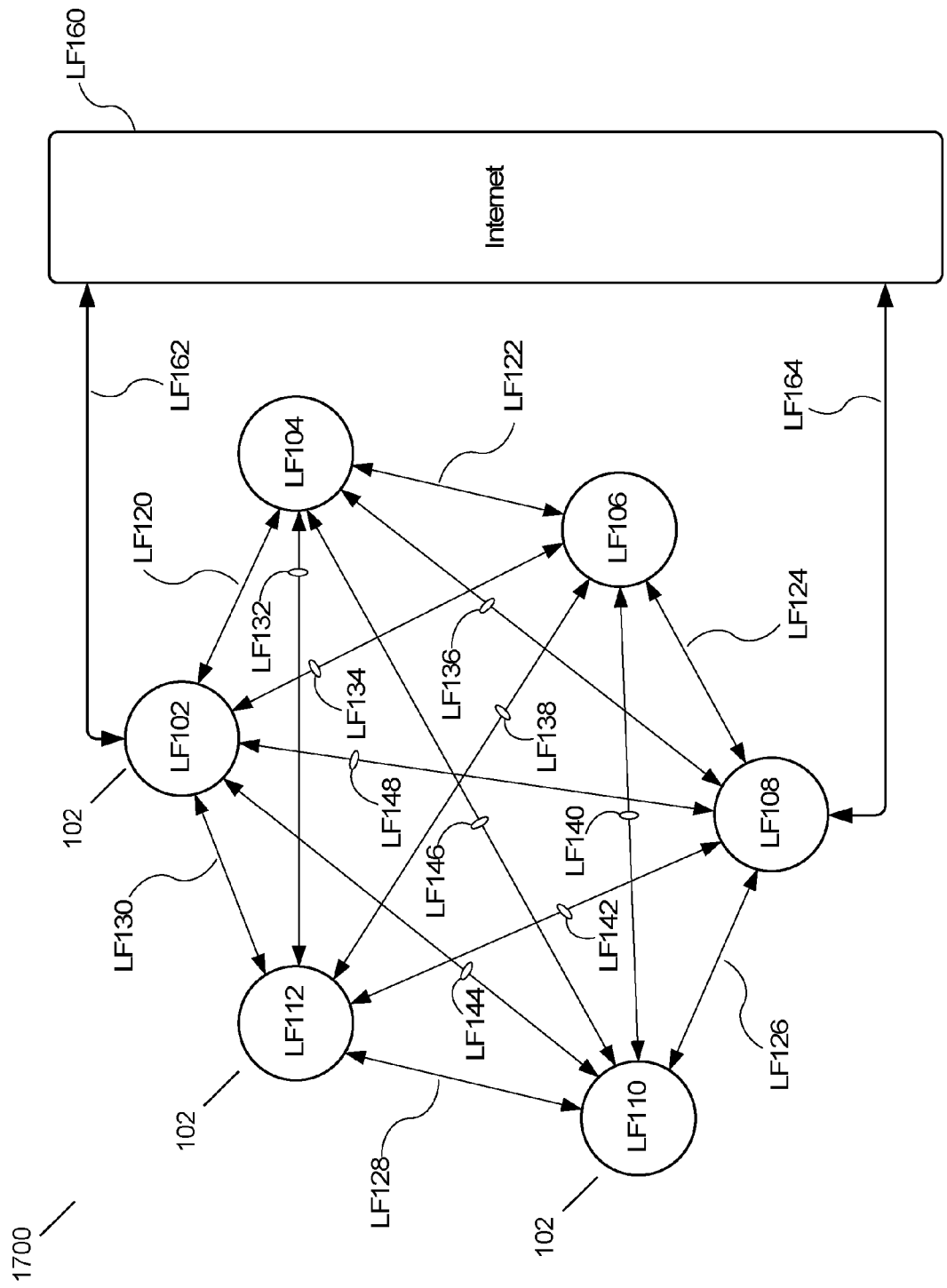
FIG. 17 depicts an embodiment of basic peer-to-peer communications including internet access.
Figure 18:
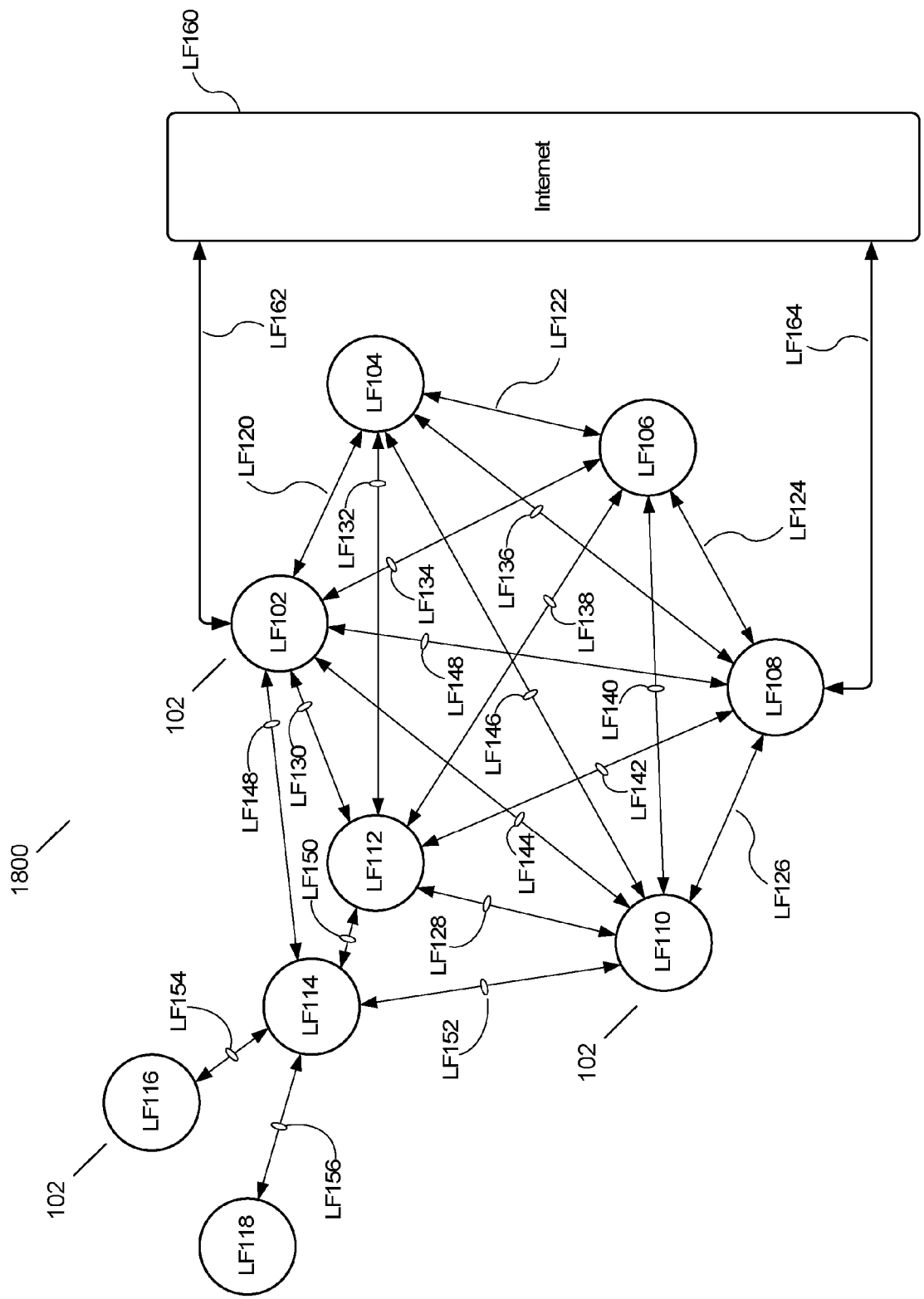
FIG. 18 depicts an embodiment of a node to node multicast routing configuration.
Figure 19:
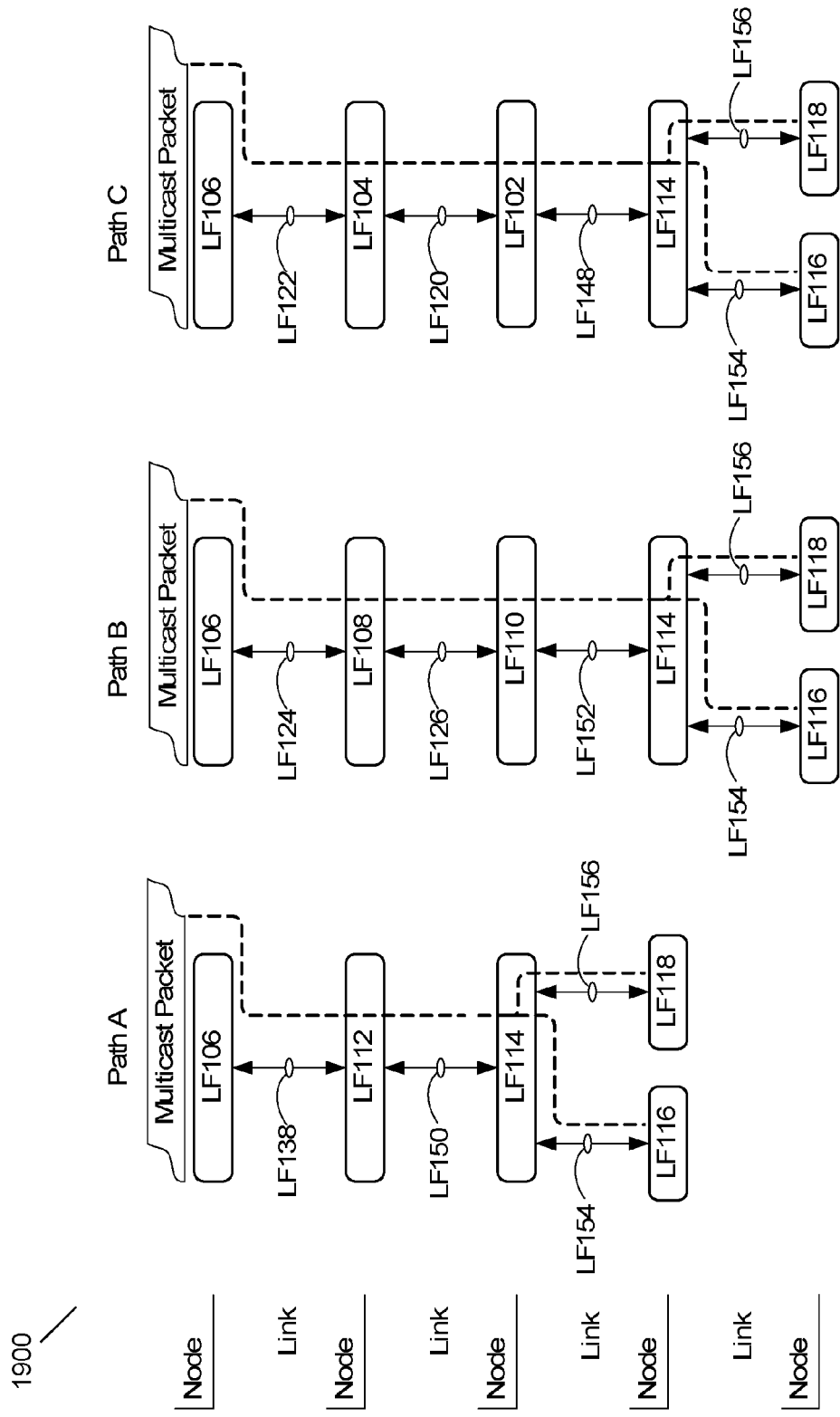
FIG. 19 depicts an embodiment of various multicast routing paths through the MBRI network.

In embodiments, an enhancement may be multicast routing. 114 illustrates providing multicast routing in a mobile ad-hoc wireless 1400 according to an embodiment of the present invention. In this embodiment, multicast routing may improve efficiency of network capacity by avoiding multiple transmissions of common data along a common path. This may allow the network to offer more service with the same capacity. In embodiments, MBRI may implement receiver oriented multicast (ROM). ROM may be a modified version of the On-Demand Multicast Routing Protocol (ODMRP) with three significant changes. First, ROM may be Receiver Oriented rather than Sender Oriented. That is to say that the receivers in a multicast group may initiate the process of forming the multicast routes. Second, ROM may construct a multicast tree, whereas ODMRP is a mesh protocol. Third, ROM may not generally operate in On-Demand mode; rather it sets up the required multicast groups and then maintains them on a periodic basis. ROM may be designed to reduce overall control message traffic on the network when a network has more source nodes than receiver nodes. This is because the ROM protocol may flood JRP control packets from the receivers of a multicast group rather than from senders. For instance, if there are 20 nodes in the network, 20 nodes are senders, and 1 node is a receiver, then there will be one JRP flood versus 20 JRP floods with ODMRP. To route the multicast traffic of a certain multicast group, ROM enabled nodes may create a tree that comprises a forwarding group. First, receiver nodes belonging to the multicast group flood the entire network with Join Request Packets (JRP's). When the JRP's are received by nodes sourcing multicast data, Join Table Packets (JTP's) are transmitted back towards the receiver nodes through the same paths of the JRP's. The nodes that are part of the path between receivers and senders are designated as Forwarders in the Forwarding Group for that particular multicast group's traffic. In embodiments, when a set of nodes form a multicast group, they may use their data link mode queues to send multicast traffic. Multicast traffic may use most common highest mode queues to send the traffic; this may reduces traffic replication by each node as all one hop neighbors supporting that mode see the traffic at the same time. Highest mode queue may ensure that multicast traffic travels at the best possible rate without overwhelming nodes to replicate traffic for different nodes. In embodiments, MANET domains may be used to limit the scope of multicasting network thus partitioning the multicast traffic. In addition, BAP may backhaul the multicast traffic to the other BAP domains that need that multicast traffic, thus further optimizing multicast traffic. For example, consider the node configuration 1500 in FIG. 15. In this example 102AA is connected to 102BB, 102CC, 102DD and 102EE with their modes listed with the nodes. When 102AA broadcasts information to 102BB, 102CC, 102DD and 102EE, the least common mode is 1, so broadcast packet is put on Mode 1 queue. When 102AA wants to multicast to 102BB, 102CC, 102DD and 102EE (assuming they all are in receive group). 102AA will copy the packet to Modes 1, 3, and 5. This copy may be done using smart pointer (reference counts) so it saves on some extra copies. FIG. 16 shows multiple mode queues supporting different levels of QoS 1600. FIG. 17 provides a more detailed view of a basic peer to peer interconnection of mobile nodes 1700. FIG. 18 now shows how the peer to peer network may accommodate multicast routing 1800, and where FIG. 19 provides a flow diagram for several possible routes through the network 1900 shown in FIG. 18. In this example, multicasting is shown from LF 106 to a group of nodes interconnected via LF 116 and LF 118. Alternate paths are shown as paths B and C, as well as other possible routings.

Figure 20:
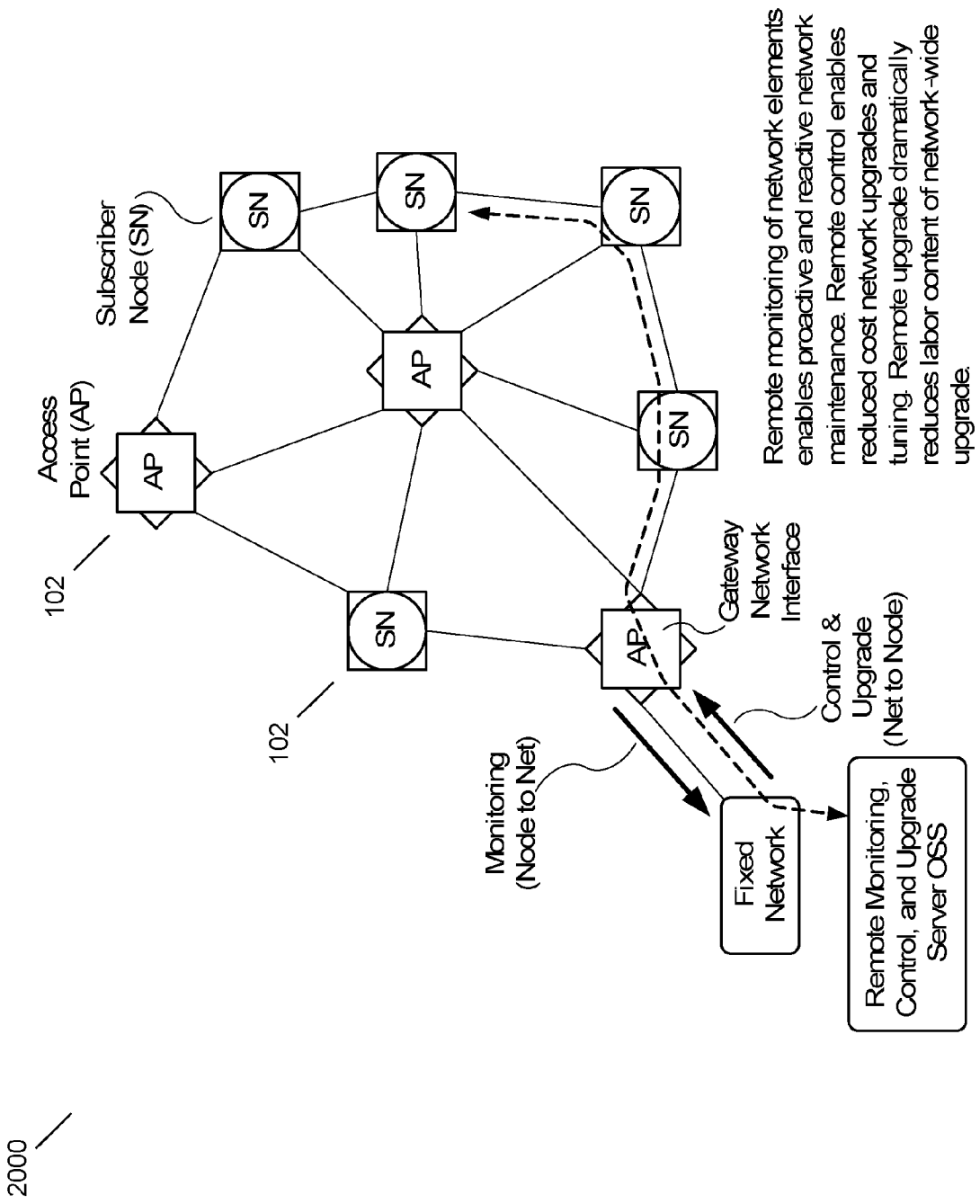
FIG. 20 depicts an embodiment for providing remote network monitoring, control and upgrade in a mobile ad-hoc wireless network according to an embodiment of the present invention.

In embodiments, an enhancement may be remote network monitoring, control, and upgrade. FIG. 20 illustrates providing remote network monitoring, control and upgrade in a mobile ad-hoc wireless network 2000 according to an embodiment of the present invention. In this embodiment, remote monitoring of network elements may enable proactive and reactive network maintenance. Remote control may enable reduced cost network upgrades and tuning. Remote upgrade may dramatically reduce labor content of network-wide upgrade.

Figure 21:
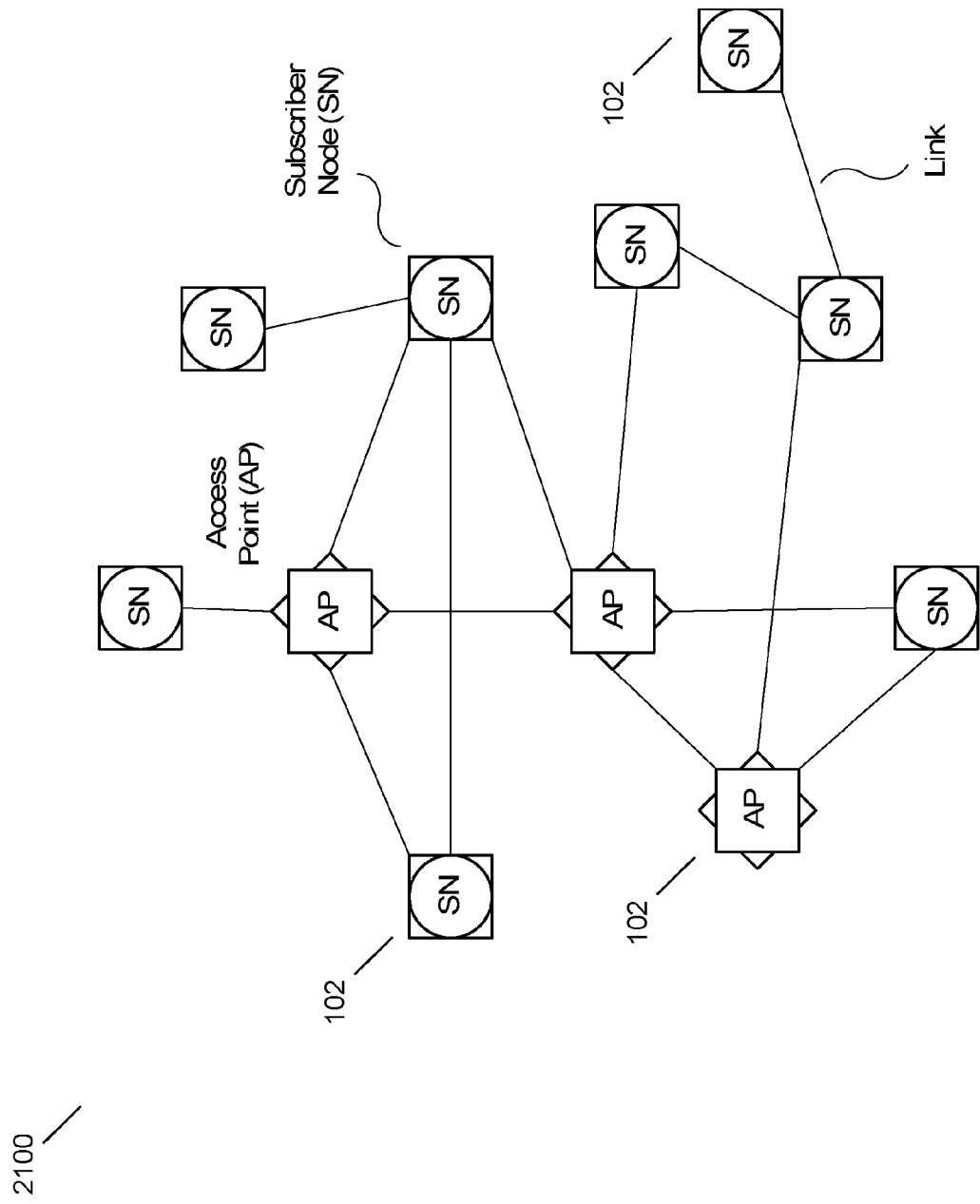
FIG. 21 depicts an embodiment of sample network topology for adaptive transmit power control.
Figure 22:
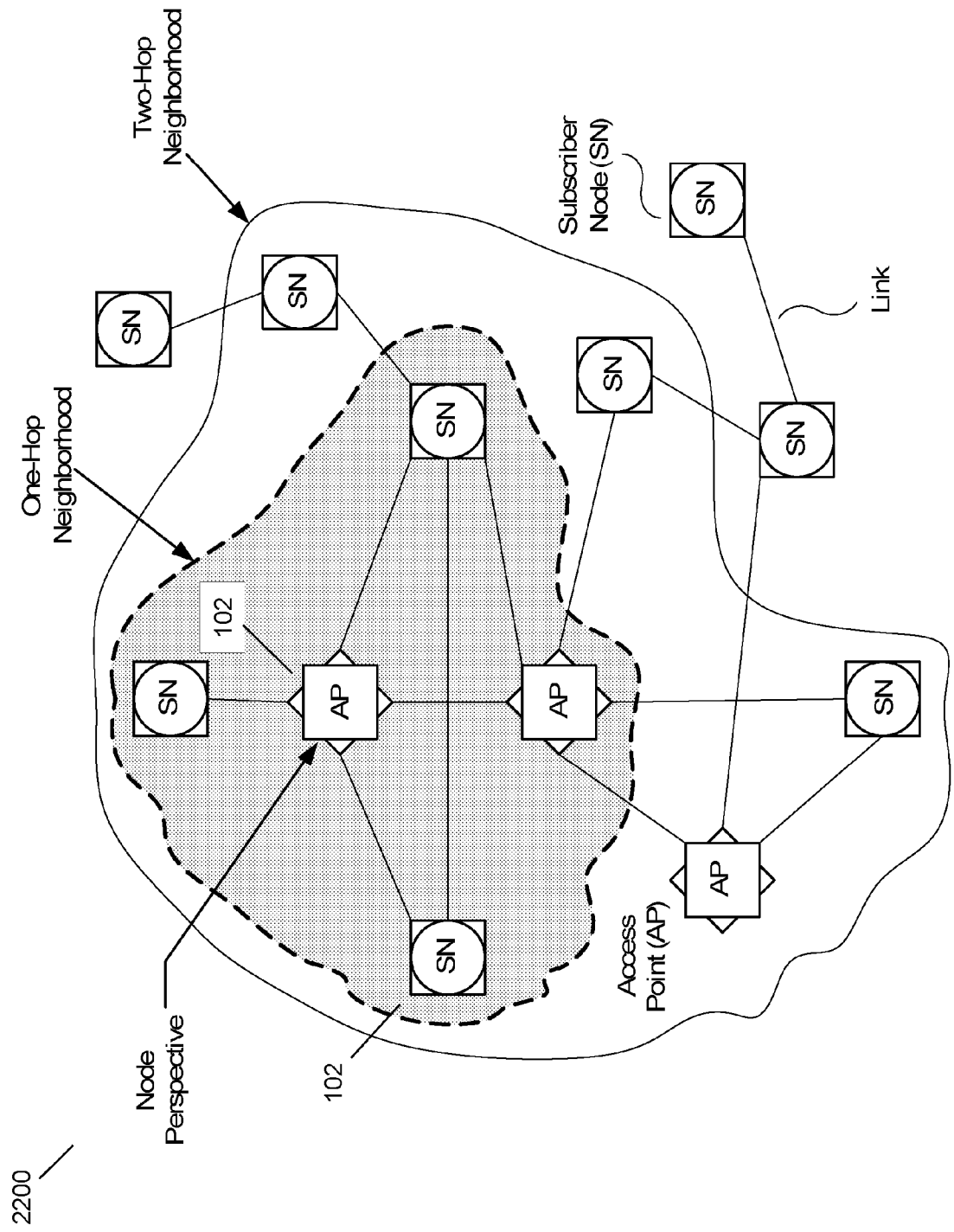
FIG. 22 depicts an embodiment of a one-hop and two-hop neighborhood adaptive transmit power control configuration.
Figure 23:
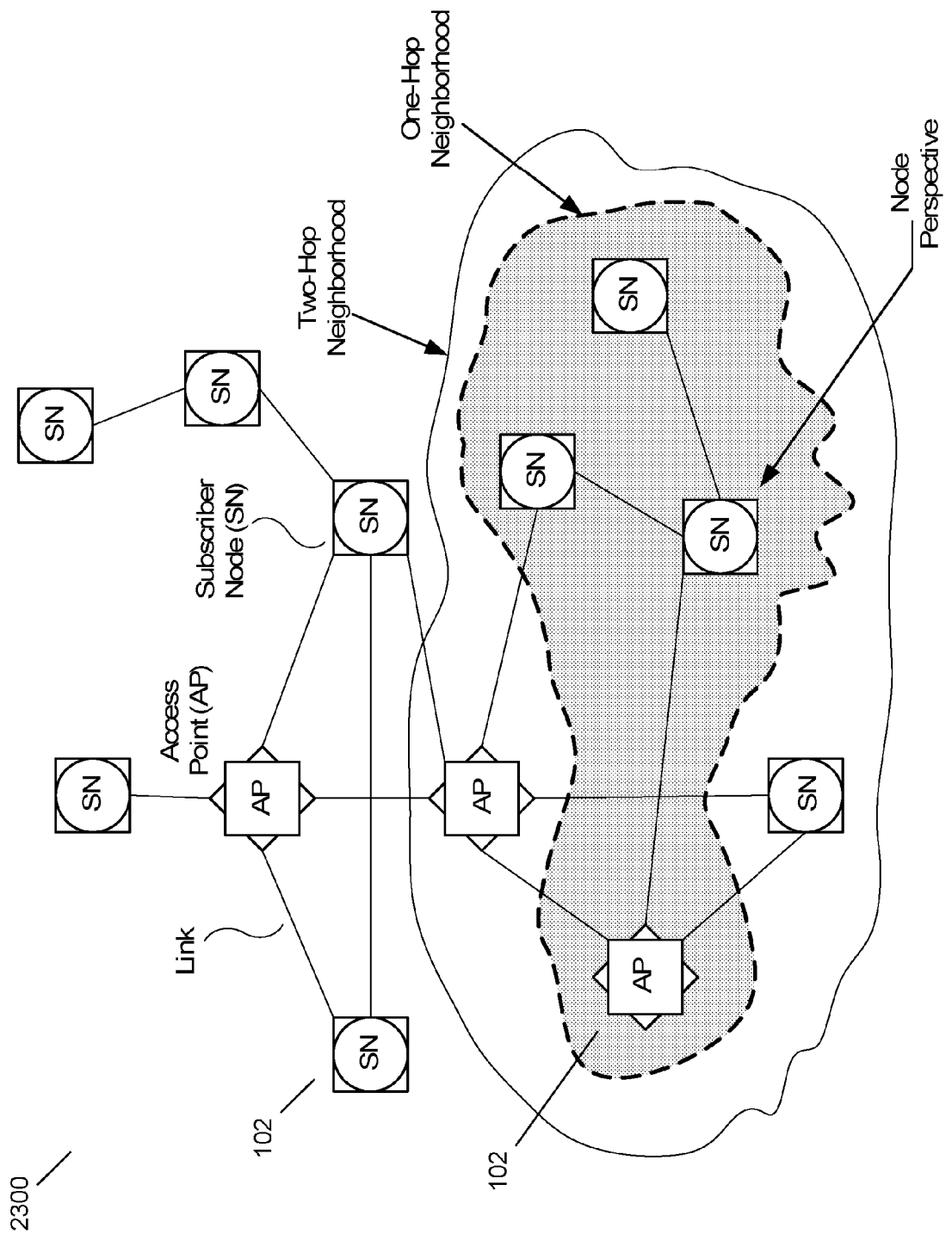
FIG. 23 depicts a second embodiment of a one-hop and two-hop neighborhood adaptive transmit power control configuration.
Figure 24:
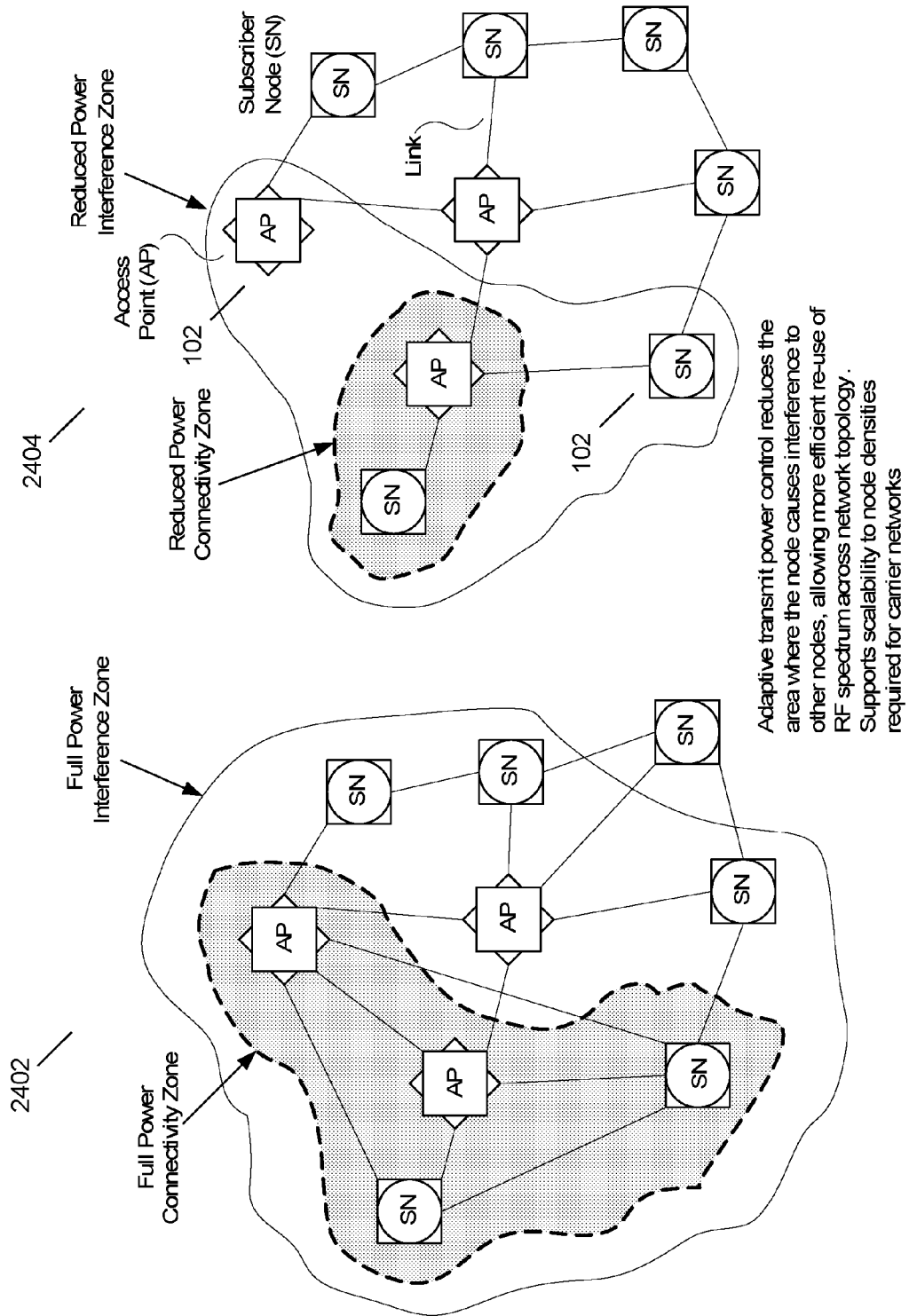
FIG. 24 depicts an embodiment for providing adaptive transmit power control in a mobile ad-hoc wireless network according to an embodiment of the present invention.
Figure 25:
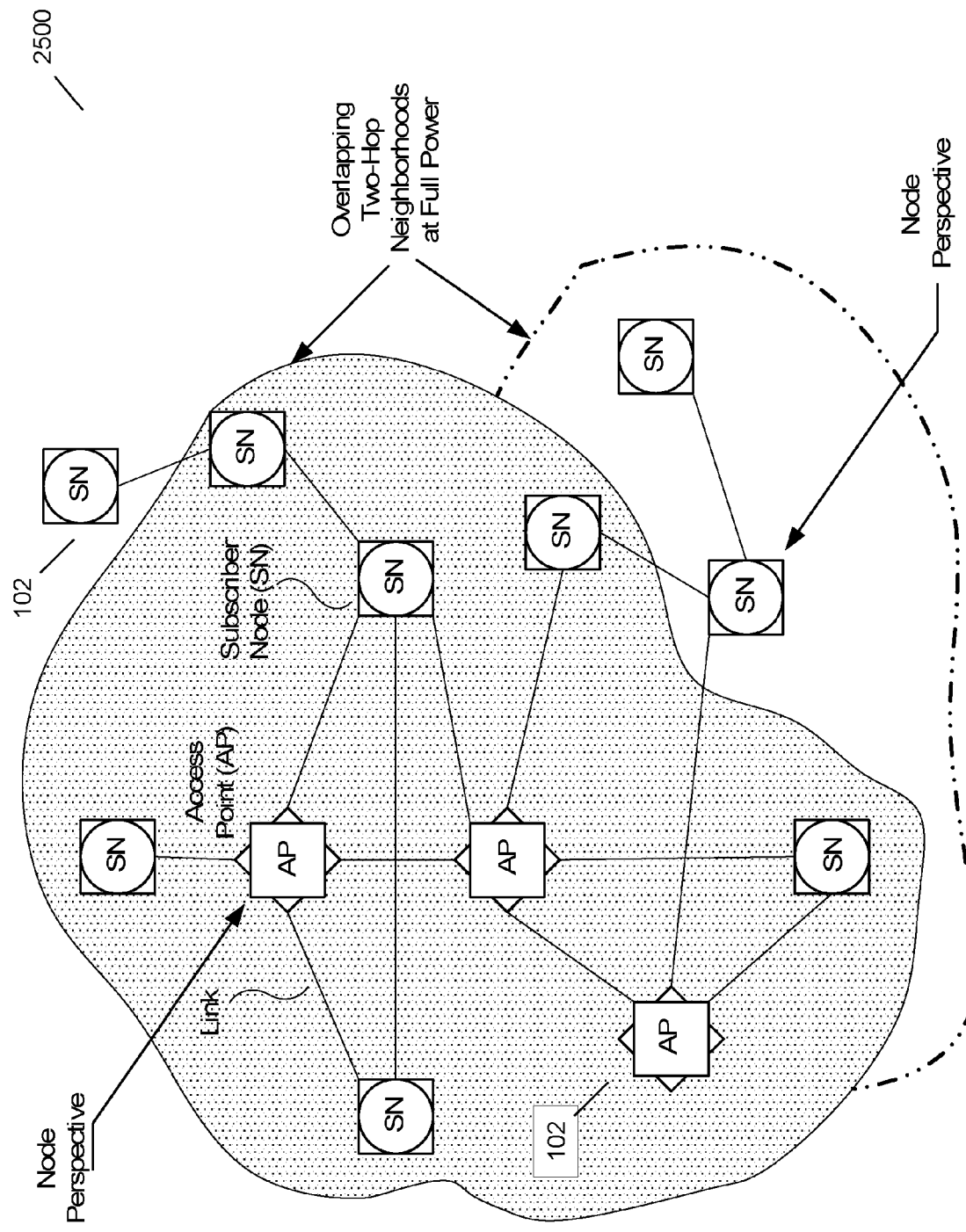
FIG. 25 depicts an embodiment of adaptive transmit power control showing the overlap of two-hop neighborhoods of two nodes when operating full power.
Figure 26:
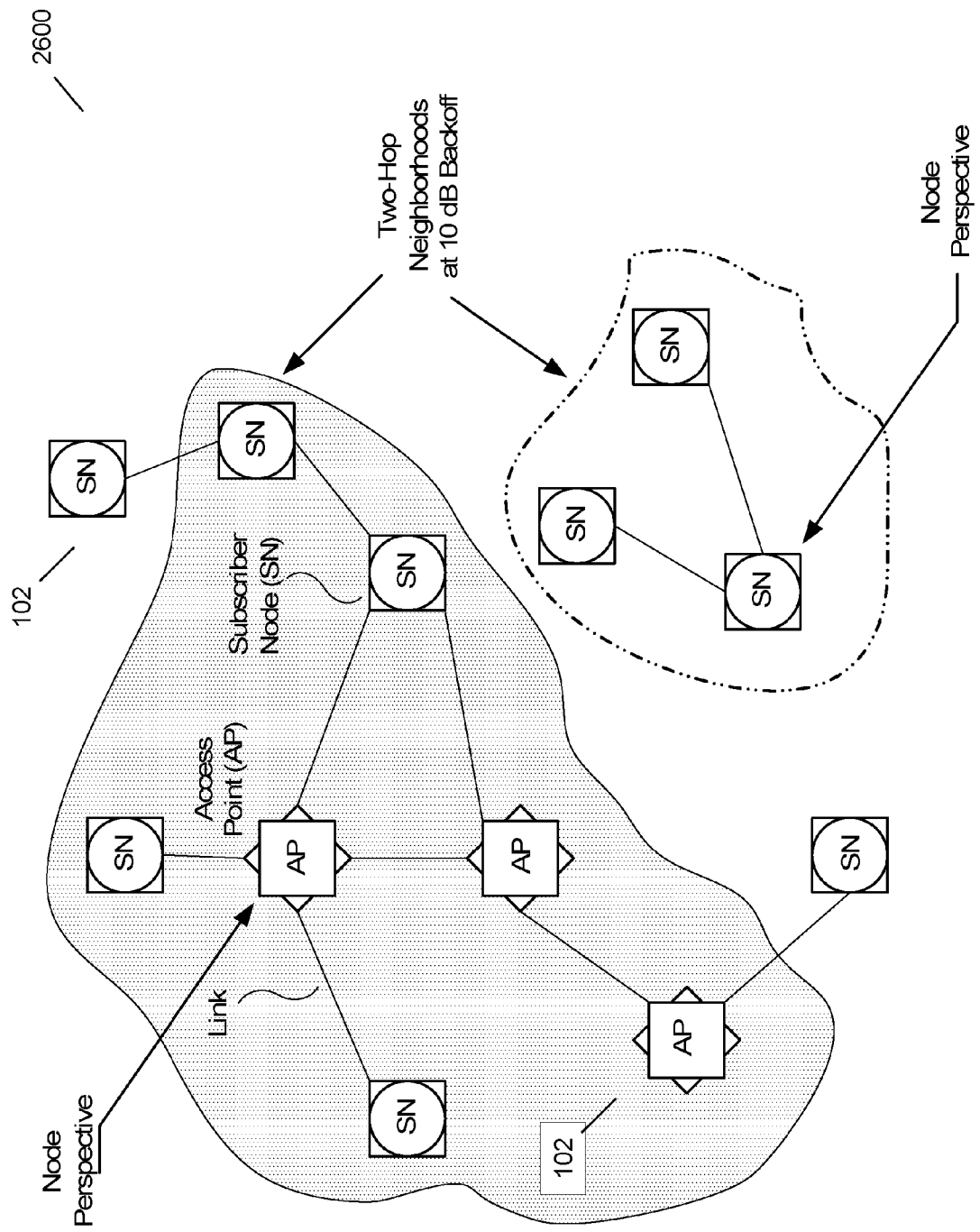
FIG. 26 depicts an embodiment of adaptive transmit power control showing the overlap of two-hop neighborhoods of two nodes when operating a 10 dB below full power.
Figure 27:
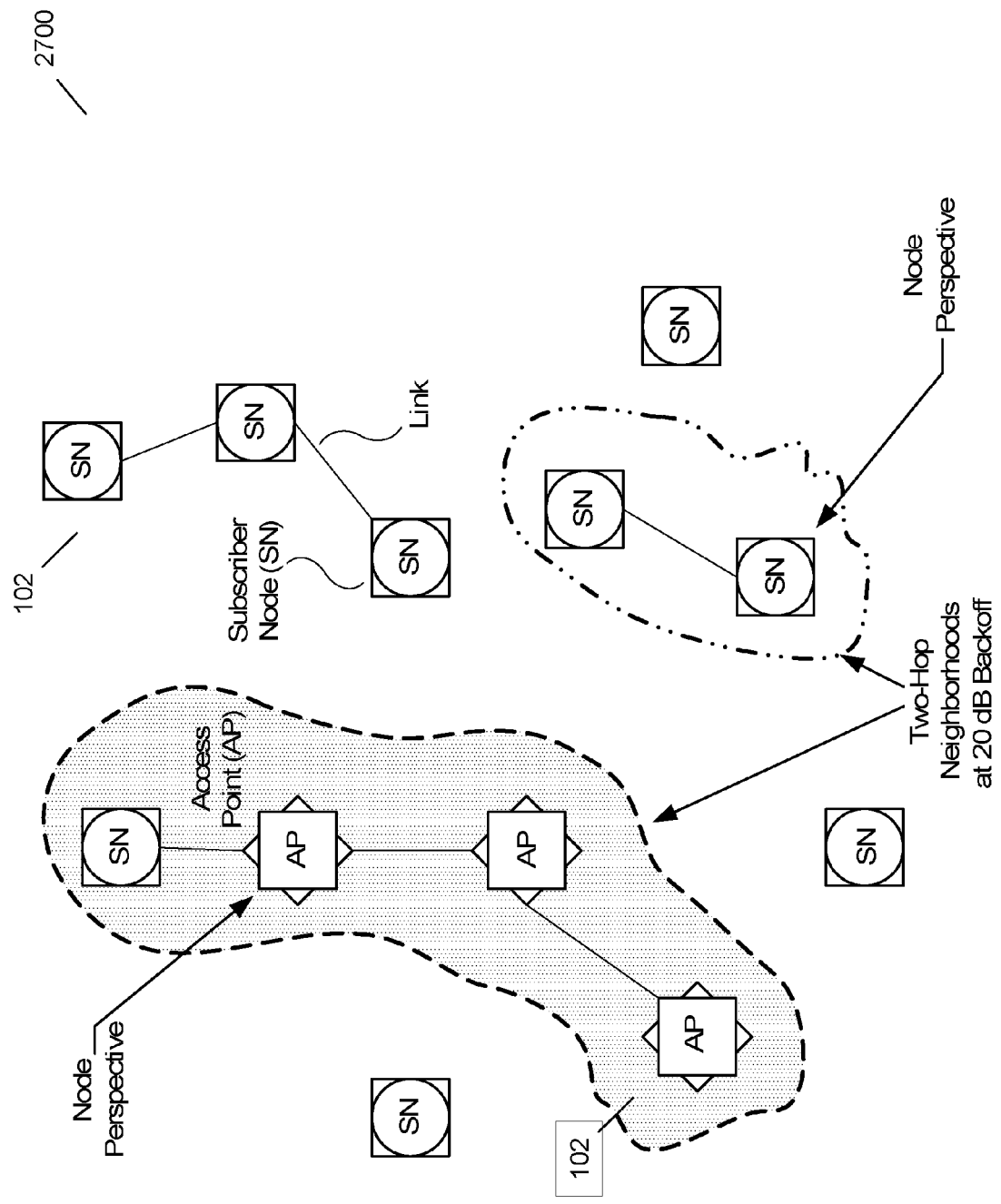
FIG. 27 depicts an embodiment of adaptive transmit power control showing the overlap of two-hop neighborhoods of two nodes when operating a 20 dB below full power.

In embodiments, an MBRI enhancement may include adaptive transmit power control. For instance, a MANET may provide transmissions that may typically occur at a fixed transmit power. The slot capacity depends on the modulation, coding, bandwidth, and TDMA time slot duration. Consider a sample network topology 2100 as shown in FIG. 21. Yellow Circles indicate nodes, and gray lines indicate links between nodes in the MANET. A link exists if two nodes are within direct communications range of one another. These nodes are called one-hop neighbors. Similarly, a collection of nodes within two hops of a node form its two-hop neighborhood. FIG. 22 and FIG. 23 show the one-hop 2200 and two-hop 2300 neighborhoods from the differing perspectives of two nodes in the network—highlighted in red in each picture. The two-hop neighborhood may be an important concept for some channel access scheduling algorithms. These channel access scheduling algorithms coordinate the transmissions considering all nodes in the two-hop neighborhood. Nodes outside the two-hop neighborhood may be scheduled independently. On average, a node may transmit proportionally once for every N2 slots where N2 is the number of nodes in the two-hop neighborhood. Hence, the smaller the two-hop neighborhood, the more often each node can transmit, resulting in increased network capacity. Adjusting the transmit power can be an effective way to reduce the size of the two-hop neighborhood. This concept is illustrated in FIG. 24 where the connectivity zone and the interference zone are shown for full power 2402 (left) and reduced power 2404 (right). FIG. 25 shows the outlines of the two-hop neighborhoods 2500 for the two nodes for links operating at full power. Notice that the neighborhoods overlap, resulting in relatively poor slot scheduling efficiency. When the transmit power is reduced, some links between nodes remain, and others disappear. FIG. 26 shows the link topology 2600 for the same network when the transmit power is reduced, such as by 10 dB. The two-hop neighborhoods are reduced and no longer overlap, allowing the different neighborhoods to be scheduled independently. This results in an increased number of simultaneous transmissions in the network. Effectively, the reuse distance has been decreased due to the reduction in transmit power. FIG. 27 shows the further reduction and isolation between two-hop neighborhoods 2700 that may be possible when the transmitter power is reduced further, say by 20 dB. The trade-off is that as the power is reduced, the set of nodes that are viable receivers (i.e., possible links) is also reduced. Some nodes have no links that can be supported at all at the lower power. As a result, a combination of transmit power levels for different TDMA time slots are used in order to maintain full end-to-end routability across the network. The router maintains "next hop" options for each of the different transmit power levels and uses the "first available" transmission opportunity that gets the data closer to its destination, subject to QoS constraints.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by adjusting transmit power levels. In embodiments, the adjusting may manage interference conditions across a network topology, spectrum overlap with surrounding networks, adjacency conditions with surrounding networks, energy levels in a battery of an electrical component included in MBRI network node, and the like. In embodiments, the adjusting may be provided on a slot-by-slot basis, on a link-by-link basis, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by adjusting transmit power levels. In embodiments, the adjusting may manage interference conditions across a network topology, spectrum overlap with surrounding networks, adjacency conditions with surrounding networks, energy levels in a battery of an electrical component included in MBRI network node, and the like. In embodiments, the adjusting may be provided on a slot-by-slot basis, on a link-by-link basis, and the like.

Figure 28:
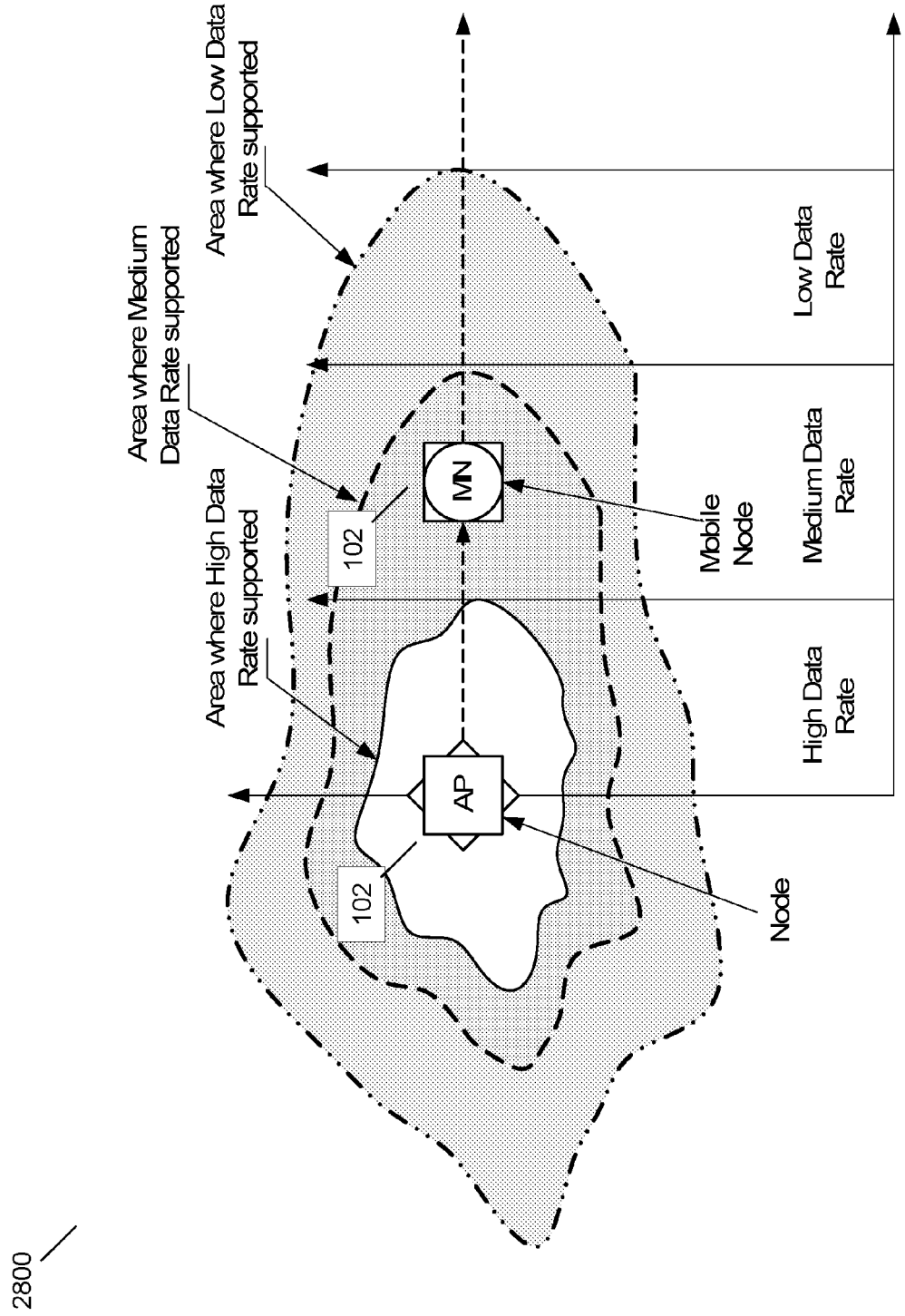
FIG. 28 depicts an embodiment for providing adaptive link data rate in a mobile ad-hoc wireless network according to an embodiment of the present invention.

In embodiments, an MBRI enhancement may include adaptive data rate (ADR). For instance, a MANET may autonomously discover links between neighboring nodes in order to exchange data over the network. Initial link establishment may occur using a fixed data rate. Links may be established when two nodes are within communications range of one another. The data rate that can be supported over a link may be roughly proportional to the distance between the transmitter and receiver, as determined by the path loss. Over shorter links (i.e., smaller path loss), increased data rates can be supported. In a cellular network, mobile nodes always communicate only with a base station. This allows the base station to act as a central controller for adjusting the link data rates for the nodes it is communicating with. In a MANET, all nodes may be able to communicate with all other nodes, and there may be no centralized controller. A distributed protocol may be needed to adjust link rates. Once neighbors are discovered and links established, an ADR adjustment algorithm may adjust the data rate on the link to the maximum rate that can be reliably sustained (i.e., low slot error rate) based on link conditions. FIG. 28 shows a depiction of how different data rates may be supported 2800 for different link conditions (e.g., range and blockage) based on relative node locations. The red circles indicate two nodes in a MANET. The blue shaded areas indicate the nominal locations where different data rates can be supported between the left-most red node and any other node in the MANET. The darker shaded areas indicate higher data rate that can be supported. For example, in a network with three available data rates, suppose the right-most red node is traveling along the dotted line path (to the right) away from the left-most red node. When the two nodes are nearby, a "high data rate" can be supported (dark blue). As the node moves away, a "medium data rate" can be supported (medium blue) as shown in the FIG. 28. With continued motion, a "low data rate" is supported. At distances beyond where the low data rate can be supported, the link is dropped and a multi-hop route through the MANET is needed to exchange data between the nodes.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; enhancing MBRI operation by adapting link data rate in a distributed manner across network topology; and using collected receive statistics to dynamically adjust link data rates under changing conditions. In embodiments, the adapted link data rate may be independently adjusted for each link. In embodiments, the collected receive statistics may adjust link quality measures in neighbor discovery and maintenance (NDM).

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; the network capable of enhancing MBRI operation by adapting link data rate in a distributed manner across network topology; and the network capable of using collected receive statistics to dynamically adjust link data rates under changing conditions. In embodiments, the adapted link data rate may be independently adjusted for each link. In embodiments, the collected receive statistics may adjust link quality measures in neighbor discovery and maintenance (NDM).

Figure 29:
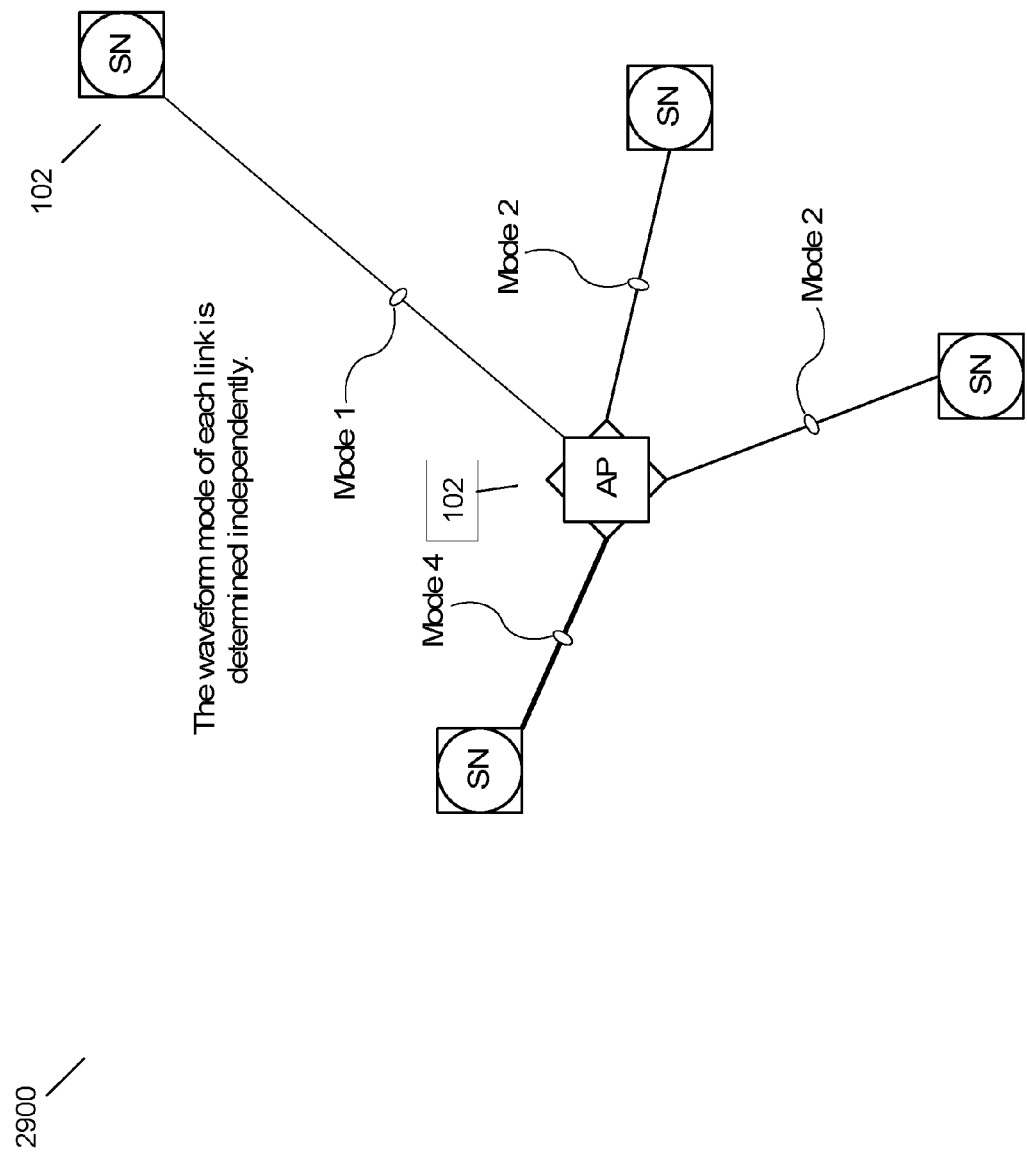
FIG. 29 depicts an embodiment for adaptive link data rate where the waveform mode of each link may be determined independently.

In relation to ADR, each waveform mode may be parameterized by a combination of parameters that represent a trade-off between data rate and demodulation performance. The link data rate may be adjusted to maintain adequate demodulation performance in the presence of changing link conditions. When link conditions degrade below a certain threshold, the ADR algorithm may rapidly decrease the link rate to a reliable mode to reduce the amount of data that is lost. When link conditions support higher data rates, the ADR algorithm may increase the link data rate to increase payload delivered by each slot. The multiple possible combinations of waveform parameters may be organized into a one-dimensional ordered list of monotonically increasing data rate with correspondingly decreasing signal robustness. The ADR algorithm may "walk up and down" the list dynamically as a function of observed link performance. A combination of measurements characterizing link performance may be used to drive adjustments. For each received time slot, the modem may return estimates of received signal strength (RSSI), Eb/No (SNR), pre-FEC bit-error rate (BER), and the like, along with the slot payload data, transmitting node ID, transmitted waveform mode and the like. An Adaptive Data Rate Control Message (ADRCM) may include the number of slots transmitted during each interval (e.g. one second) for each waveform mode, allowing the receiving node to calculate the slot error rate for each waveform mode. These link observation statistics may be grouped by transmitting node and mode to adjust the receiving node's suggested waveform mode for each link. The waveform mode of each link may be adjusted independently in each link direction. FIG. 29 shows different waveform modes 2900 from the node in the center to each of the surrounding one-hop neighbor nodes. Once a link is established, the ADR algorithm may adjust the waveform mode on the link to optimize the data rate. Relative link quality is a measure of link quality relative to the link quality needed to maintain the selected link data rate. As two nodes move closer together or farther apart, the ADR algorithm adjusts the link rate in order to maintain sufficient relative link quality. At the lowest data rate (most robust) waveform mode, relative and absolute link qualities are identical. Once nodes become too far apart to maintain their direct link, they must route through a relay node to exchange data.

In an example, an ADR algorithm runs concurrently for all one-hop links, but is computed independently for each receiver-transmitter pair. The ADR algorithm processes measured SNR data and computes a weighted average value on one second intervals. The algorithm then determines if the new value supports an increase in "mode", or no change. The "suggested" mode value and packet reception counts are relayed back to the transmitter in an ADRCM. If sufficient data were transmitted during the one second interval, the transmitter compares the number of received slots counted at the receiver to the number of slots transmitted to compute a reliability estimate. In this example, three cases may be possible: 1) the reliability was acceptable; 2) the reliability was unacceptable; or 3) no decision can be made because there are insufficient measurements. If reliability is acceptable, then ADR uses the suggested mode value for the next one-second interval. If reliability is unacceptable, then ADR compares the suggested mode to the current mode. If the suggested mode is inferior to the current mode, it is put to use. Otherwise it is ignored. As part of the process for determining whether ADR can "step up" in mode, it is sometimes necessary to insert ADR Maintenance Messages into the data queues to "force" transmissions at waveform modes needed to determine whether that mode can be supported over the link. In embodiments, suggested modes may be determined solely based on processing the data at the receiver.

Figure 30:
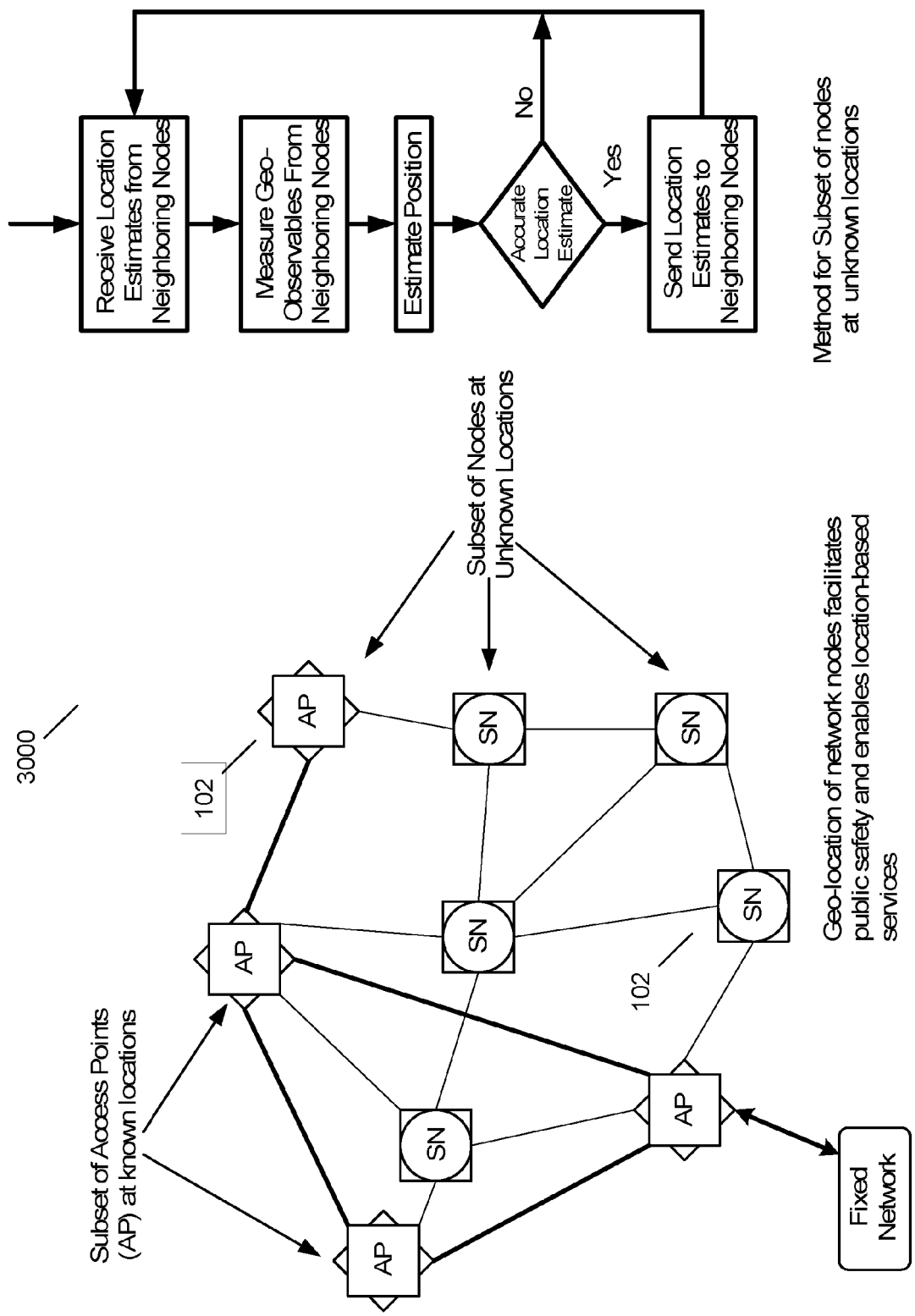
FIG. 30 depicts an embodiment for providing location information of network nodes to neighboring nodes in a mobile ad-hoc wireless network according to an embodiment of the present invention.

In embodiments, an enhancement may be network geo-location. FIG. 30 illustrates providing location information of network nodes to neighboring nodes 3000 in a mobile ad-hoc wireless network according to an embodiment of the present invention. In this embodiment, providing geo-location of network nodes to the neighboring nodes may facilitate public safety and may enable location-based services.

Figure 31:
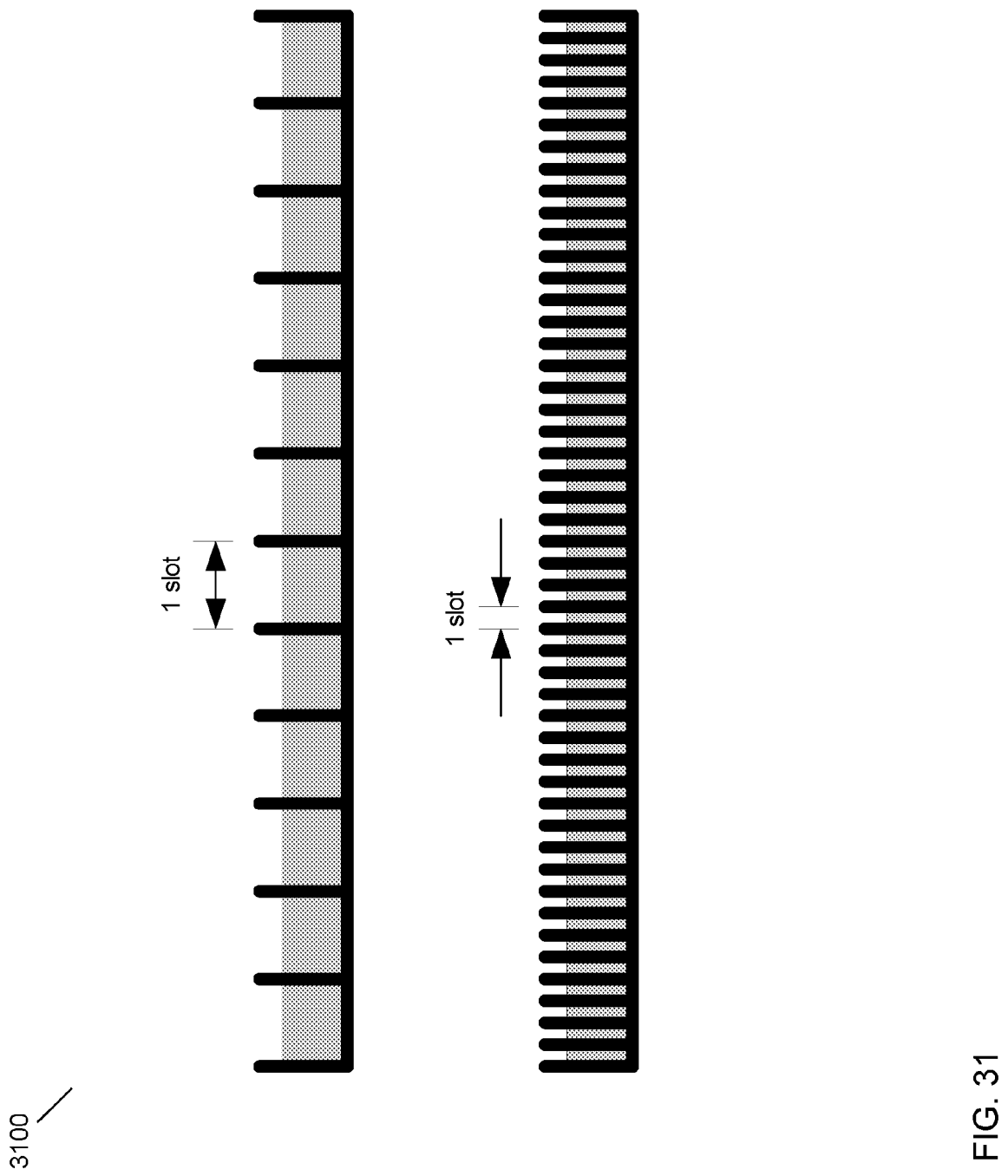
FIG. 31 depicts an embodiment of different time slot widths in relation to a multimedia data stream.

In embodiments, an enhancement may be multimedia capability. FIG. 31 depicts the use of increased slot rate in communication 3100 in a mobile ad-hoc wireless network as a means of better accommodating carrier grade service delivery of multimedia content in mobile ad-hoc networks. In embodiments, slot time is defined as the duration of a single opportunity that may be used for transmission. In an embodiment, an increased slot rate may be used to transmit data in a mobile ad-hoc wireless network. In an example, the slot rate used may be 1000-2000 slots/sec. As shown, an increased slot rate may allow more distinct opportunities for multiple nodes to access the channel. An increased slot rate may also reduce the delay between the opportunities available for the mobile nodes. An increased slot rate means a reduced slot time. A reduced slot time results in more number of devices sharing the network. The reduced slot time also reduces jitter in the network.

Figure 32:
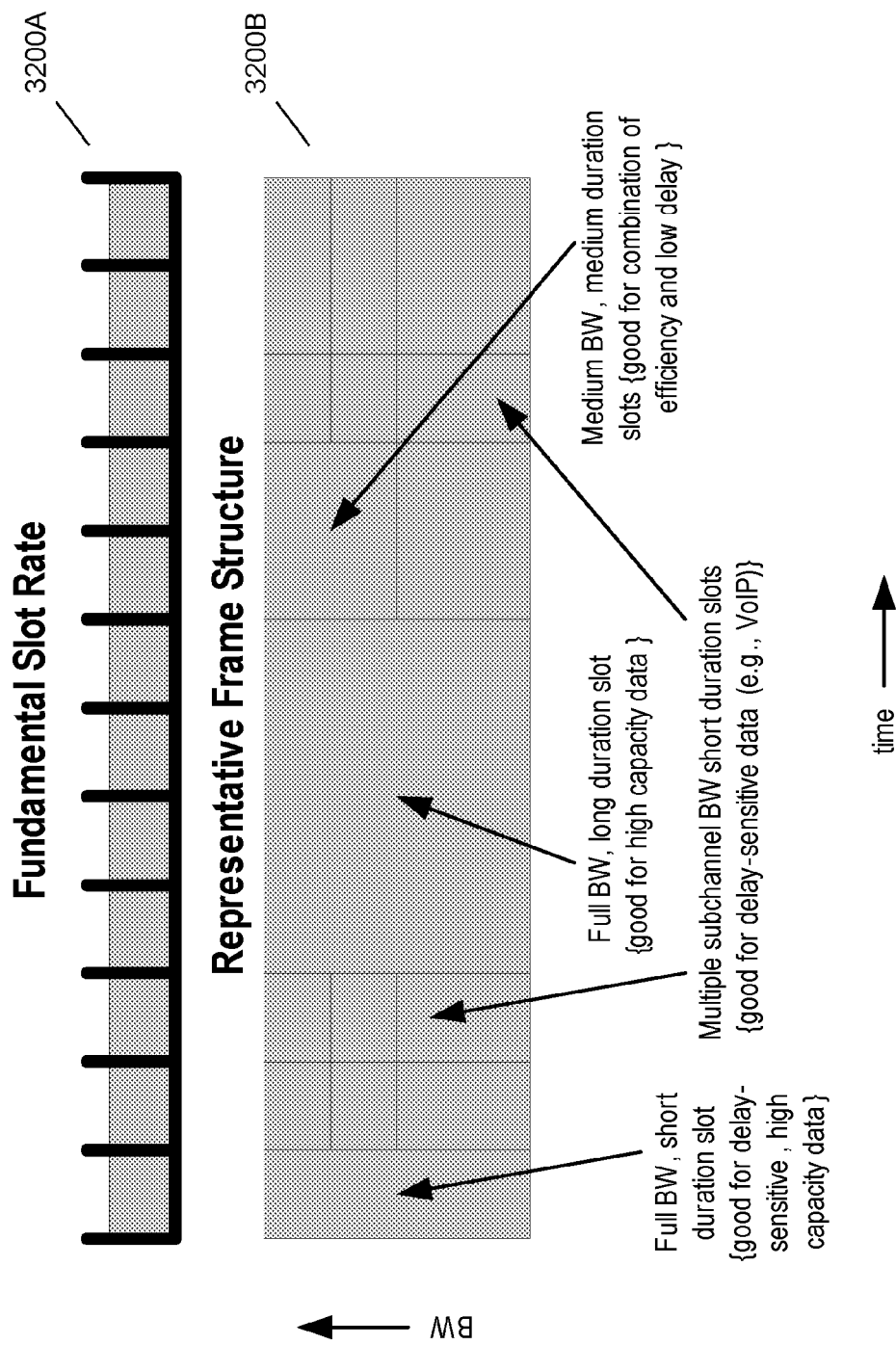
FIG. 32 depicts an embodiment of a hybrid slot structure in relation to the transmission of a diversity of media streams.

Continuing with multimedia capabilities as a MBRI enhancement. In a network running TDMA in the MBRI, transmissions may typically occur with fixed duration time bursts running at the fundamental slot rate. The slot capacity may depend on the modulation, coding, bandwidth, TDMA time slot duration, and the like. The TDMA time slots 3200A are shown at the top of FIG. 32. Multimedia internet data can have widely varying characteristics and delivery requirements including data rate, latency, jitter requirements, and the like. While a TDMA time slot structure with a single slot duration and bandwidth can effectively transport this data, efficiency improvements can be achieved by providing a more flexible transport structure that is better matched to the different types of data being carried by the network. The method described here to achieve improved efficiency is to create a hybrid frame structure that utilizes a combination of time slot durations and bandwidth sub-channels. The bottom of FIG. 32 shows an example hybrid frame structure 3200B for short (1× the fundamental slot rate), medium (2×), and long (4×) slot durations and bandwidth sub-channelization into 1, 2, or 4 sub-channels. This represents just an example, the method is generally expandable into any number of slot durations and sub-channels, not necessarily integer multiples of the fundamental slot rate. Both high capacity and scalability may be needed to enable the MBRI. Network design is a balance between providing high transport capacity and enabling methods that allow that capacity to be shared among a large number of simultaneous users. The hybrid frame structure may accomplish this by creating both high capacity transport slots and a larger number of schedulable transmissions (i.e., slot and sub-channel combinations) during a fixed interval. Note that a length 2× transmission may be more than twice as efficient as a length 1× transmission due to the elimination of slot timeline overhead for propagation guard time and preamble acquisition sequence. At the top of FIG. 32, the fundamental slot rate shows 12 individual full bandwidth schedulable transmissions at the fundamental slot rate. By moving to the hybrid frame structure shown at the bottom of FIG. 32, the number of schedulable transmissions in the network has increased to 24, allowing more nodes to transmit data during the same time interval. This may improve the latency characteristics of the network. Additionally, some of the slots are longer than the fundamental slot duration, allowing a few nodes to transmit more data more efficiently than with a fixed slot rate. This approach simultaneously enables both capacity and scalability across the network. This approach is analogous to shipping a large number of various size items in different size boxes, rather than always using the same size box to package every item. Different channel access scheduling algorithms may be matched to the different slot duration and sub-channel configurations. Full bandwidth slots are well-matched for scheduling using algorithms that select the transmitting node. Slots with multiple sub-channels are well-matched for scheduling algorithms that first select the receiving node, and then select the multiple transmitters for the different sub-channels.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI ability to transport multimedia, multi-session application data by providing a hybrid TDMA slot structure that contains a plurality of slot lengths and slot widths forming logical sub-channels.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI ability to transport multimedia, multi-session application data by providing a hybrid TDMA slot structure that contains a plurality of slot lengths and slot widths forming logical sub-channels.

Figure 33:
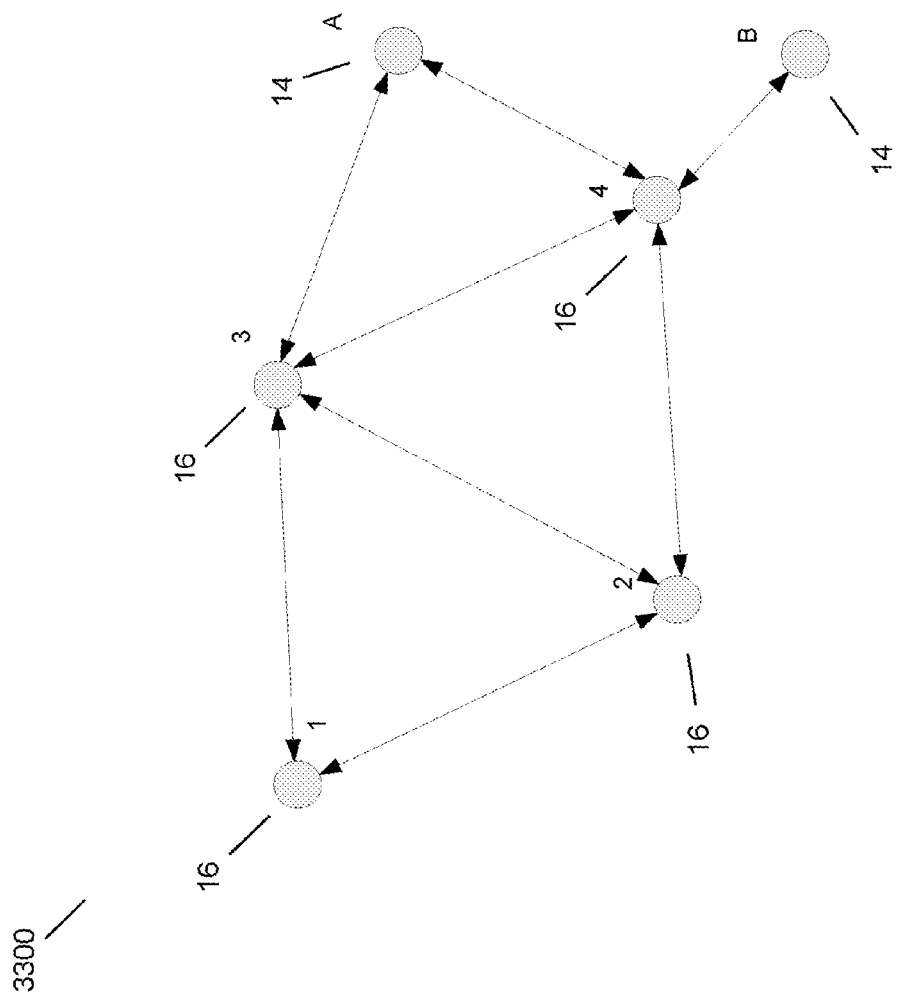
FIG. 33 depicts a mobile ad-hoc wireless network embodiment of the present invention for implementing for time synchronization.

In embodiments, an enhancement may be time synchronization. FIG. 33 depicts a mobile ad-hoc wireless network is shown where embodiments of the present invention may be implemented for providing time synchronization 3300. The network shown is a simple mobile ad-hoc network where nodes 1-4 are user nodes 16 and the nodes A, B are access point 14 (AP's). The AP's may have knowledge of network timing to insignificant levels compared to the timing needs. A method for enabling timing synchronization may include communicating a sense of network timing at all the nodes with sufficient accuracy to enable reliable communications. The network timing may include slot timing and carrier frequency timing. In an aspect of the present invention, it may be assumed that each node may be designed so that the slot timing and the carrier frequency is derived from the same local reference. In an example, frequency error in the slot timing may be directly proportional to the carrier frequency error. The carrier frequency may be an integer multiple of slot rate. In an example, the slot rate may be 1 kHz. Referring to FIG. 33, the nodes 3 and 4 may use the APs 'A' and 'B' for obtaining timing information for synchronization. The nodes 1 and 2 may use an indirect approach by obtaining the timing information derived from the nodes 3 and 4 for synchronization. In an embodiment, the timing information may be obtained by comparing the incoming packet timing relative to the local timing reference. In this embodiment, the relative timing of all of the neighbor nodes may be tracked and the local node timing is set to match the mean of these tracked times. The tracking may be accomplished using a Kalman filter with two states. In an example, the two states may be the time offset of the slot and the incoming carrier frequency (the number of states may be increased and the delay as an additional state may be introduced later). This method may be used by each node to synchronize to the network time and estimate the error in this local timing reference. In embodiments, all the nodes in the network may have identical hardware. The transmissions by a node may start at the beginning of a slot time relative to the local timing reference. In embodiments, reception of a packet by a node may be detected by the receiver hardware and the time and frequency offset are measured by the hardware relative to the local time base. In embodiments, the hardware in a node may have control registers to apply time and frequency offsets to the local time base so that later transmissions and receptions are made to this corrected time base. The transmission time may be advanced with additional hardware to remove the mean path delay if desired. Slot counts may be obtained elsewhere in the MAC header or other mechanism and only the time offset relative to the slot start may need to be tracked. In other embodiments, the network timing may be acquired by a node on power-up. The node may detect rogue nodes (out of frequency spec) of both neighbors and the local timing error. The node may estimate the link delays so that they may be removed from the timing reference. In embodiments, every terminal (whether mobile or AP) may be in one of three time/frequency states at every moment in time.

a. OFF-NET state
        i. Terminal not yet entered into the network
        ii. Needs to acquire TDMA time and frequency error from a received control packet b. IN-NET state
        i. Guaranteed to have TDMA time and freq errors to within specification
        ii. Maintains time and frequency through periodic corrections from received control packets
    c. OUT-OF-NET state
        i. No guarantee of Time and Freq to within specification
        ii. Due to potential freq reference oscillator drift and/or potential TDMA clock drift
        iii. Too much time passed since last time/freq update on received control packet.

Terminals may be IN-NET to fully participate in network. OUT-OF-NET terminals may spend all their time attempting to transition to IN-NET by a time frequency recovery protocol. OFF-NET terminals wanting to enter the network may spend all their time attempting to transition to IN-NET by a time frequency recovery protocol. IN-NET terminals continually improve their time/frequency estimates by a time/frequency maintenance protocol.

In embodiments, a node may track the relative time difference between the local clock and the received packets from all other nodes in the neighborhood. It may be assumed that the data was properly aligned in the source node slot relative to its timebase with its correction. The path delays may also be significant in maintaining communications over that link and may be estimated. As part of the same protocol the link loss may be incorporated. Additional smoothing may be done with a Kalman filter to minimize total system time error by tracking neighbors. From the link time error estimates the local error may be computed with its standard deviation. The link delays may be computed from the information provided by the remote transmitters. The local transmitter may be advanced by the mean link delay to reduce the uncertainty at the receivers. With relative time tracking the guard time can be drastically reduced down to less than 10 microseconds Additional precision may be obtained tracking neighbor frequency as well as phase noise. Mean neighbor frequency/phase in multicast and the target frequency/phase in directed communications (most critical in carrier frequency) may be used. Each node may use a weighted average of the neighborhood nodes frequency/time to establish its local frequency/time.

Figure 34:
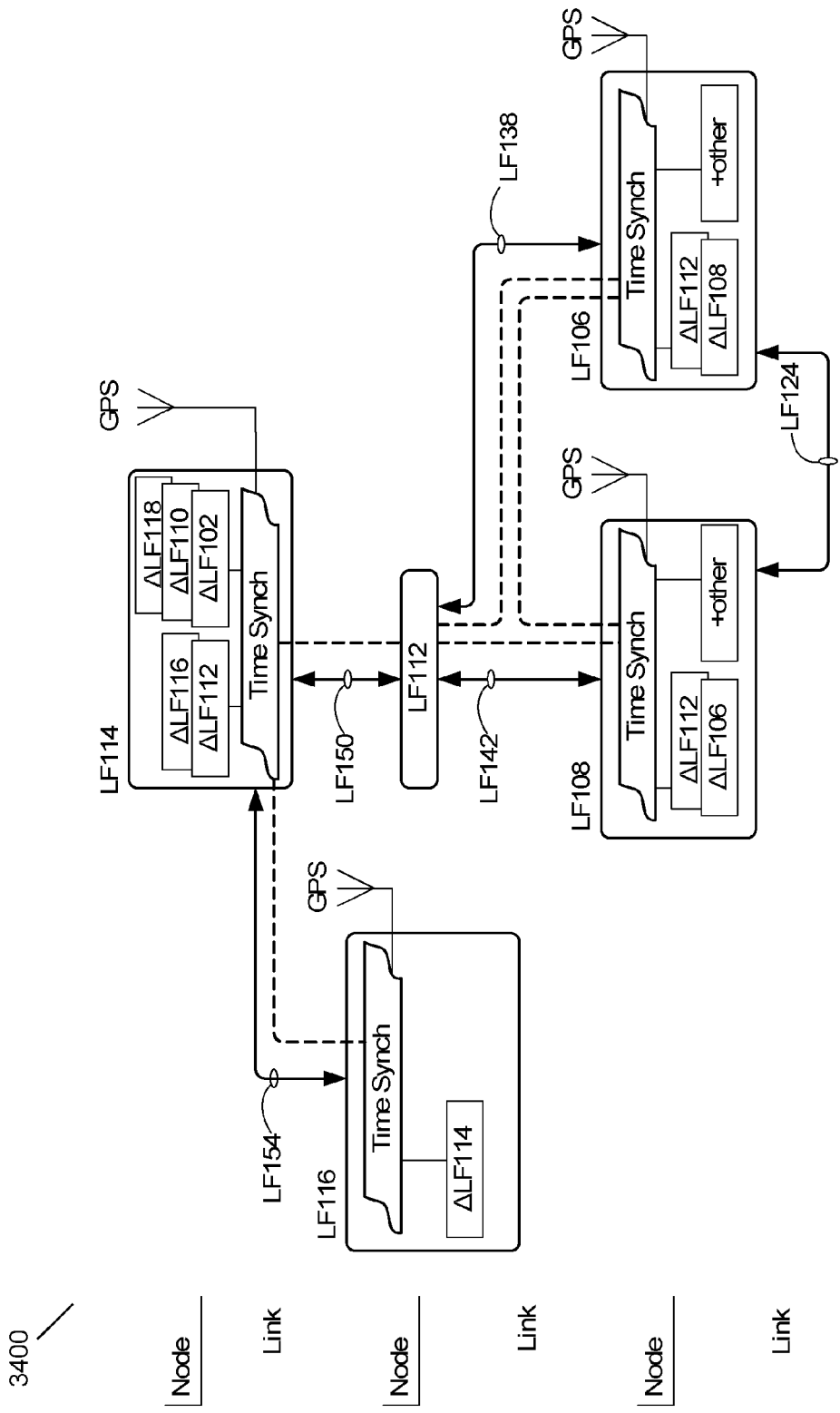
FIG. 34 depicts a mobile ad-hoc wireless network embodiment of the present invention for implementing for time synchronization, where some of the communications between nodes are illustrated.

In embodiments, FIG. 34 illustrates how time synchronization may be based on the time difference 3400 between synchronization packets and GPS based time reference. Delta time lookup table may be maintained for each node within MBRI and updated as required.

Figure 35:
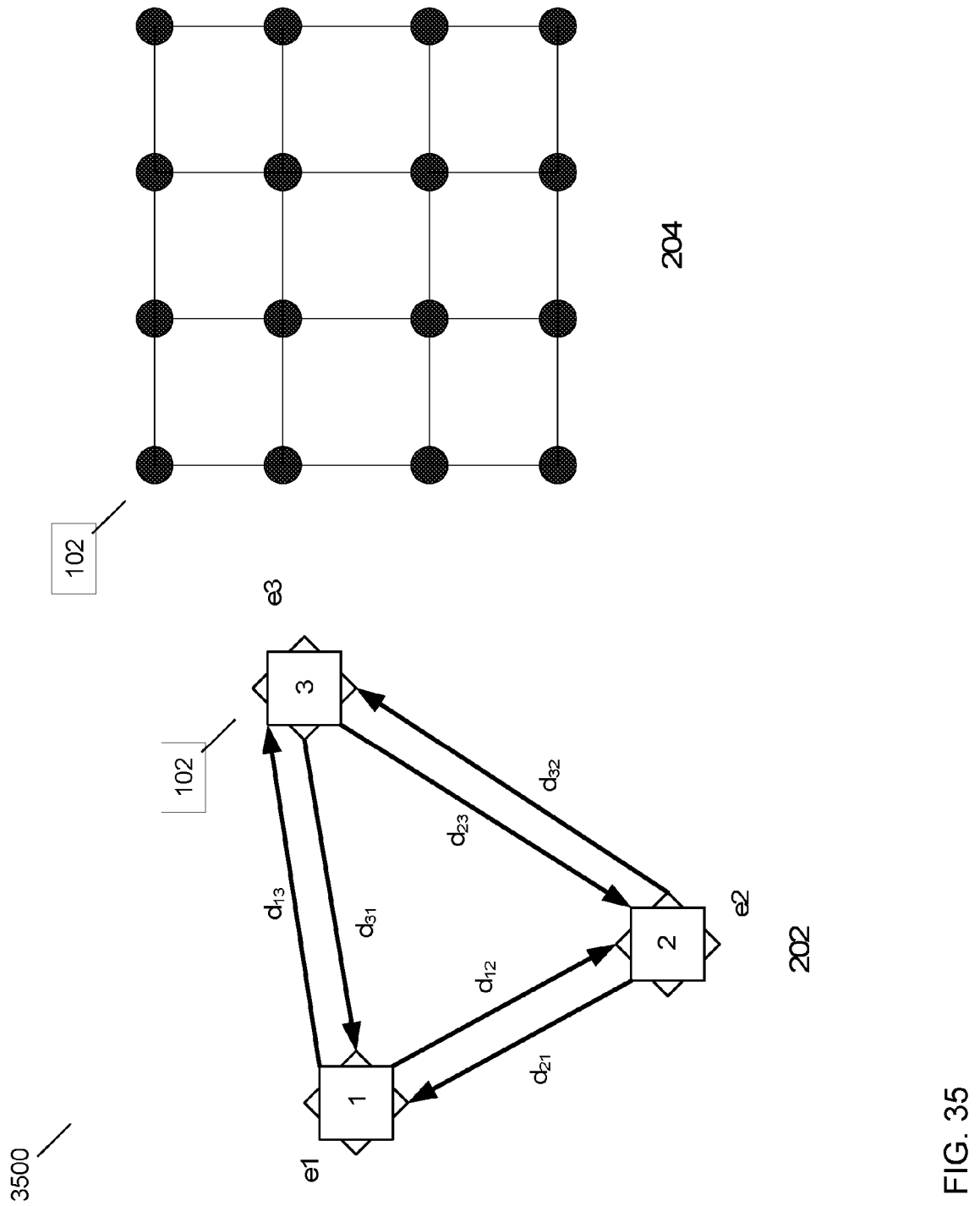
FIG. 35 depicts an embodiment of a time synchronization algorithm.

Continuing with network time synchronization as a MBRI enhancement, FIG. 35 illustrates an example topology for evaluating the algorithm 3500. Estimating the relative time of each node, correcting for time offsets and estimating delay of each link in two mobile ad-hoc networks in accordance with an embodiment of the present invention is discussed. As shown, a simple three-node mobile ad-hoc network 202 and a mesh network 204 that was also used for evaluating the algorithm performance. The algorithm estimates the relative time of each node, corrects for time offsets and estimates the delays of each link in the network.

In an embodiment, in the network 202, each node has a time offset of $e_i$ and the time of reception is $(e_i-e_j)+d_{ij}$ for the reception of a packet from node i to node j and the link delay is $d_{ij}$ for this specific link. It is assumed that these delays are symmetric i.e. $d_{ij}=d_{ji}$. For the network 202 there are 6 unknowns for, the absolute time offsets $e_i$ and the link delays $d_{ij}$ where $\{i,j \ni [0,N-1]\}$ and the number of nodes may be N.

The network 202 has 6 observables, namely the arrival times on the 3 links in each direction. Using a simple model we may write the following relation:

$$y = C^* x + w \text{ where } x = [e; d] \text{ (}e\text{ is length }n\text{, and }d\text{ is length } n^*(n-1)/2\text{)}$$

therefore x is of length n*(n+1)/2, y is the observation vector (relative link timing error) and w is the observation noise.

The time for each node may be estimated as follows:

$$y = [y_{1,2} \, y_{2,3} \, y_{3,1} \, y_{2,1} \, y_{3,2} \, y_{1,3}]^T$$

and $$C = \begin{bmatrix} 1 & -1 & 0 & 1 & 0 & 0 \\ 0 & 1 & -1 & 0 & 1 & 0 \\ -1 & 0 & 1 & 0 & 0 & 1 \\ -1 & 1 & 0 & 1 & 0 & 0 \\ 0 & -1 & 1 & 0 & 1 & 0 \\ 0 & -1 & 0 & 0 & 1 \end{bmatrix},$$

It may be shown that the rank of C is 5 in the example and (N*(N−1)/2−1 in general) supporting the claim that the solution to x or [e d] uniquely cannot be determined. It may be observed that the missing degree of freedom is the mean of the $e_i$'s. This problem may be solved by augmenting y and C as follows:

$$Y = [y_{1,2} \, y_{2,3} \, y_{3,1} \, y_{2,1} \, y_{3,2} \, y_{1,3} \, 0]^T$$

and $$C = \begin{bmatrix} 1 & -1 & 0 & 1 & 0 & 0 \\ 0 & 1 & -1 & 0 & 1 & 0 \\ -1 & 0 & 1 & 0 & 0 & 1 \\ -1 & 1 & 0 & 1 & 0 & 0 \\ 0 & -1 & 1 & 0 & 1 & 0 \\ 1 & 0 & -1 & 0 & 0 & 1 \\ c & c & c & 0 & 0 & 0 \end{bmatrix},$$

where $$c = 1/N;$$

The above matrix C has rank 6 as desired by forcing the mean of the $e_i$'s to 0 and the unknowns e and d can be uniquely determined. Alternatively the augmentation variable can be considered the average error relative to some global time variable. This is discussed later.

It may be assumed that a new observation Y is available on each slot. Thereafter, a Kalman filter may be applied that estimates the unknown parameters in an optimal way if the distribution of the parameters are Gaussian. In this embodiment:

$$x(k) = F^* x(k) + v(k)$$

$$y(k) = C^* x(k) + w(k)$$

The covariance of v and w (the process and observation noises respectively) are Q and R respectively. F may be the identity I matrix assuming that the local time drifts as a random walk (frequency offsets may be added with more states) and the matrix Q is $\sigma^2 * I$ for the upper left n*(n−1) terms and 0 elsewhere (link delays are static but unknown) and for the augmentation variable (sum of the time offsets or mean time phase forced to 0 for now). In an example, the matrices F and C are constant and independent of the time index k.

In an example, the traditional Kalman filter formulation may be used to find the estimate x(k) as follows:

$$e(k) = y(k) - C^* \ddot{\mathbf{x}}(k)$$

$$\ddot{\mathbf{x}}(k+1|k) = F^* \ddot{\mathbf{x}}(k+1|k) + G(k)^* e(k)$$

where $$G(k) = F^* K(k, k-1)^* C' [C^* K(k, k-1)^* C' + R]^{-1}$$

$$K(k+1, k) = F^* (K(k, k-1) - F(k, k-1)^* G(k)^* C^* K(k, k-1)) \\ {}^* F' + Q$$

or using the square root algorithm $$\begin{bmatrix} R^{1/2} & C * K_k^{1/2} & 0 \\ 0 & F * K_k^{1/2} & Q \end{bmatrix} \Theta = \begin{bmatrix} R_{e,k+1}^{1/2} & 0 & 0 \\ G_k & K_{k+1} & 0 \end{bmatrix}$$

$$G(k) = G_k * R_{e,k+1}^{-1/2}$$

In another embodiment, the Kalman filter may be partitioned among the nodes with limited communications. Each node may only directly observe the $y_{i,k}$ links from node i. In an example, considering the partitioning from the node 1 perspective, the observation vector may be $$y_i = [y_{1,2} \, * \, * \, * \, y_{1,3} \, 0]^T$$

where * indicates unknown values (the constant 0 is available since this is a fixed constant). It may be desirable to update the Kalman filter at each node without these unknown values, since this may require additional traffic to relay the observations to each of the neighbors. The Kalman error vector at the $i^{th}$ node becomes:

$$e_i(k) = y_i - C_i^* x_i(k|k-1)$$

Where the $C_i$ matrix has been punctured such that (zero'ed all rows not containing a 1 in the ith column).

$$C_1 = \begin{bmatrix} 1 & -1 & 0 & 1 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & -1 & 0 & 0 & 1 \\ 1 & 1 & 1 & 0 & 0 & 0 \end{bmatrix};$$

If the Kalman gain G could be computed correctly (with puncturing identical to C above) with the limited information available at node i, then the estimate of x would be exact for the non punctured terms compared to the all seeing observer before. Therefore, if on transmission, every node transmitted the x component associated with it then all nodes may have full knowledge of the complete Kalman filter state (with the simplified model that all nodes transmit on every slot).

The effect of puncturing on the computation of Kalman gain may be computed as follows: By communicating the local estimate of $e_i$ the complete Kalman filter may be obtained from superposition for $e_i$ that could be received from its neighbors. This may be accomplished under the assumption that the $e_i$ processes are independent as in the normal case considered (none of the local oscillators are coupled or correlated in any way) and that the observation noises may be independent. In the computation of the Kalman gain, it may be seen that the only term that may not be known at each local node is K(k,k−1) (assuming that the topology is locally known, i.e. the link interconnection between the local node and the link connections to the neighbors). In an example, the K matrix is the covariance of the estimation error of the parameter vector x. The process noise may be assumed to be accurately modeled as a constant diagonal over the time offset vector e and also another constant diagonal matrix for the distance vector d (this is strictly not true since there are correlations imposed by the geometry of the mesh). If the matrix C was also diagonal then the Kalman filter could estimate all of the parameters as N independent estimators since there would be no coupling between any of the parameters and superposition apply exactly. Given this information, good estimates may be obtained from local processing only with periodic updates from neighboring nodes.

In an embodiment, in the formation of the Kalman gain the operation $(C'*K*C'+R)^{-1}$ is first examined. In the product $C*K*C'$ conveniently punctures the K matrix in that only the row and columns of K that correspond to non punctured C element are used and the inverse can be computed more easily in that only the row and columns of K and R that are not punctured needs to be inverted. The remaining parts of the matrix corresponding to the non punctured parts of R may be discarded because later operations punctured out this contribution in the computation of $C'*(C'*K*C'+R)^{-1}$. The number of states that then need to be tracked is $2*N+1$ where N is the number of neighbor links maintained for the time offset estimate of the neighbor node and the link delay (the other link delay estimates also drop out of the estimation puncturing as one would intuitively expect). The last observable is for the 0 mean constraint which may not be discarded until the data is merged from the other neighbors or merged with knowledge of the global or GPS time reference. In an embodiment, the effect of puncturing on the K (parameter covariance) matrix is considered as follows:

In the formation K(k)

$$K(k)=K(k,k-1)-F(k,k-1)*G(k)*C*K(k,k-1)$$

This matrix gets filled out most of all row and columns except for where the C matrix has all 0's in the corresponding row and column in K from the product $C'*C$. In the update on K we have:

$$K(k+1,k)=F*K(k)*F'+Q$$

The case where F and Q are diagonal which simplifies the computation but no puncturing of this matrix is performed by these operations may be considered. However, when computing the next Kalman gain matrix the K matrix is effectively punctured again so the puncture rows and columns of K do not contribute to the next update. Therefore one may conclude that only the non punctured rows and columns may need to be computed in the updates.

In an embodiment, data calculated above in sub-Kalman filters is assimilated as if a single global Kalman filter had processed the data. In a previous embodiment, a set of observation matrices $C_i$ were generated from the global observation matrix C. For the portioning these matrices may have been:

$$C = \begin{bmatrix} 1 & -1 & 0 & 1 & 0 & 0 \\ 0 & 1 & -1 & 0 & 1 & 0 \\ -1 & 0 & 1 & 0 & 0 & 1 \\ -1 & 1 & 0 & 1 & 0 & 0 \\ 0 & -1 & 1 & 0 & 1 & 0 \\ 1 & 0 & -1 & 0 & 0 & 1 \\ 1 & 1 & 1 & 0 & 0 & 0 \end{bmatrix};$$

$$C1 = \begin{bmatrix} 1 & -1 & 0 & 1 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & -1 & 0 & 0 & 1 \\ 1 & 1 & 1 & 0 & 0 & 0 \end{bmatrix}$$

$$C2 = \begin{bmatrix} 0 & 0 & 0 & 0 & 0 & 0 \\ 0 & 1 & -1 & 0 & 1 & 0 \\ 0 & 0 & 0 & 0 & 0 & 0 \\ -1 & 1 & 0 & 1 & 0 & 0 \\ 0 & 0 & 0 & 0 & 0 & 0 \\ 0 & 0 & 0 & 0 & 0 & 0 \\ 1 & 1 & 1 & 0 & 0 & 0 \end{bmatrix};$$

$$C3 = \begin{bmatrix} 0 & 0 & 0 & 0 & 0 & 0 \\ 0 & 0 & 0 & 0 & 0 & 0 \\ -1 & 0 & 1 & 0 & 0 & 1 \\ 0 & 0 & 0 & 0 & 0 & 0 \\ 0 & -1 & 1 & 0 & 1 & 0 \\ 0 & 0 & 0 & 0 & 0 & 0 \\ 1 & 1 & 1 & 0 & 0 & 0 \end{bmatrix};$$

By the geometric constraints the C matrix may be expressed as:

$$C_T = C1 + C1 + C3$$

Using this factorization, the following observations may be made:
If each estimate in each of the 3 Kalman filters were summed as:

$$x_T = x_1 + x_2 + x_3$$

and the Kalman gains $G_i$ were identical where the punctured row and columns become don't cares, then the direct sum would be identical to what would have been arrived at using the $C_T$
In the term $$[C_T*K(k,k-1)*C_T'+R]^{-1}$$

In computing the Kalman gains were the same then by the puncturing arguments the vector XT would be identical to the desired result. In this expression the terms are all known locally except for the parameter covariance K(k,k−1). If term was small compared to R the effect could be ignored. However in typical scenarios, the term $C_T*K*C_T$ is comparable to the R matrix and therefore cannot be fully ignored. The cross terms between local and non-local and between non-local parameters cannot be updated with the limited information available. If however the missing terms in the K matrix were available then the update can be made exact.

Since $C_T{}^{\prime *}C_T$ is diagonal for the terms related to the d, the associated K terms will be diagonal as well as the region above and to the left of this sub matrix. The Ct*Ct matrix is shown below for the example chosen.

$$Ct'*Ct = \begin{bmatrix} 13 & 7 & 7 & 0 & 0 & 0 \\ 7 & 13 & 7 & 0 & 0 & 0 \\ 7 & 7 & 13 & 0 & 0 & 0 \\ 0 & 0 & 0 & 2 & 0 & 0 \\ 0 & 0 & 0 & 0 & 2 & 0 \\ 0 & 0 & 0 & 0 & 0 & 2 \end{bmatrix}$$

For the sub matrix associated with the time offset terms $e_{i,j}$ the diagonal terms are a constant and all of the off diagonal terms are also constant with a value=(D+1)/2 where D is the diagonal term of 13. This is a consequence that each of the observations of the reception error is the difference between the local time and the transmitted time offsets and therefore all of the receive time errors are correlated by ½. In the embodiments described above, all transmitters may be assumed to be active on every slot for ease of analysis.

In an embodiment, an extension to the algorithm described above may be used where a simple solution to correct for drift and variance estimates given the duration since the last observation is described. This method may be equivalent to evaluating the update K times where K is the number of slots since the last observation with the observation matrix set to 0. This may easily be seen to be:

$x(k+K)=F^K*x(k)$

For the determination of the parameter covariance the effect on the square root Kalman filter is more easily modified. In each iteration, without observations the effective observation matrix C is 0. Therefore when computing the update $$\begin{bmatrix} R^{1/2} & C*K_k^{1/2} & 0 \\ 0 & F*K_k^{1/2} & Q \end{bmatrix} \Theta = \begin{bmatrix} R_{e,k+1}^{1/2} & 0 & 0 \\ G_k & K_{k+1} & 0 \end{bmatrix}$$

The term C*K is 0 and when performing the LQD only the F*K term is modified and the only result term required is $K_{k+1}$. Equivalently:

$[F*K_kQ]\Theta=[K_{k+1}0]$

In our example F is the identity matrix and Q is diagonal. By performing M iterations, using the above this is equivalent to $[K_kQ*\sqrt{M}]\Theta=[K_{k+M}0]$ By using this iteration when there is more than one slot elapsed since the last iteration, significant computation can be avoided.

In an embodiment, in the network 204, which is a mesh network, given the accuracy of the frequency estimates all nodes should be able to acquire all neighbor time/frequency accurately for neighbor to neighbor communications. The propagation of a neighborhood time frequency so that multicast messages, contention message request, and generally slotted ALOHA across the mesh however may be an issue. There may be time/frequency tilt across the mesh but the neighborhood needs to be synced accurately. Based on the prior analysis these all need to be within ~10 us for this to occur in typical systems. If only the AP is allowed to transmit until sync has been acquired this does not appear to be an issue. A more desirable approach would be to allow nearly immediate communications between neighbors in the event that the AP is distant so that the data can flow immediately. The mesh network shown (rectangular) was used for simulation evaluation in a 4×4 array shown in FIG. 2 (204). It may be assumed that the slot timer and carrier PLL are locked to the same reference.

Figure 35A:
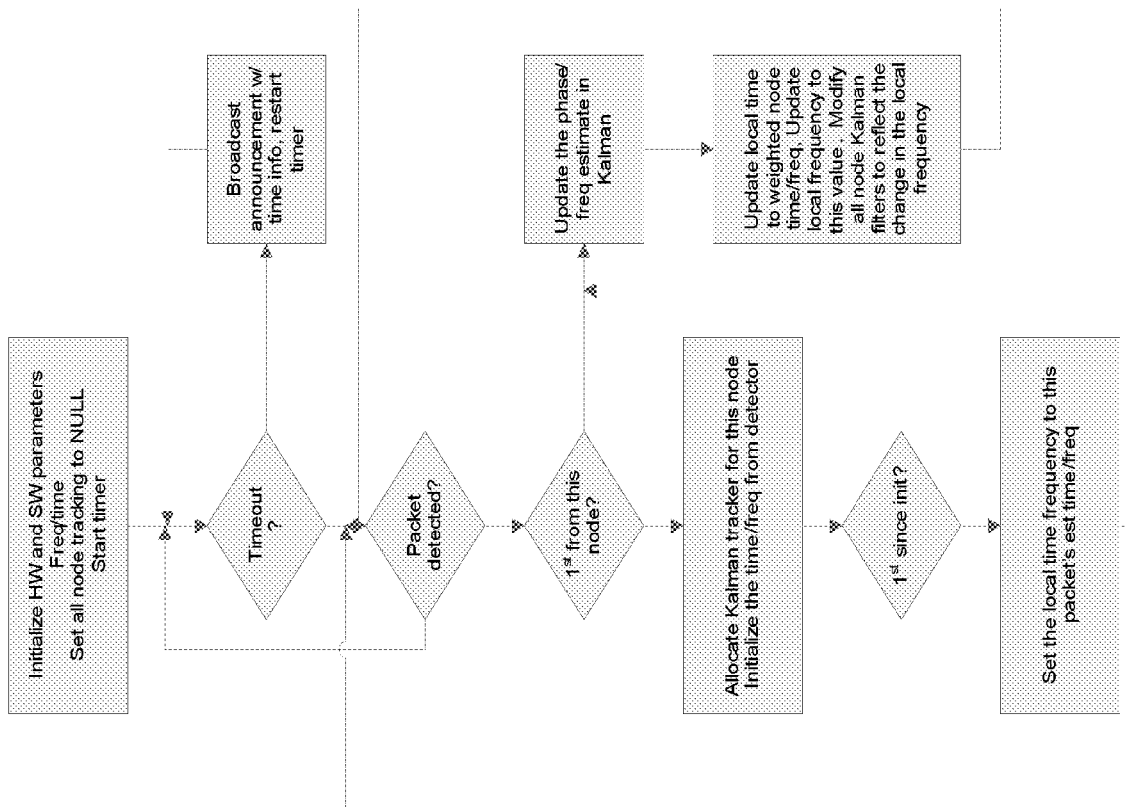
FIG. 35A depicts a method for using Kalman parameter estimates for obtaining time synchronization in a mobile ad-hoc network in accordance with an embodiment of the present invention.

FIG. 35A depicts a method for using Kalman parameter estimates for obtaining time synchronization 3500A in a mobile ad-hoc network in accordance with an embodiment of the present invention. In an embodiment, the Kalman parameter estimates may be applied to the local clocks to reduce the difference between MANET nodes. The reference point may be chosen as the reception time. If there is a local time offset as indicated by the Kalman filter, the local time offset may be set to drive this state to 0 (move the local time which in terms of the Kalman parameters changes the state by this amount). The transmissions may be advanced by the average of the delays of each of the links connected to the local node so that its transmissions arrive at a time at each of the receivers at a time of 0 as closely as possible without knowing the destination a-priori. This scheme may be modified to change the transmission time offset by an amount corresponding to the estimated delay on the link between the local transmitter and the destination node. The transmission delays may be expected to be small compared to the capture windows on the receivers, and is not necessary and would complicate the system unnecessarily.

As shown in FIG. 35A, on each reception of a packet the hardware reports a time offset of the preamble relative to the local clock and a carrier offset estimate. Given these two measurements and the state of the transmitter node from the packet the local Kalman filter is executed to update the parameters estimates. The information received from the other node in the MAC header would be the time offsets and link delay estimates of its neighbors from its Kalman filter. Using the superposition approximation used, the common elements (common neighbors) these would be directly added to the Kalman filter state estimates. The Kalman time offset may be subtracted from the local time correction offset. This time offset can then be subtracted from the Kalman time offset estimate effectively zeroing this value. If the frequency estimate is also used, the same applies to this variable as well.

Figure 35B:
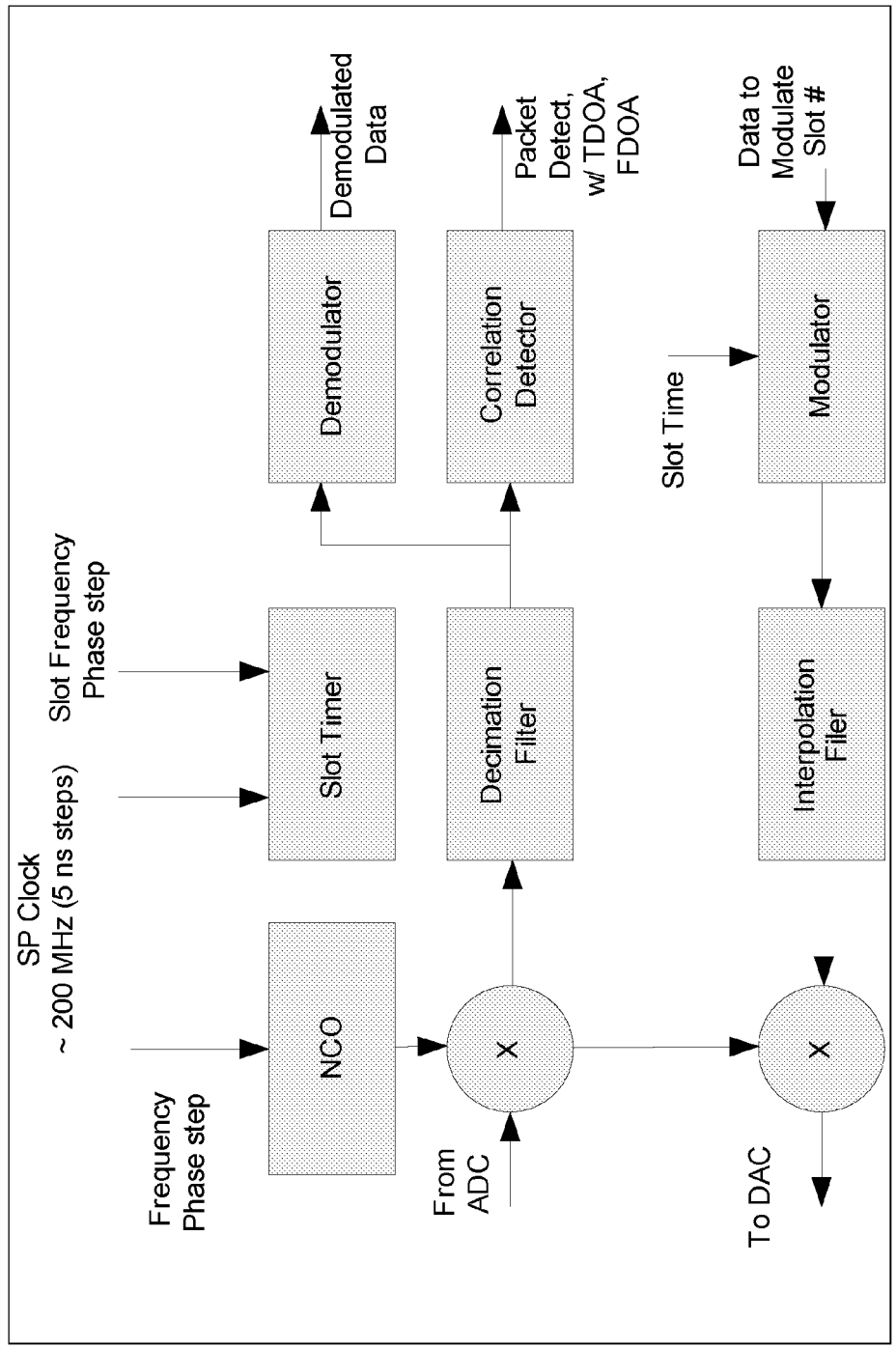
FIG. 35B illustrates the digital processing portion of the burst transceiver implemented in a node in a mobile ad-hoc network in accordance with an embodiment of the present invention.

FIG. 35B illustrates the digital processing portion of the burst transceiver 3500B implemented in a node in a mobile ad-hoc network in accordance with an embodiment of the present invention. The observables considered in the block diagram of FIG. 4 may be burst time of arrival relative to the slot timer and the carrier frequency. The controls available for timing purposes may be the slot and carrier phase and frequency (4 variables). It may be assumed that both the slot and carrier phase and frequency are derived from the same chip clock. From these observables, the frequency and phases are adjusted to the best possible system timing for both reception and transmission of data bursts.

Figure 35C:
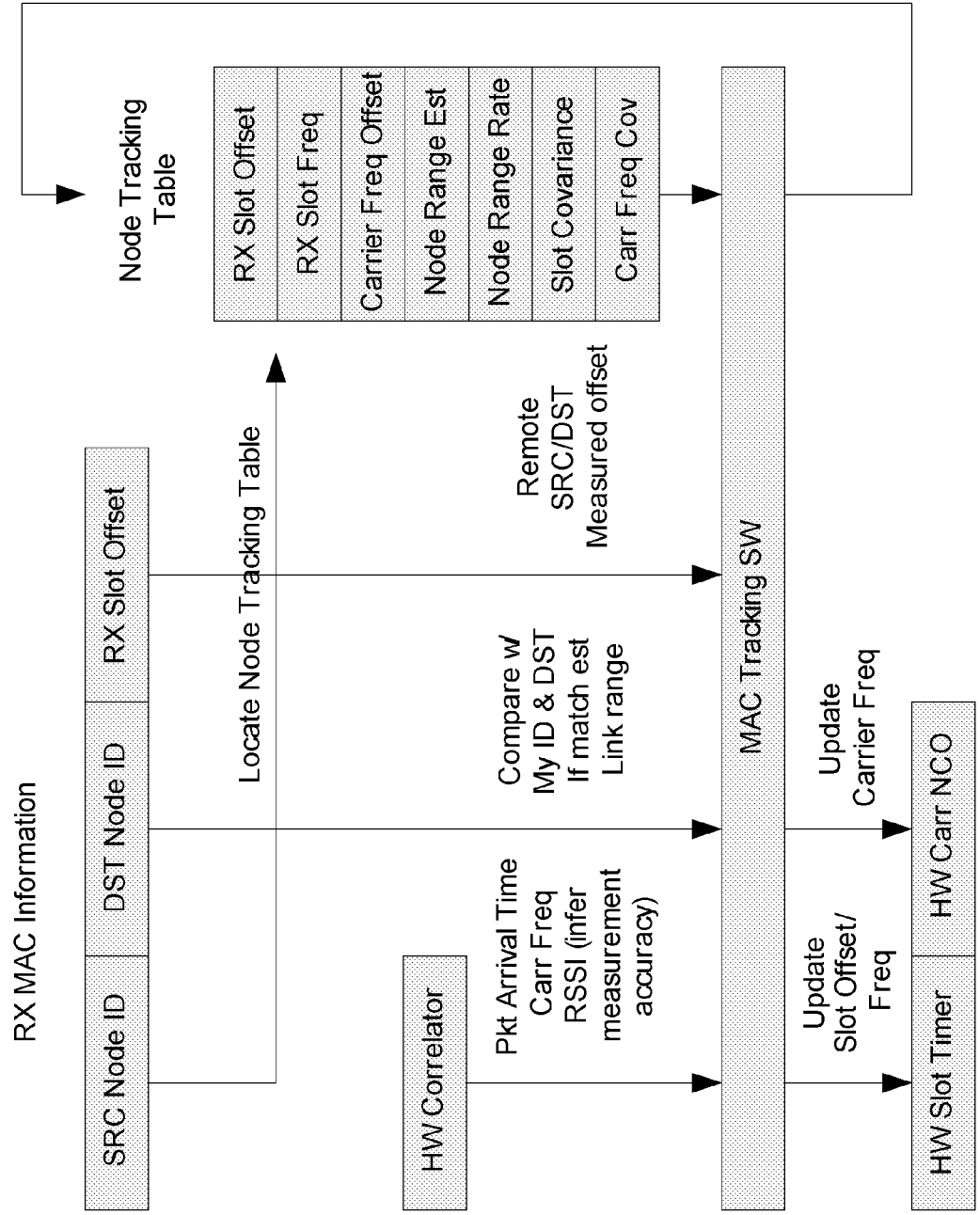
FIG. 35C depicts a top-level view of a timing subsystem in a mobile ad-hoc network in accordance with an embodiment of the present invention.

FIG. 35C illustrates a top-level view of a timing subsystem 3500C in a mobile ad-hoc network in accordance with an embodiment of the present invention. In an embodiment, the system may use a slotted transmission method similar to a slotted ALOHA network. This approach may require accurate slot timing information to avoid collisions in the scheduling of the packets to be transmitted. The receiver must also associate these packets with the intended slots. Another timing requirement may be that the carriers may be set to common frequencies and tuned to avoid frequency offsets that would either introduce interference in adjacent channels or degrade the demodulation process. To set limits on the accuracy required, a maximum communications distance of about 5

Km is set. Therefore a transit time of 17 us must be accounted for and must also be tracked to remove offsets so that all of the links are symmetric relative to this time difference. It may also be desirable to support slot sizes on the order of 500 us that is a tradeoff between the transit time and other overhead, the minimum packet size desired and the responsiveness and bandwidths available. Based on this information a target accuracy before transmission may be set to 5-10 us to reduce this uncertainty overhead. Also a consideration is the timing accuracy to correctly demodulate the OFDM symbol. If no correlator output is used to correct for time offsets the accuracy with 50 KHz carrier spacing would necessitate about 2 us accuracy for a 1% ISI interference level. This may be deemed unreasonable and unnecessary for proper operation. For the timing tracking a correlator may be required and this correlator output may drive the demodulation process. Also a consideration may be the carrier frequency tracking. In the reference system the channel spacing is set to 50 KHz. For reasonable ICI (inter carrier interference) and the desired carrier tracking for demodulation may need to be less than 5 KHz for a single OFDM symbol. In the power up phase of the modem, the receiver may listen to its surroundings and acquires initial slot and carrier frequency offsets. The received packet has a slot ID tag that may be used to set the initial slot timer offset. The offset frequency is also estimated and used as the initial carrier frequency. If no packet arrives within ~100 ms (several frames and small compared to human time scales) a time out occurs and the node announces its presence. If another node is within listening distance the 2 or more nodes will acquire a mutual time base. When the powered up node received a packet the node ID is also present in the packet so that this node can initialize a tracking loop associated with this remote node number. Each time a packet is received from this node the tracked state is updated with an improved time offset associated with this node. Periodically the listening node emits a packet and the destination nodes can compare the receive time compared to the estimated time to ascertain the link distance to this node (time in us) since this is a significant part of the link time budget.

Figure 35D:
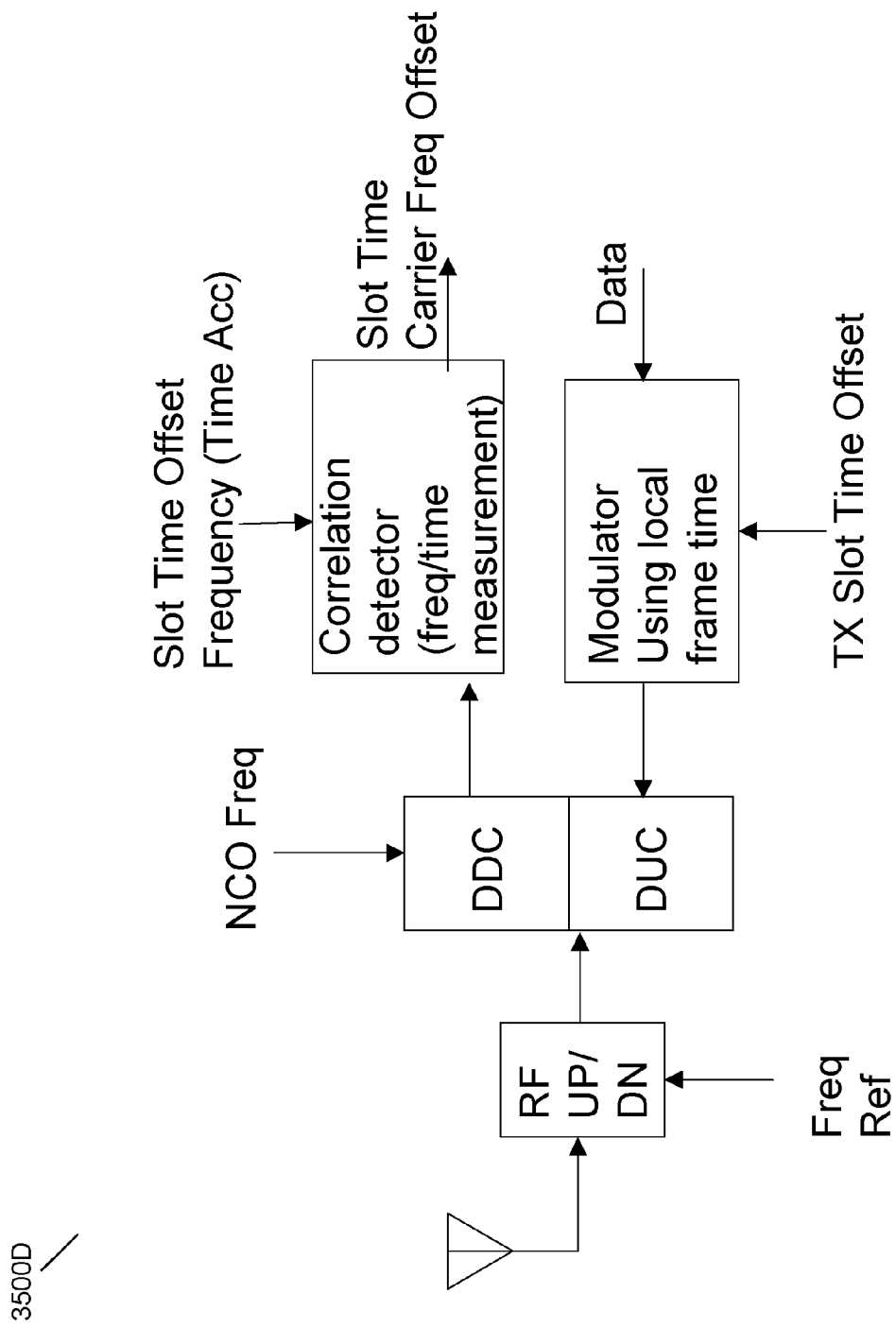
FIG. 35D illustrates hardware used for acquiring and adjusting slot time and frequency by a node in a mobile ad-hoc network in accordance with an embodiment of the present invention.

FIG. 35D illustrates hardware used for acquiring and adjusting slot time and frequency by a node in a mobile ad-hoc network 3500D in accordance with an embodiment of the present invention. In this embodiment, during coarse acquisition the slot time is set to match the $1^{st}$ packet. Afterwards the slot time/frequency is adjusted to track the weighted mean neighbor time. Carrier offset relative to local=Observables−receive time in slot+fractions. Phase Locked Loop (PLL) frequency offset=Control−preset local slot time offset (relative to current).

Figure 35E:
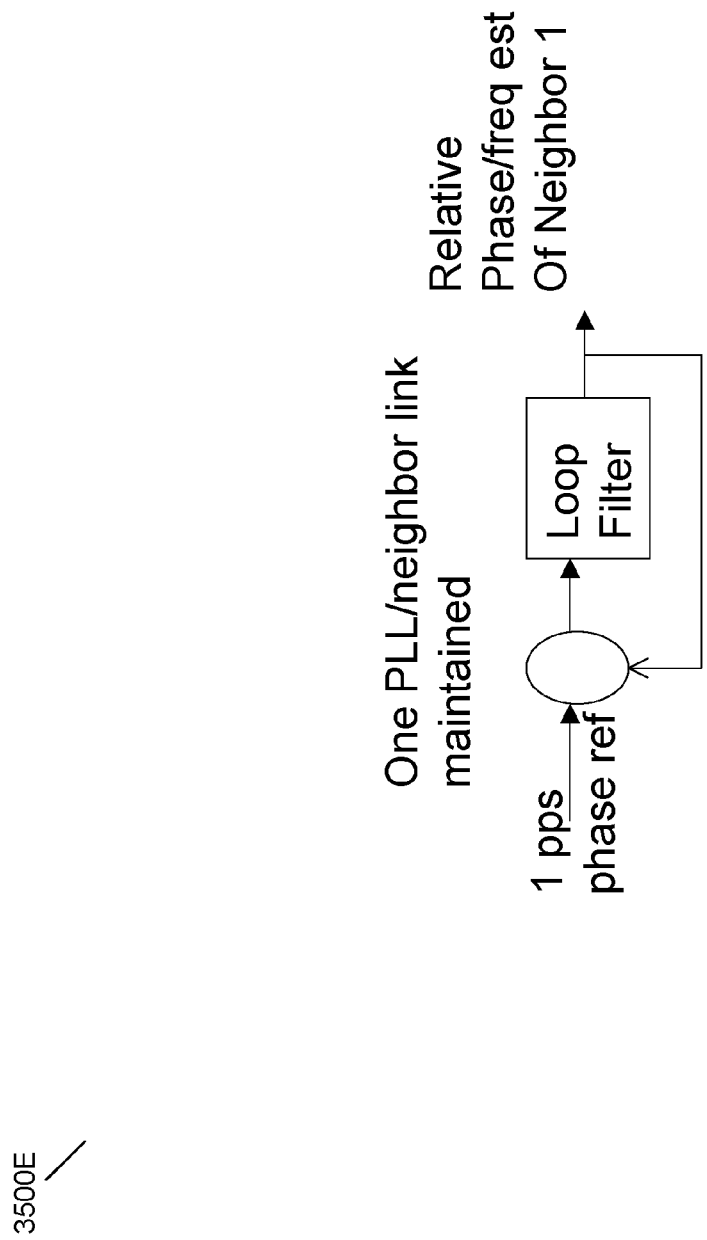
FIG. 35E depicts a functional block diagram of a Kalman filter used in a mobile ad-hoc network in accordance with an embodiment of the present invention.

FIG. 35E depicts a functional block diagram of a Kalman filter used in a mobile ad-hoc network 3500E in accordance with an embodiment of the present invention. The figure shows the block diagram of a Kalman filter used in the form of a timing phase locked loop (PLL) to determine the local oscillator phase noise and receive phase/frequency detector characteristics. These characteristics may be used to tune the Kalman parameters and improve system performance. The method followed for determining the noise is:
Simple Leeson phase noise model used for ref osc
(close in phase noise is assumed to be 10 Hz/sec frequency wander)
Assumed 10 MHz ref has −140 dBc/Hz@1 MHz
At 2.5 GHz multiplied gives −114 dBc/Hz@1 MHz
In 1 sec the frequency drift will be ~2 mHz rms after acquisition
This does not include improvement from VCXO cleaning
This would not include local drift which doubles rms error power
The Leeson model used is as follows:

$$L(d)=10*\log[((F/(2*Q*d)^2+1)*(NkT/P)*(c/d+1))]$$

d=frequency offset in Hz.
L(d)=noise level at the frequency offset d in dBc/Hz.
F=center frequency in Hz.
Q=loaded Q.
N=noise factor.
k=Boltzmann's constant 1.380E-23 J/degree.
T=Room temperature 290 degrees Kelvin.
P=Power delivered to amplifier input in W.
c=Corner frequency for flicker (1/F) noise in Hz
Traditional text book Kalman filters fail in practice when long term operation or ill conditioned data are encountered. Some implementations compute rescue variables to detect divergence and reset. The issue arises when the parameter covariance computed becomes non positive definite (negative Eigen values) from differencing co variances with finite arithmetic. In embodiments, a more modern approach may be to use square root derivations where the covariance is expressed ad a Cholesky factor (square root of a positive definite matrix). A square root Kalman filter may be described as:

$$x_{i+1}=F_ix_i+Q_iw_i$$

$$y_i=H_ix_i+R_iv_i$$

Where w, v are unit variance Gaussian vectors
Form the left matrix below and transform $$\begin{bmatrix} R_i^{1/2} & H_iP_i^{1/2} & 0 \\ 0 & F_iP_i^{1/2} & Q_i \end{bmatrix}\Theta = \begin{bmatrix} R_{e,i}^{1/2} & 0 & 0 \\ K_{p,i} & P_{i+1}^{1/2} & 0 \end{bmatrix}$$

Where $\Theta$ is any unitary matrix that lower triangulates the pre-array
(LQD, Lower*Q decomposition)
P is the parameter covariance and $P^{1/2}$ is its Cholesky factor (square root)
Perform the state update using the array elements $$\hat{x}_{i+1}=F*\hat{x}_i+K_{p,i}R_{e,i}^{-1/2}(y_i-H_i\hat{x}_i)$$

The Kalman filter may be used to track the node Doppler to better estimate the effective frequency difference with the tracked range. These features would provide most of the added information required for geo-location if enough nodes are visible from all other nodes. The computation of the Kalman filter is proportional to the number of observations and the square of the number of parameters tracked. In the case considered there are 2 observation variables and 2 states. The update would then require about 40 MAC ops+4 square roots or divisions (there may be different algorithms for the LQD it depends on if the square root or division is easier. Typically there is little difference however). With 128 nodes on a 200 MOP processor the total time update would require ~32 us (~50 OPS/update).

Figure 35F:
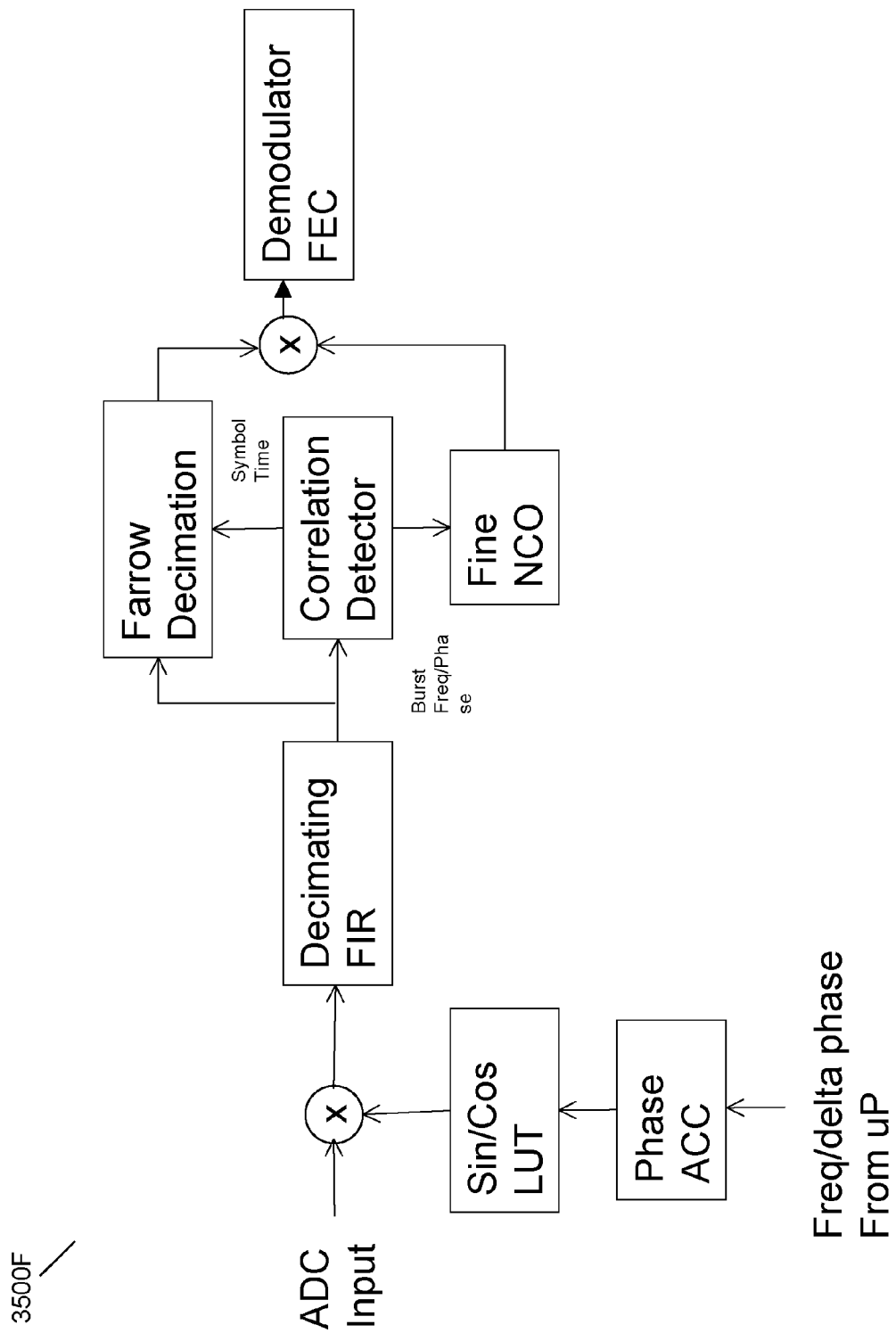
FIG. 35F depicts a block diagram of a digital receiver in accordance with an embodiment of the present invention.

In embodiments, FIG. 35F depicts a block diagram of a digital receiver 3500F in accordance with an embodiment of the present invention.

Figure 35G:
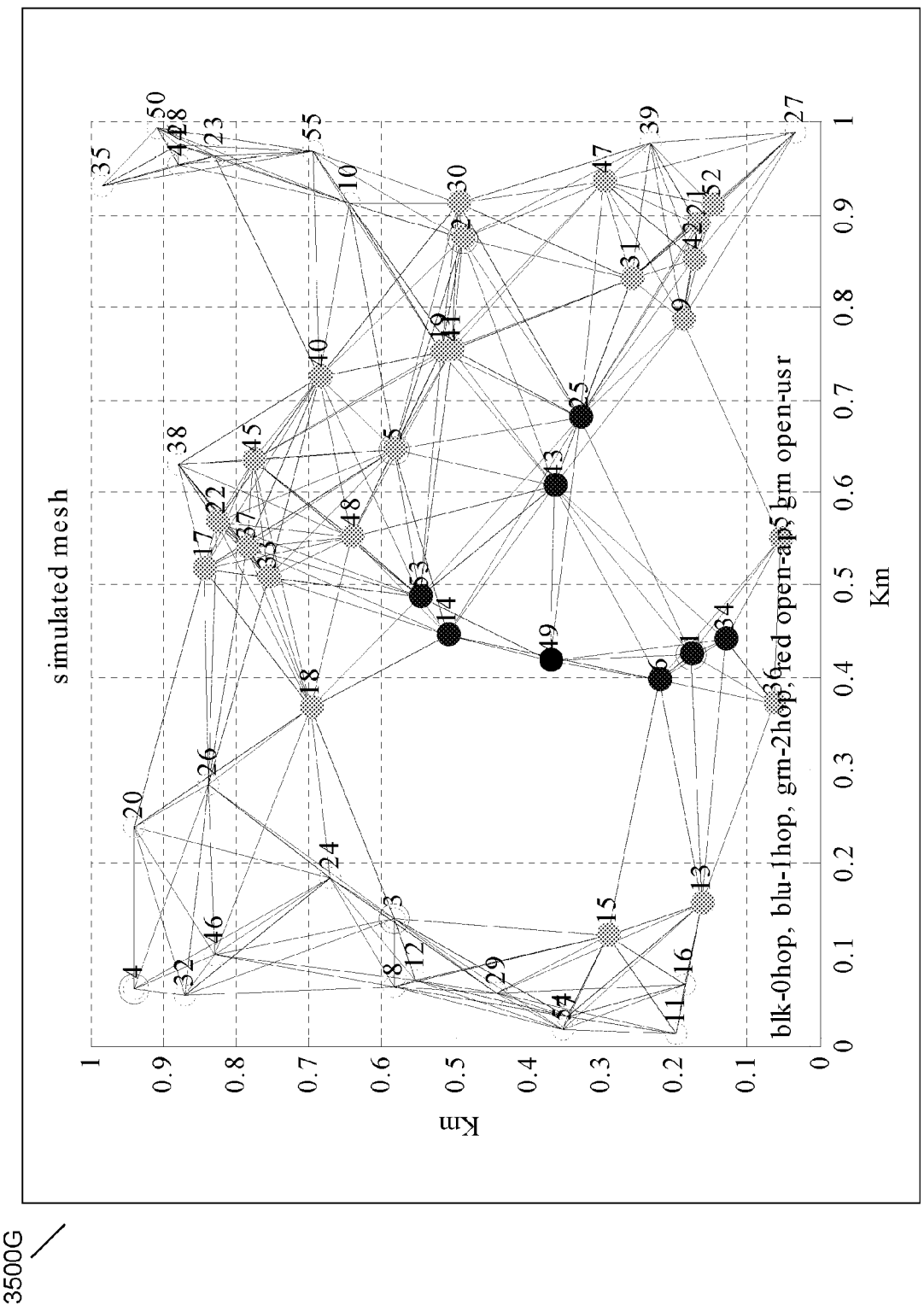
FIG. 35G depicts simulation results for a mobile ad-hoc network with 5 access points and 50 user nodes in accordance with an embodiment of the present invention.
Figure 35H:
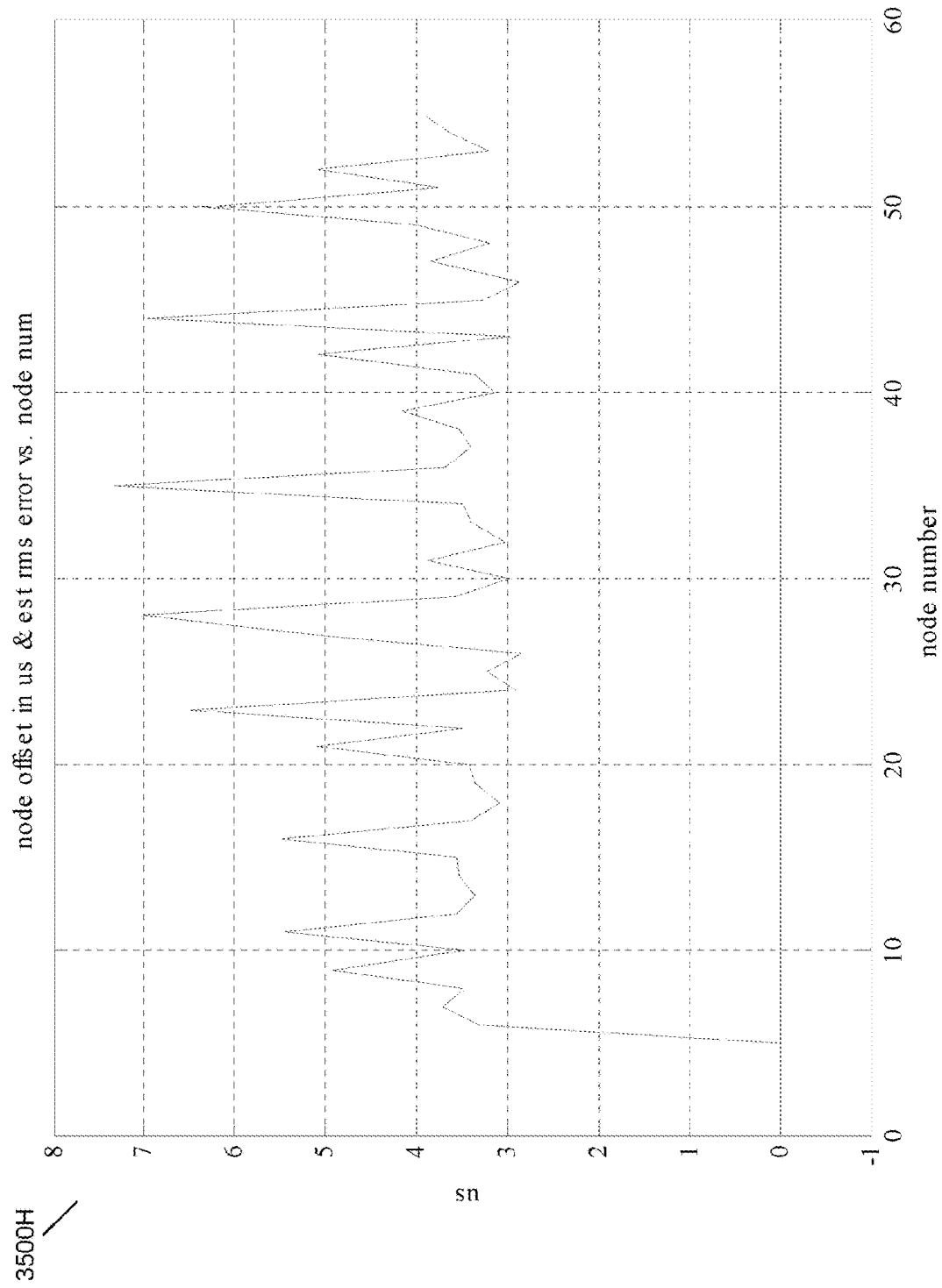
FIG. 35H depicts simulation results for a mobile ad-hoc network with 5 access points and 50 user nodes in accordance with another embodiment of the present invention.

In embodiments, FIG. 35G depicts simulation results 3500G for a mobile ad-hoc network with 5 access points and 50 user nodes in accordance with an embodiment of the present invention. The simulation time was for 100 slots with each node having a probability of transmission of 10% on each round. FIG. 35H shows an example mesh with the links shown with the node ID next to each node.

In embodiments, FIG. 35H depicts simulation results 3500H for a mobile ad-hoc network with 5 access points and 50 user nodes in accordance with another embodiment of the present invention. The simulation time was for 100 slots with each node having a probability of transmission of 10% on each round. The estimated Root Mean Square (RMS) timing error is plotted vs the node id. After just 100 slots intervals it is seen that most nodes have an rms sync error of ~4 us. This error gradually decreases with the number of slots seen and eventually floors out at 2 us. The neighbor error however is much less and typically 0.5 us for the examples simulated.

In embodiments, the present invention may provide for synchronizing time in an ad-hoc network, the ad-hoc network comprising two or more transceiver nodes, or a multiplicity of two or more transmitters and two or more receivers that allows the method of establishing a network time by detecting receive packets and estimating from it a time of arrival and frequency of arrival relative to a local time base and processing that information for the purpose of reducing the timing errors between nodes using a processor.

In embodiments, reading information in the MAC header may be for the purpose of improving the timing estimates, communicating changes in remote node state, providing MAC timing information to the remote nodes, and the like. In embodiments, using a Kalman filter may be used for the purposes of optimally estimating either relative or absolute states In embodiments, distributed computing may be provide an equivalent estimate as would be provided by a single computation location using all of the knowledge available from the distributed nodes. In embodiments, estimating link delays may be for the purpose of advancing the transmitter reference to minimize the receiver arrival time differences. In embodiments, additional MAC information may be transferring time information from an AP or other more stable reference via GPS or other method as to enable the estimation of the timing error relative to the stable reference. In embodiments, using the error covariance estimates may be for the purpose of detecting broken oscillators or other failures that may result in poor timing reference estimates. In embodiments, a hardware platform may not be limited to timing error or frequency error measurement, where hardware is processed by the host processor to enable the algorithm. In embodiments, a hardware platform may be provided that has controls to allow the shifting of time or frequency toward the desired operating point that is accessible by the host processor that may shift time for the receiver section, transmitter section or both as needed by the algorithms. In embodiments, weighting the state estimate for application may be to provide the controls in the hardware.

Figure 36:
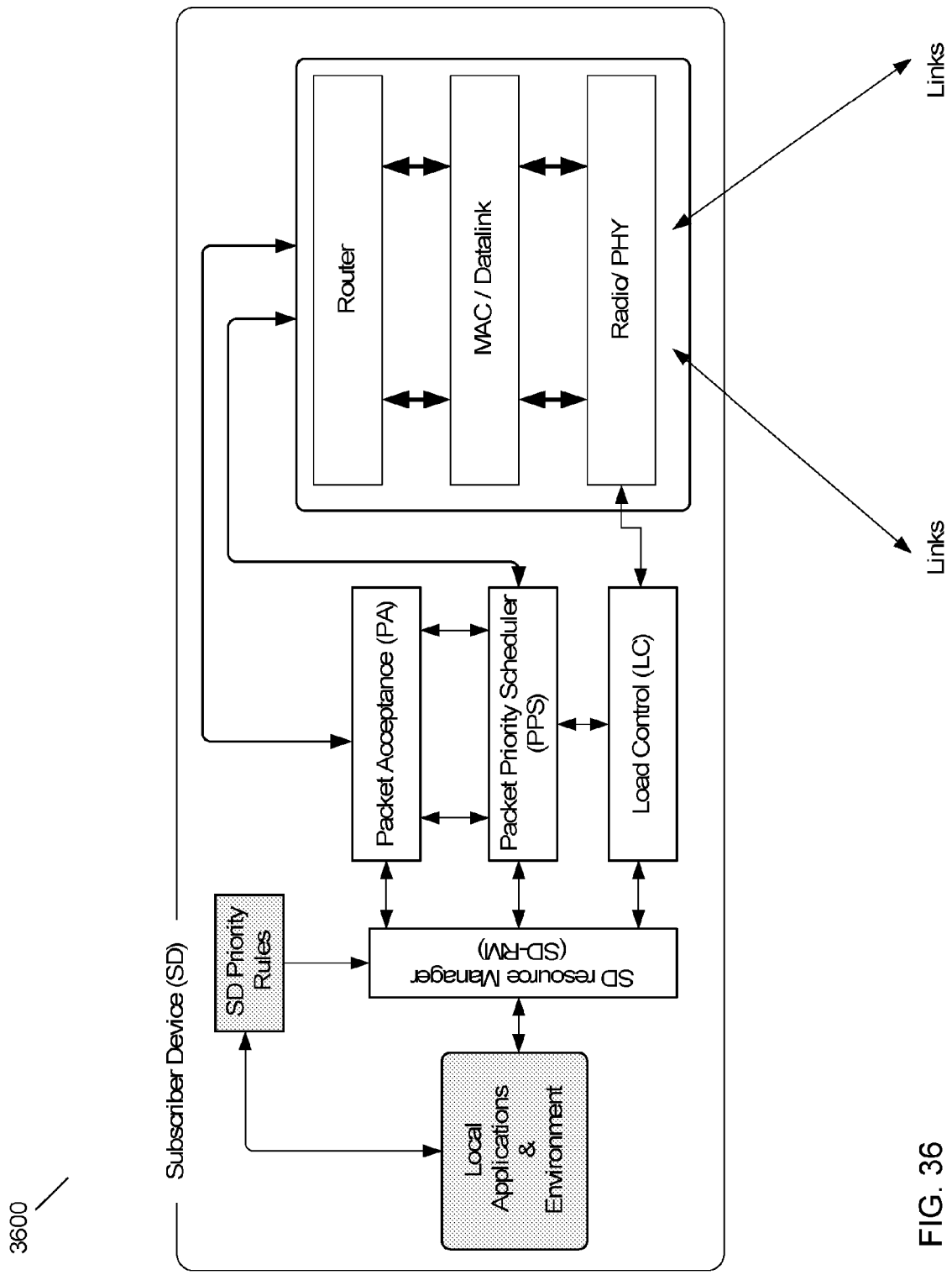
FIG. 36 depicts an embodiment of radio resource management in a subscriber device.
Figure 37:
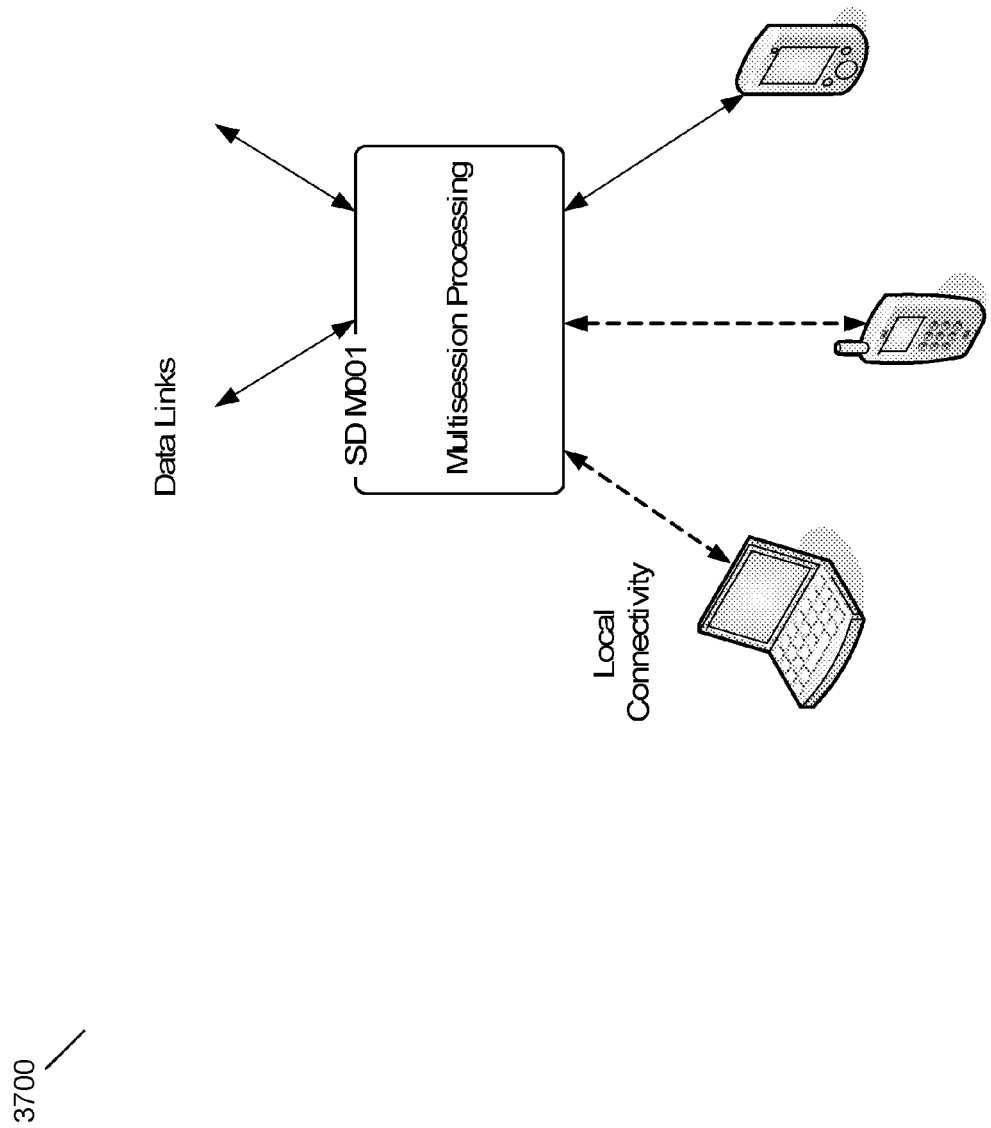
FIG. 37 depicts an embodiment of a multi-session enabled subscriber device.

In embodiments, the MBRI may provide functions and capabilities that enable improvements over existing systems. For instance, MBRI may provide functions and capabilities in the subscriber device that may ordinarily be a part of a base station, such as air interface management, signaling, concentration logic, signal propagation algorithms, and the like. MBRI may enable the creation of a mobile Internet, including routing implemented in the subscriber device, MAC layer functionality in the subscriber device, peer-to-peer communication (e.g., communications between subscriber devices), and the like, that may provide a communications protocol stack equivalency within the subscriber device. MBRI may enable full radio resource management in the subscriber device, such as the subscriber device acting unilaterally, the subscriber device cooperating with other nodes, interference mitigation, handover/handoff functionality, backhaul capabilities such as access to the public Internet, IP-RAN capabilities, and the like. FIG. 36 provides one embodiment of how radio resource management 3600 may be implemented in an MBRI subscriber device. In addition, MBRI may be OFDMA enabled, and subscriber devices may be multisession enabled, where a node may perform multiple transmissions simultaneously, such as with a session-tagged interleaving of packets to identify one session transmission from the other. In embodiments, multisession transmissions may be the result of multiple applications on the node, performing tasks simultaneously, sending out communications across the network, and the like, where the simultaneous transmission of the data is sent in a multisession transmission.

In embodiments, performance of the MBRI may be enhanced over current systems, such as through adaptive power control, intelligent route diversity, least cost routing on the subscriber device, warranted service level agreements (SLA), node neighbor discovery and awareness, no need for a home location register (HLR) or visitor location register (VLR), geo-location of devices, openness to web applications on the subscriber device, subscriber device unicast and multicast capabilities, increased radio saturation, graceful degradation, and the like.

In embodiments, methods and systems are provided herein for operating an all IP mobile ad hoc network with carrier grade network performance and improved spectrum utilization through IP transparent routing, media access control and physical layer convergence protocols including a plurality of wireless mobile nodes and a plurality of wireless communication links connecting the plurality of nodes. The methods and systems may include a range of features, including, for example, one or more of: (1) facilitating node level, network wide and interoperable time synchronization for packet level and frame level transmission/reception peer to peer, peer to network and network to peer; (2) supporting a variety of wireless access protocols using TDD or FDD transmission based on symmetrical waveforms optimized for peer to peer communications in a mobile ad-hoc network; (3) supporting a physical layer convergence protocol that allows for symmetrically optimized waveforms based on OFDM, OFDMA, SC-OFDMA, QAM, CDMA and TDMA protocols; (4) facilitating link-by-link autonomous data rate selection; (5) providing a slotted MAC protocol for peer to peer, peer to network and network to peer frame transmission/reception; (6) providing for autonomous network entry/exit for nodes entering or exiting the network, and transparently allowing new nodes to utilize ARP for end route translation, DHCP for authentication, authorization and IP address resolution; (7) providing peer to peer packet routing with facilities for packet segmentation and reassembly, Quality of Service based routing and traffic type based routing; (8) MAC layer and network layer fairness algorithms designed to optimize and prioritize traffic based on nodal queue build-up, traffic type latencies, bandwidth optimization and spectrum optimization; (9) providing unicast and multicast routing of packet data through the mobile ad hoc network; (10) facilitating peer-to-peer connections to selectively bypass network infrastructure; (11) providing for remote monitoring, control, and upgrade of the wireless mobile nodes; (12) providing location estimates of neighboring nodes to each node in the network; (13) facilitating adaptive control of transmission power of a node based on location of the node; (14) dynamically adapting packet routing according to network and spectrum conditions; (15) prioritizing delay sensitive traffic across the mobile ad hoc network; (16) providing multiple connections of the mobile ad hoc network to a fixed network; (17) enabling automatic re-transmission of loss-sensitive traffic; (18) providing secure connections and supporting existing IP security standards; (19) facilitating spectrum independence; and/or (20) Supporting multi-session support at individual node.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by providing peer-to-peer communications support. In embodiments, the communications support may be for time-division duplex (TDD) transmission band operation, for frequency-division duplex (FDD) transmission band operations, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by providing peer-to-peer communications support. In embodiments, the communications support may be for time-division duplex (TDD) transmission band operation, for frequency-division duplex (FDD) transmission band operations, and the like.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by providing support for multiple transmission channel access structure types. In embodiments, the multiple transmission channel access structure type may be QA, OFDM, OFDMA, SC-OFDMA, CDMA, TDMA, FDMA, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by providing support for multiple transmission channel access structure types. In embodiments, the multiple transmission channel access structure type may be QA, OFDM, OFDMA, SC-OFDMA, CDMA, TDMA, FDMA, and the like.

In embodiments, the present invention may implement a method for providing a mobile, broadband, routable internet (MBRI), in which a plurality of mobile devices interact as nodes in a mobile ad hoc network (MANET) and in which packets are IP routable to the individual device independent of fixed infrastructure elements; and enhancing MBRI operation by providing facilities to allow the nodes to gracefully enter and exit the MANET and to retrieve their IP addresses upon first time entry into the MANET.

In embodiments, the present invention may implement a system for a mobile, broadband, routable internet (MBRI), in which a plurality of mobile devices interact as nodes in a mobile ad hoc network (MANET) and in which packets are IP routable to the individual device independent of fixed infrastructure elements; and the network capable of enhancing MBRI operation by providing facilities to allow the nodes to gracefully enter and exit the MANET and to retrieve their IP addresses upon first time entry into the MANET.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by providing logical layer to physical layer segmentation and reassembly functions to pack control and data payload efficiently in the air interface payload time slots and frequency segments or sub-channels.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by providing logical layer to physical layer segmentation and reassembly functions to pack control and data payload efficiently in the air interface payload time slots and frequency segments or sub-channels.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by providing MAC level algorithms that warrant statistical fairness amongst all cooperating nodes within a particular access point domain for access to payload transmission time slots and frequency segments or sub-channels within the access point domain.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by providing MAC level algorithms that warrant statistical fairness amongst all cooperating nodes within a particular access point domain for access to payload transmission time slots and frequency segments or sub-channels within the access point domain.

In embodiments, the present invention may implement a method for providing a mobile, broadband, routable internet (MBRI), in which a plurality of mobile devices interact as nodes in a mobile ad hoc network (MANET) and in which packets are IP routable to the individual device independent of fixed infrastructure elements; and enhancing MBRI operation by providing facilities to simultaneously support unicast and multicast data streams peer-to-peer, peer-to-network, and network-to-peer in the MANET.

In embodiments, the present invention may implement a system for a mobile, broadband, routable internet (MBRI), in which a plurality of mobile devices interact as nodes in a mobile ad hoc network (MANET) and in which packets are IP routable to the individual device independent of fixed infrastructure elements; and the network capable of enhancing MBRI operation by providing facilities to simultaneously support unicast and multicast data streams peer-to-peer, peer-to-network, and network-to-peer in the MANET.

In embodiments, the present invention may implement a method for providing a mobile, broadband, routable internet (MBRI), in which a plurality of mobile devices interact as nodes in a mobile ad hoc network (MANET) and in which packets are IP routable to the individual device independent of fixed infrastructure elements; and enhancing MBRI operation by providing remote download capabilities for seamless upgrade of node and access point software during MANET operations. In embodiments, the MANET operations may provide network wide upgrade, automatic upgrade to the node, and the like.

In embodiments, the present invention may implement a system for a mobile, broadband, routable internet (MBRI), in which a plurality of mobile devices interact as nodes in a mobile ad hoc network (MANET) and in which packets are IP routable to the individual device independent of fixed infrastructure elements; and the network capable of enhancing MBRI operation by providing remote download capabilities for seamless upgrade of node and access point software during MANET operations. In embodiments, the MANET operations may provide network wide upgrade, automatic upgrade to the node, and the like.

In embodiments, the present invention may include a plurality of other functions and capabilities in association with MBRI, such as prioritizing delay sensitive traffic across the network protocol through priority queuing and priority channel access by differentiating data traffic across the protocol stack, dynamically adapting bandwidth usage according to network and backhaul conditions through distributed decisions regarding local bandwidth usage by individual wireless nodes, dynamically assigning IP addresses to new entry nodes or terminating IP addresses for exiting nodes according to network requests for service through distributed decisions regarding local resource usage by individual wireless nodes, and the like.

In embodiments the present invention may provide improved capabilities associated with MBRI associated with a facilitating adaptive control of the transmission power of a node based on the location of a node in the mobile ad hoc network, mobile ad hoc network creation and self-forming networks made up of individual nodes based on their relative position with respect to each other in the mobile ad hoc network, mobile ad hoc self healing networks made up of individual nodes based on their relative position with respect to each other in the mobile ad hoc network, mobile ad hoc load leveling networks according to network requests for service and comprises making distributed decisions regarding local resource usage by individual wireless nodes, mobile ad hoc networks where the nodes and network are packet size indifferent and comprises making distributed decisions regarding local resource usage by individual wireless nodes, unicast routing in mobile ad networks according to network requests for service and comprises making distributed decisions regarding local resource usage by individual wireless nodes, mobile ad hoc networks that are Internet Protocol Plug Compatible, mobile ad hoc networks that are neighbor aware to requests for service and comprises making distributed decisions regarding local resource usage by individual wireless nodes, mobile ad hoc networks according that are geo location aware for network requests for geo location information, mobile ad hoc networks that are unconditionally open for Java Web applications, mobile ad hoc networks that are configured for private or public network usage, and the like.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by providing logical layer and data link layer control functions and algorithms that set a node transmit power level for at least one payload characteristic. In embodiments, the payload characteristic may be a time slot, a frequency segment, a sub-channel, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by providing logical layer and data link layer control functions and algorithms that set a node transmit power level for at least one payload characteristic. In embodiments, the payload characteristic may be a time slot, a frequency segment, a sub-channel, and the like.

Figure 39:
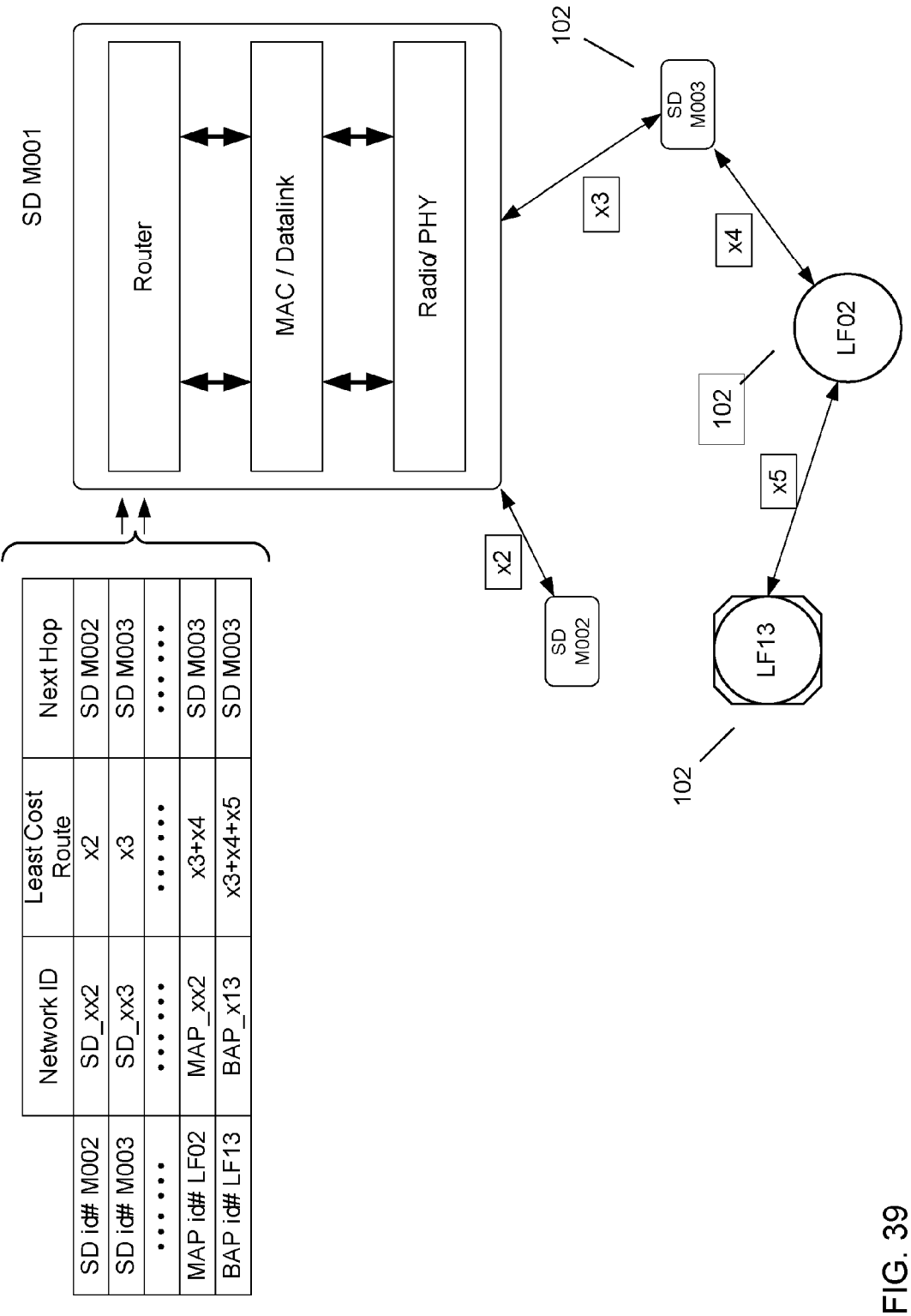
FIG. 39 depicts an embodiment of a fully enabled IP router in a subscriber device.

In embodiments, the MBRI may distribute network, routing and switching intelligence to the subscriber device and to spanning network elements that enable subscriber devices to interconnect with the "wired" Internet. By doing this each subscriber device can autonomously determine its own path to transmitting/receiving information to/from other peer devices in the network and with the Internet. In addition, route diversity increases exponentially commensurate with the number of devices in a given geographic area thereby increasing Quality of Service, increasing bandwidth switching capability through improved spectrum reuse and increased spectrum tele-density. Furthermore, MBRI automatically load levels the access side traffic across all the available backhaul points of presence (which are also MBRI nodes that have fixed wired connections to the Internet). FIG. 39 provides one embodiment of a fully enabled IP router in a subscriber device 3900 and how it may be implemented within MBRI.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI capabilities by providing load level peer-to-network traffic amongst the available backhaul access points through traffic based link scheduling within access point domains and across domains that subtend a backhaul access point.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI capabilities by providing load level peer-to-network traffic amongst the available backhaul access points through traffic based link scheduling within access point domains and across domains that subtend a backhaul access point.

In embodiments, benefits of MBRI may include improved quality of service, better scalability for traffic carrying capacity, an ability to increase spectrum reuse for a given geography by an order of magnitude more than cellular systems used over the same geography, and the like. MBRI may allow each node to optimize the network resources and each other on a packet by packet basis for sending/receiving traffic from one device to another or to/from the wired Internet. The technology takes advantage of access side hopping/routing and backhaul hopping/routing to optimize packet forwarding.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI capabilities by providing node level metrics that use neighbor RF information and link level routing information to allow nodes to asynchronously optimize for the maximum throughput and transmit opportunities within an access point domain on a per slot schedule basis.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI capabilities by providing node level metrics that use neighbor RF information and link level routing information to allow nodes to asynchronously optimize for the maximum throughput and transmit opportunities within an access point domain on a per slot schedule basis.

In embodiments, the MBRI may scale, commercialize, and optimize both unlicensed and licensed spectrum band operations for the public communications marketplace including voice, video and data services through an all IP mobile ad-hoc routing network, where each node is a standalone router able to make unilateral routing decisions through unique mobile ad-hoc protocols that are equivalent and transparent to the standard IP protocols used in the public wired Internet.

In embodiments, the MBRI may have the capability to move routability into a mobile access network, in turn allowing intelligent routing, optionally including providing a network that is routable, such as IP-routable, down to the individual device in a mobile ad hoc network, without necessity of a base station to perform the routing. Thus, the methods and systems disclosed herein may allow peer-to-peer Internet communications in a mobile ad hoc network without the need for intervention by a base station or similar controller. 37 provides an embodiment of a multi-session enabled subscriber device 3700 and how it may be implemented in MBRI.

In embodiments, methods and systems disclosed herein also include providing a range of functions that have historically been provided as part of a base station in the handset or subscriber device in a mobile ad hoc network work, optionally including one or more of an air interface management facility, signaling intelligence, concentration logic, signal propagation algorithms, interference mitigation between devices, and the like. Methods and systems disclosed herein may include full radio resource management capabilities in a subscriber device, such as a handset, including management of the radio of the device itself, management of how the device cooperates with foreign devices, and handover and handoff by the subscriber device.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI capabilities by providing at least one of signaling, network routing, link scheduling, and slot scheduling intelligence to allow the node to self-route and self-manage air interface resources. In embodiments, the intervention may be from external routing, a control function, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI capabilities by providing at least one of signaling, network routing, link scheduling, and slot scheduling intelligence to allow the node to self-route and self-manage air interface resources. In embodiments, the intervention may be from external routing, a control function, and the like.

In embodiments, methods and systems disclosed herein may also include providing an architecture with fixed radios associated with mobile radios. The fixed radios may include various access points to nodes of an MBRI. Methods and systems disclosed herein include methods and systems for providing backhaul to the Internet from a mobile ad-hoc network, such as an MBRI. Backhaul may include a diversity of backhaul types, including connection to the Internet backbone, as well as optional interconnection into a FAP. Pre-deployment design for maximum bandwidth demand may identify where a FAP exists for backhaul and allocate MANET radios to these sites in a pattern that provides optimum backhaul capacity for all the MANET radios in the network. Other MANET radios that are not at a FAP may transmit their backhaul to those MANET radios that do have fiber and thus reduce the number of fibered points required to cover a region. In embodiments, FAPs may be successively activated as bandwidth demand grows in the network. This process of identifying where the FAPs are may require the development of specific data from multiple sources and the development of bandwidth planning in order to predict which FAPs are activated in which period. This may reduce the number of FAPs needed for a MANET network and thus reduce cost. It also may allow for the concentration of backhaul bandwidth and thus enable volume discounts on fiber backhaul. By bringing the radios to the FAPs, the time to deploy a network may be substantially reduced. In addition, it may provide a wider selection of Fiber Access Points to increase the flexibility of a MANET network design. Most wireless networks and network planning software programs design a network for coverage and rely on backhaul to be brought to every wireless site. This innovation reverses that process by the acquisition and unification of multiple data sources to identify FAPs prior to actual deployment and by software that enables systematic selection of the best FAPs for the network as demand grows. Benefits of the process may include network design for end state bandwidth capacity, network design for bringing MANET nodes to FAPS, data development to identify where FAPs are located, activation of pre-determined FAPs as bandwidth demand across the network grows, and the like.

In embodiments, backhaul-driven MANET network design may provide network design for improved end state capacity. Current network design software may be limited to executing algorithms that design a network for coverage, usually working out from a single fixed point and then locating new network nodes to provide contiguous network coverage. In embodiments of the present invention, MANET networks may enhance this software by first establishing where the network's forecast capacity would be concentrated and then selecting FAPs that correspond to this concentration of end state bandwidth demand. FAP data development may be provided through the purchase of multiple data sets that identify the location of fiber terminating equipment are combined and cross-checked against each other. Additional proprietary data may also be added, for instance from a fiber connectivity carrier or the municipality. Together, this data may provide a listing of all FAPs that could be used in the region. MANET network design may be undertaken using the FAPs as starting locations for MANET radios. Any gaps in coverage in the network may then be filled by deploying additional MANET radios that backhaul their traffic via a wireless ad hoc mesh. Fiber backhaul for the MANET radios located at FAPs may be activated as and when overall network traffic demand requires this additional backhaul. The overall result may be a network design optimized to the pre-existing FAPs and thus avoids the cost and time required to provide fiber backhaul to every MANET radio site. By successive activation of fiber backhaul so the cost of this fiber backhaul, transport may be deferred until the network bandwidth demand requires it.

Figure 38:
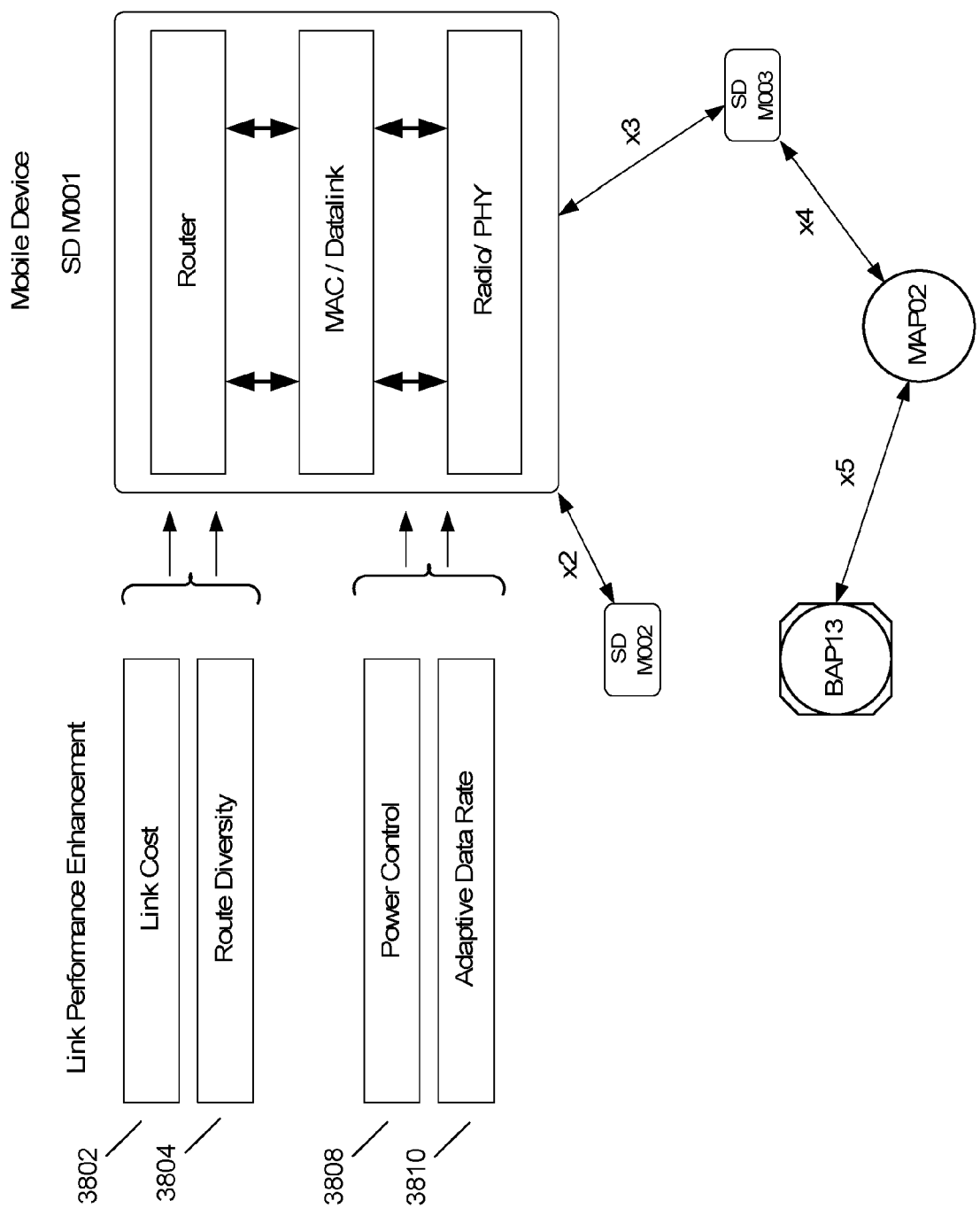
FIG. 38 depicts an embodiment of a subscriber device with enhanced performance.
Figure 40:
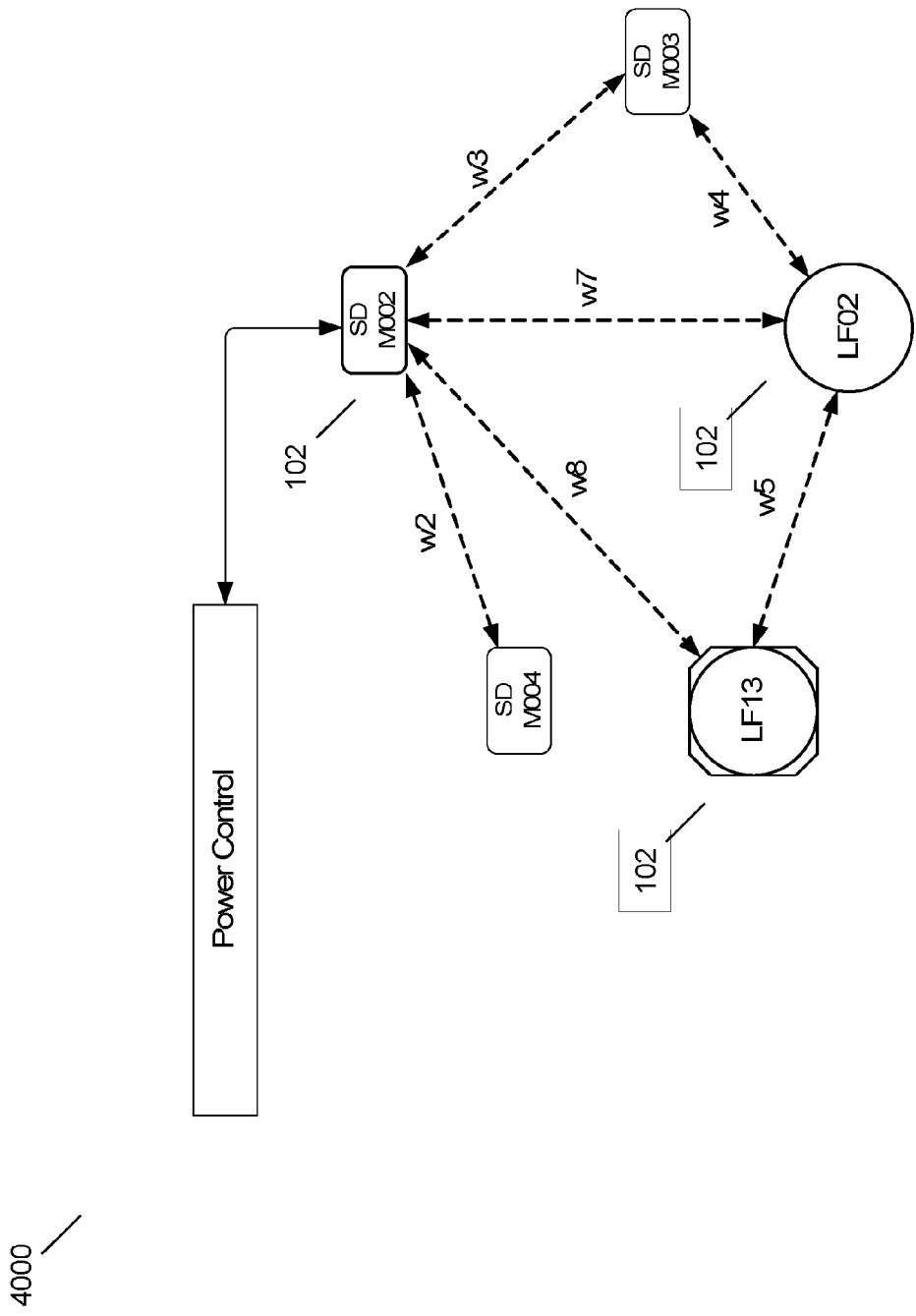
FIG. 40 depicts an embodiment of a subscriber device with enhanced power control, such as a whisper mode.

In embodiments, methods and systems disclosed herein may include a range of performance improvement facilities, including, without limitation power control facilities 3808, adaptive data rate facilities 3810, cost-based routing algorithms 3802, route diversity facilities 3804, independence from a pre-set route list or need to retrieve a route list, warrantable service levels, neighbor discovery, awareness facilities, and the like, as shown in FIG. 38. In embodiments, power control facilities optionally may include adaptive power control of radio transmission power from a mobile device, such as for increasing radio saturation and for graceful degradation of network performance. Power control facilities 4000, such as shown in FIG. 40, may provide for nearby devices whispering (w2, w5, w7, w8) to each other at low power, optionally based on channel conditions or other factors, so that they have minimal impact on the rest of the network. Power management in the MBRI system may be enabled through both a managed interface and from autonomous action at the node level. For instance, a node may individually sense power requirements to neighbor nodes through neighbor awareness, and be able to dynamically adjust power levels so that they are not to great, as to cause interference to other nodes in the neighborhood, or too low, as to reduce link quality. In another instance, power management may be provided in a more centralized manner, such as to declare certain links, services, data streams, and the like, certain power levels, such as for quality of service requirements or dedicated link assignments. In embodiments, the fixed MAPs and BAPs may also participate in power control algorithms.

Figure 41:
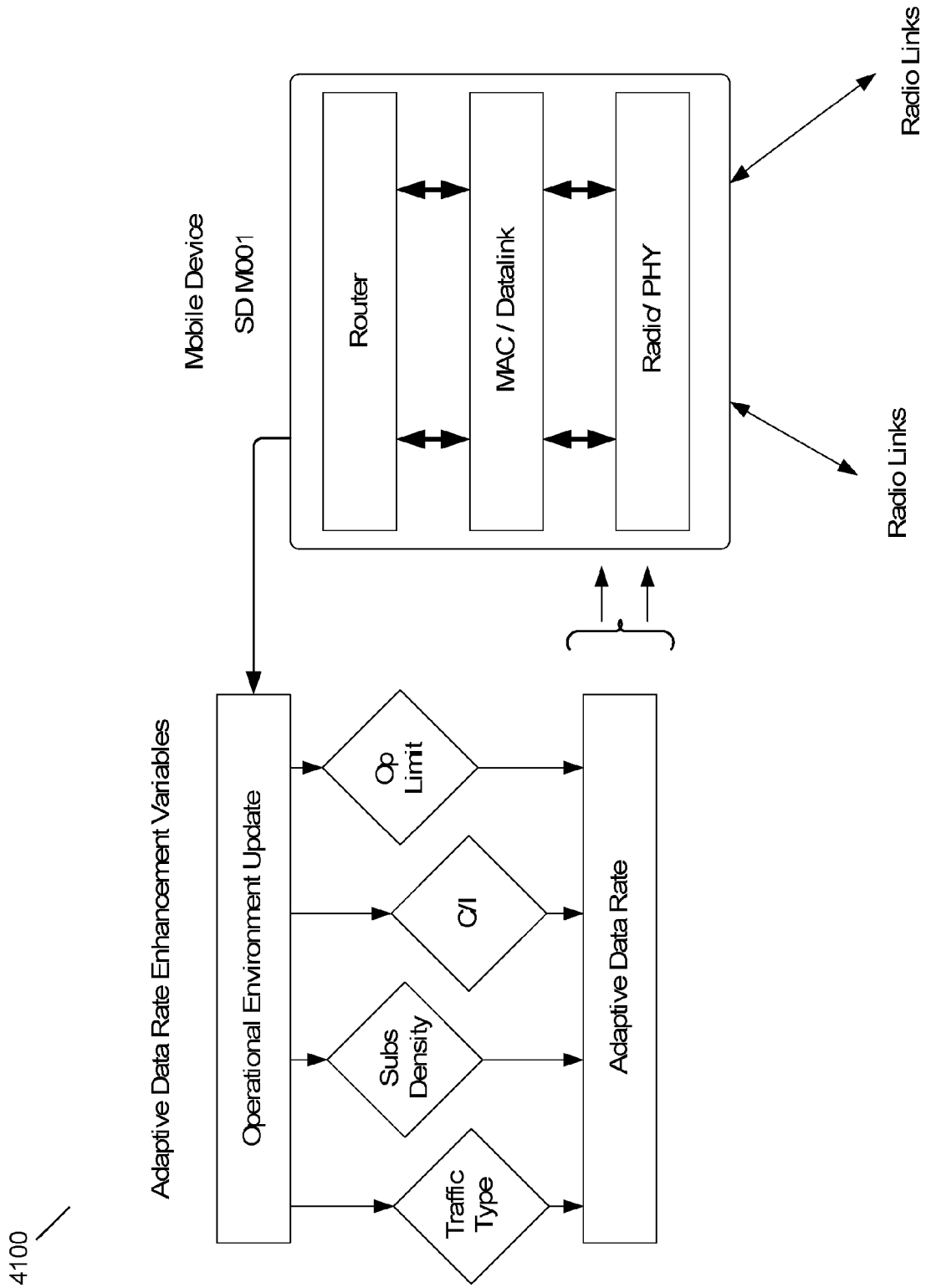
FIG. 41 depicts an embodiment of a subscriber device with enhanced adaptive data rate capabilities.
Figure 42:
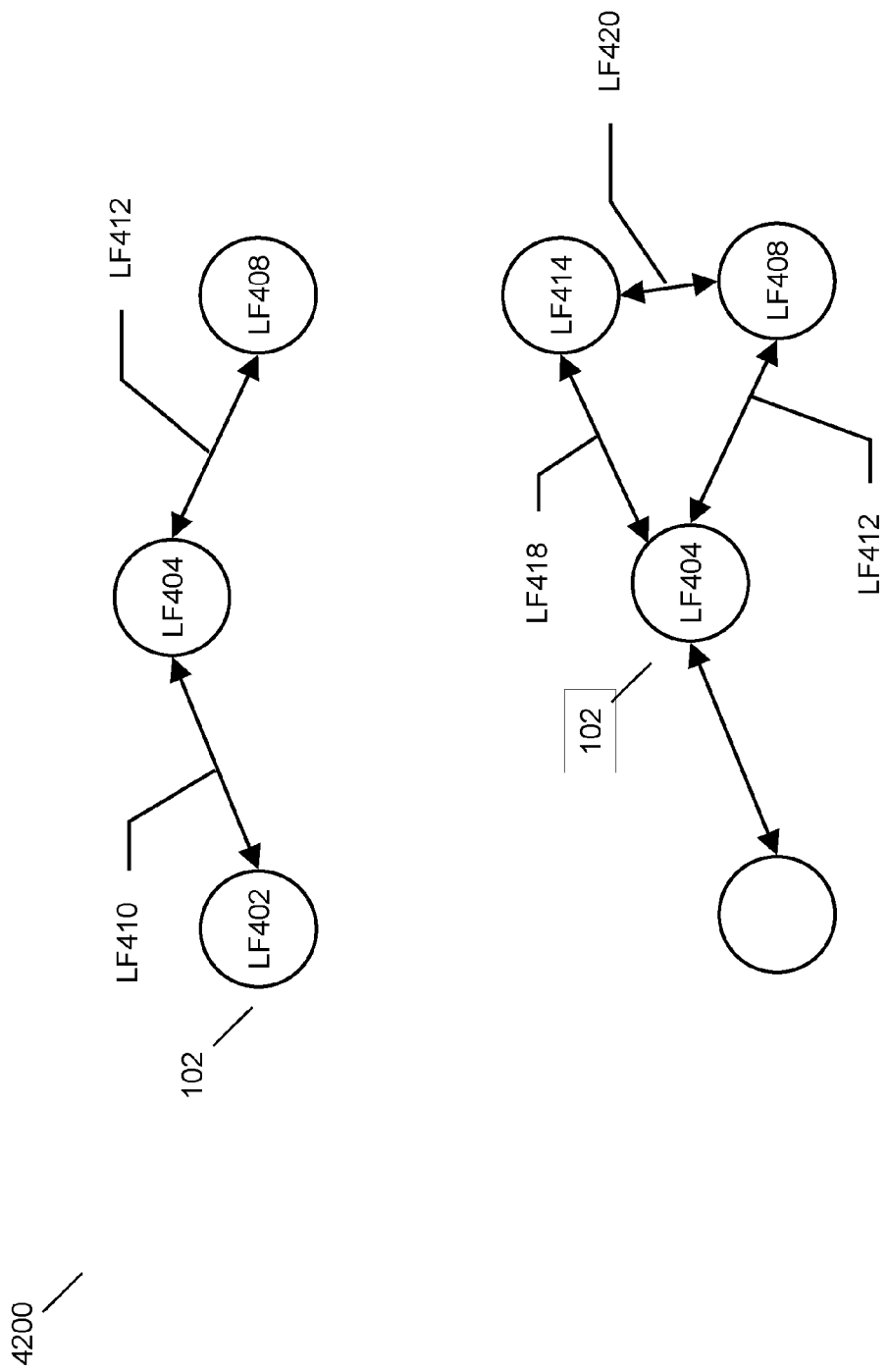
FIG. 42 depicts an embodiment of how nodes may communicate in association with adaptive data link rate.

In embodiments, ADR (adaptive data rate) facilities 4100, such as shown in FIG. 41, may include methods and systems for varying data rates delivered to or from a device based on a variety of factors, including traffic type, density of subscriber devices in an area, spectral conditions in an environment, terms and conditions of a subscription plan, and others. MBRI may enable dynamic ADR facilities through link-by-link autonomous data rate selection, neighbor awareness, network management services, and the like. For instance, a node may detect that a type of data traffic is requesting routing on a particular link, and the node, enabled through the ability to select data rates for individual links, may be able to automatically adjust the data rate allocation provided to the link to meet the requirements of the new traffic type. FIG. 42 illustrates one method of how adaptive data rate may be utilized 4200.

Figure 43:
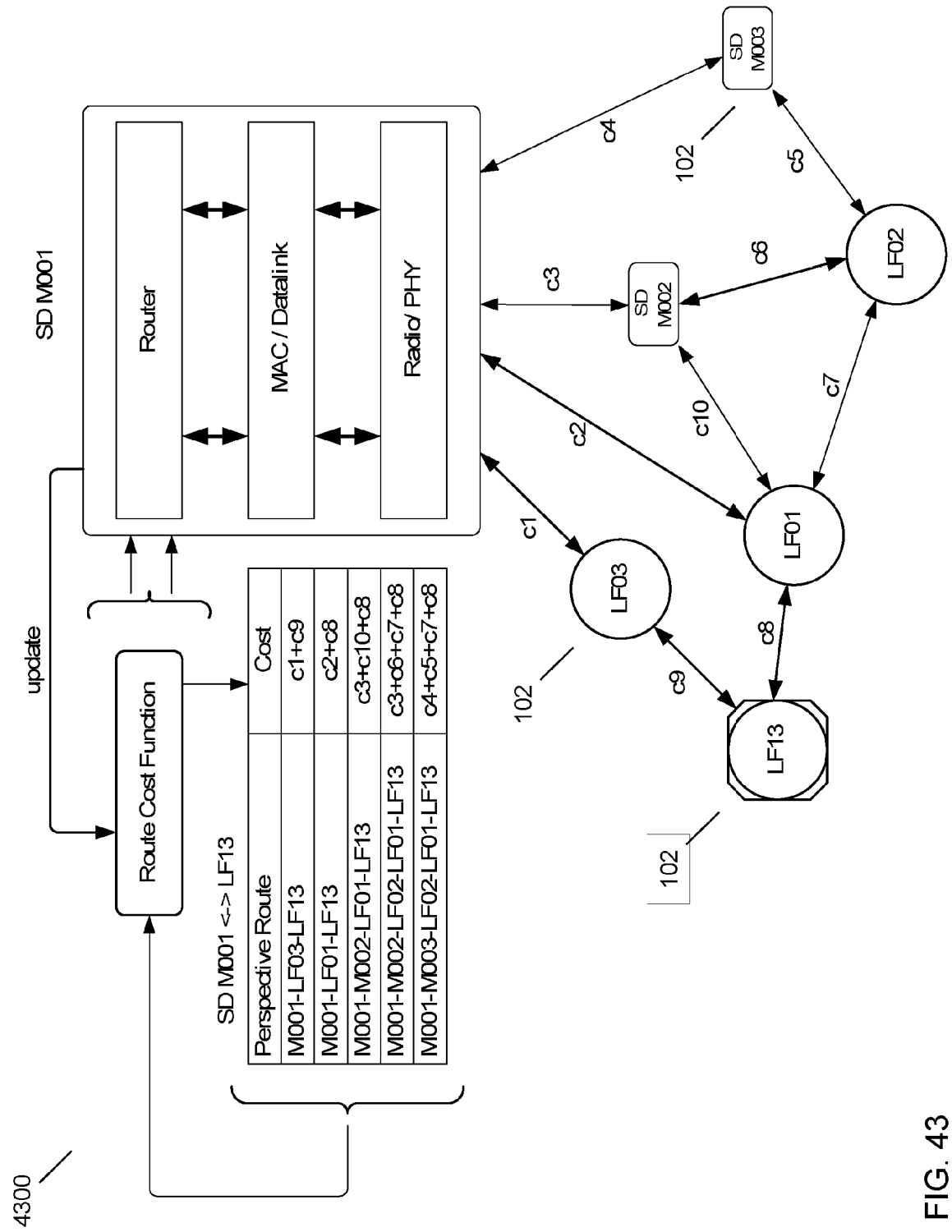
FIG. 43 depicts an embodiment of a route cost function.
Figure 44:
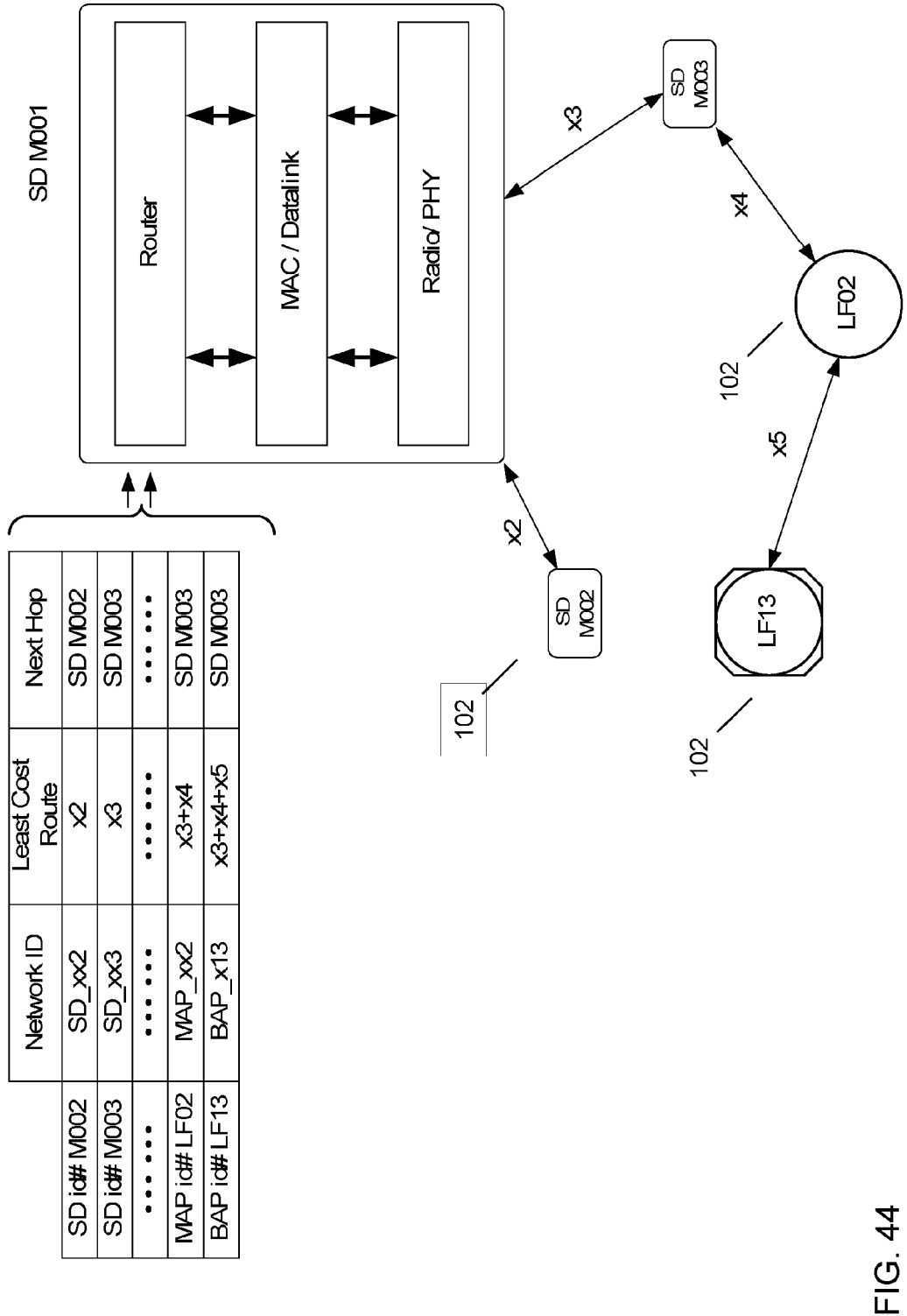
FIG. 44 depicts an embodiment of a least cost routing function.

In embodiments, Cost-based routing algorithms 4300 may include algorithms that assign "costs" to links involved in a route, and with different links being assigned costs optionally based on a variety of factors, such as the number of hops involved in a series of links, the density or type of traffic being handled by a particular link, terms and conditions of service applicable to a particular link, quality of spectrum or channel conditions for a particular link, power required to communicate to a particular link, or the like, such as shown in FIG. 43. Costs of different available routes can then be compared with costs of different routes being calculated by considering overall cost of a plurality of links in a prospective route. Calculation of the cost may be based on a sum of costs, or based on a weighted average or other type of calculation. Calculation of cost can be subscriber-specific (or subscriber plan specific). For example, a subscriber plan might dictate finding "least cost" routes as to overall network performance (allowing the subscriber to have a less expensive subscription plan), or the subscriber might have a "high performance" plan that finds routes with the highest level of bandwidth or quality of service. Routing algorithms embodied in software on subscriber devices can thus take into account these various factors and route traffic in a way that accounts for the costs of routing, defined in whatever terms a network service provider prefers. Cost based routing may be enabled through MBRI capabilities, such as intelligent routing, neighbor awareness, peer-to-peer communications, link-by-link autonomous data rate selection, and the like. For instance, the cost of a route may be determined through both a node's ability to discern available routes through awareness of neighbor link availability and current traffic loading, but also on the ability of nodes in the network to alter their data rate per the changing routing requirements of the network. For example, a high quality of service route through the network may be called for, such as to provide a data stream pipeline from a mobile network node to BAP connection point. The source node may be able to determine, through an awareness of network node availability and loading, a route that best provides the needs of the route. In addition, the source node, perhaps in conjunction with management facilities, may be able to alter power and data rate levels to improve the conditions under which the route costs are determined. In embodiments, MBRI may provide a dynamic and flexible way for optimal routes to be discovered and enhanced. FIG. 44 illustrates one embodiment of how least cost routing may be implemented 4400 within MBRI.

Figure 45:
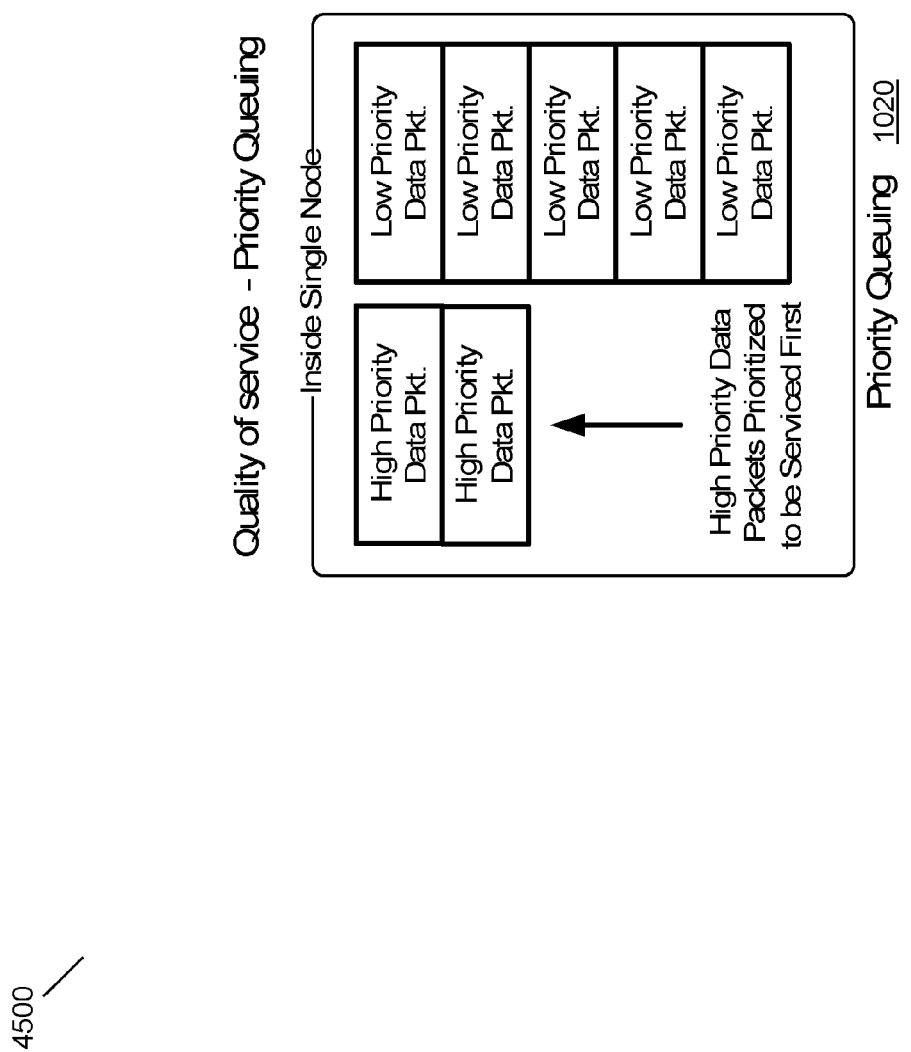
FIG. 45 depicts an embodiment of quality of service priority queuing.
Figure 46:
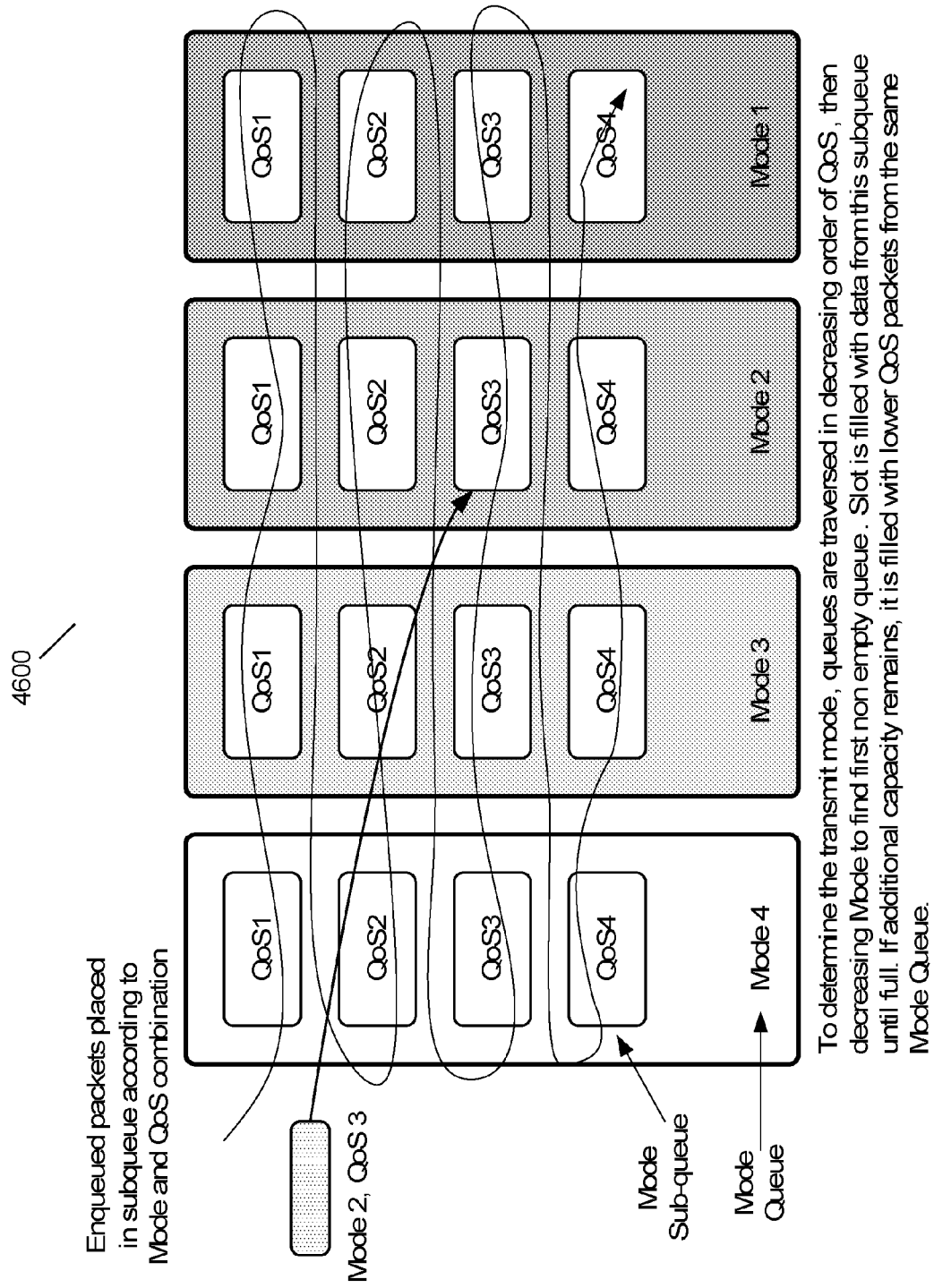
FIG. 46 depicts an embodiment of quality of service de-queuing order to maintain quality of service using strict priority de-queuing discipline.

In embodiments, MBRI may provide for QoS for differentiated levels of service. There are multiple ways in which QoS is provided for differentiated levels of service for different traffic priorities, such as priority queuing, priority channel access, priority routing, and the like. Priority queuing may utilize the data queues within each node to create a system of "passing lanes" that can be used to give the traffic that is generated by some applications an advantage over others. Data queues may be organized by transmitted waveform mode and QoS setting. Priority channel access may use traffic priority settings to adjust the channel access schedule to give prioritized channel access to nodes transmitting higher priority data. A priority routing method is to route data along different paths according to priority level. High priority data may be routed along the most direct path, while lower priority data may be routed over multiple hops to balance the load level across the network. Multiple levels of priority queuing for user data within each waveform mode queue may provide a range of differentiated service levels. Additionally, a dedicated queue at the highest priority level may be reserved for routing protocol messages. This may help to make sure that data is following a suitable route through the network. Data packets may be queued on the basis of priority settings in a header. Within each sub-queue (such as a combination of waveform mode and QoS level), data may be served in a FIFO (first in, first out) manner. High priority data may be transmitted before lower priority data 4500 as shown in FIG. 45. Data packets may be en-queued according to selected waveform mode for the link corresponding to the next hop and QoS setting in the header. When a transmission opportunity is approaching, data may be selected to be de-queued for transmission. De-queuing may be based on QoS setting first, then waveform mode 4600 as shown in FIG. 46 for an example of strict priority de-queuing.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and providing differentiated quality of service in the MBRI through prioritization. In embodiments, the prioritization may utilize priority queuing, priority channel access, priority routing, priority routing based on prioritization data in the header, and the like. In embodiments, prioritization may determine relative prioritization based on local node information, where the node information may be CPU load, battery level, queue depth, application data type, and the like. In embodiments, prioritization may utilize an exchange of metadata describing the node condition to indicate relative need for priority channel access.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of providing differentiated quality of service in the MBRI through prioritization. In embodiments, the prioritization may utilize priority queuing, priority channel access, priority routing, priority routing based on prioritization data in the header, and the like. In embodiments, prioritization may determine relative prioritization based on local node information, where the node information may be CPU load, battery level, queue depth, application data type, and the like. In embodiments, prioritization may utilize an exchange of metadata describing the node condition to indicate relative need for priority channel access.

In embodiments, MBRI may enable QoS based routing, providing mobile nodes capability to route MANET traffic based on QoS information to optimize traffic, CPU load, mobile node's battery power usage, and the like. The mobile node's network layer may broadcast router control information to the MANET domain. This route control information has several components to it, including link cost, route cost, power cost, CPU cost, configurable cost, adaptive data rate (ADR) information, and the like. This information may be added to a given MANET routing protocols and broadcasted. Receiving nodes may create different routes to the destination based on different criteria such as power, link cost, and the like. Once a MANET routing protocol converges with this additional information, all nodes would have different routing topologies based on these criteria, and then tagging the traffic to determine which criteria to use for routing the traffic. Host traffic may be tagged and assigned a set of QoS value based on programmable application awareness logic. This application awareness logic may essentially determine traffic requirements for a given data flow (e.g. VoIP call vs. mp3 download). Once traffic is tagged, relay nodes may use this information to route the traffic. Other examples of routing based on QoS may include relay nodes deciding to route based on power utilization (instead of link cost) to save battery power.

Figure 47:
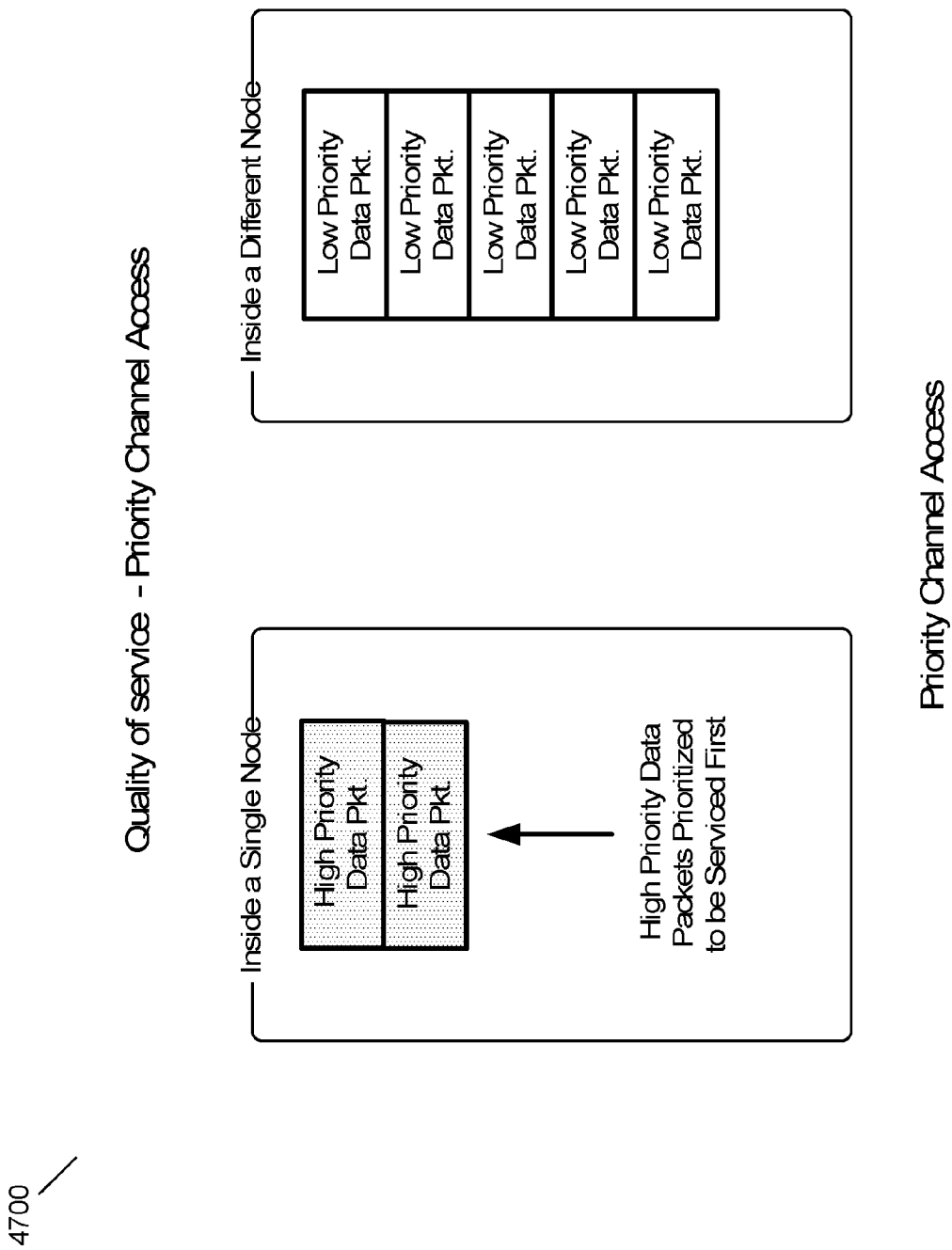
FIG. 47 depicts an embodiment of quality of service priority channel access.
Figure 48:
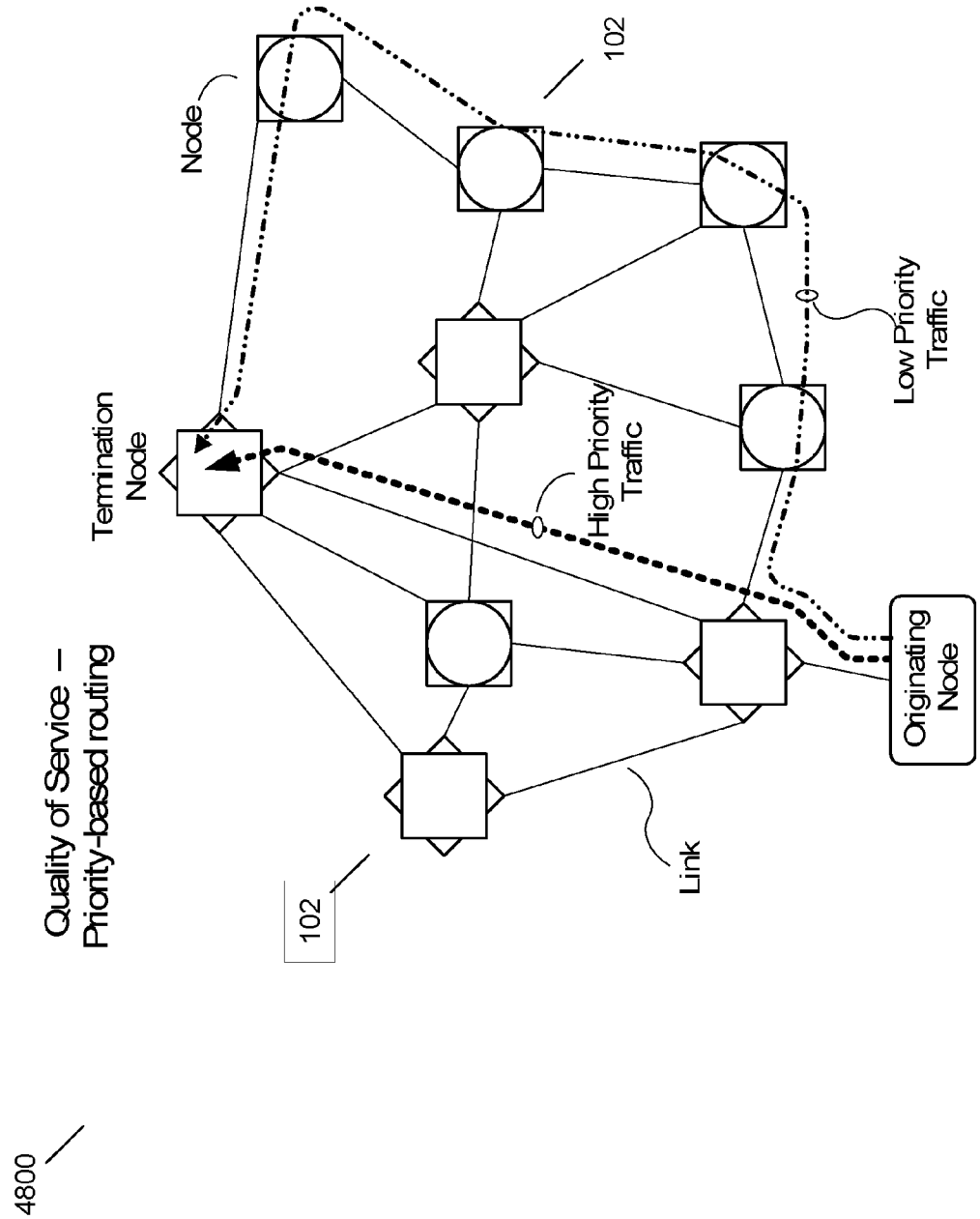
FIG. 48 depicts an embodiment of quality of service priority-based routing.
Figure 49:
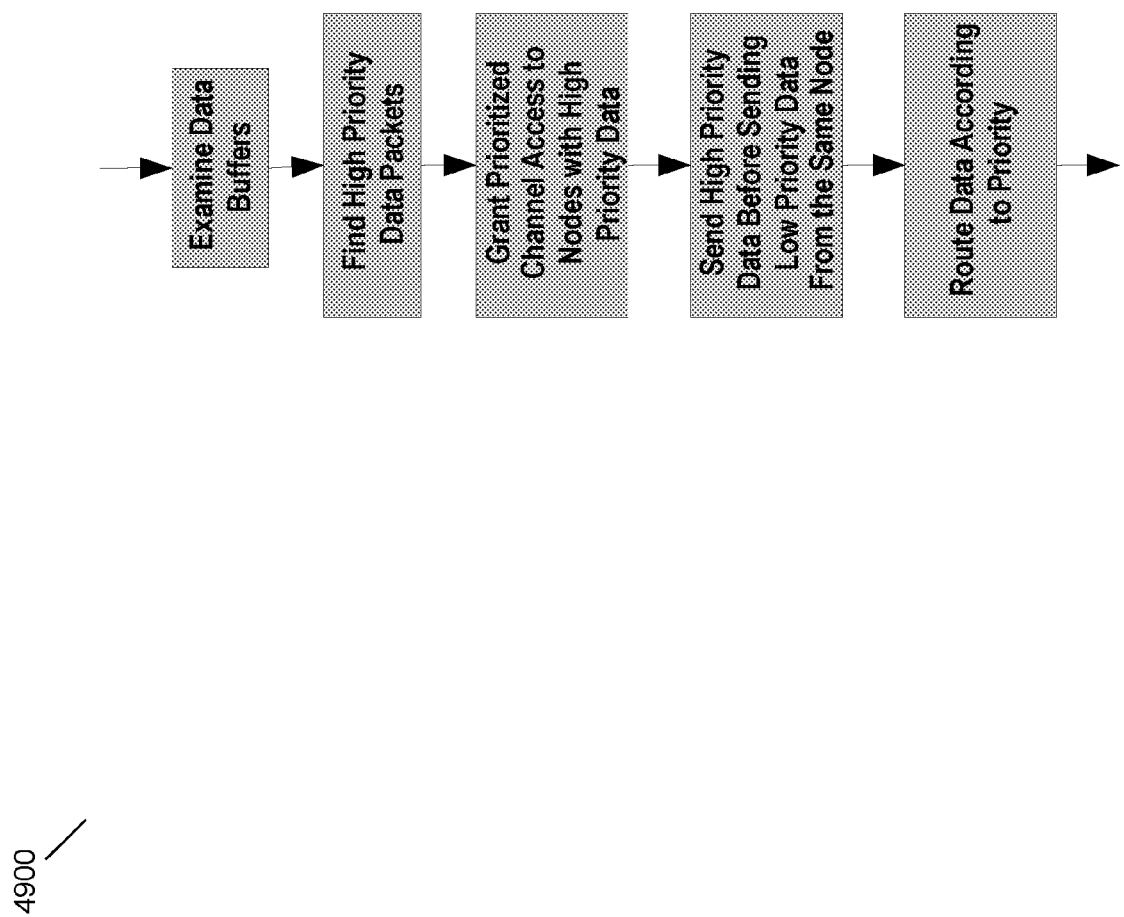
FIG. 49 depicts an embodiment of quality of service priority-based differentiated quality of service.

In embodiments, multiple queuing disciplines can be used, including strict priority, weighted round robin (WRR), and the like. Alternate methods of en-queuing and de-queuing, such as by next hop link instead of by mode may also be supported while maintaining the QoS sub-queues within each queue. The queue depths may be monitored to allow a node to indicate when it is experiencing congestion and needs more transmit slots to satisfy its offered load. The queue depths may be transformed into calculation of a "Node Weight" that is used to adjust transmit scheduling. The Channel Access module may be responsible for determining which node transmits during each time slot. When the node "wins" a time slot, it transmits. Channel access is partitioned into individual time slots. Without differentiated data priority levels, all nodes may have statistically equal opportunity to transmit during a given slot. When multiple levels of priority are enabled, a series of node weights corresponding to a combination of priority levels and data queue depth may be used to adjust the transmit schedule. This may allow nodes with higher node weights to win statistically more slots per second in order to meet their need for increased channel access and high priority transmission. FIG. 47 shows differing priority data inside the node queues inside two different nodes 4700. Differentiated routing may send data along different paths across the network topology according to data priority. High priority data may be sent along the quickest, most direct route over the network, while lower priority data may be sent along a path that balances the data traffic across the network topology. An example is of quality of service priority-based routing 4800 shown in FIG. 48. The multiple levels of providing QoS prioritization 4900 are shown below in FIG. 49. High priority data packets within a node may be transmitted before lower priority data packets. A node with high priority data packets may be granted preferred channel access over a node containing lower priority data. Multiple routes between source and destination may be set up to allow high priority data to take the quickest, most direct path, while lower priority data may take a longer path in order to balance network load across the topology.

In embodiments, route diversity facilities may include software and technology on subscriber devices that enable selection of routes among a plurality of diverse routes, optionally including routing packets across diverse routes to ensure a very high or specified level of QoS. For example, if a subscriber plan calls for a particular level of quality of service, IP traffic packets to and from that subscriber device may be routed redundantly across various routes, ensuring that if there is failure of one route, packets can nevertheless be assembled for the intended traffic. Coupled with the other capabilities described herein (adaptive transmit power control and data rate based on channel conditions, for example), route diversity may allow a service provider to ensure high (or desired level) of quality of service; thus, a service provider may warrant service levels, guaranteeing the delivery of service to a pre-committed service level in an entirely mobile network (such service level commitments being impractical in conventional cellular networks, where quality of service is highly dependent on density and traffic of mobile devices in proximity to a given base station). Route diversity may also include capabilities for SAR, such as using error correction techniques associated with packet segmentation and reassembly in the fixed Internet or other IP-based networks. In embodiments the MBRI, by having true IP-based routing, may allow independence from a pre-set route list and therefore independence of the need to retrieve a route list from a server or fixed infrastructure component, thereby simplifying routing as compared to conventional mobile networks. Neighbor discovery and awareness facilities may include software and components for identifying nearby MBRI-enabled subscriber devices and automatically establishing links with the other devices.

In embodiments, methods and systems may include facilities for registration of users, such as using DHCP for registration, optionally including registration independent of the need for HLR or VLR as required in mobile cellular networks. Management facilities may include management independent of cellular back office, such as for billing for data, authentication, provisioning, switching, and the like. In embodiments, a management path may be established for managing back office functions, distinct from the traffic path used to pass various types of traffic among subscriber devices.

The management path may be implemented in various configurations, depending on the desires of the service provider or network operator. For example, a real-time continuous management path may be provided, in which the activities of individual subscriber devices are tracked, recorded, and managed at all times, including facilities for tracking the load of traffic handled to and/or from a subscriber device, the type of traffic, and even the content of the traffic (subject to regulatory and other privacy constraints). The real time management path may be provided as an IP-based management path, using all of the IP-routing capabilities described herein, and the management path may allow a service provider to interact with applications on the subscriber device, such as to deploy applications to a subscriber devices, enable or disable applications or capabilities on the subscriber devices (such as to allow higher performance capabilities, to alter service plans, or the like), to monitor traffic for purposes of administering service plans, and many other functions. Any of those activities may alternatively be provided in a batch-mode management path, with subscriber devices provided with applications for recording their activities and periodically reporting activity levels, traffic types and the like to a service provider or network operator. In another alternative embodiment, a subscriber-administered management path may be provided, in which a subscriber (such as an enterprise, educational institution, government entity, organization, or even a family or individual) may operate and manage subscriber devices without intervention of a conventional network operator. For example, a company could manage devices in a company headquarters, deploying applications, enabling or disabling capabilities, or the like, without the need to monitor traffic or usage, because the network bandwidth is provided entirely by the combination of the local swarm of IP-enabled subscriber devices and the enterprises' own local area network.

Figure 50:
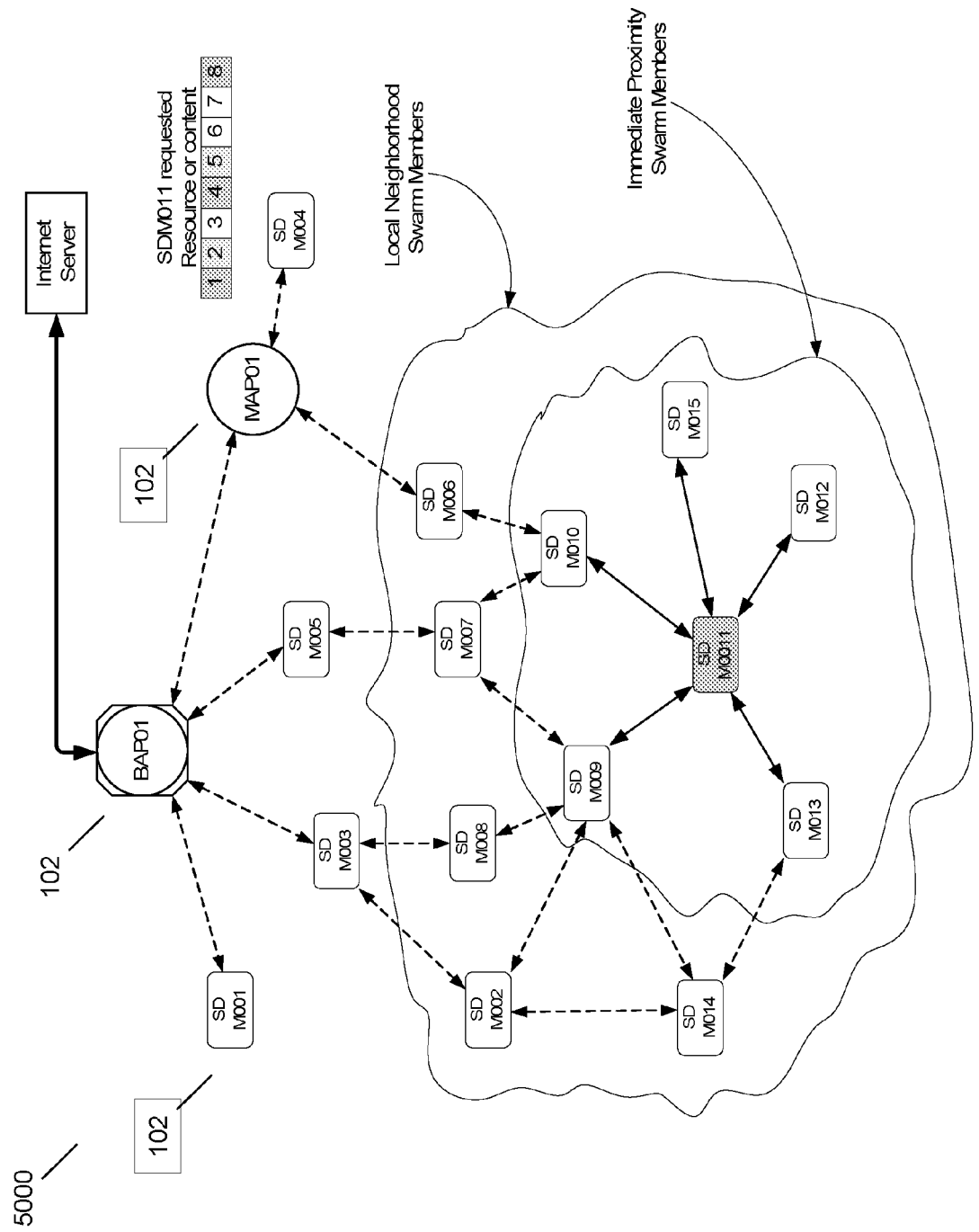
FIG. 50 depicts an embodiment of local IP-based swarming.

The existence of a subscriber-only management path may support, among other things, establishment of an entirely local IP-enabled network (a local Internet), consisting of a swarm of mobile devices in geographic proximity to each other, optionally extended or supported by local fixed assets such as local area networks. Such a network may allow internal traffic that is highly secure as compared to Internet or cellular traffic, in which traffic and content are transmitted, and often stored, on servers owned and operated by unknown entities distributed around the world. Such a local or geographically focused network swarm may also be provided by a service provider or network operator, using a more conventional management path, still offering an increased degree of security by virtue of its being optionally segregated from the Internet or cellular networks. A locally focused mobile swarm may also enable various value-added applications and capabilities, such as applications relating to local commerce, local news and entertainment content, local government, local public safety, local traffic, local weather, local operation of an enterprise, interpersonal communication with local friends, family and neighbors, and many others. The local swarm can enable an entire class of applications that can use very high bandwidth (e.g., at broadband video rates), that can be offered at low cost (due to low demands on network infrastructure for reasons described herein), that are highly secure (due to diminished use of unsecured network servers), and that are geographically aware (using geo-location facilities described herein). FIG. 50 provides an embodiment of local IP-based swarming 5000, where content may be distributed within an immediate proximity swarm before requesting for external sources of the same.

In embodiments, methods and systems disclosed herein may allow effective equivalency between the MBRI core stack and the fixed Internet OSI stack. Thus, applications designed for the fixed Internet may be deployed on the MBRI, and vice versa, without requiring intervention, such as of a carrier or service provider. The MBRI core stack allows two different networked devices to communicate with each other regardless of the underlying architecture. In addition, the MBRI core stack provides a basis for understanding and designing a network architecture that is flexible, robust, and interoperable. The overall MBRI model consists of seven layers, the three layers of the MBRI stack, including the physical layer (layer 1), the MAC layer (layer 2), and the router layer (layer 3), and the four higher layers of the fixed Internet OSI stack, including a transport layer (layer 4), a session layer (layer 5), a presentation layer (layer 6), and an application layer (layer 7). A sending or receiving device may implement one or more of the seven layers of the model. In embodiments, device A may be networked with device B through a transmission channel. The transmission channel may include one or more intermediate nodes between the connected devices A and B. In embodiments, the intermediate nodes may implement at least three layers of the model: the physical layer, the MAC layer, and the routing layer. In embodiments, the intermediate nodes connecting two devices A and B may process, transform, and modify the received data before retransmitting. In another embodiment, the intermediate node may retransmit the data between devices A and B without any modification or transformation. For example, the functionality of each of the layers may be pruned to meet specific requirements without deviating from the scope of the invention. In embodiments, all functions specific to a particular layer may be implemented in software and/or hardware without deviating from the scope of the invention.

Figure 51:
FIG. 51 depicts an embodiment of the MBRI layered stack.

FIG. 51 provides a breakout of the MBRI core stack 5100, including the routing layer, the MAC layer, and the physical layer. As shown in this embodiment, the MBRI routing layer may include the sub-layers IPv4/RFC 791, BGP4/RFC 4271, SLSR (scoped link state routing) and ROM (receiver oriented multicast). The MBRI MAC layer may include the sub-layers for encapsulation/RFC's 894/1042, MAC 802.3, ARP/RFC 826, DHCP, NDM (neighbor discovery management), ADR (adaptive data rate), and NAMA channel access. The MBRI physical layer may provide for the sub-layers SAR, LANTA network timing, and configurable waveform slot by slot; PLCP being replaced by the equivalent OFDMA waveform modes; and waveform discovery being replaced by OFDMA. In embodiments, the MBRI set of layers may provide a core stack that enables MBRI to facilitate the behavior and functionality of the fixed Internet in a MANET environment.

In embodiments, the physical layer may be associated with transmission of a bit stream over a channel. The physical layer may define the physical characteristics of the interface between a sending device and the transmission media. For example, the physical layer may delineate the characteristics of the interface between a receiving device and the transmission media. The MBRI may support segmentation and reassembly (SAR) of packets into physical timeslots in the physical payload, such as over the air payload, and therefore may be unique to MANET systems. In embodiments, most SAR functions in the stack may take place at the packet/MAC boundary. SAR may improve data delivery efficiency and allow packet lengths greater than single slot capacity. With respect to transmission, SAR may segment layer 2 datagrams (essentially IP packets with an additional datalink header) to efficiently fit available payload capacity of a single time slot transmission. This may improve slot packing efficiency, where some of the SDUs may be segmented into fragments. The fully formed data link PDU may be sent to the physical layer controller for forwarding to the modem. With respect to interfaces, the physical layer controller may send fully formed slot payload ready for transmission and waveform mode definition, and data queues may pull data from a specified queue for segmentation. SAR may reassemble individual segments to form the original layer 2 datagrams at the receiver node. The reassembly module may receive SAR SDUs (fragments) and reassemble them into data SDUs. The fragments may then be buffered and ordered according to SAR sequence numbers. When all the fragments that correspond to a data SDU are buffered, then the complete SDU may be sent to the L2 Forwarding switch to determine its next destination. When the reassembly process is started for any SDU, a configurable timer may be set. If this timer expires before reassembly is complete, then the reassembly process may be aborted in order to prevent the reassembly process from "hanging" when fragments are dropped or delayed. Un-segmented data and control SDUs may be passed directly through to the L2 Forwarding Switch. In embodiments, the SAR process may execute in a variety of ways, such as independently for each link in a multi-hop path through the wireless MANET, on the end-to-end route over the wireless portion of the network, and the like. In embodiments, there may be an SAR L2 Forwarding Switch that sends assembled data SDUs for further processing; a data link PDU De-capsulation that receives SAR SDUs, Data SDUs, and Control SDUs once data link PDU is broken into its constituent parts; a physical controller that receives demodulated data fragments for reassembly into original SDUs, and then IP packets; and the like.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and dividing application data into smaller fragments for transmission over the MBRI, including a timer to eliminate partial fragments when one of the fragments is lost or delayed beyond a tolerable amount.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of dividing application data into smaller fragments for transmission over the MBRI, including a timer to eliminate partial fragments when one of the fragments is lost or delayed beyond a tolerable amount.

The MBRI physical layer may provide for a local area node tracking algorithm (LANTA), a local node based timing algorithm that relies on distributed data across the MANET to derive actual network time (as opposed to a centralized time source for the standard Internet). In the MBRI MANET system, the system clocking may be a bit more complex than many systems in that the node must establish a network clock reference from the data received from other nodes. The local node may derive its clock offsets from its neighbors. Each node may estimate on receive the time offset and updates this estimate relative to the local clock on all observable links. Each node on transmit may send information to the receiver(s) its accumulated time shift since the last transmission so that this change since the last transmission can be subtracted from the local estimate at each receiver node. If a node has observed a packet from the AP, this node may reset its local reference to match the AP for network time and this change may get reflected in the next transmission to the other neighbor nodes. In embodiments, LANTA may interface with the other blocks in the physical modem to extract the time information from the received slots.

The MBRI physical layer may provide for a configurable waveform slot by slot, where each slot of every frame may be modulated independently of other slots in the frame depending upon the node destination and link characteristics for the end node. The modem at the receiver may detect the signal, demodulates a few bits of self-discovery data indicating which waveform mode was transmitted, and then demodulate the data payload sent during that time slot. To enable adaptive data rate (ADR) link adjustment across the MANET, the receiver may need to be able to decode and demodulate the transmitted data without knowing in advance which waveform mode was used to encode the data. Self-discovery bits may be encoded in every waveform burst so that once the signal is detected, these bits may be decoded to identify the signal processing needed to demodulate the transmitted waveform mode. This may occur independently on a slot by slot basis, and may be enabled by the independent slot configurability. In embodiments, this process may interface with the MAC's physical controller to essentially receive "slot commands" indicating whether to transmit or receive and the associated frequency and bandwidth and waveform mode (on transmit).

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; using a waveform definition in association with the MBRI physical layer, wherein each piece of configuration information is defined independently on pairs of consecutive slots such that there is complete independence; and specifying the waveform parameters in a manner that allows implementation of an adaptive modulation capability. In embodiments, the implementation of the adaptive modulation capability may be provided by varying occupied bandwidth, by varying modulation technique, by varying error-correcting code rate, and the like. In embodiments, a portion of the configuration information may be embedded in a physical layer header to enable autonomous self-detection of waveform features at a receiver.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; the network capable of using a waveform definition in association with the MBRI physical layer, wherein each piece of configuration information is defined independently on pairs of consecutive slots such that there is complete independence; and the network capable of specifying the waveform parameters in a manner that allows implementation of an adaptive modulation capability. In embodiments, the implementation of the adaptive modulation capability may be provided by varying occupied bandwidth, by varying modulation technique, by varying error-correcting code rate, and the like. In embodiments, a portion of the configuration information may be embedded in a physical layer header to enable autonomous self-detection of waveform features at a receiver.

The MBRI physical layer may provide for OFDMA/OFDMA waveform modes, where a family of waveform modes may be implemented to provide an adaptive modulation capability that balances waveform capacity and demodulation robustness. Each waveform mode may be parameterized by a combination of parameters, such as occupied bandwidth, error-correcting code rate, modulation technique, and the like. In embodiments, the choice of these parameters may represent a trade-off between slot payload carrying capacity (i.e., data rate) and demodulation performance. In embodiments, the MBRI physical layer may provide OFDMA, OFDM, FDM, TDM, CDM, waveform modes, and the like.

In embodiments, the physical layer may be associated with the MAC layer, where the MAC layer is provided to help impede the condition of collision of data (packets). The MBRI MAC layer may provide a high quality peer to peer packet transmission/reception protocol for passing frames between nodes and for distinguishing between peer to peer, peer to network, and network to peer traffic. The MAC layer may also manage the radio resources of a single node and control sub-network layer convergence functions such as segmentation and reassembly, QoS, throughput fairness, adaptive data rate control and transmit power control. The MBRI MAC layer may utilize encapsulation/RFCs 894/1042, where channel access and segmentation, and transmission may be used to determine which packets to transmit over the air and how to break them up for over the air transmission. In embodiments, the standards may only be relevant at a nodal boundary between L3 and L2 and controlled by MTU size constraints at the layer boundary. A downward path (from L3) module may receive payload messages (packets) from the routing layer with a MANET Header already attached to them. This header may tell the data link about source, destination, and next hop route information as well as IP protocol type (e.g. TCP/UDP/ICMP), and the assigned QoS parameter for queue selection. An additional layer of forward error correction (FEC) may be applied to long IP packets (such as >1000 bytes) replacing the native cyclic redundancy check (CRC) in IP to provide improved performance over the wireless interface. This module may also be responsible for mapping the information in the MANET header into appropriate transmission modes and queues. There may be an upward path (to L3) module, which may remove the MANET Header and pass the packet to layer three. If the MANET Header indicates that the received SDU is a Control SDU received from the corresponding data link process in another node, the data link Control Message may be sent to the Neighbor Management and ADR module for interpretation. In addition, any FEC applied at the IP layer may be removed. There may be a number of interfaces, such as the L2/L3 API that may send and receive payload messages (packets) to/from the router layer with a MANET header already attached to them; an L2 Forwarding Switch that may receive data that is not eligible for L2 Forwarding, including payload data headed for L3; Data Queues that may en-queue the packets onto the message queues for transmission on the air interface based on the QoS level in the MANET Header and the ADR Mode on the link to the next hop; Queue Management that may provide the translation between next hop and proper mode queue; Neighbor Management and ADR that may forward data link control messages received from other nodes to the neighbor management and ADR module; and the like. Similarly, de-capsulation may be the reverse process of stripping off headers to recover the original IP packet after traversing the wireless network.

The MBRI MAC layer may utilize MAC 802.3, a standard function meaning that MBRI obeys the rules for MAC transport. That is, MBRI uses MTU sizes and buffering akin to the MAC standard. In embodiment, some MBRI functions may be different, for example, an MBRI state machines not retransmitting lost frames. MBRI may also utilize other standard stack functionality, such as ARP/RFC 826, DHCP, and the like.

The MBRI MAC layer may utilize neighbor discovery and management (NDM) protocol to develop and maintain a list of nearby nodes called "neighbors". NDM may discover and maintain the neighbor information and makes this information available for other processes (e.g., Channel Access, Routing, etc.) to make their decisions based on this information. Nodes are considered one-hop neighbors if they can communicate directly over the wireless link. Nodes are considered two-hop neighbors if they communicate over two hops across the wireless topology using exactly one relay node. The collection of one-hop neighbors may be called the "one-hop neighborhood", while the collection of all one-hop and two-hop nodes combined may be called the "two-hop neighborhood". In a distributed network topology, each node may have its own unique two-hop neighborhood. The two-hop neighborhoods of two nearby nodes may be often partially overlapping. Nodes may discover each other's presence and maintain timely knowledge of their link status by exchanging data link control messages (DCMs). DCMs may be sent using a pre-defined waveform mode (typically the most robust mode available) in order to form a richly connected neighborhood topology. The neighbor management portion of this module may be responsible for interpreting the received DCMs to form and update a neighbor table containing this link-state information. Conceptually, the neighbor table may contain a row of entries corresponding to each neighbor. A neighbor node may be added to the neighbor table when this module receives a DCM from the neighbor. A link quality measure may also be maintained for each neighbor, where the link quality may be incremented upon successful data reception from a node and decremented when the node was expecting a transmission from the neighbor but did not successfully receive one. In addition, nodes may be deleted when their DCMs are not received for some period of time, such as they are 'aged out' as their link quality measure drops to zero. A collection of network entry and formation protocols may control network formation, where a "network" in this context may be a collection of nodes that have discovered each other. Upon boot-up, a node may enter a listen-only mode for a short period of time to obtain time synchronization and begin forming its neighbor table. After some configurable period of time, the node may broadcast its DCM containing its one-hop neighbor table information. Other nodes receiving this information may add this node to their own neighbor tables. This updated information may then be reflected in the neighbor nodes' subsequent DCM transmissions received by the node entering the network. Once link quality measures reach a certain level, a "link" may be declared and the router notified, thus allowing the node to begin sending payload data over the network. In embodiments, there may be associated interfaces, such as Packet En(De)capsulation that may receive data link Control Message transmitted by a neighbor node; L2/L3 Link Manager Helper that may send an indication of neighbor link state change to notify router; Neighbor Table that may read Neighbor Table information and write Neighbor Table updates; Queue Management that receives an indication of queue depths by QoS level for determination of Node Weight for inclusion in transmitted DCMs; and the like. In embodiments, additional types of DCMs may be defined and used to disseminate relevant neighbor control information such as time of day, router domains, time accuracy, link costs, and the like.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; exchanging data-link control messages between a first node and a plurality of other nodes; developing and maintaining a one-hop list of nodes, from amongst the plurality of other nodes, within direct communication range of the first node; developing and maintaining a two-hop list of nodes, from amongst the plurality of other nodes, within direct communication range of the first node; and making decisions based on the information in at least one of the one-hop list and two-hop list. In embodiments, the first node may dynamically drop communications with nodes when they are no longer within direct range. In embodiments, the list may include metadata about the nodes in the list, information may be made available for other processes, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; the network capable of exchanging data-link control messages between a first node and a plurality of other nodes; the network capable of developing and maintaining a one-hop list of nodes, from amongst the plurality of other nodes, within direct communication range of the first node; the network capable of developing and maintaining a two-hop list of nodes, from amongst the plurality of other nodes, within direct communication range of the first node; and the network capable of making decisions based on the information in at least one of the one-hop list and two-hop list. In embodiments, the first node may dynamically drop communications with nodes when they are no longer within direct range. In embodiments, the list may include metadata about the nodes in the list, information may be made available for other processes, and the like.

The MBRI MAC layer may utilize adaptive data rate (ADR), a link by link matching of over the air capacity to the supportable capacity of the link according to RF conditions. This function may not be needed in the Internet, since the underlying media does not change in capacity characteristics, unlike the spectrum between two nodes on a packet by packet basis. In ADR, once neighbors are discovered and links established may be made by using the lowest (lowest capacity, most robust) waveform mode. An ADR adjustment algorithm may be applied to increase the data rate on the link to the maximum rate that can be reliably sustained (i.e., low slot error rate) based on link conditions. The system may be able to adjust link data rate to maintain adequate demodulation performance in the presence of changing link conditions. When link conditions degrade below a certain threshold, the ADR algorithm may be able to rapidly decrease the link rate to a reliable mode to reduce the amount of data that is lost. When link conditions support higher data rates, the ADR algorithm may increase the link data rate to increase payload delivered by each slot. Otherwise, more slots may be needed to deliver the same amount of data, reducing the overall capacity carried by the network. The multiple possible combinations of waveform parameters may be organized into a one-dimensional ordered list of monotonically increasing data rate with correspondingly decreasing signal robustness. The ADR algorithm may "walk up and down" the list dynamically as a function of observed link performance. A combination of measurements characterizing link performance may be available. For each received time slot, the modem may return estimates of received signal strength (RSSI), Eb/No (SNR), and pre-FEC bit-error rate (BER) along with the slot payload data, transmitting node ID, and transmitted waveform mode. The data link control message may include the number of slots transmitted during each time period, such as 1 second intervals, for each waveform mode, allowing the receiving node to calculate the slot error rate for each waveform mode. These link observation statistics may be grouped by transmitting node and mode to adjust the receiving node's suggested waveform mode for each link. In embodiments, there may be associated interfaces, such as data link PDU de-capsulation that receives slot counts by neighbor node and ADR mode, neighbor table that reads neighbor table information and writes neighbor table updates, and the like.

The MBRI MAC layer may utilize queue serving, inbuilt ToS and QoS prioritization at a MAC Layer. This function may not be needed in the Internet, as they may not be resolved at the edge boundary because of MPLS types of algorithms, such as because the media is constant in its QoS. The queue management module may determine queue selection when packets are en-queued and de-queued and monitors queue utilization. Data packets may be en-queued according to ADR mode of the next hop and QoS setting in the MANET header. This module may forward the current link waveform mode from the neighbor table to the packet en(De)capsulation module to allow the data to be placed in the proper queue. When a transmit slot is approaching, data may be selected to be de-queued for transmission. De-queuing may be based on QoS setting first, then waveform. Multiple queuing disciplines may be supported, including strict priority and weighted round robin (WRR). Mode-based queuing may be used since the NAMA channel access protocol may schedule node transmissions without specifying the destination. In this way, a transmitting node may send data to multiple neighbors using the same time slot. Queuing by waveform mode may allow the network to select the most efficient link rate that has data to send. The queue depths may be monitored to allow a node to indicate when it is experiencing congestion and needs more transmit slots to satisfy its offered load. The queue depths may be transformed into calculation of a "Node Weight" that may be used to adjust transmit scheduling in the two-hop neighborhood. In embodiments, there may be associated interfaces, such as packet en(de)capsulation that may send translation between next hop and waveform mode; data queues that may observe queue depths by mode and QoS level; Neighbor Management and ADR that may send node weight; neighbor table that may pull a waveform mode by one-hop neighbor; segmentation and transmission that may send de-queue selection; and the like.

The MBRI MAC layer may utilize node activated multiple access (NAMA) channel access, a protocol for the MBRI MAC layer that manages the slotted TDMA architecture that is the base control and data protocol between MANET nodes. The standard Internet has a very simple layer 2 state machine that relies on CSMA/CD or CSMA/CA at the physical layer to effect processing at the MAC level. However in an MBRI MANET there may be a need for a more feature rich MAC to take into account the variability and lack of uniform media quality at the physical layer (i.e. there may be a need to take into account the spectrum quality between nodes at any instant in time. In embodiments, NAMA may be the MBRI control and data protocol. The schedules for control slots and data slots may be computed in a statistically fair random manner based on two-hop neighborhood and time. The NAMA protocol may define the schedule. NAMA may run in a distributed fashion across the MANET topology to establish a coordinated collision-free schedule that manages the partially overlapping two-hop neighborhoods. Rather than compute the schedule explicitly like a WiMax base station would, each node may use a consistent data set (e.g., the two-hop neighborhood node ID, node weight, and time slot ID) to perform identical computations using a hashing function. The hash function may compute a "node priority" to each node for the time slot. The node with the highest priority in the two-hop neighborhood may then be elected the transmitter for that slot. In embodiments, all other nodes may be commanded to receive during that slot. A subset of the time slots may be designated as control slots, and a subset of the time slots may be designated as data slots. Nodes may use NAMA to compute the control slot schedule. In NAMA, all nodes may have statistically equal opportunity to win the slot for transmission. When the slot is won, the node may transmit its DCM and fill the remainder of the slot with payload data, space permitting. Control slots may be transmitted using the lowest (most robust) waveform mode so that all nodes (including nodes that are not yet neighbors) may have the opportunity to successfully receive the DCM and update their neighbor table. Each node may maintain a counter of the number of slots since its last transmitted a DCM. When this counter exceeds a configured value, the next slot a node wins for transmission may be treated as a control slot where a DCM may broadcast using the lowest waveform mode. The counter may then be reset. Data slots may be scheduled using "weighted NAMA" to compute the schedule. With weighted NAMA, the data slots may be divided into different weight levels for the purposes of scheduling. Only nodes with node weights meeting or exceeding the weight level of the slot may participate in the schedule computation for that slot. This may allow nodes with higher node weights to win more slots per second in order to meet their need for increased channel access. In embodiments, there may be associated interfaces, such as a neighbor table that may pull a list of nodes and node weights in two-hop neighborhood, segmentation and transmission that may send an indication of upcoming transmit slot command, a physical controller that may send an indication of transmit or receive slot command to some number of slots in advance (e.g., two slots).

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; computing a TDMA schedule in a distributed manner in a plurality of nodes that avoids collisions between transmissions and provides statistically fair channel access; providing a capability to reallocate channel access to a subset of the plurality of nodes within the network topology; and commanding a modem to communicate according to the computed schedule. In embodiments, the reallocation may be a shift of channel access, the reallocation may be a weighting of channel access, the communication may be transmitting, the communication may be receiving, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; the network capable of computing a TDMA schedule in a distributed manner in a plurality of nodes that avoids collisions between transmissions and provides statistically fair channel access; the network capable of providing a capability to reallocate channel access to a subset of the plurality of nodes within the network topology; and the network capable of commanding a modem to communicate according to the computed schedule. In embodiments, the reallocation may be a shift of channel access, the reallocation may be a weighting of channel access, the communication may be transmitting, the communication may be receiving, and the like.

The MBRI MAC layer may utilize layer 2 forwarding (L2F), which may be responsible for packet forwarding per L2F table rules. If the received L2 SDU matches the rules in the L2F table, this module may send that packet to the next hop after modifying the PCOG MANET Header with next hop and TTL information. If instructed by the L2F table or no matches are found in the L2F table, this module may pass that packet towards the routing layer. In embodiments, there may be associated interfaces, such as an L2F table that may read table data to determine next hop for the packets received from reassembly module, data queues that may en-queues the messages to the message queues for transmission on the air interface after modifying the MANET Header to reflect the new next hop and TTL information, packet en(de)capsulation that may send a packet when a L2F table rule instructs this or no entry is found, reassembly that receives packet data after completion of the SAR process, and the like.

The MBRI MAC layer may utilize layer 2/layer 3 link manager helper, a module that may convert one-hop link costs computed by ADR into L3 metrics and sends them to the Link Interface Manager in the routing layer. ADR link costs may be computed based on a combination of the waveform mode for the link, the size of the two-hop neighborhood, and the node weight distribution in the two-hop neighborhood. The L3 metrics may have a courser granularity (such as four or five different values) than the L2 costs, and they may not change as frequently in order to reduce downstream computation and overhead transmission impacts on SLSR. L2 metrics may reflect radio "reality" on a short-term basis, while L3 metrics may represent a more stable, coarser representation of link capacity to prevent excess routing protocol traffic. In embodiments, there may be associated interfaces, such as neighbor management and ADR that may receive an indication of major state change in neighbor table, a neighbor table that may pull one-hop Neighbor Table information, a layer 2/layer 3 API that may send smoothed L3 link costs through API to router layer, and the like.

In embodiments, the MAC layer may be associated with the routing layer. In embodiments, the routing layer may enable logical addressing and routing. Logical addressing is a mechanism of adding an address for identifying the source and the destination when these are on different networks. The routing layer may provide for full transparency with the Internet through a border gateway protocol edge router, and make transparent all TCP/IP and UDP functions at the routing level via OSPF, open shortest path first protocol, an interior protocol for link state management, within a regional network. The router may also be responsible for application awareness, multicast and unicast operations, multicast OSPF, IPv4 and IPv6 transparency, and the like. The MBRI routing layer may utilize standard routing functionality, such as IPV4/RFC 791, BGP4/RFC 4271, and the like. The MBRI routing layer may utilize scoped link state routing (SLSR) algorithms that may scope the amount of nodes and links evaluated for transport. In embodiments, the nearer the packet is to the end destination the more the routes may be pruned. The pruning may take into account link measures, which is not the case for standard Internet routing. That is, MBRI may map routes to the Internet routing only after evaluating and processing the availability within the MANET. The SLSR algorithm may be a unicast routing protocol used to determine routes within the wireless MANET portion of the network. The concept of multilevel "scoping" may be used to reduce routing update overhead in large networks. Each node may broadcast multiple types of SLSR control messages to provide link state updates, such as an intra-scope message, an inter-scope message, and the like. A maximum hop count or 'scope' may be specified over which routing protocol messages are exchanged. Multiple scope tiers may be maintained with different message exchange rates, where the most frequent, shortest distance messages may be called intra-scope messages, and less frequent, longer distance messages may be called inter-scope messages. These messages may be broadcast periodically with differing frequencies. In embodiments, a nominal update rate may be five seconds for intra-scope, and fifteen seconds for inter-scope. From state updates, nodes may construct the topology map of the entire network and compute efficient routes. SLSR may propagate link state updates as aggregates instead of flooding individually from each source. The result is that the route on which the packet travels may become progressively more accurate as the packet approaches its destination. As the network size grows large, multiple scopes with progressively increasing ranges (and decreasing update rates) may be used to keep routing overhead low. Since one-hop neighbor link state information is maintained by the data link, the "hello" packets typically sent by routers to establish one-hop neighbors may be suppressed to reduce routing overhead. Instead, the layer 2 link manager helper in the data link may forward this information to the link interface manager in layer 3. The link interface manager may continually forward this one-hop information to the SLSR process. In embodiments, SLSR may forward its MANET route information to the route table manager.

Finally, the MBRI routing layer may utilize receive oriented multicasting (ROM), a wireless routing protocol that may be optimized for determining the "spanning nodes" of a multicast tree prior to packet forwarding of a data stream that may require multicast where the tree can be updated on a packet by packet transmission. ROM may be the functional equivalent of SLSR for multicast routing, and in embodiments, ROM may have similar interfaces as SLSR. In embodiments, the MBRI stack may allow effective equivalency with the fixed Internet OSI stack. Thus, applications designed for the fixed Internet may be deployed on the MBRI, and vice versa, without requiring intervention, such as of a carrier or service provider. In addition, the MBRI stack may provide greater capabilities to a user of an MBRI enabled subscriber device, through the mobile environment that MBRI enables. In embodiments, methods and systems may include openness to a wide range of applications, including capability, for example, to download an Internet application directly on the subscriber device. Methods and systems may also include facilities for geo-location, thereby enabling location with respect to a global position, including location of a mobile device within a swarm of mobile devices.

In embodiments, in contrast to conventional wireless and fixed wired access networks, methods and systems may be provided for a mobile broadband internet network solution where every subscriber device and infrastructure node has routing capabilities to allow for intelligent routing decisions enabling intra-network peer to peer communications. Traffic between nodes of the MBRI may not need to leave the mobile ad-hoc network for routing or switching purposes. Instead, because MBRI may be routing enabled, local traffic including required signaling may stay within the MBRI. In addition, because of its unique neighbor discovery management and Adaptive Data Rate and Power Management Capabilities the MBRI enables local intelligence to be shared across its member nodes leading to the creation and deployment of new classes of services and applications. Further, because of its mobile ad-hoc network characteristic the MBRI is independent of fixed traffic aggregation points such as base stations or cell towers, and instead can leverage multiple backhaul access points in a load leveling and self-healing manner. Because of the mobile ad-hoc network waveform characteristics and the mobile ad-hoc network architectural flexibility to deploy additional Backhaul Access Points or to upgrade existing mobile ad-hoc network access points with backhaul capability the MBRI assures broadband bandwidth to the individual SD/MAP nodes in excess of conventional 3G/4G networks. If combined with dynamic spectrum access technology the MBRI can coexist within existing defined spectrum with associated active network operations.

In embodiments, there may be distinct MBRI variants, having various sub-sets or supersets of the capabilities disclosed herein. For example, a basic MBRI may contain the mobile ad-hoc network protocol stack that brings Internet access and routing capability to the Subscriber Device (SD). Various enhanced versions of MBRI may include one or more of the enhancements described herein, such as individual selected media transport enhancements conceived to improve multimedia transport of the MBRI network. A more comprehensive, commercial grade MBRI may collect a plurality (or even all) of the enhancements, offering the full extent of benefits described herein. For example, a comprehensive MBRI may include a basic MBRI coupled with the cumulative conceived transport enhancements targeted at high quality service for multimedia, multi-session applications. A version of the MBRI using dynamic spectrum awareness may allow for management of traffic based on channel conditions, including enhancements to the mobile ad-hoc network protocol stack that allow for spectrum co-sharing between non-cooperative spectrum users or dissimilar spectrum technologies, and coordination between cooperative systems.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; providing enhanced support for simultaneous transport of various multimedia, multi-session applications; using dynamic spectrum awareness to manage traffic based on channel conditions; enabling co-sharing between non-cooperative spectrum users; and coordinating between cooperative systems.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; the network capable of providing enhanced support for simultaneous transport of various multimedia, multi-session applications; the network capable of using dynamic spectrum awareness to manage traffic based on channel conditions; the network capable of enabling co-sharing between non-cooperative spectrum users; and the network capable of coordinating between cooperative systems.

In embodiments, an MBRI may include ad-hoc network creation and self forming capabilities, self healing capabilities, and load leveling capabilities. An MBRI may be packet size indifferent, that is, it need not be constrained to particular packet sizes or types. The MBRI may use various routing capabilities, such as unicast and/or multicast routing, routing enabled and peer-to-peer communication and the like. The MBRI, as noted above, may be Internet protocol plug compatible, allowing it to seamlessly integrate with fixed IP-routing networks. Subscriber devices in the MBRI may be neighbor aware. In embodiments subscriber devices may include geo-location capabilities. Geo location capabilities may include conventional facilities, such as GPS facilities located in subscriber devices. Geo location capabilities may also include enhanced geo location, such as locating a particular subscriber device within a swarm (such as based on the number of hops required to reach the device within the swarm from other subscriber devices of known location, based on the power levels received from a subscriber device by other nearby subscriber devices of known location, based on time-based techniques, or the like). By locating devices within a swarm, local, swarm-based applications may use the location of a subscriber device, such as for the various locally focused applications described above. For example, a commercial offer can be made to a subscriber device if the subscriber appears to be near a merchant, or the like. Subscriber devices may include radio resource management capabilities, including managing power levels, data rates, use of spectrum (optionally for channel or spectrum-aware radio resource usage with dynamic spectrum access networking (DYSAN)). Being IP-routable, MBRI devices may be unconditionally open for IP-based applications, such as web 2.0 applications, Java web applications, and the like, without requiring fixed Internet or cellular network infrastructure, such as specialized servers or device-specific application development. An MBRI may be provided in or associated with a private or public network, optionally separated from the Internet or integrated with the Internet. The MBRI may be provided with security features, applications and components used with the fixed Internet or cellular networks, including security at the routing layer and other layers of the MBRI stack. By being unconditionally open to applications, MBRI devices may be provided with security applications developed and used for any other IP-enabled device, such as anti-virus, firewall, anti-spam, unified threat management, device access security, network access control, application access control, device behavior profile monitoring, data leakage prevention, parental access control, software compliance detection, and other applications.

The MBRI may be spectrum independent; that is, it may be deployed at any spectrum location, even within small spectrum bands. With DYSAN capabilities the MBRI may offer enhanced usage of existing spectrum, such as by using available time-frequency rectangles within channels or bands not fully consumed by other usage of the same spectrum (such as by cellular networks). In embodiments, the combination of spectrum independence (e.g. the ability to operate at any frequency), and the capabilities of DYSAN (e.g. the ability to dynamically switch frequencies while transmitting between nodes), may allow MBRI to provide a high degree of frequency spectral reuse with a high level of throughput. A DYSAN enabled MBRI may be able to efficiently utilize a selected set of frequencies to operate with, allowing communications to both effectively utilize the spectrum as it becomes available, and change frequencies as the environment changes to the advantage or disadvantage of certain frequencies. In addition, the ability of MBRI to operate at any frequency may allow local MBRI configurations to be operated at frequencies that are optimized for the area. In embodiments, MBRI's ability to operate on any frequency, coupled with MBRI's DYSAN capabilities, may provide MBRI with a robust operating frequency strategy that may be unique to MBRI.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; enhancing MBRI operation by dynamically adjusting operating frequency to match temporal and spatial spectrum availability.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by dynamically adjusting operating frequency to match temporal and spatial spectrum availability.

The MBRI may be provided in a highly scalable configuration (e.g. leveraging incremental increases in spectral bandwidth that become available to a service provider/operator, leveraging incremental addition of fixed or mobile backhaul or connection points to fixed Internet and other networks, and leveraging addition of increased bandwidth due to increased peering (such as in whispering modes that don't degrade the network with new users in local swarms). In embodiments, for example, mobile access points can be added, such as to enhance bandwidth to a swarm at a concert or event, and the large number of peers at such an event may allow high bandwidth peering among them, thereby enabling broadband performance in usage environments that seriously degrade conventional cellular networks. The MBRI may be provided in a structured or unstructured network architecture, according to operator design, with varying management paths as described above. For example, a city park may be configured with fixed access points that help guarantee a complete coverage of the park grounds, even when there are few mobile device nodes present. In this instance, management paths may be provided from the fixed access points to the mobile device without the need for the presence of other mobile devices. Alternately, a park in the country may be supplied with a minimum set of fixed access points, thereby providing a more unstructured network access to mobile devices. In this instance, the area network may be designed to provide an extension of the fixed internet as a function of device density. Management paths may then be developed in an ad-hoc manner, as mobile device density and placement varies. In embodiments, the fixed access points placement and capabilities may be optimized based on the degree to which the network architecture is meant to be structured.

The MBRI may be provided with varying levels of spanning network capability, including mobile access points, backhaul access points, and other access points that optionally connect a swarm of subscriber devices to fixed Internet assets, as described in more detail below. For instance, a geographic area may be found to include areas of varying mobile device density, where areas of high density are separated by areas of low density. In this instance it may be desirable to span across the low density areas with access points in order to enable the greater benefits that may be provided by a larger area of interconnectivity. Alternately, it may be desirable to have a swarm of subscriber devices not connected, say to fixed Internet assets. This may be for the sake of security, such as in the case of an enterprise, or for the sake of flexibility, such as in the case of an impromptu network arrangement in a remote area where application services are locally provided, and no need for fixed Internet connectivity may exist. In embodiments, the ability to provide varying levels of spanning network capability may enable network designers to customize the capabilities of the network to the requirements of the network application.

The MBRI may use various physical layer wave form variants, including OFDMA wave forms, slotted wave forms, half duplex wave forms, wave forms synchronized by slot, waveform variants (e.g. slotted/half duplex, synchronization on each slot separately), multi-session, and the like.

In embodiments an enhanced MBRI may include adaptive data rate capabilities and may allow high quality of service, using flexible transport for both time sensitive and delay tolerant traffic. In embodiments, adaptive data rate capabilities may be device specific, application specific, time flexible or time dependent, adjustable as a function of available frequency spectrum, configurable by the individual or service provider as a function of service cost, and the like. Time sensitive traffic may include voice services, real-time streaming media services, real-time data collection, and the like, and may require that delivery of data be uninterrupted. Delay tolerant traffic on the other hand, may be data services that may not require that data is delivered in an uninterrupted manner, such as the download of an application from the network, the transfer of a data file between peers, access to a website, and the like. In embodiments, an enhanced MBRI may provide flexibility with respect to the needs of these various data services, while maintaining a high quality of service, through adaptive data rate capabilities. In embodiments, quality of service may be maintained through prioritized queuing and priority-based channel access that may explicitly provide the differential service level. Adaptive data rate may try to maximize the data rate on the link, though it may not be necessarily visible to the end-user experience. In embodiments, the amount of data the end-user receives may be based on both link rate and time slot scheduling. At a higher link rate, fewer time slots may be needed to send a constant amount of data, leaving more time slots available for the network to service other nodes.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation to improve quality of service by providing flexible transport capabilities. In embodiments, the flexible transport capability may be adjusting link data rate, prioritizing delay-sensitive traffic, adjusting occupied spectrum, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation to improve quality of service by providing flexible transport capabilities. In embodiments, the flexible transport capability may be adjusting link data rate, prioritizing delay-sensitive traffic, adjusting occupied spectrum, and the like.

In embodiments, MBRI routing may use sub-queues, traffic based scheduling, optimized short/medium/large packet support, and the like, to manage routing traffic. MBRI routing may perform routing traffic management in order to improve throughput, improve quality of service, avoid bottlenecks, and the like. For example, when a node experiences a high volume of data routing requests, the node may begin prioritizing traffic throughput, such as by time sensitivity, service agreed quality of service, message size, and the like. In addition, in order to better facilitate routing flexibility, the node may begin to vary the packet size, such as making them smaller. In this way, the node may be able to better interleave the data streams, and thus better meet their varying requirements. Alternately, packet sizes may be made larger in order to reduce the overhead associated with individual packets. In embodiments, the MBRI node may provide different strategies for different data stream combinations, such as one strategy for a highly diverse data traffic set, and another for a homogeneous data traffic set.

Figure 52:
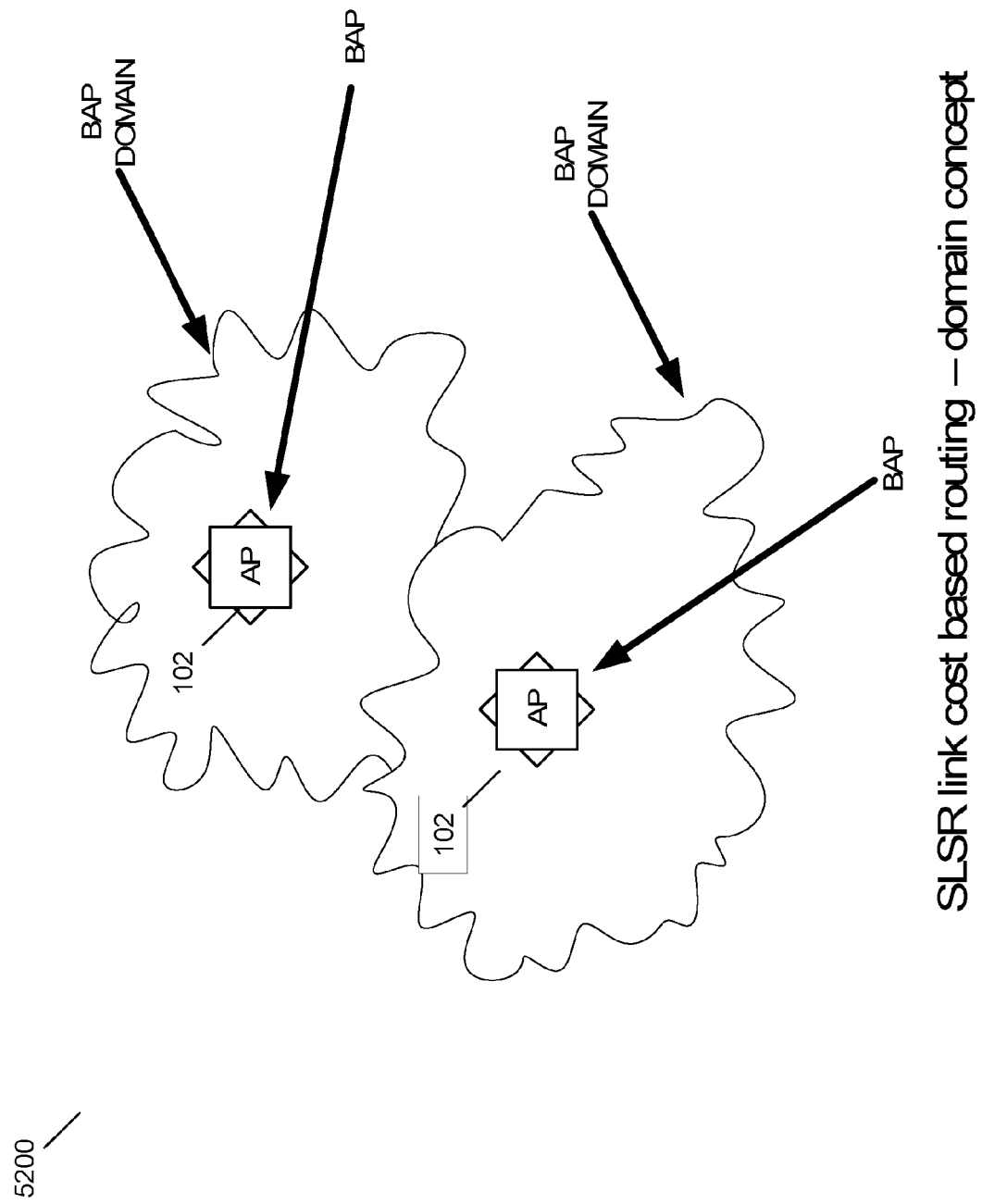
FIG. 52 depicts an embodiment of SLSR link cost based routing domain concept.
Figure 53:
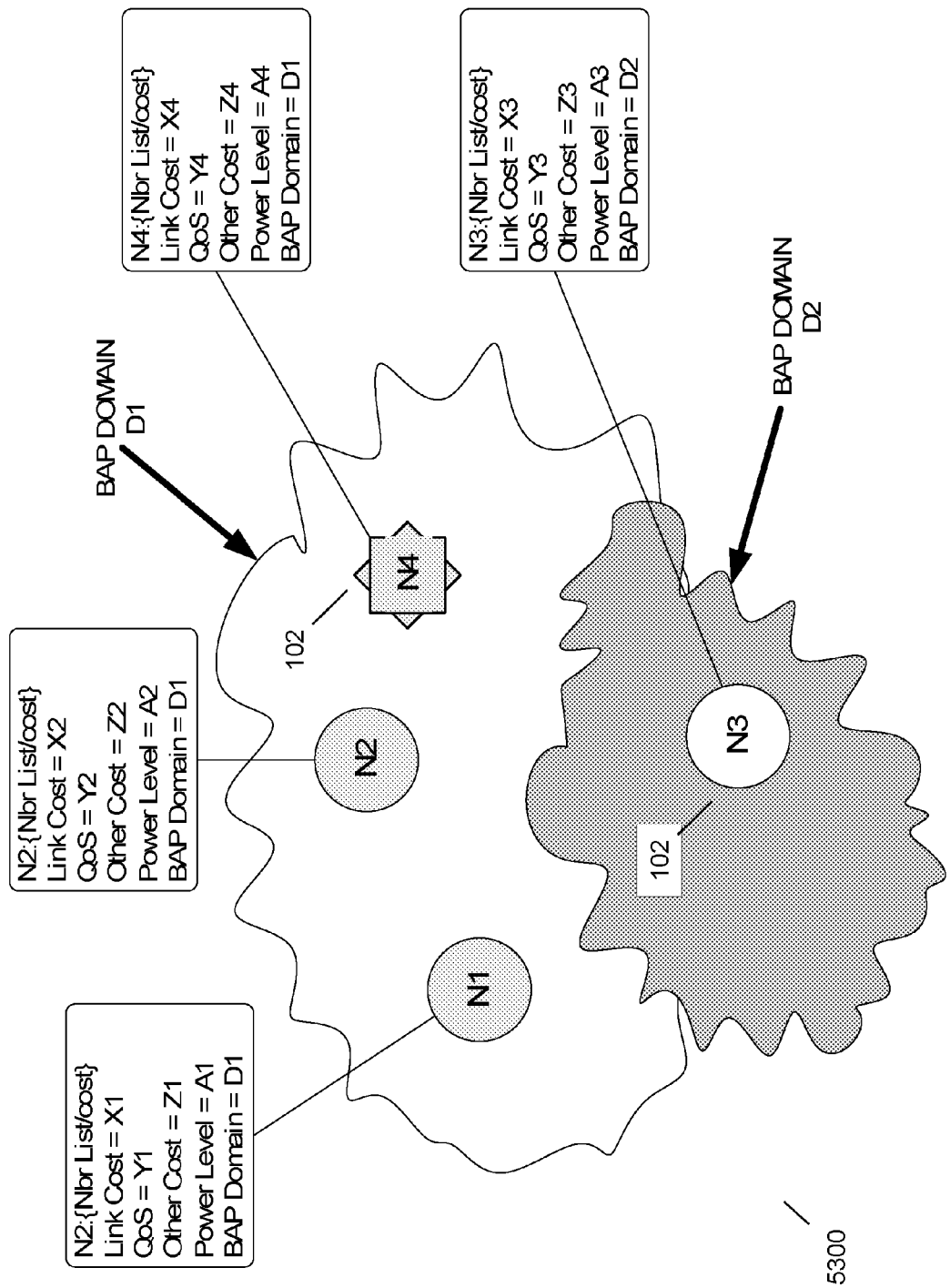
FIG. 53 depicts an embodiment of SLSR link cost based routing protocol with extra information.
Figure 54:
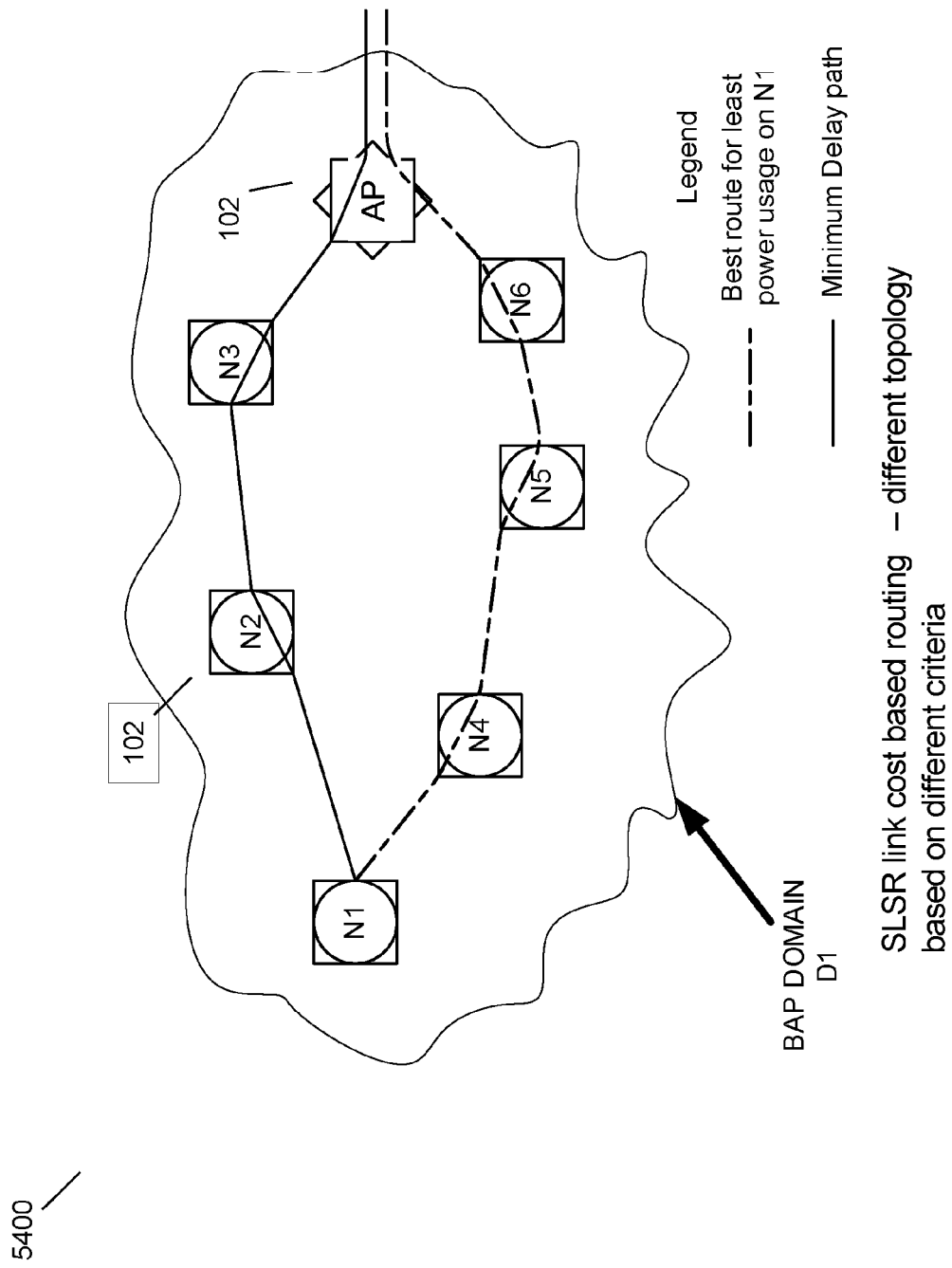
FIG. 54 depicts an embodiment of SLSR link cost based routing different topology based on different criteria.

In embodiments, scoped link state routing (SLSR) link cost based routing and/or SLSR domain management may be utilized by MBRI nodes in order to improve routing efficiency, where mobile nodes may be provided a capability to determine an optimum path through mobile network by utilizing different types of cost/QoS information over any MANET routing protocol and by utilizing backhaul domain management for MBRI. Mobile nodes may use different information to calculate link cost, such as ADR, two hop neighborhood size, link data rate, and the like. Mobile nodes may provide many parameters to minimize MANET routing algorithm cost, e.g. route/link cost, QoS, power level, etc. Other mobile nodes may see MANET routing information, along with these parameters, and determine the minimal cost. For instance, a mobile node that advertises it is a low power device may not be best choice for routing even though the device has better link/route cost. Mobile nodes may use the information provided by a MANET routing protocol, along with extra information, to determine optimum network routes. Mobile nodes may create multiple paths to their destination based on different criteria. MBRI may provide a mechanism to create MANET domains when additional backhaul access points are deployed. The MANET domain concept may be similar to the cellular "cell" concept in terms of the geographic path of the signal. In embodiments, the MBRI network may operate on a single frequency channel in a coordinated manner in adjacent BAP domains so as to avoid interference between nodes in different domains. These MANET domains may limit the scope of MANET routing, thus partitioning the network for an optimum route towards the internet. Once MANET domains are created, they may provide a backhaul exit point for MANET traffic. MANET domains may work together with other MANET domains and MANET routing protocols. This may help provide alternate routes information in the case of a backhaul failure. MANET domains may be automatically created when backhaul access points are deployed, thus adding capacity without a site survey and re-provisioning of an existing system. FIG. 52 shows a MANET domain concept 5200, where an arbitrary MANET cloud is formed around a BAP. As shown, MANET domains may intersect each other and BAPs may not need to be at the exact center of the BAP domain. FIG. 53 shows three mobile nodes 5300 (N1, N2 and N3) and a BAP (N4) in BAP domain D1. Mobile node N3 belongs to an overlapping BAP domain D2 and co-exists with other nodes N1 and N2. All these nodes may advertise their link state (per MANET protocols) along with "extra" information such as cost, QoS, power level and BAP domains. Mobile nodes may use this information to create different topology based on different criteria. For example, some set of nodes may be used to determine a BAP's shortest path optimizing QoS, but a different set of nodes may be used to calculate the same BAP's shortest path using optimizing power usage. Mobile nodes would advertise the following properties on top of a MANET routing protocol. These nodes may use information when received from other nodes, such as cost (as provisioned), cost (as discovered), QoS (as provisioned), QoS (as discovered), power usage, hops (cost) to BAP, mobility (vehicular, pedestrian node or fixed), and the like. FIG. 54 shows determination of BAP shortest path 5400 using optimization of minimum delay versus power usage options. In embodiments, SLSR link cost based routing and/or SLSR domain management may better enable MBRI to provide efficient routing strategies for communications across the network.

In embodiments, multicasting within the MBRI network may be enabled through a node's IP routable capabilities. Multicast is the delivery of information to a group of destination nodes simultaneously using the most efficient strategy to deliver the messages over each link of the network only once, creating copies only when the links to the multiple destinations split. MBRI nodes, being IP routable, may have the capability to provide multicast transmissions across the network. In this way, the MBRI may increase routing efficiency through the network by taking advantage of node distribution and density to transmit messages to a plurality of locations, while minimizing the need for duplicate transfers.

Figure 62:
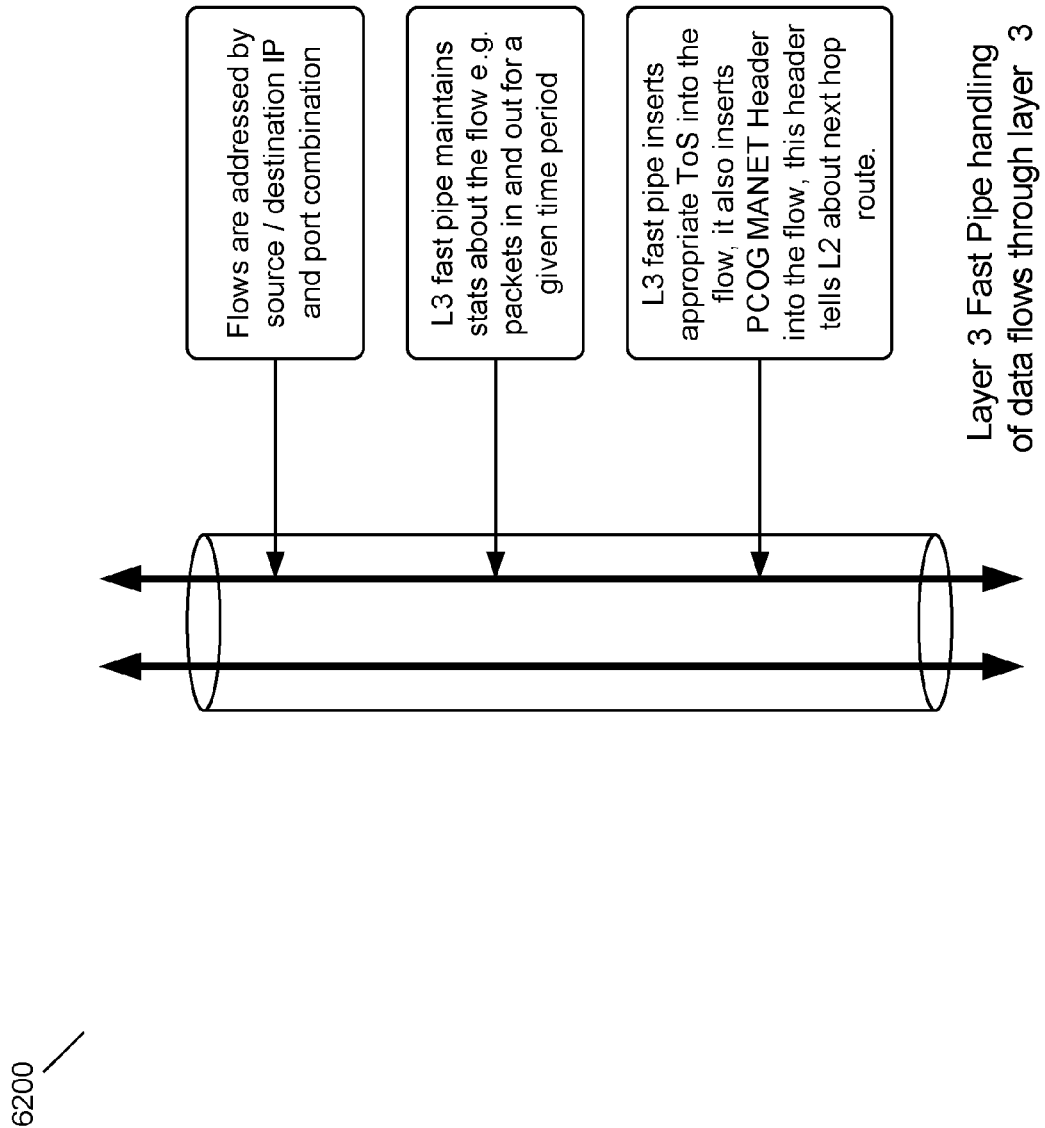
FIG. 62 depicts an embodiment of a layer 3 fast pipe handling of data flows through layer 3.
Figure 70:
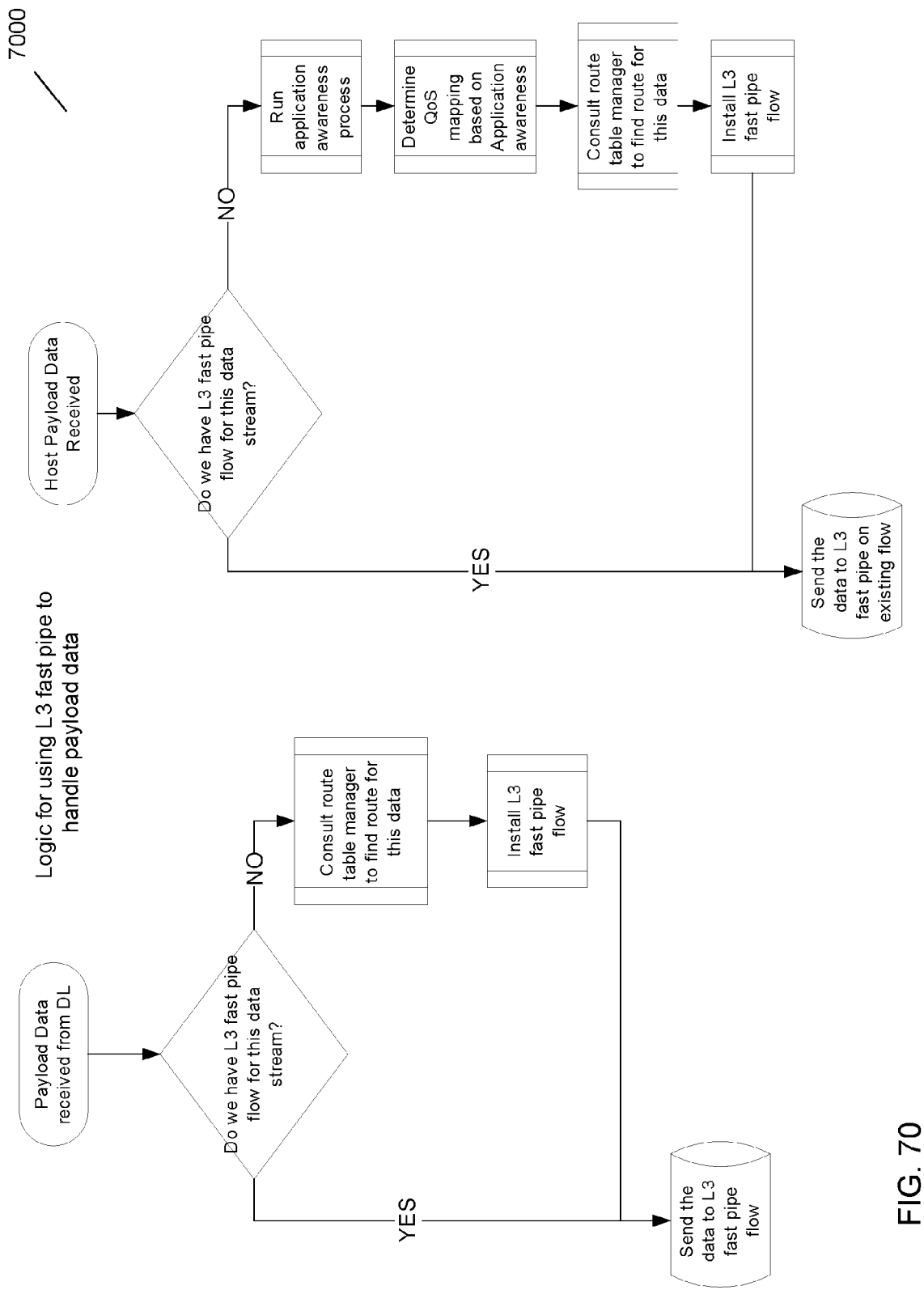
FIG. 70 depicts an embodiment for logic associated with layer 3 fast pipe handling payload data.

In embodiments, layer 2 forwarding (L2F) and layer 3 fast pipe may be associated with increasing the speed in communicating across the MBRI network, and may be protocols implemented inside the node. The data path through Layer 3 (L3) may be based on the concept of a L3 Fast Pipe 6200 as depicted in FIG. 62. The Application Awareness, QoS Translation, and L3 Fast Pipe modules may work together to handle bi-directional data flows between the wired interface and the data link. A list of data flows may be compiled and maintained. Each flow may be uniquely identified using the 4-way combination of source IP address, source port, destination IP address, and destination port. When data is presented to L3 over either the wired interface or the data link, these four parameters may be checked to determine whether an L3 Fast Pipe flow has been established. If it has been established, the data may be inserted into the L3 Fast Pipe with the parameters for the corresponding flow. The Ethernet header data may then replaced with a header that may contain the next hop information for the route and QoS level for the flow. When data packets with source and destination parameters that don't match an installed flow arrive at a Layer 3 interface, these modules may work together to install a new flow in the L3 Fast Pipe. An embodiment for the business logic 7000 for this process is shown in FIG. 70. The left side shows the logic for payload data received across the data link interface, and the right side shows the logic for payload data received across the wired interface. When data packets arrive at the data link interface, the Route Table Manager may be used to obtain the next hop identification for insertion into the PCOG MANET Header. Additionally, the flow may be installed into the L3 Fast Pipe. When data packets arrive at the host interface, an Application Awareness module may examine the terms of service (ToS) settings and packet statistics to identify a suitable QoS level for the flow. A ToS to QoS translation table may also be used to determine the QoS level through the MANET, and the Route Table Manager identifies the next hop. This information may be inserted into the PCOG MANET Header and the flow installed into the L3 Fast Pipe. When the next hop for the route changes, the L3 Fast Pipe may be quickly adjusted to point to the new next hop. Flows may be removed from the L3 Fast Pipe when data is not received for some period of time, such as 30 seconds, and may be configurable.

Figure 71:
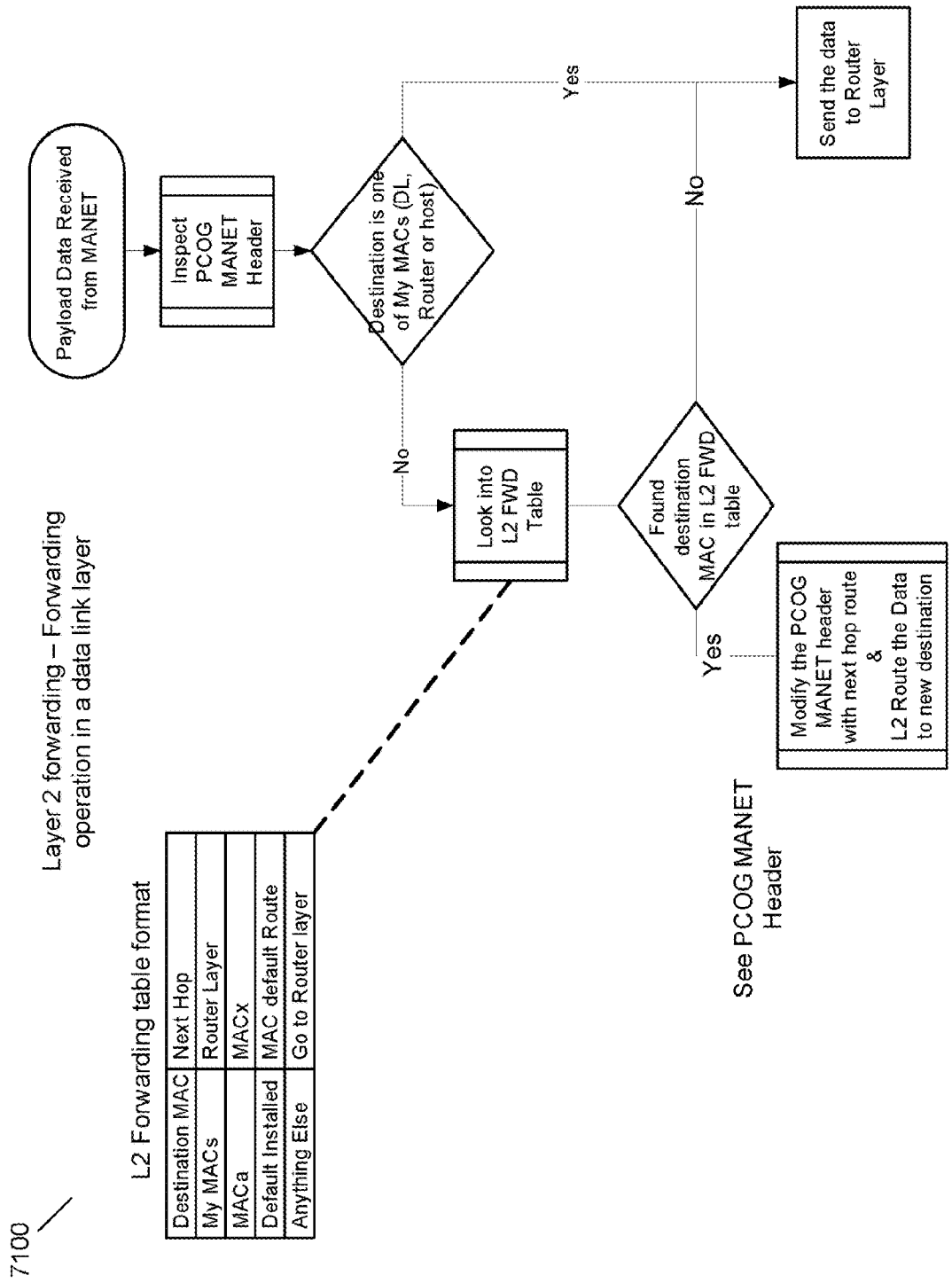
FIG. 71 depicts an embodiment for layer 2 forwarding.
Figure 72:
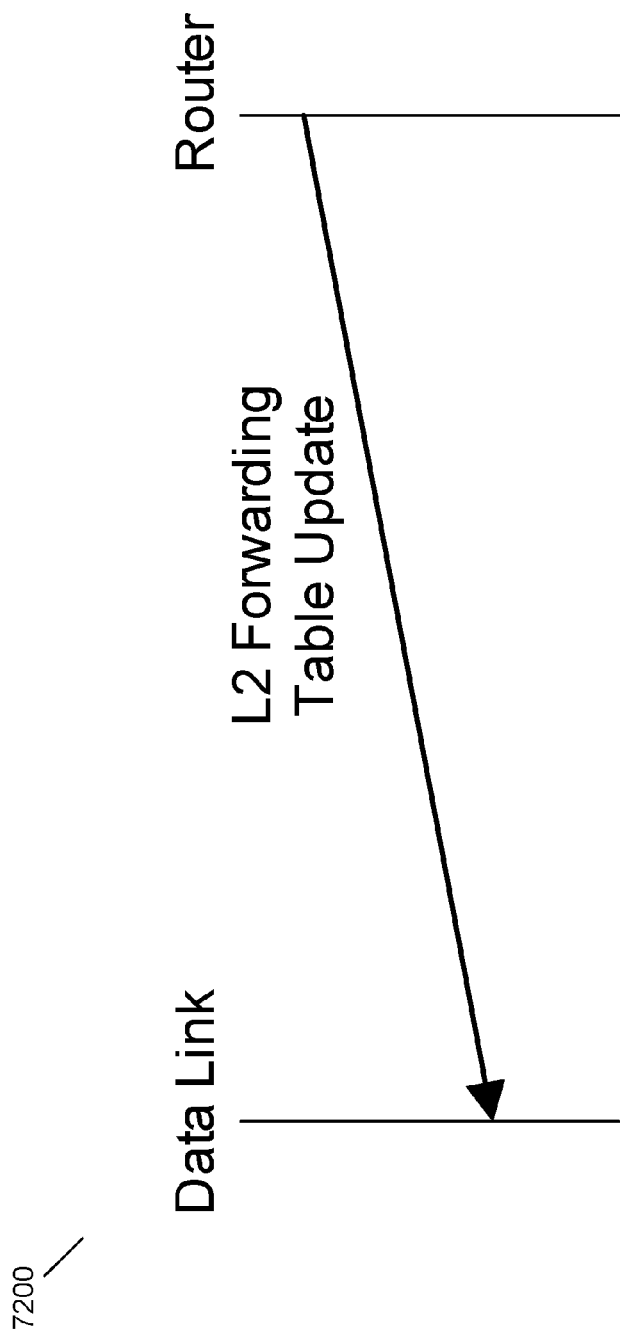
FIG. 72 depicts an embodiment for layer 2 forwarding associated with forwarding a table update from a router.

In embodiments, L2F may act as a sub-network protocol used by the MBRI nodes to circumvent routing operations taking place at layer 3 and thereby prevent timely and resource expensive routing functions from operating on incoming packets at a node. This may then provide header information that may be resolved at layer 2 to make smart routing decisions, thereby increasing the speed of decision making and increasing network throughput and efficiency. The mobile node's network layer sends router control information to the data link layer that helps prepare the layer two forwarding table. The mobile traffic may have a special fixed header, such as with source, destination, next hop routing information, and the like. Once a data link layer receives mobile traffic, it may examine the header, consult with the layer two forwarding table, and forward the traffic to next hop as determined by the layer two forwarding table. The layer two forwarding table may instruct layer two to pass the packet up to the network layer for routing. In embodiments, the networking may layer prepare and sends layer two forwarding table information to data link layer based on various MANET routing protocols 7200, such as shown in FIG. 72. The networking layer may apply a special header to traffic, such as including source, destination, next hop and related QoS related information 7300, and the like, such as shown in FIG. 73. The data link layer may use the layer two forwarding table information to route the packets to a destination by using special header information as identified, such as illustrated in FIG. 71. In embodiments, this may reduce latency on multi-hop paths by keeping the data from going all the way up to the router at each hop.

Figure 74:
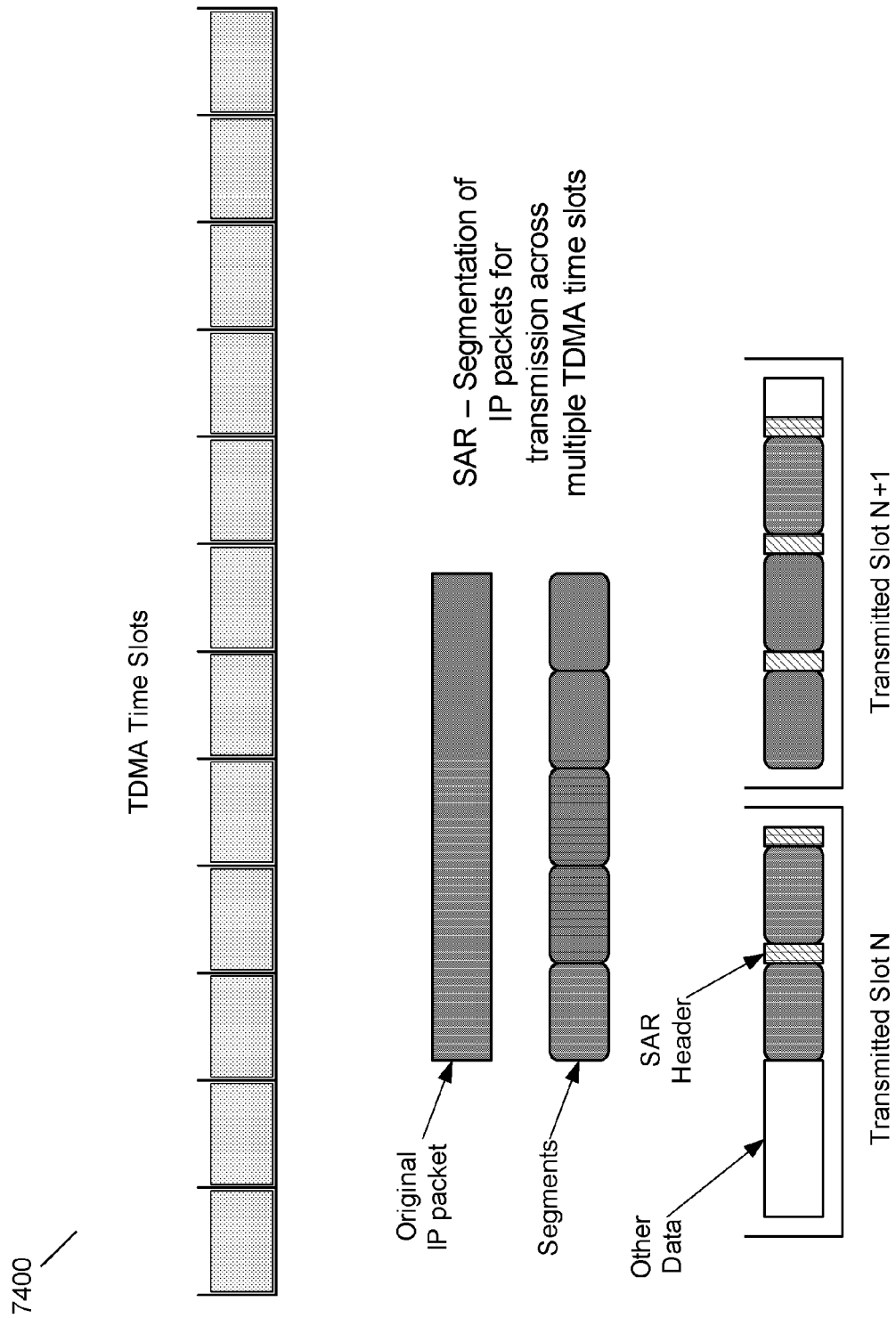
FIG. 74 depicts an embodiment for segmentation and reassembly associated with transmission across multiple TDMA time slots.
Figure 75:
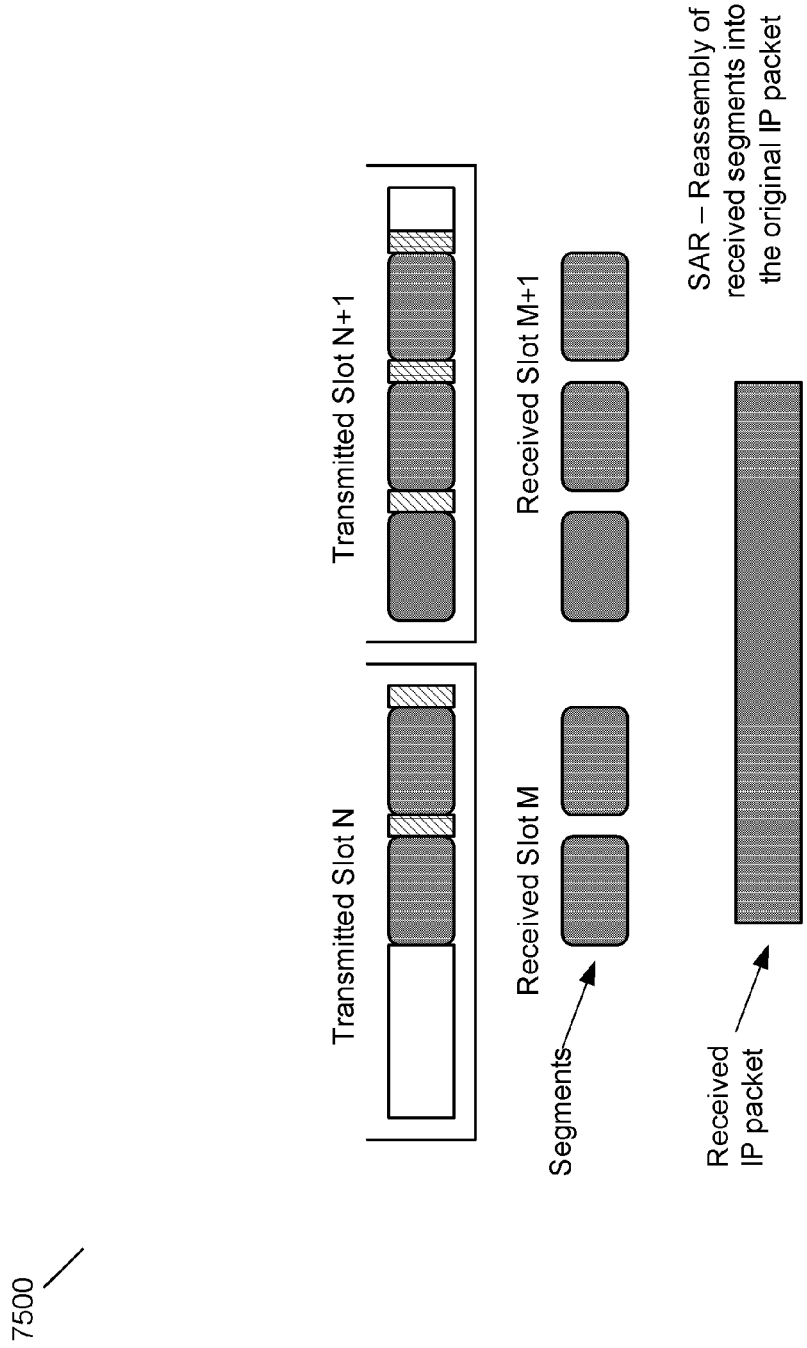
FIG. 75 depicts an embodiment for segmentation and reassembly associated with reassembly of received segments into the original IP packet.

In embodiments, MBRI may support SAR, a process used to fragment and reassemble packets so as to allow them to be transported across networks, such as asynchronous transfer mode (ATM) compatible networks. In SAR, an incoming packet from another protocol to be transmitted across the network is chopped up into segments that fit into fixed byte chunks carried as cell payloads. At the far end, these chunks are fitted back together to reconstitute the original packet. In embodiments, The SAR function may perform a large packet to small packet transformation and reassemble the packet at the next hop destination for efficiency at the data link layer. In embodiments, packet size may be determined dynamically in response to the real-time data-rate available over each individual data link. In a network running TDMA in the MBRI, transmissions may occur with fixed duration time bursts. The slot capacity may depend upon the modulation, coding, bandwidth, TDMA time slot duration, and the like. A depiction of TDMA time slots 7400 is provided at the top of FIG. 74, where capacity is filled with payload data. Typically, the IP packets that make up the payload data do not always fit evenly into the slot capacity. Rather than allow the remaining slot capacity to go unused, IP packets may be segmented into smaller pieces to fill the available slot capacity efficiently, such as show in FIG. 28. The original IP packet is divided into multiple segments, and a SAR Header is added to tag each segment and enable reassembly at the receiver. The individual segments are transmitted using multiple TDMA time slots. Upon reception, the data from the individual TDMA time slots containing the SAR fragments is reassembled into the original IP packet 7500 as depicted in FIG. 75. The fragments may be buffered and ordered according to SAR sequence numbers contained in the SAR Header. Once all the fragments that correspond to a single IP packet are buffered, the complete IP packet is formed and sent up the protocol stack. When the reassembly process is started for any packet, a configurable timer may be set. If this timer expires before reassembly is complete, then the reassembly process may be aborted in order to prevent the reassembly process from "hanging" when fragments are dropped or delayed. Un-segmented IP packets may be passed directly up the protocol stack. In embodiments, the SAR process may be executed independently for each link over a multi-hop path through the wireless MANET or over the complete end-to-end route over the wireless portion of the network.

Figure 76:
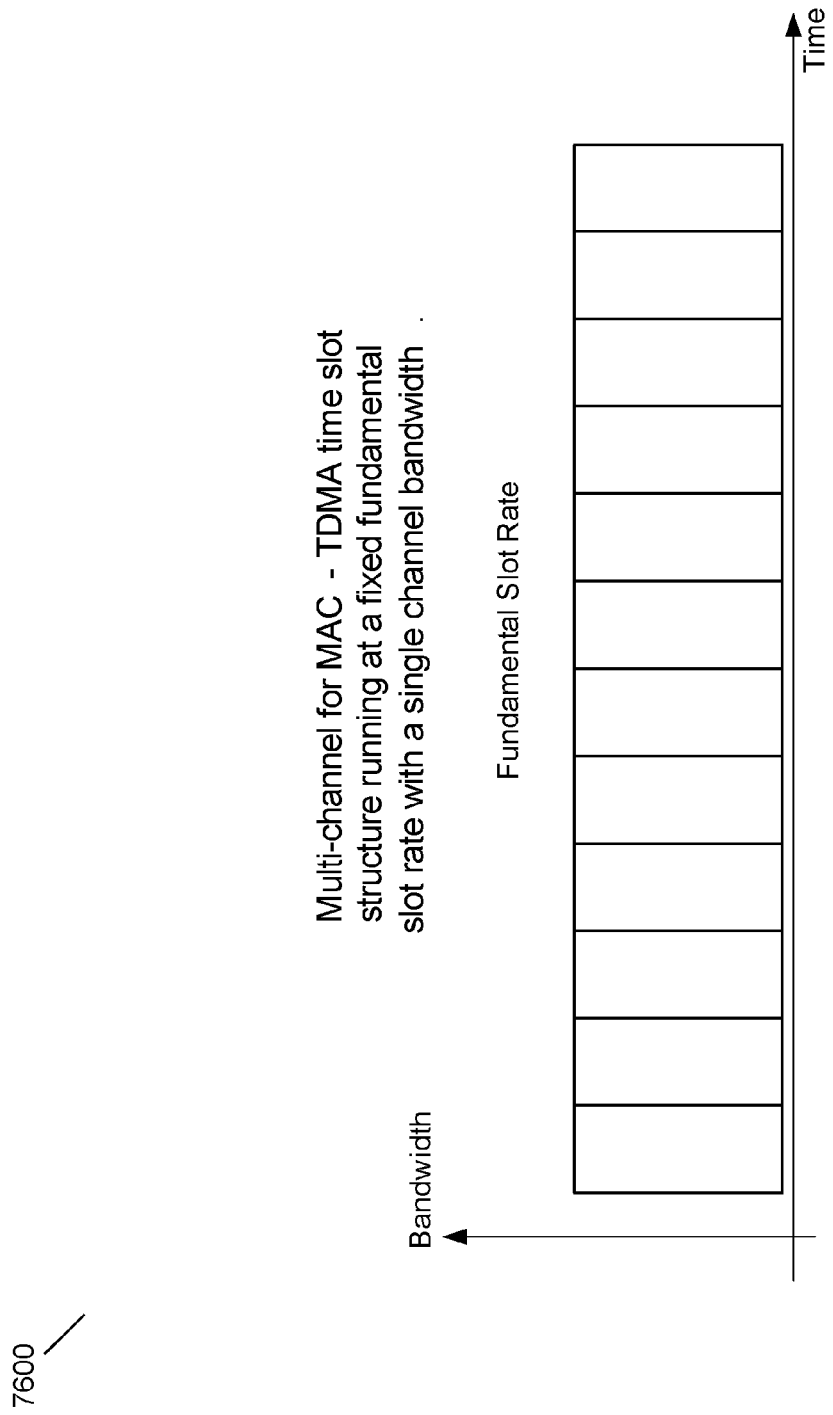
FIG. 76 depicts an embodiment for Multi-channel for MAC associated with TDMA time slot structure.
Figure 77:
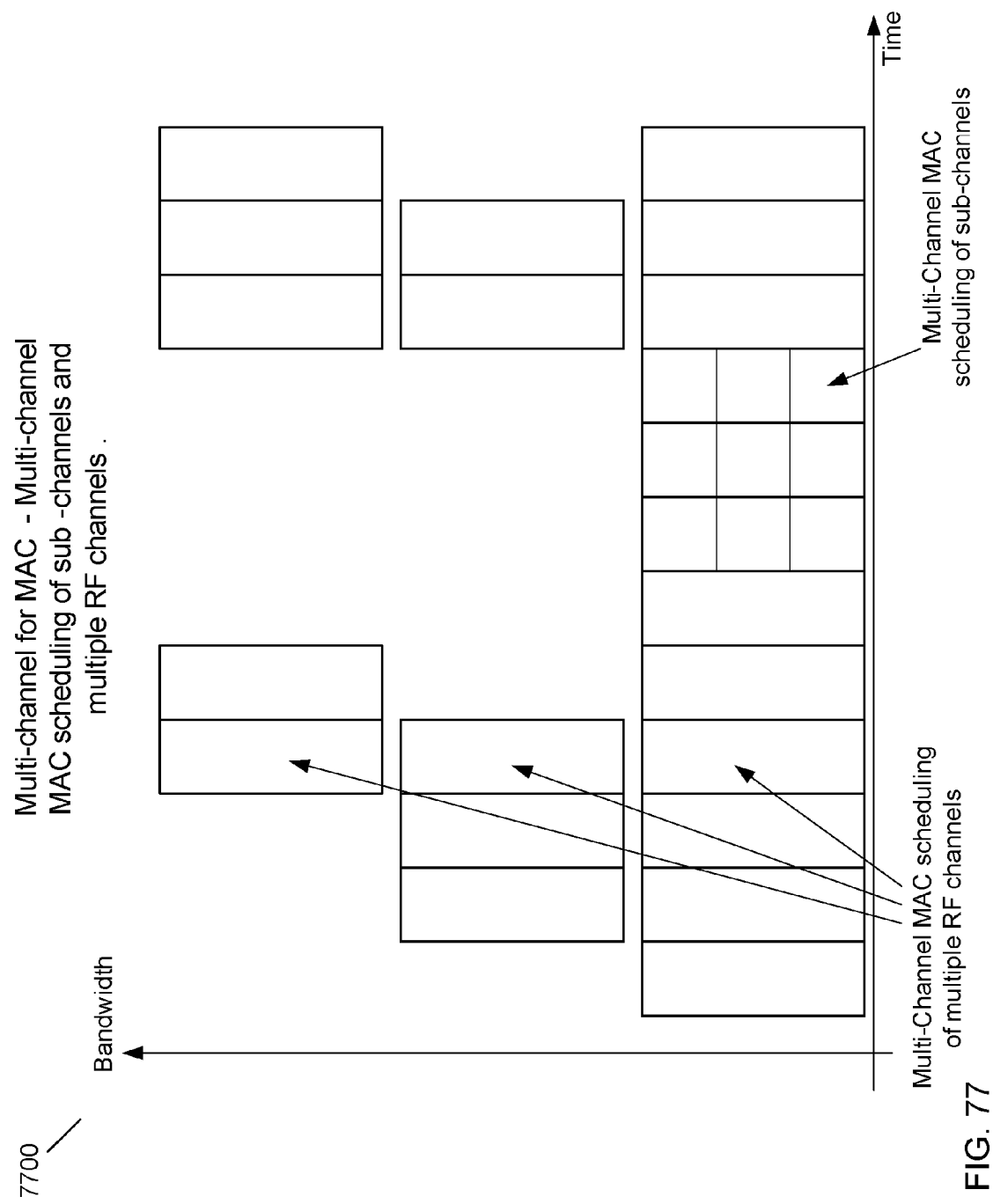
FIG. 77 depicts an embodiment for Multi-channel for MAC associated with scheduling of sub-channels.

In embodiments, MBRI may support multi-channel MAC. In a network running TDMA in the MBRI, transmissions may typically occur using a single channel. The slot capacity depends on the modulation, coding, bandwidth, and TDMA time slot duration. A representation of the TDMA time slots 7600 are shown in FIG. 76. In a multi-channel environment, control-plane cooperation may enable neighboring nodes to notify transmitter-receiver pairs of channel conflicts and deaf terminals to prevent collisions and retransmissions. MBRI, though full OSI functionality, may provide the facility for multi-channel MAC in order to improve packet transfer throughout the MBRI network. Multimedia internet data can have widely varying characteristics and delivery requirements including data rate, latency, and jitter requirements. In some instantiations, the bandwidth may be divided into sub-channels. In others, the radio may be able to access multiple channels over a bandwidth that may be greater than the modem's single channel bandwidth. In both cases, a multi-channel MAC increases the number of transmission opportunities in the network for exchanging data. When multiple distinct RF channels are accessed and scheduled, the overall network capacity is increased beyond that achievable using a single channel. FIG. 77 shows both examples of using a multi-channel MAC 7700. The multi-channel MAC may use knowledge of the distributed network topology and spectrum availability. One method for scheduling sub-channels is to first select which node in the topology is the receiving node, and then select the multiple transmitters for the different sub-channels. Similarly, multiple RF channels may be scheduled where the spectrum availability is used to determine number of channels to be scheduled simultaneously. The spectrum availability may be defined prior to network operation, or may be based on local sensing of the RF channel utilization. In embodiments, the transmit power of the individual nodes may be adjusted to minimize the variation of received power over the different sub-channels at the receiver. Another method for scheduling sub-channels may be to schedule transmissions based on pairs of nodes in the network topology and select sub-channels to avoid causing interference between the transmissions internal to the network. In embodiments, transmit power control may be used to manage interference levels.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by coordinating node transmissions across multiple channels. In embodiments, channel access may depend on spectrum conditions. In embodiments, transmit power may be explicitly controlled to manage interference levels across the network topology.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by coordinating node transmissions across multiple channels. In embodiments, channel access may depend on spectrum conditions. In embodiments, transmit power may be explicitly controlled to manage interference levels across the network topology.

In embodiments, MBRI may support adaptive power control, which may provide the ability to manage power based on network performance, spectrum reuse, emergency needs, spectrum conditions, environmental conditions, service level commitments, subscriber rate plan, traffic type, application type, and the like. In embodiments, adaptive power control may be used to support "whispering" as much as possible, such as to increase the number of parallel conversations to promote better spectrum reuse. The MBRI node may be able to adjust power based on an established need or changing conditions. For example, a user may subscribe to a high quality of service, and the user's device node may need to boost power in order to help guarantee the quality of the transmission to the next node. In a more general case, the node may find itself transmitting in an environment that requires more or less power to accommodate its links to adjacent nodes, where through adaptive power control the node may be able to dynamically adjust the power level based on changing environmental conditions. In embodiments, MBRI may also be able to adjust power levels on certain frequencies, such as in association with DYSAN capabilities. In embodiments, the MBRI ability to support adaptive power control may contribute to longer battery operation of mobile nodes while extending the data transmission capabilities of the node within varying network and subscriber conditions.

Figure 55:
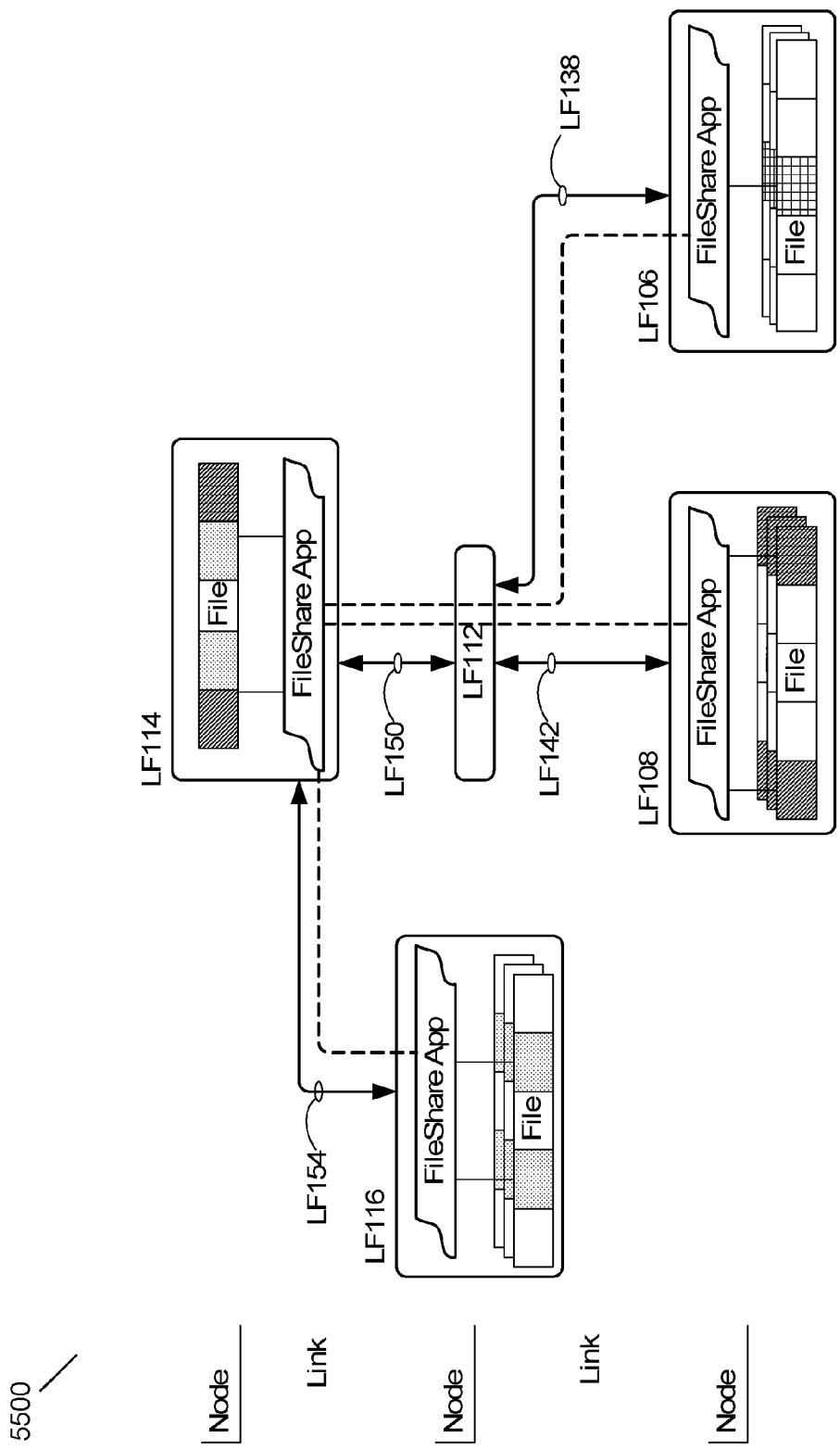
FIG. 55 depicts an embodiment of distributed data and applications within MBRI.

In embodiments, MBRI may provide the necessary requirements for distributed data services, such as for storage, schema persistence, low latency data transfer, and the like. MBRI may enable a new category of wireless web and device applications by providing mechanisms that spread data across many nodes, exchange information to bind the data together as a whole, and respond quickly when the data is requested. FIG. 55 illustrates one embodiment of distributed data and applications 5500 within MBRI.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by providing distributed data services. In embodiments, data from the data services may be spread across a plurality of nodes, recreated when one or more nodes becomes unavailable. Schema views of the data from the data services may persist when one or more nodes become unavailable. Data from the data service may be accessed from a plurality of nodes with sufficient speed to appear as if the data comes from one data source.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by providing distributed data services. In embodiments, data from the data services may be spread across a plurality of nodes, recreated when one or more nodes becomes unavailable. Schema views of the data from the data services may persist when one or more nodes become unavailable. Data from the data service may be accessed from a plurality of nodes with sufficient speed to appear as if the data comes from one data source.

In embodiments, in MBRI a distributed data store may be created when users can save information on a network node (device) other than their own. These nodes are known as peers. Peers collaborate with another by allowing data to be stored on each other, and a peer-to-peer network may save data using this distributed mechanism. MBRI supports peer-to-peer network architecture because it is a routable IP network, providing multiple diverse paths for communication between nodes. A peer-to-peer network may assume diverse connections between nodes in a network and ad hoc connections between peers. The usefulness of peer-to-peer networks is well established, and such networks are commonly used for sharing content files containing location, audio, video, or even real time data such as telephony. The size of the data need not be large, nor need it persist for very long to nonetheless be useful to an application. In addition to data sharing, more complex applications may use distributed or federated databases, where each peer contains a small part of a database (such as a table or record, as appropriate for the form factor of the device), and also maintains logical pointers to data parts that exist on other devices. The pointers link together separate data parts to form a larger logical database, spread across the MBRI network. Such a solution may only be workable in a low-latency, high-bandwidth IP network, making MBRI a unique platform for this kind of scalable storage solution in the wireless arena.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by storing data segments across a plurality of nodes as a distributed data store. In embodiments, each of the plurality of nodes may contain a portion of the store, where each of the plurality of nodes may maintain link pointers to assemble the portions into a larger database, where each of the plurality of nodes may have both processing and storage capacity for the portion to persist for a duration of time, and the like. In embodiments, the distributed data store may be a database, where the entities in the database may be logically accessed as if from one monolithic, federated database because of the low latency and high bandwidth of the link across which the data is transported.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by storing data segments across a plurality of nodes as a distributed data store. In embodiments, each of the plurality of nodes may contain a portion of the store, where each of the plurality of nodes may maintain link pointers to assemble the portions into a larger database, where each of the plurality of nodes may have both processing and storage capacity for the portion to persist for a duration of time, and the like. In embodiments, the distributed data store may be a database, where the entities in the database may be logically accessed as if from one monolithic, federated database because of the low latency and high bandwidth of the link across which the data is transported.

In embodiments, MBRI may provide for schema persistence. A schema describes the logical structure or view of some data. When nodes exchange data, some common schema is at work, so that the data matches up. In the simplest view of distributed data, a Web application may execute locally on a node, and provides a description of the data it uses, with enough contextual information about what the data contains, so that another Web application on a different node can decode the description and also work with it. In a mobile network such as MBRI, peers may join and leave the network. Simple data schema solutions suffer from the problem of persistence, where a large distributed data store may lose an essential, small portion of the whole data view. To be persistent, data in the individual peers is replicated. To be readily available, small embedded distributed data services (or applications) may exchange information called hash maps, which are distributed metadata structures that permit reassembly in real time of the missing data.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and where MBRI operation may be provided with hash maps for data stores. In embodiments, the hash maps may permit the real-time creation of database schemas, where the schemas may be available to all applications as needed for data exchange and transformation, recreated even if at least one of data and metadata become unavailable due to the loss of a node, and the like. In embodiments, new nodes may allow the storage of hash maps to support distributed databases.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and where MBRI operation may be provided with hash maps for data stores. In embodiments, the hash maps may permit the real-time creation of database schemas, where the schemas may be available to all applications as needed for data exchange and transformation, recreated even if at least one of data and metadata become unavailable due to the loss of a node, and the like. In embodiments, new nodes may allow the storage of hash maps to support distributed databases.

In embodiments, MBRI may provide for low latency data transfer through data distribution. In hub-and-spoke wireless and wired topologies, the movement of data is constrained by available path bandwidth and number of paths from source to sink. In MBRI, bandwidth is a cumulative function of the number of available nodes through which data can be transferred. The low latency of MBRI makes distributed storage possible; data joins would otherwise be too slow to be of practical use. The MBRI topology and latency may enable resilient large file transfers, using techniques such as parity files. Large files may be split into multiple smaller ones; parity files may be generated that are then transferred along with the original data files. MBRI may provide routing mechanisms to optimize the transfer of these small files, which are then reassembled. If any of the data files were damaged or lost whilst being propagated, parity files are used to reconstruct the damaged or missing files. These techniques may be of particular benefit in secure or hostile environments.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and which MBRI may be enhanced by providing low latency data delivery. In embodiments, the data may be presented quickly enough to be practically indistinguishable from a database call to a server at the end of a wired connection. The data may be automatically split into several portions to permit delivery via multiple routes on the wireless network. The data may be split into several smaller portions to permit parallel transportation and reassembly at the destination, where at least one of the transportation and reassembly may include mechanisms to check and correct for errors.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and which MBRI may be enhanced by providing low latency data delivery. In embodiments, the data may be presented quickly enough to be practically indistinguishable from a database call to a server at the end of a wired connection. The data may be automatically split into several portions to permit delivery via multiple routes on the wireless network. The data may be split into several smaller portions to permit parallel transportation and reassembly at the destination, where at least one of the transportation and reassembly may include mechanisms to check and correct for errors.

In embodiments, MBRI has the essential characteristics for distributing, saving and moving data across a network. These characteristics include ad hoc nodes, low latency IP over diverse connections, multiple paths for increased bandwidth, and the like. MBRI may enable incremental scaling of data capacity, fault tolerance, high availability in a low-latency network, and the like, through distributed storage and processing. Depending on the form factor and processing capacity of the node, standard IP network storage services are possible, making MBRI a transparent substitute for some fixed networks.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by providing incremental scaling of distributed data capacity as additional nodes join the network, where additional nodes may provide a net increase in available processing power to deliver data services across the network.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by providing incremental scaling of distributed data capacity as additional nodes join the network, where additional nodes may provide a net increase in available processing power to deliver data services across the network.

Figure 56:
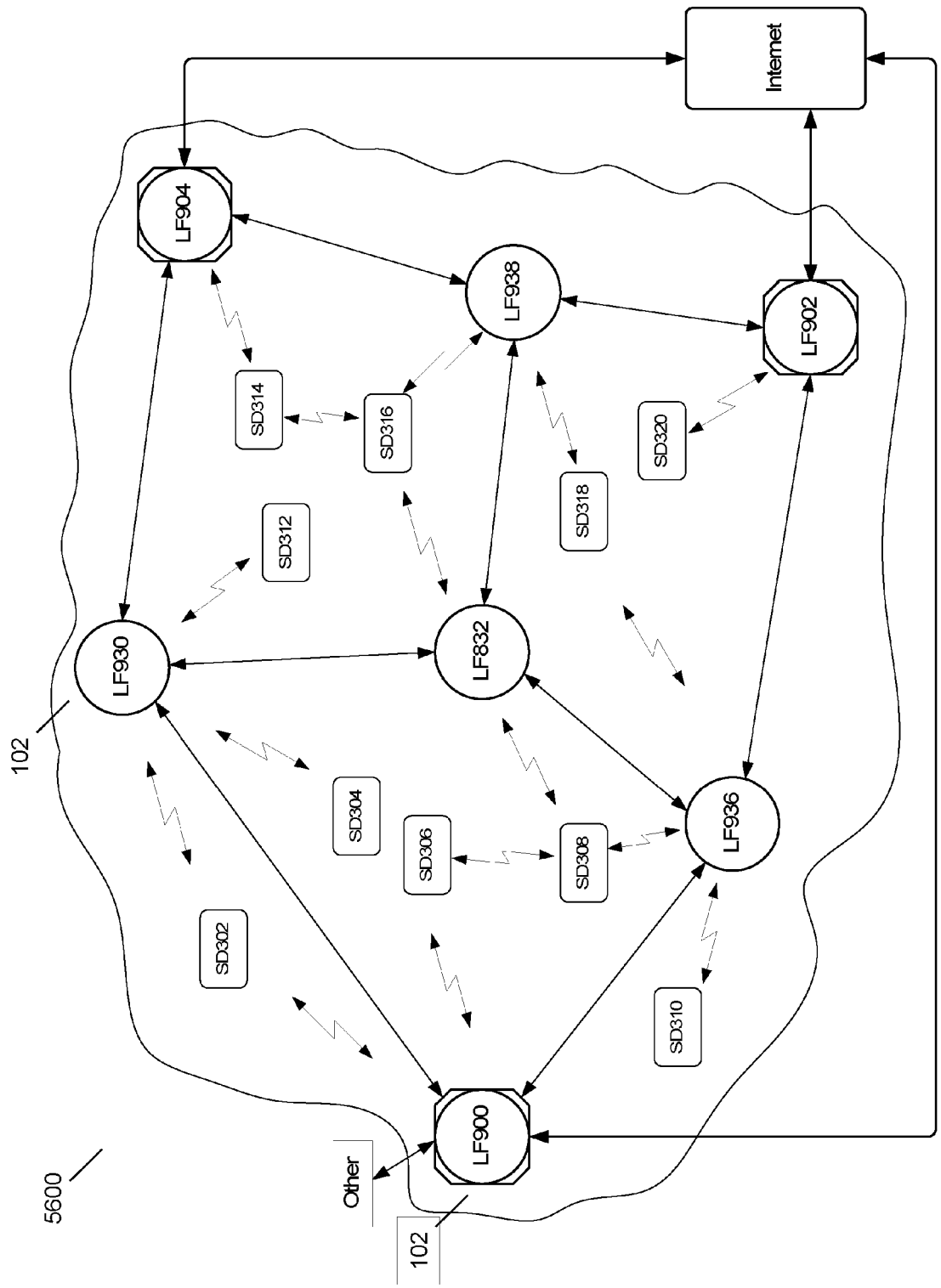
FIG. 56 depicts an embodiment of a local mobile application, with all data links shown.
Figure 57:
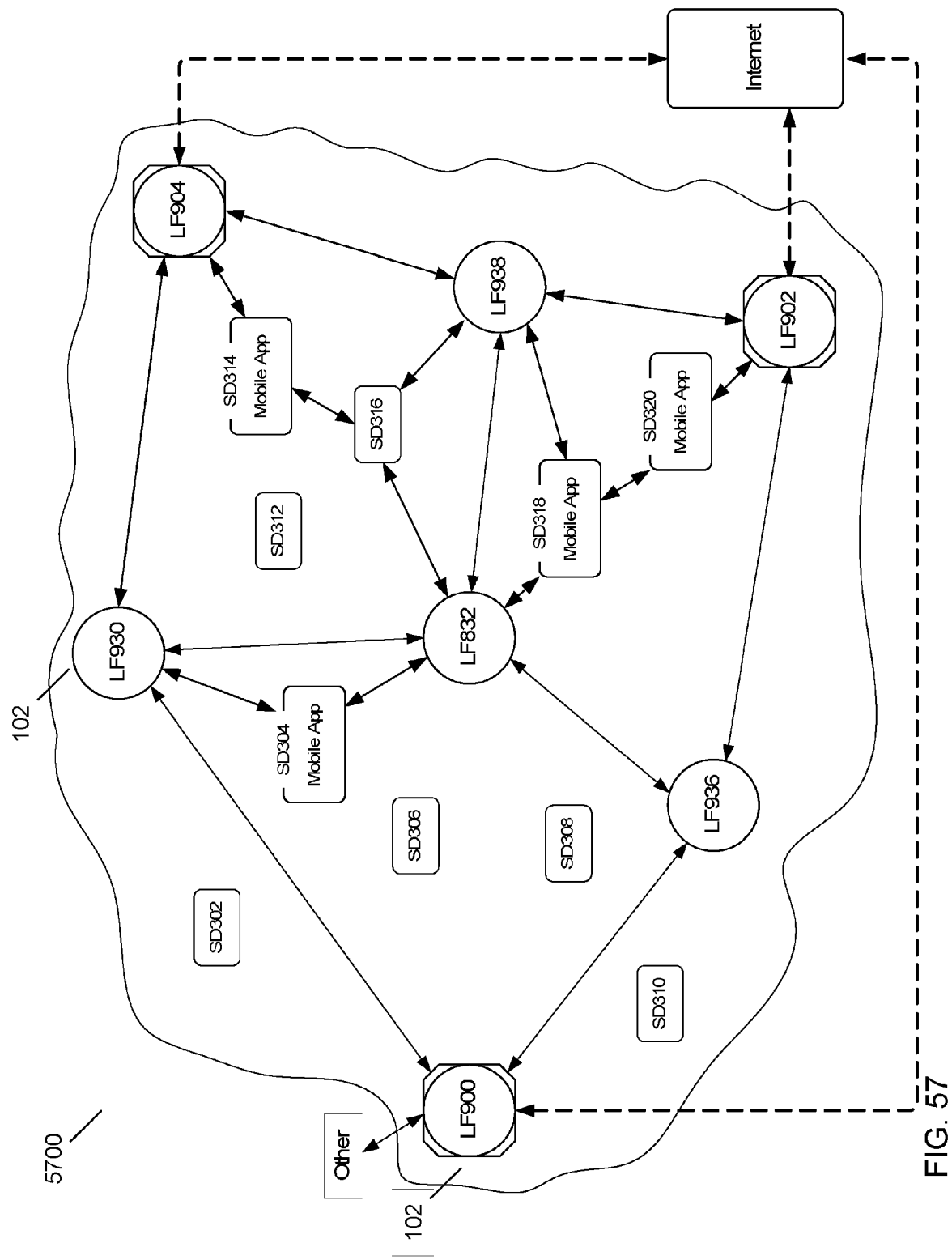
FIG. 57 depicts an embodiment of a local mobile application, with the mobile based application shown common to all four subscriber devices.

In embodiments, MBRI may provide for local intelligence, such as caching, local content and services, and the like. In embodiments, local intelligence may provide for a number of different applications, but be based on MBRI's ability for nodes to have a local awareness. For instance, information from the local area may be circulated, such as within the local geographic area, within the local swarm of mobile nodes, associated with local access points, and the like. An application that has large data storage requirements, such as video or image applications, may store or cache data in surrounding nodes. A local application, such as in association with a local store, may provide content and services throughout the local network through storing the content and user service access interfaces on user device nodes. In embodiments, MBRI's ability to share and store information amongst nodes in the local area may provide a local intelligence that is unique to the capabilities of MBRI, and for which user's and services may benefit through shared resources. FIG. 56 and FIG. 57 illustrate an embodiment of how local mobile applications 5600, 5700 may be implemented within MBRI.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by delivering local node-by-node intelligence, where intelligence may be implemented in association with at least one application. In embodiments, the application may operate on routing tables, pointers, on storage, and the like. The application processing capability may be internal to the node. The application may permit the node to view adjacent nodes in presentation formats consistent with available geographical information. The application may permit the temporary caching of information to be delivered to users as needed.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by delivering local node-by-node intelligence, where intelligence may be implemented in association with at least one application. In embodiments, the application may operate on routing tables, pointers, on storage, and the like. The application processing capability may be internal to the node. The application may permit the node to view adjacent nodes in presentation formats consistent with available geographical information. The application may permit the temporary caching of information to be delivered to users as needed.

In embodiments, MBRI may provide support for distributed applications, non server based applications, and the like. MBRI, through local awareness capabilities and on-device storage capabilities, may enable the storage of applications, including applications that may be provided in a distributed manner, such as amongst a number of device nodes. MBRI nodes may then share data back and forth within the MBRI network. In embodiments, applications running on network nodes may provide application use within the MBRI network apart from any application support from the fixed Internet. For example, an auction support application, set up and distributed to user device nodes in a remote location, may execute application functions within the MBRI network in a manner completely separate from any fixed internet access point. As such, the auction application may provide for a distributed or non-server based application that may provide an application environment that is unique to MBRI.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by providing cooperative processing. In embodiments, cooperative processing may eliminate the requirement for centralized servers to maintain a common state for all application users of the network, may occur at a local node, may permit scaling of the number of users in a manner not limited by server accessibility, may permits scaling of the number of users in a manner not limited by processing, may permit scaling of the number of users in a manner not limited by storage capacity, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by providing cooperative processing. In embodiments, cooperative processing may eliminate the requirement for centralized servers to maintain a common state for all application users of the network, may occur at a local node, may permit scaling of the number of users in a manner not limited by server accessibility, may permits scaling of the number of users in a manner not limited by processing, may permit scaling of the number of users in a manner not limited by storage capacity, and the like.

In embodiments, MBRI may provide for nodes to enter a sleep mode, where sleep mode may be a way to conserve battery power on the node. In embodiments, there may be multiple different kinds of sleep modes with different time scales, where, for instance, some may be as short as 500 microseconds and don't necessarily rely on detecting network activity. Sleep mode may reduce functionality of the node, while maintaining an awareness of neighbor activity, such as detected neighbor traffic, request for routing, a neighbor leaving sleep mode, and the like. In this way, a node in sleep mode may exit sleep mode when it detects activity from a neighbor. In embodiments, the ability for a node to exit sleep mode upon detection of neighbor activity may allow for a number of nodes to be in sleep mode, and for them to reawaken sequentially or serially upon the initiation of network activity.

Figure 58:
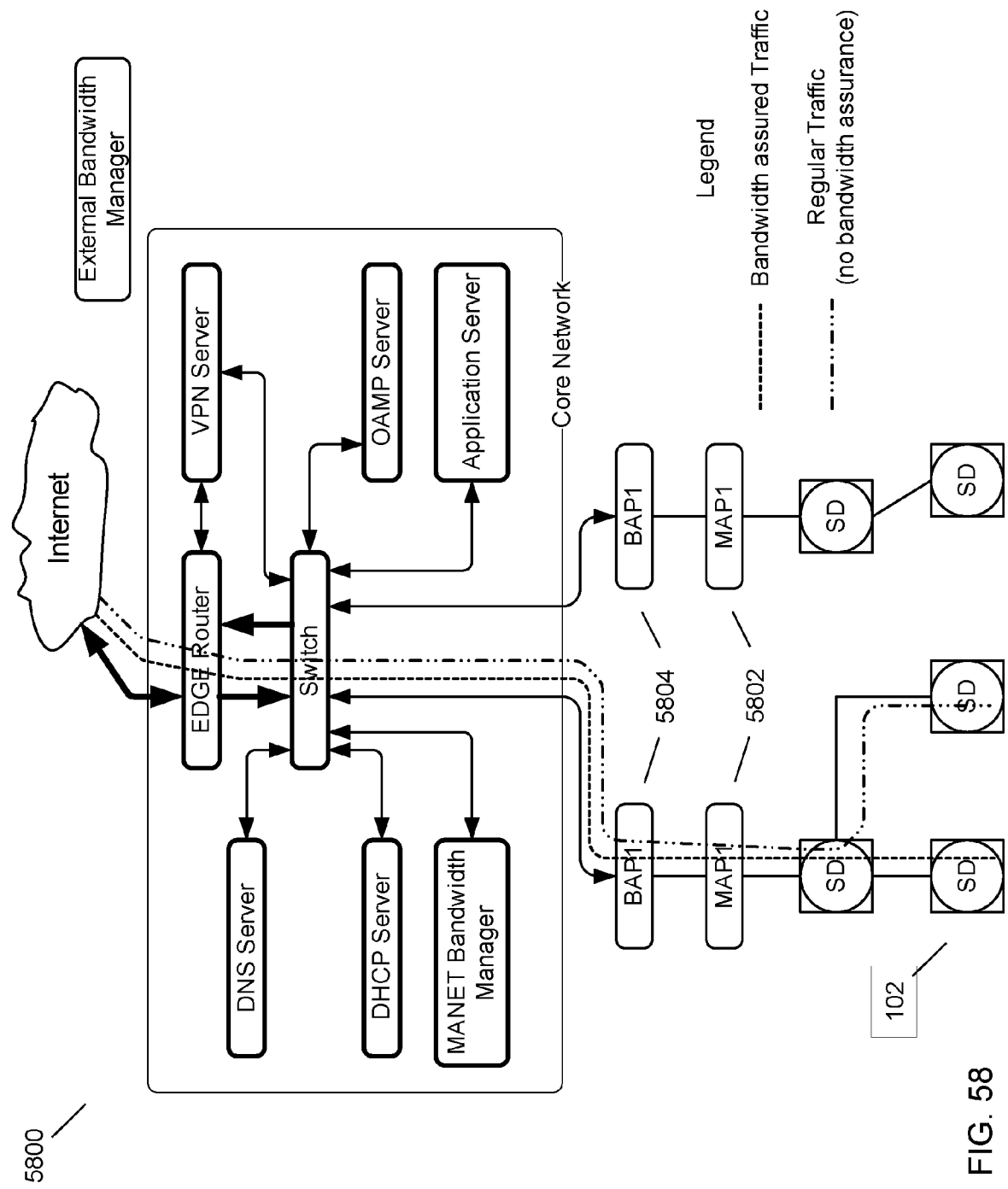
FIG. 58 depicts an embodiment for admission control MANET to Internet data flow.
Figure 59:
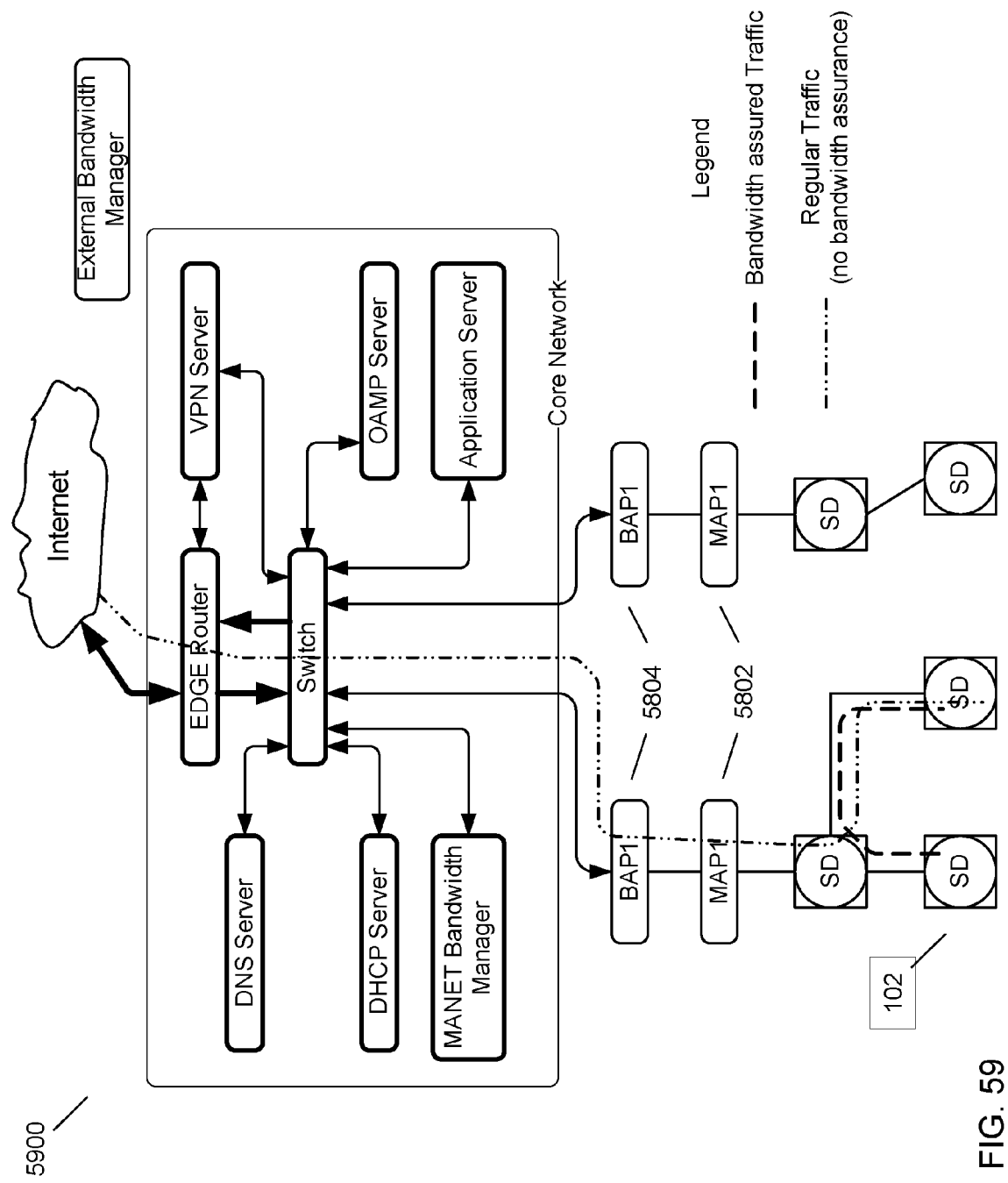
FIG. 59 depicts an embodiment for admission control MANET data flow.
Figure 60:
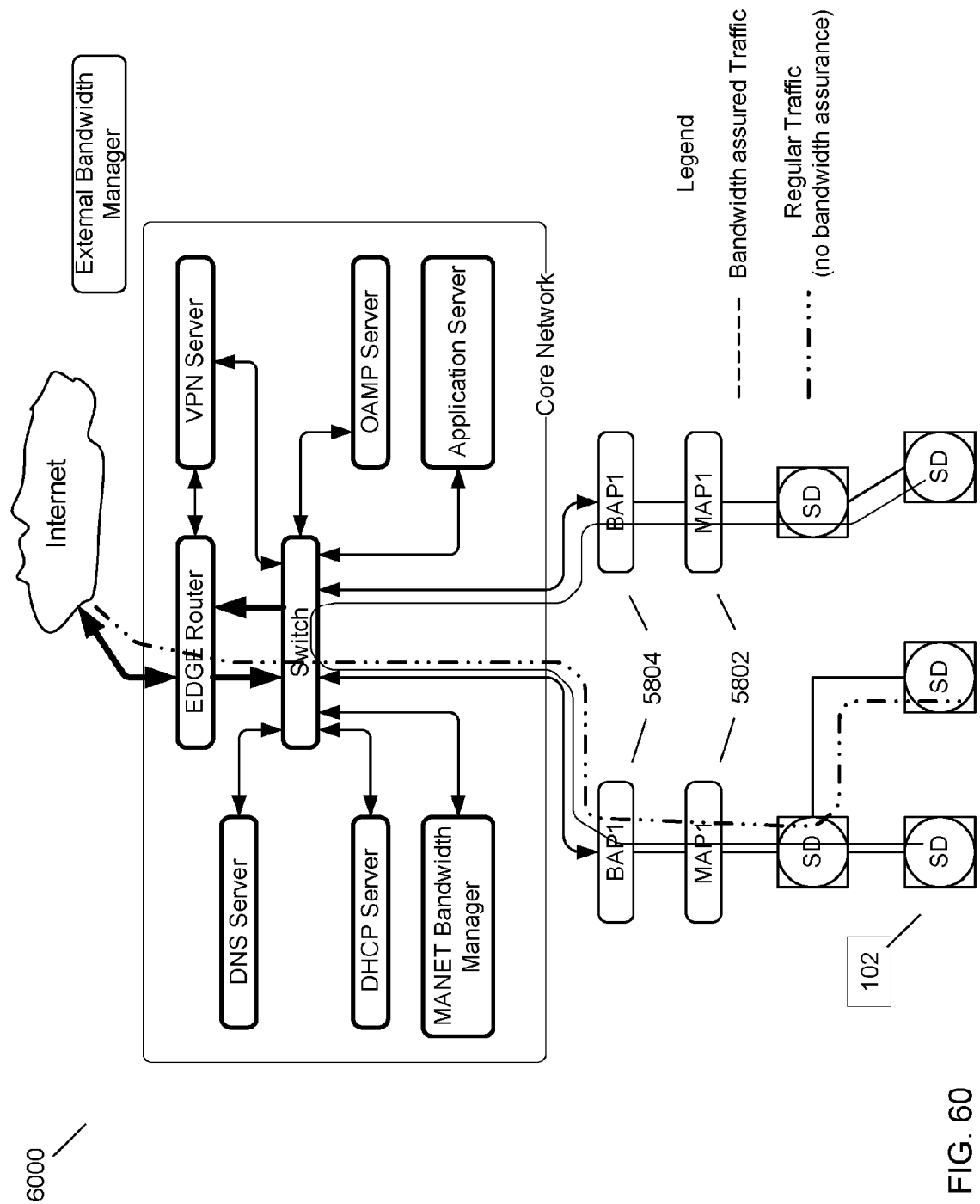
FIG. 60 depicts an embodiment for admission control data flow across different BAP domains.
Figure 61:
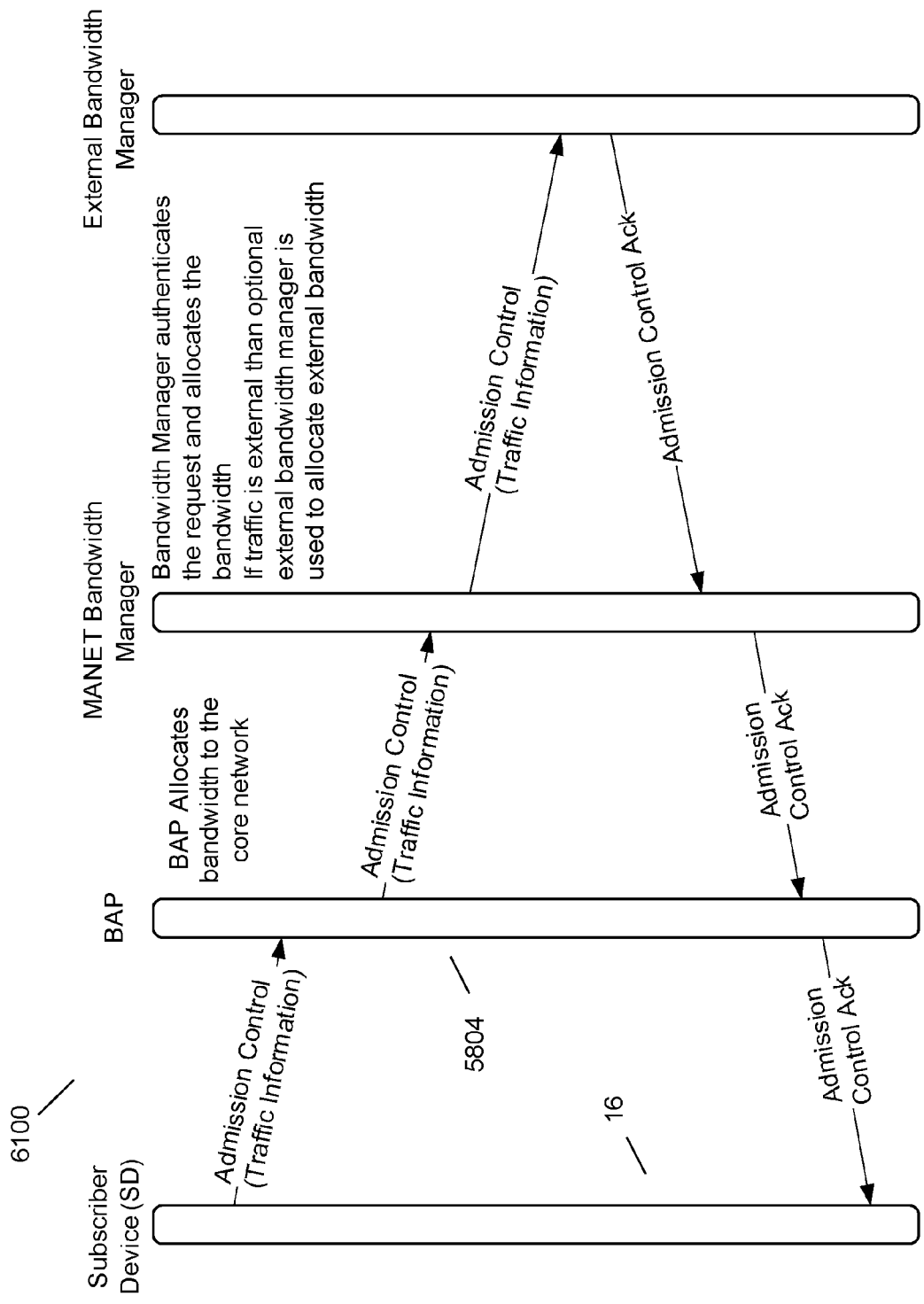
FIG. 61 depicts an embodiment for admission control messages for admission control.

In embodiments, MBRI may support assured bandwidth/admission control, providing traffic admission control capability to the MBRI enabled network, where upon request a subscriber device may be provisioned with assured bandwidth for a session on the MBRI network. A subscriber device requiring guaranteed bandwidth for a specific session or all the session may request the desired bandwidth by sending a control message, such as to a MANET bandwidth manager via BAP. The BAP may allocate the bandwidth towards the core network and pass the request to the MANET bandwidth manager. The MANET bandwidth manager may authenticate the request against a subscriber's class of service and the bandwidth available, if needed it may contact the external bandwidth manager to assure external bandwidth towards the ISPs backbone to the internet Once the request is verified and resources allocated, it may acknowledge the subscriber device with a specific QoS value. Now the subscriber device may use this special QoS value for the traffic, relay nodes may honor this QoS value to assure the bandwidth. The MANET side of the network has a reserved range of QoS values for assured bandwidth applications and each node in the network may honor these QoS values. FIG. 58 shows and example of two different traffic flows 5800, one with bandwidth assured and the other one without. The relay nodes, MAP 5802 and BAPs 5804 may prioritize the bandwidth assured traffic. FIG. 59 shows assured bandwidth between two mobile nodes 5900. In this example a relay node uses QoS values to discriminate between regular traffic and bandwidth assured traffic. FIG. 60 shows assured bandwidth between two different BAP 5804 domains 6000. In this example data flow relay nodes assure bandwidth by honoring the special QoS values. In this scenario BAPs 5804 involved allocated bandwidth on the core network for this traffic. FIG. 61 shows an example control protocol 6100 for a subscriber device going through a bandwidth request.

In embodiments, MBRI may support MANET address resolution protocol (MARP), a mechanism that tracks the dynamic bindings between IP addresses and data link addresses in MANETs. Each device in this type of network may have two addresses: an IP address and a data link address. In this instance, the IP addresses may be static, whereas the data link addresses may be assigned dynamically, and can change over time when devices move from one location to another. Whenever an IP datagram is to be sent by one device to another, it may be encapsulated with a data link header that specifies the current data link address that corresponds to the destination IP address. MARP helps to ensure that the correct destination data link addresses are available when IP datagrams are forwarded in MANETs. In embodiments, the Internet protocol ARP (RFC 826) may provide an IP address to data link address binding service for broadcast LANs, such as the Ethernet. However, MANET technologies may not provide the broadcast data link service that ARP requires for correct operation, consequently, ARP may not be used by MANETs. MARP may provide ARP services for MANETs.

In embodiments, MARP may maintain dynamic databases of the bindings between data link and IP addresses. An authoritative, master database may be maintained on a server that is accessible by all devices via the MANET's data link unicast service. Entries from this database may be cached on each device for the purpose of assigning data link addresses when IP datagrams are encapsulated in preparation for forwarding to their destinations. In embodiments, MARP may use an aging process that discards entries when they are not refreshed, where aging may prevent the retention of bindings from nodes that have lost network connectivity. The protocol may be invoked when certain events occur, such as a registration, where each time a device is assigned a data link address it registers its new binding by sending a message that contains the current binding to the master database (the master database time may stamp the binding and store it); resolution, where a device needs a binding that is not available in its local cache, it retrieves the current one from the authoritative cache, by sending a request and receiving a response (the up-to-date binding may then be time-stamped by the device and stored in its cache); aging, where each device, and the master database, ages out the entries in its cache by examining their time stamps and discarding any bindings that exceed a specified life time; and the like. MARP, when run on a device, may update its cached bindings by issuing proactive resolution requests before entries expire, and repeating its own registration before its entry in the master database expires. Aging may be necessary for the elimination of cache entries that refer to hosts that are no longer reachable. Registration may need to be repeated at a rate that exceeds the aging rate. In embodiments, MARP may replace the ARP protocol (RFC 826) that was designed to provide an address binding service for Ethernet LANs. MARP may operate on a data link that provides a basic unicast service, that supports dynamic IP address to data link address bindings thereby increasing scalability, that supports dynamic IP address to data link address bindings thereby increasing scalability.

In embodiments, MBRI may support traffic policing, where nodes on the network may monitor, adjust, and take action with respect to network traffic. Network traffic policing may be for the purposes of security, quality of service, maintenance, contract compliance, and the like. For instance, policing may occur within a single node at its ingress point to the MBRI. The device may police the amount of traffic that is trying to enter the network. If the traffic exceeds the negotiated contract, the device may prevent some of the data from entering the network.

In embodiments, MBRI may provide traffic shaping on the network, such as per flow, per node, per MAP 5802/BAP 5804, and the like. In a similar fashion as for traffic policing, as described herein, traffic shaping may be realized through monitoring network activity, such as by an individual node, by neighboring nodes, throughout the network, and the like. For example, traffic shaping may be associated with the process of smoothing the burstiness in time of offered traffic so that a more uniform offered load is presented to the ingress point of the network. In embodiments, traffic in MBRI components may go through an L3 fast pipe 6200, such as described herein, and shown in FIG. 62. In embodiments, host traffic may be inspected on two edges of the network, such as at the subscriber device and at the BAP. Based on subscriber class of service traffic type the L3 fast pipe may offer traffic shaping to optimize the network load. Traffic types (e.g. real time voice/video or mp3 streaming etc.) may be used to calculate traffic priorities, and higher priority traffic (e.g. real time voice) may then take preference over non real time type traffic (e.g. mp3 download via FTP). Policy enforcement logic may be used to decide if a certain type of traffic is allowed via MBRI, such as a subscriber signing up for a WAP-only plan, and not being allowed an mp3 download via FTP. In addition, policy enforcement may also restrict bandwidth usage by a certain subscriber to optimize network load.

In embodiments, MBRI may provide automatic retransmission request (ARQ) functionality, where a node may receive a transmission from a node and request a retransmission because of a detected anomaly. For instance, the receiving node may detect a checksum error or the like, and as a result may request a retransmission from the sending node. In embodiments, automatic retransmission request functionality may improve transmission reliability and overall quality of service.

In embodiments, MBRI may provide for forward error correction (FEC) on long IP packets. FEC is a system of error control for data transmission, whereby the sender node adds redundant data to its messages, also known as an error correction code. This allows the receiving node to detect and correct errors (within some bound) without the need to ask the sender node for additional data. The advantage of forward error correction is that a back-channel is not required, or that retransmission of data can often be avoided, at the cost of higher bandwidth requirements on average. In embodiments, FEC may be applied in situations where retransmissions are relatively costly or impossible.

Figure 63:
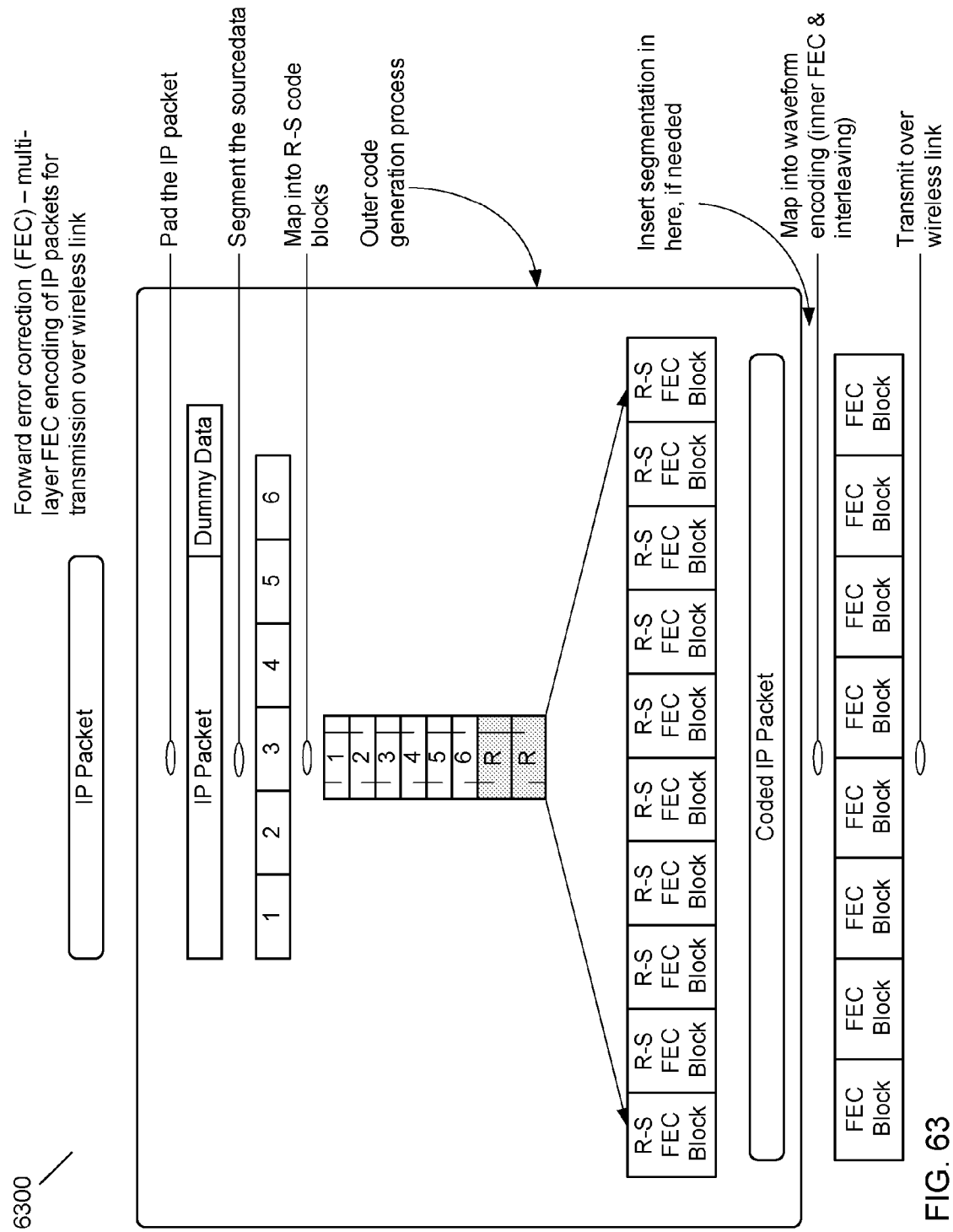
FIG. 63 depicts an embodiment for forward error correction associated with multi-layer FEC encoding of IP packets for transmission over a wireless link.
Figure 64:
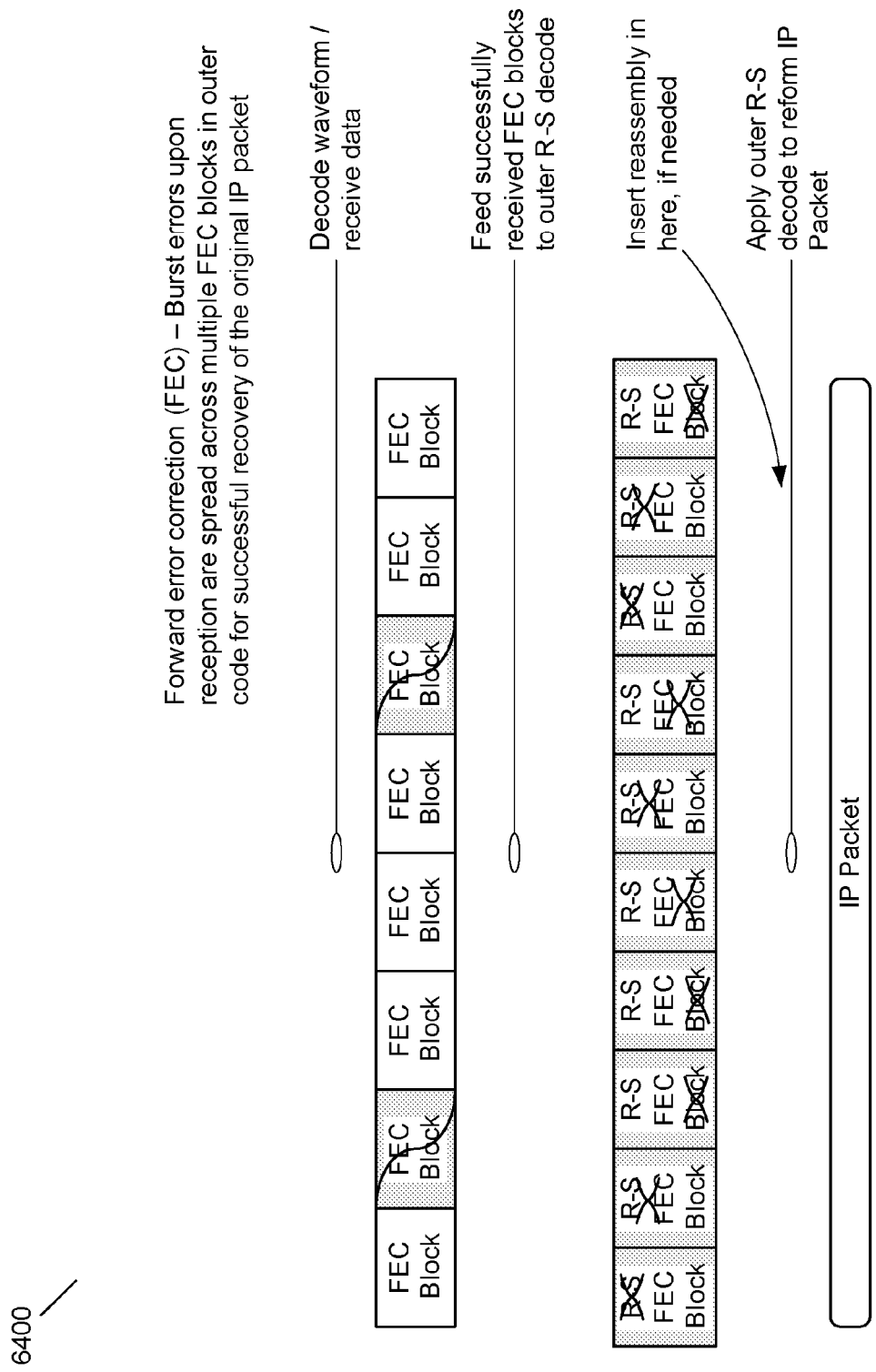
FIG. 64 depicts an embodiment for forward error correction associated with burst errors upon reception.
Figure 65:
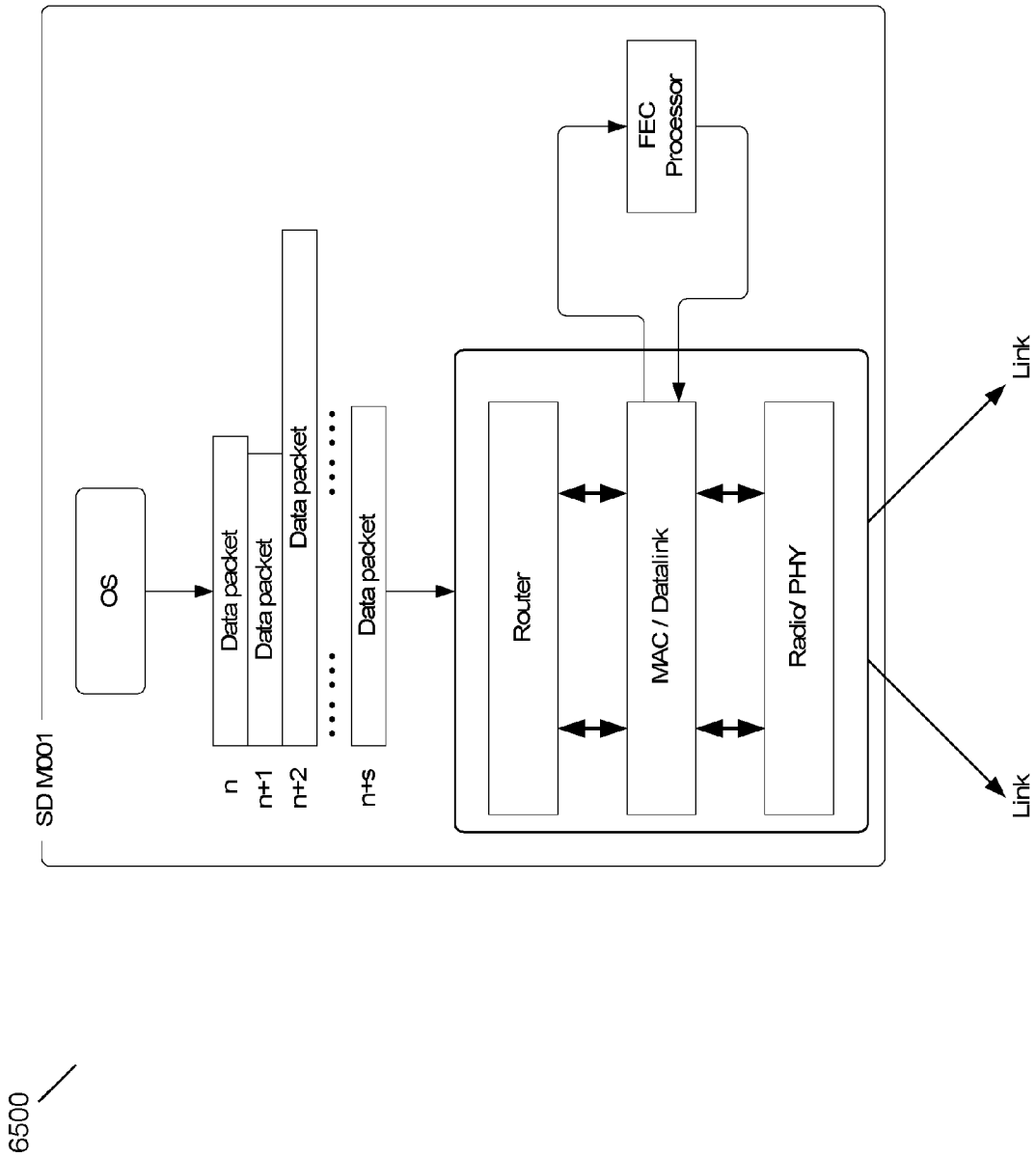
FIG. 65 depicts an embodiment for forward error correction associated with packet length.

In embodiments, MBRI transmissions may occur in units of slots, where each slot may contain multiple data blocks that are forward error correction (FEC) encoded to provide robustness to bit errors. In multipath propagation, some bursts may contain residual errors for a slot error rate (SLER), such as on the order of 1-5%, even after the inner FEC is applied. In MBRI, IP packets may be often divided up into multiple segments for transmission over multiple TDMA time slots. Even when the packet is not divided across multiple time slots, the packet may be divided across multiple FEC blocks. If one segment (or inner FEC block) is lost due to burst errors, the entire IP packet may be lost. This results in the transport layer (e.g., TCP) experiencing a higher loss rate. The TCP protocol may react by reducing the offered load on the network and consequently the throughput experienced by the user. This problem may be solved by applying an additional layer of FEC (i.e., an outer code) to long IP packets (longer than 1000 Bytes) so that slots experiencing residual errors can be corrected to construct the full IP packet before being sent up the protocol stack for interpretation by TCP. For the purposes of illustration, the encoding process is shown for a single IP Packet 6300 in FIG. 63. The method may be applied to any length or grouping of payload data for transmission over a wireless link. In this example, first the IP packet is segmented. Dummy data may be appended to form an integer number of segments. Next, an outer FEC code is applied across the data segments—a Reed-Solomon (R-S) code is depicted in the figure, but the approach is general to accept any FEC code. Multiple R-S blocks are combined to form a coded representation of the original IP packet. This data is then encoded according to the defined waveform format that includes interleaving and FEC (an inner code) for transmission over a wireless link. The coded IP packets may be segmented prior to waveform encoding as part of a Segmentation & Reassembly (SAR) process for aligning data payload with TDMA slot payload. The receive process 6400 is shown in FIG. 64. The individual waveform FEC blocks contain some residual burst errors (indicated by a red 'X'). The bursty error bits are disbursed across the multiple blocks in the outer code. Each code block contains a small enough quantity of errored bits such that the data is recovered error-free. Reassembly (if applicable) is applied after successful data recovery to form the original IP Packet. As an extension, the individual blocks that comprise the coded data may be routed over different paths between a common source and destination in order to provide route diversity for performance improvements. Additionally, the code rate of the outer code may be dynamically adjusted to compensate for varying link burst error rate conditions. FIG. 65 provides one embodiment of how packet length dependent FEC may be implemented 6500 in MBRI.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by providing at least two layers of forward error correction on long data packets to improve data transmission. In embodiments, the L2 FEC may be applied in conjunction with segmentation and reassembly (SAR) to match data to TDMA slot payloads.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by providing at least two layers of forward error correction on long data packets to improve data transmission. In embodiments, the L2 FEC may be applied in conjunction with segmentation and reassembly (SAR) to match data to TDMA slot payloads.

Figure 66:
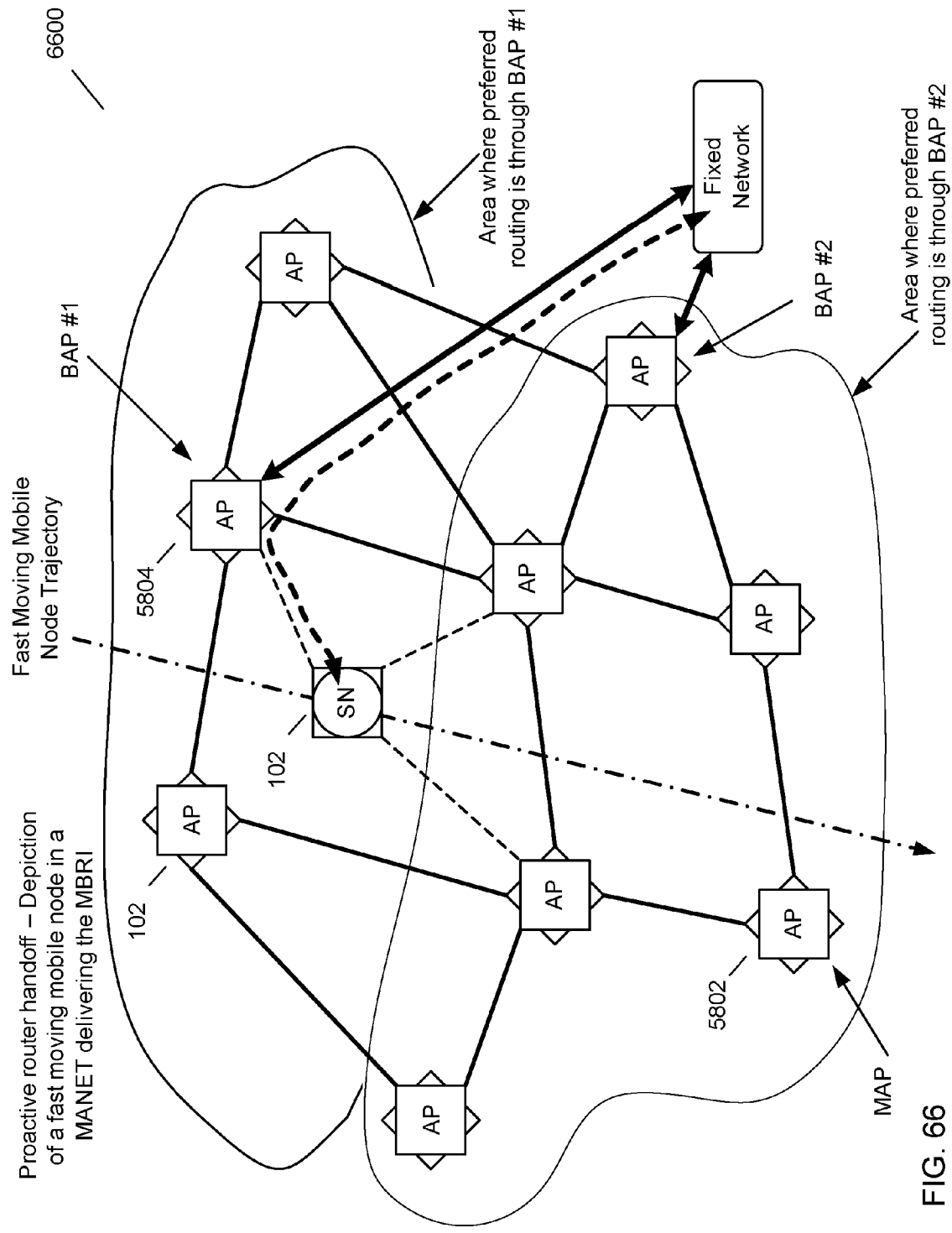
FIG. 66 depicts an embodiment for proactive router handoff.
Figure 67:
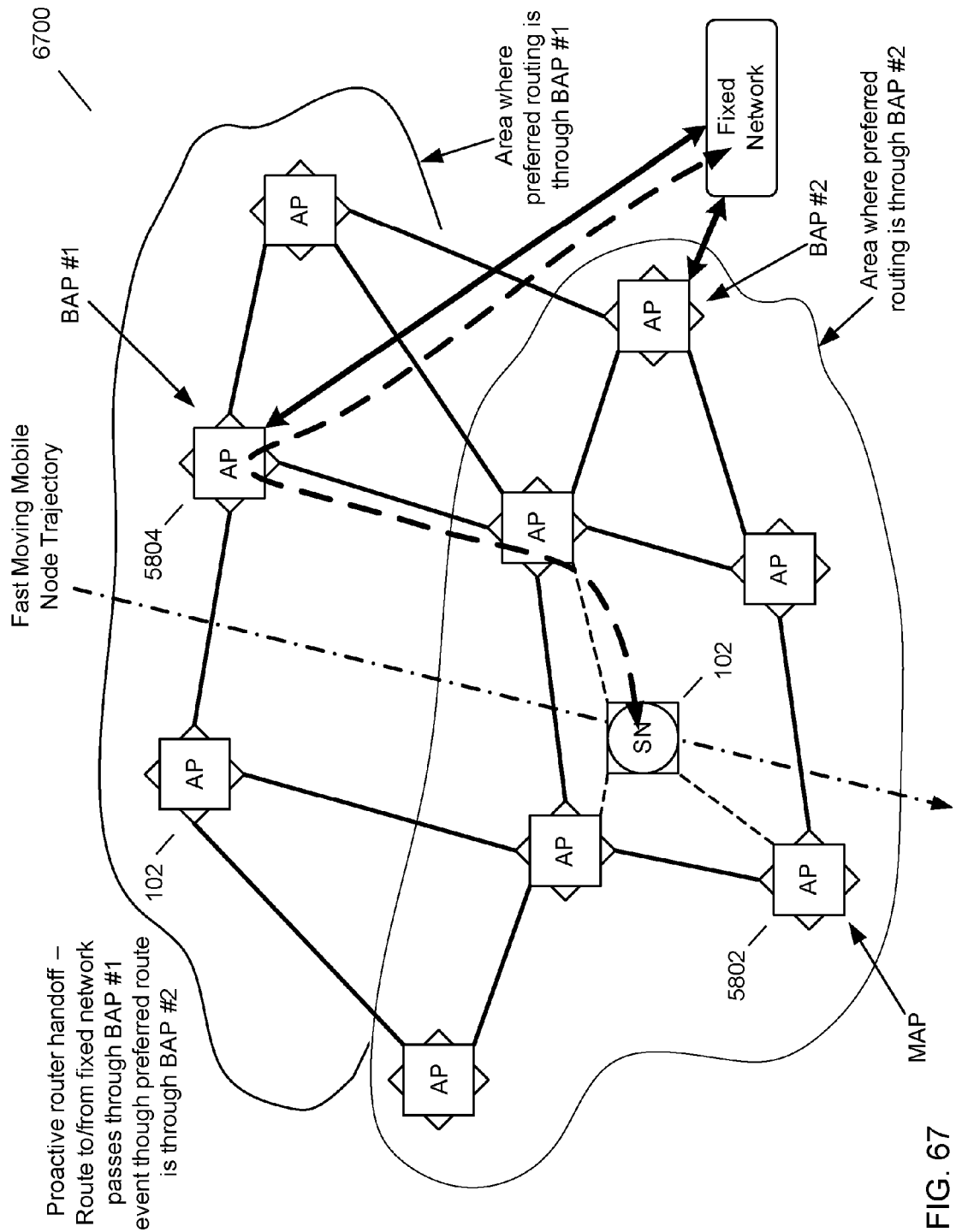
FIG. 67 depicts an embodiment for proactive router handoff showing a preferred route associated with a first BAP encountered.
Figure 68:
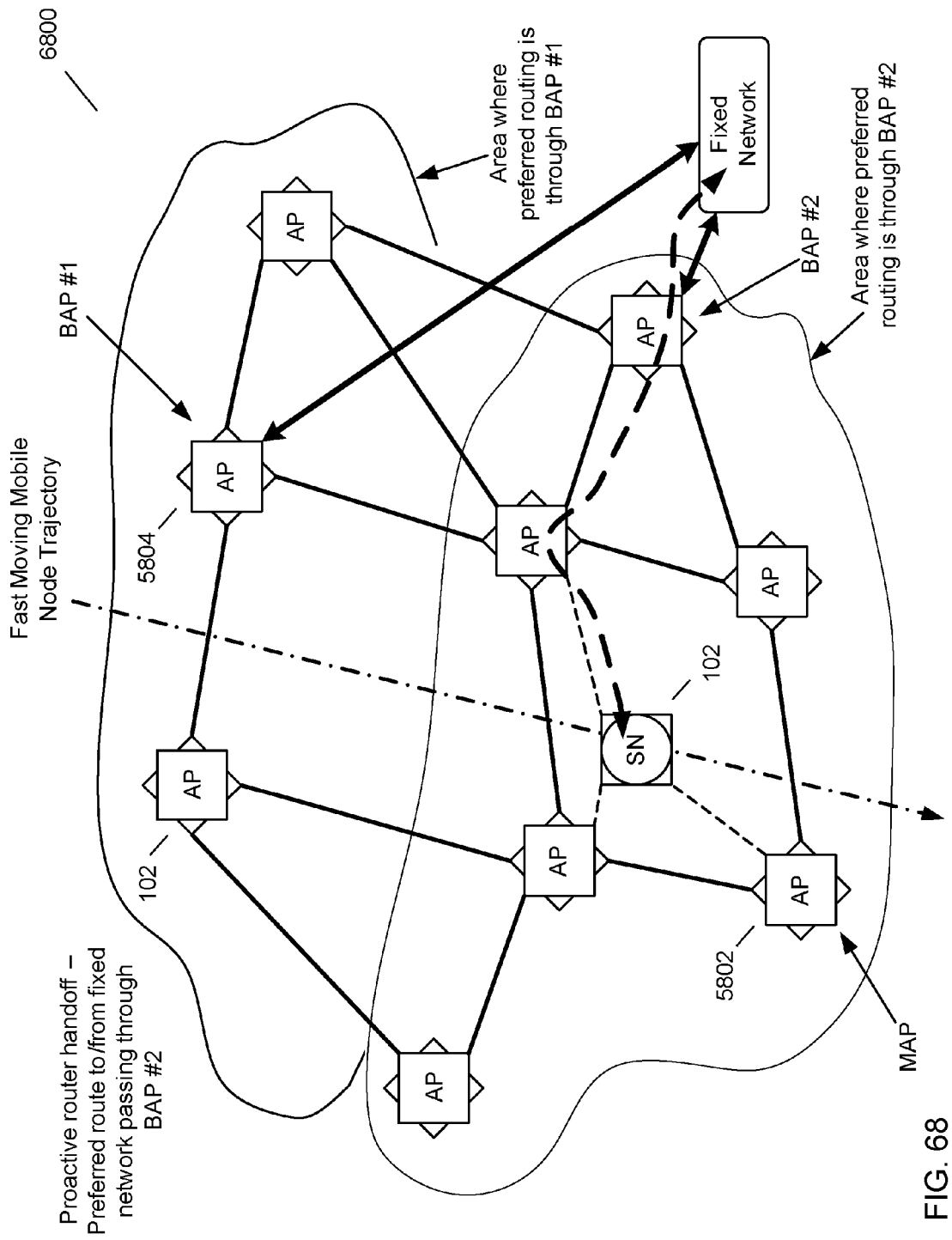
FIG. 68 depicts an embodiment for proactive router handoff showing a preferred route associated with a second BAP encountered.

In embodiments, MBRI may provide proactive router handoff capabilities in order to accommodate fast moving nodes. Consider the following example, without limitation, of a fast moving mobile node in the network 6600 shown in FIG. 66. Multiple fixed (MAPs 5802 and two BAPs 5804 are shown to form a spanning network to provide coverage in a region. Links between access points are indicated by the light blue solid lines. A fast moving mobile node (yellow circle) follows a trajectory indicated by the thin dotted line. Links to nearby access points are indicated by magenta solid lines. A route that connects the mobile to the fixed network is formed through a BAP 5804 (indicated by thick dashed line). Based on node location in the region, connectivity through one or the other of the BAPs 5804 is preferred (for network efficiency). As the node traverses the region where the network is deployed, links change. In the basic MBRI, routes reactively update to link state changes. This necessarily leads to a delay between when the links change and when the routes are updated. FIG. 67 shows the mobile node after it has crossed over 6700 into the area where the preferred routing is through BAP #2 5804. However, due to the reactive routing updates, the route to/from the fixed network remains through BAP #1 5804. Depending on node velocity and routing update rate, the links may change again before route updates are completed. This results in data from the fixed network traversing an inefficient path that is always trying to "catch up" to the mobile node as it moves through the network. The impact is additional hopping 6800 leading to increased latency and decreased network capacity. The preferred route through BAP #2 5804 is shown in FIG. 68. Rather than waiting for reactive routes to adjust, proactive routes are formed. The first step is to identify fast moving mobile nodes in the network that might require proactive routing updates. Identification can occur in a variety of ways to include Doppler estimates from the received signals, geo-location estimates of mobile node location, and interpretation of the rate of change of link state variables. The predictive routing algorithms may use knowledge of the location of fixed infrastructure (MAPs 5804 and BAPs 5808) and the anticipated location of the fast moving mobile node to adjust routes based on the predicted link states/costs in the network. In this manner, the route may be updated before waiting for the link cost to reflect the change indicating that a route update is needed, and further waiting for the route to actually be updated. In embodiments, proactive router handoff may provide a way for MBRI to be extended to nodes in vehicles, and so, out onto a road network.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI operation by adapting selected routes based on anticipated future position of mobile network nodes. In embodiments, the adapting may be based on observations of geo-location, on Doppler shift of node transmissions, on interpretation of the rate of change of certain link state variables, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI operation by adapting selected routes based on anticipated future position of mobile network nodes. In embodiments, the adapting may be based on observations of geo-location, on Doppler shift of node transmissions, on interpretation of the rate of change of certain link state variables, and the like.

Figure 69:
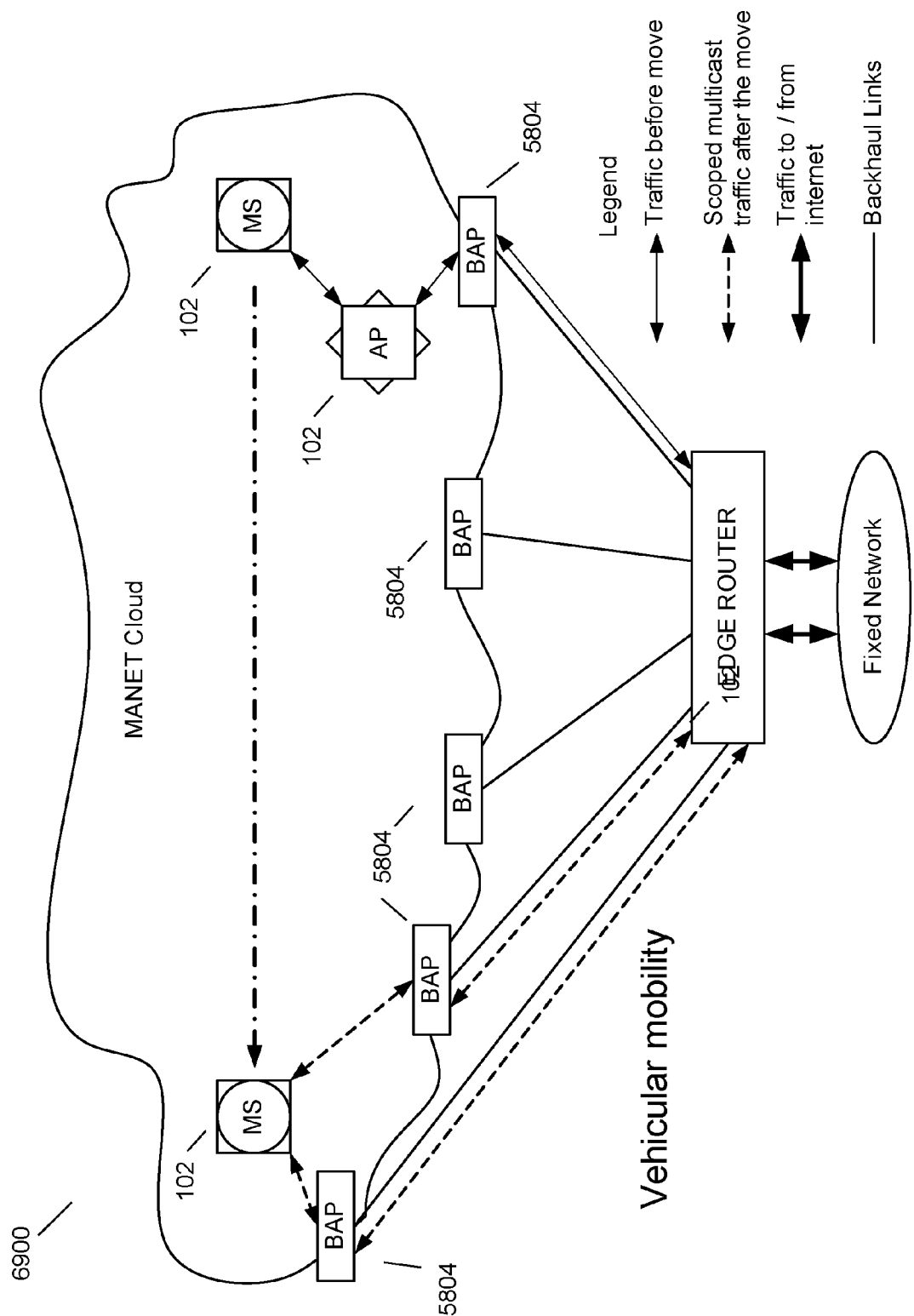
FIG. 69 depicts an embodiment for vehicular mobility.

In embodiments, MBRI may provide for vehicular mobility-vector based routing 6900, providing optimum routing of traffic to and from nodes moving at vehicular speeds for MBRI network, such as shown in FIG. 69. When mobile nodes travel at a faster speed than it takes MANET networks to converge, it may cause a mobile node to miss data as the data is routed via nodes that are no longer reachable. A node, in a vehicle may be able to determine a mobility-vector for the sake of establishing and/or maintaining routing within an MBRI network structure as the node moves. In embodiments, a node may be in a vehicle as a result of being mounted in the vehicle, carried into the vehicle by a user of a mobile device, temporarily mounted on the vehicle, and the like. The node in the vehicle may determine the vehicular mobility-vector in a plurality of ways, such as detecting and monitoring link parameters, including power level, data rate capabilities, and the like; through relative or absolute directionality associated with the motion of the vehicle or surrounding nodes; through information supplied by neighboring nodes; and the like. In embodiments MBRI may provide certain rules or capabilities associated with routing in association with nodes in rapid motion, such as vehicular mobile nodes may not participate in relay of traffic of stationary (or lower speed) nodes, minimize the ripple in topology caused by fast moving node; preferentially directing the communications of vehicular mobile nodes with AP as long as power requirements are met (i.e. it may not need high power to transmit); vehicular mobile nodes may hand off to an overlay cellular network if the only routing choice available is high power transmission; vehicular mobile nodes may attempt to relay thru other vehicular mobile nodes if the other mobile nodes are travelling in the same direction and towards AP; an edge router (ER) may calculate the speed and vector of the mobile node by using GPS and/or TDOA; ER anticipates a scoped region where a mobile node is for the return traffic; ER may send scoped multicast traffic to the nodes in that anticipated area where the vehicle is expected; nodes when discovering a vehicle in their area may relay that traffic to the vehicular mobile node; and the like. In embodiments, vehicular mobile-vectoring may enable an AP predicting the possible mobile node location based on mobility, GPS, speed, vector and other characteristics; AP using scoped multicasting to send data to all the possible locations; Mobile nodes discriminating highly mobile nodes from routing calculations to avoid excessive route ripple; and the like. In embodiments, vehicular mobility-vector based routing may better enable MBRI to extend connectivity to nodes moving at vehicle speeds, and thus across a road system.

Figure 78:
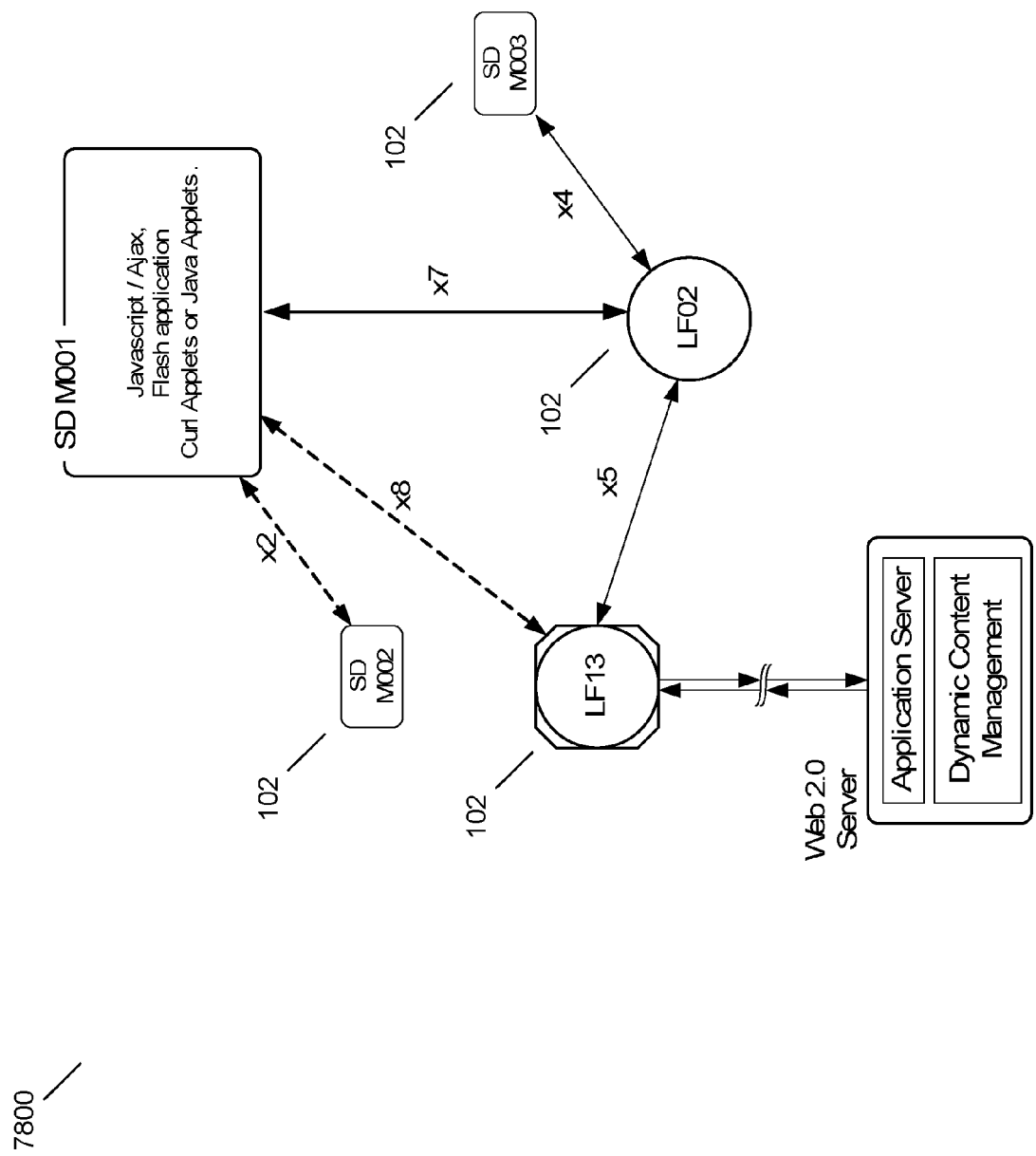
FIG. 78 depicts an embodiment associated with MBRI being Web 2.0 capable.

In embodiments, MBRI may provide a device to device environment where files and applications may be generated, shared, deployed, transferred, downloaded, distributed amongst a plurality of devices, and the like. For instance, MBRI may provide benefits associated with being Web 2.0 ready. Web 2.0 is a term describing the trend in the use of World Wide Web technology and web design that aims to enhance creativity, information sharing, collaboration among users, and the like. These concepts have led to the development and evolution of web-based communities and hosted services, such as social-networking sites, wikis, blogs, folksonomies, and the like. MBRI, representing a mobile extension of the Internet, may better enable these services. In addition, MBRI may provide aspects of a local distributed computing presence, which better enables these services at a local level. In embodiments, MBRI, through device node capabilities and MBRI neighbor node awareness capabilities, may provide the facility for these direct-to-device application deployments, distributed processing, application file sharing, and the like. In addition, MBRI nodes, having the capability to manage transfer and routing of this data along with throughput traffic, may be able to provide this peer to peer distributed processing and file sharing in a manner that does not degrade system performance. Because of MBRI's ability to control, manage, and shape data traffic amongst network nodes, these nodes may also be able provide direct device-to-device peering with symmetrical throughput, where traffic and data transfers are managed to maintain an even flow of data amongst the nodes of the MBRI network. FIG. 78 illustrates one embodiments of how Web 2.0 applications may be implemented 7800 within MBRI.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by providing a native-IP context, where the native-IP context may be indistinguishable from fixed IP networks. In embodiments, the native-IP transport may be in large part symmetrical. In embodiments, the native-IP transport may support Web 2.0 applications.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by providing a native-IP context, where the native-IP context may be indistinguishable from fixed IP networks. In embodiments, the native-IP transport may be in large part symmetrical. In embodiments, the native-IP transport may support Web 2.0 applications.

MBRI, being Web 2.0 ready, may provide for new end user applications, and entirely local mobile Internet applications, where applications may be created that are unique to the mobile Internet environment that MBRI creates. For instance, an instant picture sharing application could be created that takes advantage of many users taking pictures of an event or location at the same time. In this instance, MBRI may allow the real-time, or near real-time sharing and distribution of photos to the users within a swarm or local area. In embodiments, new end user applications may be created that are unique to MBRI, where users may be able to share, utilize, distribute data in ways only available to a mobile Internet environment, such as with MBRI's self managed node routing and neighbor awareness.

In embodiments, the present invention may implement a method for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by using nodes to serve Web 2.0 applications directly to other nodes in a peer-to-peer fashion. In embodiments, the Web 2.0 applications may not require the transmission back and forth to other central nodes. In embodiments, the Web 2.0 application capability may not be provided within each node without the intermediate step of discovery at a central node of how to connect source and destination nodes.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and where MBRI may be enhanced by using nodes to serve Web 2.0 applications directly to other nodes in a peer-to-peer fashion. In embodiments, the Web 2.0 applications may not require the transmission back and forth to other central nodes. In embodiments, the Web 2.0 application capability may not be provided within each node without the intermediate step of discovery at a central node of how to connect source and destination nodes.

In embodiments, MBRI may provide broadband throughput data rates to mobile subscriber devices, such as enabled by high data rate backhaul access points to the fixed internet, and high data rate inter-node links. Broadband access for a user may be additionally enabled by high data rate MAP and CAP connections. In embodiments, quality of service may be better ensured through MBRI by way of multiple high data rate access points for any given local swarm of user nodes.

In embodiments, an end-user may participate in the deployment of a device onto the network, such as when the user enters the MBRI network, first connects to the MBRI network, and the like. That is, a user may want to, or have to, perform some act or function in order for their device to begin acting as a node on the network, and thereby be provided the services and access available from the Internet through MBRI. For example, the user may be charged a fee for access to the mobile Internet, and so the user may want a function that manually enables or disables their access. Alternatively, a user may have to provide some form of identification, whether manually or automatically, in order to gain access to the mobile network. In embodiments, this process may be provided in a transparent manner, where the user has previously set up a profile for the conditions under which they connect, and under these conditions, the user may be automatically connected.

In embodiments, a combination of enhancements and capabilities may be provided in a given configuration of the invention. For example, a more comprehensive, commercial-grade MBRI may include the totality of MBRI-Enhancements and MBRI Basic capabilities. In addition, any of the MBRI capabilities may be combined with dynamic spectrum access capabilities. In embodiments, combinations of enhancements and capabilities may be made available to service providers in the form of tools to manage operation and consumption of resources in a mobile Internet environment. For example, certain resources may be made to be restricted, such as bandwidth, application accessibility, multi-session capability, shared resource capabilities, quality of service level, and the like. In this way, service providers may be able to establish different costs for different access to resources, and control the use of resources in a given environment, network, device, and the like.

In embodiments, the design and deployment of field radio network infrastructure for outdoor and indoor environments may be a complex, costly, and time consuming process. Some of the design and deployment considerations that may need to be addressed for effective field radio network system design engineering and deployment planning to meet field system performance specifications may include physical factors such as geographic topology, area building infrastructure, line-of-site, available telecom infrastructure, radio frequency interference and propagation factors (e.g. foliage, occlusion), suitable radio installation site availability, network volume demand profile, outdoor and indoor coverage requirements, and the like. The MBRI system of the present invention may address these environmental conditions in a manner that may simplify the complexity and substantially lessen the cost and time required to design a radio network for the field, plan for its deployment and execute deployment where the MBRI technology platform is employed.

In embodiments, the MBRI system may enable network engineers and deployment managers to change the nature of the field network design, deployment planning and deployment process in a plurality of areas, including 1.) efficient use of real estate required for fixed radio installation, 2.) efficient connection to other wired telecom infrastructure required for connection to other networks, 3.) low cost and fast network design engineering and deployment planning, 4.) low cost, fast deployment and network turn-up, 5.) low cost and fast capacity expansion and network upgrade, 6.) seamless outdoor and indoor operation, 7.) network end-user deployment participation, and the like. In embodiments, this present invention may change the logic of field radio network design deployment and management from up-front complex, high-cost and time consuming network design and field based RF engineering and installation, to highly automated, low cost and rapid up-front network design and deployment planning with a rapid and low cost deployment and network installation process.

In embodiments, the present invention may provide for efficient use of existing real estate for fixed radio installation. Physical sites may be required to deploy fixed radios that connect to end-user devices and backhaul traffic to and from end-user devices and other networks. The availability of suitable real estate sites in the relevant geography to accommodate sufficient fixed radio installation may be a function of radio size, weight, power requirements, the inter-radio networking scheme including, radiated power, propagation and routing, and the like, all of which may be inherent in the radio system design. The MBRI MAP and BAP access side and backhaul side mesh routing capabilities, backhaul load balancing, RF propagation and routing capabilities, size, weight, form-factors, antennae options and powering options may allow an MBRI network to be deployable to a range of many more candidate real estate locations for fixed site installation in any given geography than other field deployed radio networks. Thus, an optimal subset from this larger set of candidate locations may be selected that may meet the lowest cost, easiest to install and also satisfy network radio propagation and performance requirements.

In embodiments, the present invention may provide for efficient connection to other wired telecom infrastructure required for connection to other networks, including field deployed radio networks, tower-based assets (e.g. backup batteries and antennas), and the like. Field deployed radio networks may require connection to other wired telecom infrastructure to effectuate traffic transfer with other networks such as the Internet, the PSTN, other wireless networks, and the like. The availability, location, complexity and cost associated with accessing and equipping the wired telecom infrastructure connection points, such as fiber, copper, coax of Telcos, MSOs, and the like, to accept connection to the field deployed radio network may be a significant factor affecting field radio network architecture design, deployment planning, deployment, and installation. The MBRI MAP and BAP access side and backhaul side mesh routing capabilities, backhaul load balancing, RF propagation and routing capabilities, size, weight, form-factors, antennae options and powering options may allow an MBRI network to be deployable to a range of many more candidate real estate locations for fixed site installation in any given geography than other field deployed radio networks while also concurrently satisfying radio propagation and network performance requirements. Thus, the selection of optimal wired network connection points may be made easier in that the optimal, lowest cost, easiest to access and upgrade wired infrastructure connection points may be selected from among those available in any given geography. In embodiments, an MBRI field network design may start with the optimal selection of the required wired telecom infrastructure BAP connection points for the specified network backhaul capacity in any given geography and then proceed to the selection of the remainder of optimal MAP points. This may be the reverse of how field radio network systems are designed today, where optimal radio propagation coverage is determined first and then the network backhaul is constructed to meet it at optimal RF based location selections, adding complexity, cost and time. The MBRI system flexibility may significantly increase the options for inexpensive fixed radio location design and deployment, thus allowing for optimal backhaul BAP location selection first and then solving for meeting propagation specifications by deploying the number of MAPs needed at the most efficient locations to do so.

In embodiments, the present invention may provide for low cost and fast network design engineering and deployment planning. The availability of information and data regarding the geographic topology, area building infrastructure, line-of-site, available telecom infrastructure, radio frequency interference and propagation (e.g. foliage, occlusion), and the like. may be available in a variety of data based information sources from municipalities and private enterprise sources. This data may be organized and structured in a manner that may be evaluated to solve the multidimensional network design problem for the geographic specific network architecture design that is optimized concurrently and equally for low cost deployment and ongoing operations, addressing these complex environmental factors with a flexible network technology, in addition to achieving economically efficient high-performance scale operation. In embodiments, the MBRI MAP and BAP access side and backhaul side mesh routing capabilities, backhaul load balancing, RF propagation and routing capabilities, size, weight, form-factors, antennae options and powering options may allow an MBRI network to be deployable in any environment where complex radio engineering formerly performed in the field at high cost may now be replaced with automated desk-top MBRI designing capabilities where environmental factors affecting network performance may be addressed by incorporating additional meshed MAPs and BAPs as required to satisfy performance specifications while also meeting lowest cost deployment objectives. In embodiments, an automated design tool incorporating the technical design factors for the MBRI network technology interacting with the structured environmental factor data may be designed and operated. This tool capability when used in unison with the MBRI network technology may substantially lower the cost and time required for network architecture design in any given geography as well as the deployment planning program design.

In embodiments, the present invention may provide for low cost, fast deployment and network turn-up. The MBRI MAP and BAP access side and backhaul side mesh routing capabilities, backhaul load balancing, RF propagation and routing capabilities, size, weight, form-factors, antennae options and powering, including its ad-hoc, self-healing and self-forming attributes may enable a highly simplified, low labor intensive, low cast and rapid network deployment, installation and turn-up. In embodiments, fixed radio sites may be optimally selected to meet network propagation and performance requirements while concurrently being optimized for easy and low cost for site: acquisition, physical accessibility and preparation, rental and ongoing maintenance costs, and the like. A sufficient number of them may be chosen in any given geography to better assure for required network geographic coverage propagation and performance; in essence, more low cost MAPs may be added as necessary to "fill-in" propagation "holes" and to "reach" difficult coverage areas as a trade-off for fewer more expensive radios located at more costly sites, requiring complex RF designs and labor intensive field based RF engineering.

In embodiments, the present invention may implement a method for providing a mobile, broadband, routable internet (MBRI), in which a plurality of mobile devices interact as nodes in a mobile ad hoc network and in which packets are IP routable to the individual device independent of fixed infrastructure elements; and enhancing MBRI by providing degrees of freedom in pre-selecting real estate locations and allowing MBRI's self forming, self healing properties to provide coverage solutions. In embodiments, the coverage solution may minimize RF planning, eliminate RF planning, reduce labor content of site engineering, reduce complexity of site acquisition, reduce site rental locations, allow for ease of implementation, access to backhaul points of presence, and the like.

In embodiments, the present invention may implement a system for a mobile, broadband, routable internet (MBRI), in which a plurality of mobile devices interact as nodes in a mobile ad hoc network and in which packets are IP routable to the individual device independent of fixed infrastructure elements; and the network capable of enhancing MBRI by providing degrees of freedom in pre-selecting real estate locations and allowing MBRI's self forming, self healing properties to provide coverage solutions. In embodiments, the coverage solution may minimize RF planning, eliminate RF planning, reduce labor content of site engineering, reduce complexity of site acquisition, reduce site rental locations, allow for ease of implementation, access to backhaul points of presence, and the like.

In embodiments, the present invention may provide for low cost and fast capacity expansion and network upgrade. The MBRI MAP and BAP access side and backhaul side mesh routing capabilities, RF propagation and routing capabilities, size, weight, form-factors, antennae options and powering, including its ad-hoc, self-healing and self-forming attributes may enable a highly simplified, low labor intensive, low cast and rapid network capacity expansion and network up-grade. In embodiments, backhaul load balancing may be an automatic feature of the MANET, and scale proportionally in relation to the number of BAPs. A field radio network design, deployment and ongoing management plan may include provisions for planned and unplanned network capacity expansions. As with the nature of the MBRI network system initial design and deployment innovations, any network capacity expansion, either permanent or temporary, may be met at low cost and rapidly using the same logic and tools to additional optimally pre-selected fixed site locations. Further, since the fundamental MBRI technology design may be incorporated into software and small form factor physical units, technology up-grades to an existing operational MBRI network may be effectuated at low cost and rapidly via software downloads or low cost and low labor intensive field installation activity.

In embodiments, the present invention may provide for seamless outdoor and indoor operation, including broadband coverage. The MBRI indoor premises located CAP, indoor premises located MAP when operationally associated with the outdoor fixed radio MAP and BAP access side and backhaul side mesh routing capabilities, backhaul load balancing, RF propagation and routing capabilities, size, weight, form-factors, antennae options and powering, including its ad-hoc, self-healing and self-forming attributes may enable seamless indoor coverage as indoor located CAPs and MAPs that may reach and connect with outdoor located MAPs and may be employed for indoor network coverage and indoor device connectivity. As may be with the logic of outdoor network design and planning, indoor RF propagation coverage and capacity and network performance requirements may be efficiently achieved with optimal site selection for fixed radio installation using the same data bases, network design logic and associated design tools, and the like. In embodiments, indoor CAP and MAP, as associated with outdoor MAP and BAP, may provide similar connectivity and broadband coverage for users as they migrate between indoor and outdoor environments.

Figure 79:
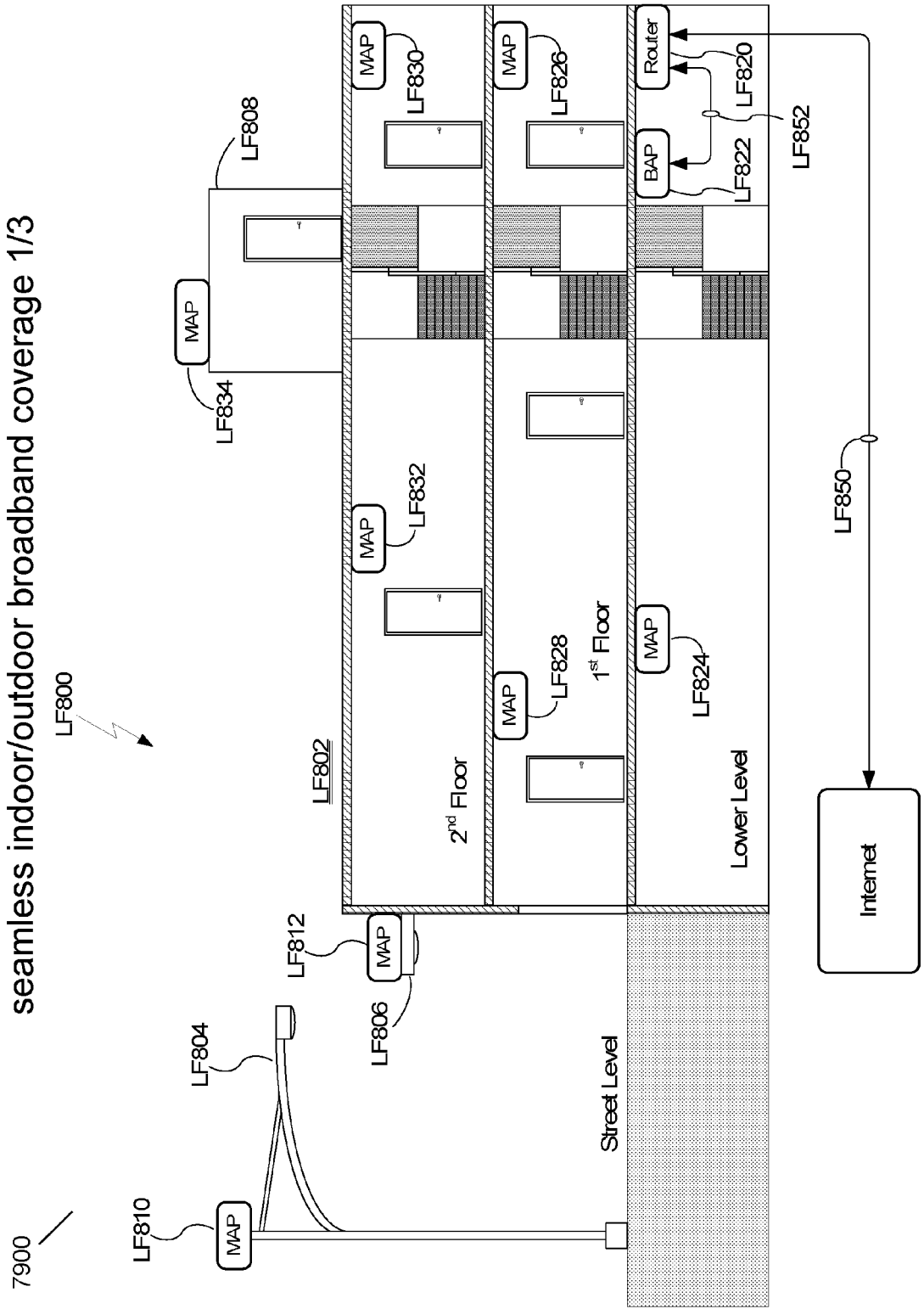
FIG. 79 depicts a first embodiment for seamless indoor/outdoor broadband coverage.

FIG. 79 illustrates one embodiment of seamless outdoor and indoor operation 7900. In this instance, MBRI may be seen as deployed as a combination of outdoor (LF810, LF812, LF834) and in building (LF824, 826, 828, 830 832) MAP units along with BAP (LF822) so as to provide MBRI. In embodiments BAP (LF822) may provide access side and back haul side. In most installation back haul access (LF852) may be coupled to a suitable router or switch (LF820) which may allow broadband access to a high speed internet backhaul. In its absence BAP (LF822) may be equipped with suitable backhaul interface capable of direct connection to the internet. A combination of in building (LF802) and outdoor MAP units may provide users a seamless connectivity since outdoor units (LF810, LF812, LF834) can be advantageously deployed so as to provide interconnectivity within building (LF802) MAP and BAP units.

Figure 80:
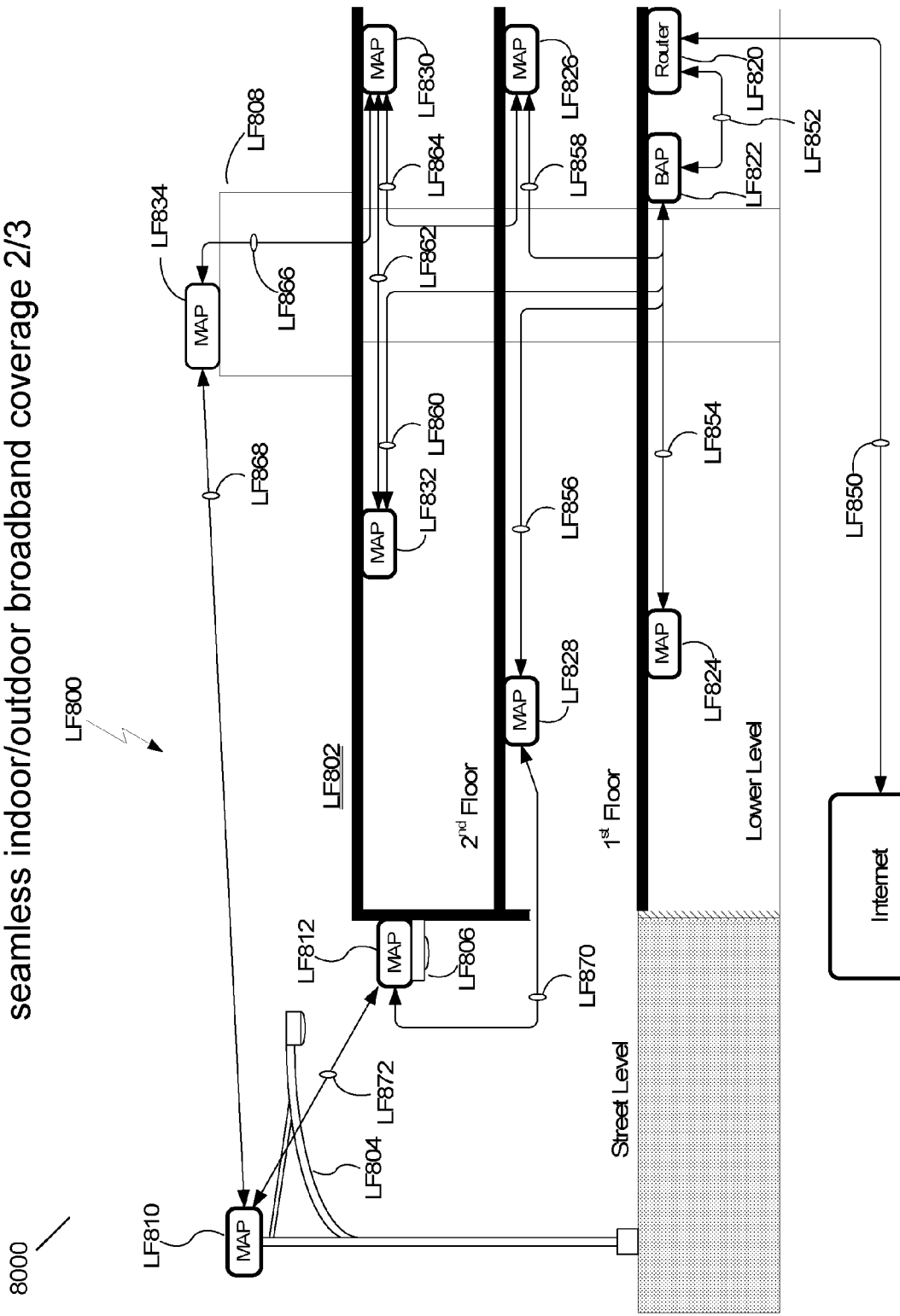
FIG. 80 depicts a second embodiment for seamless indoor/outdoor broadband coverage.
Figure 81:
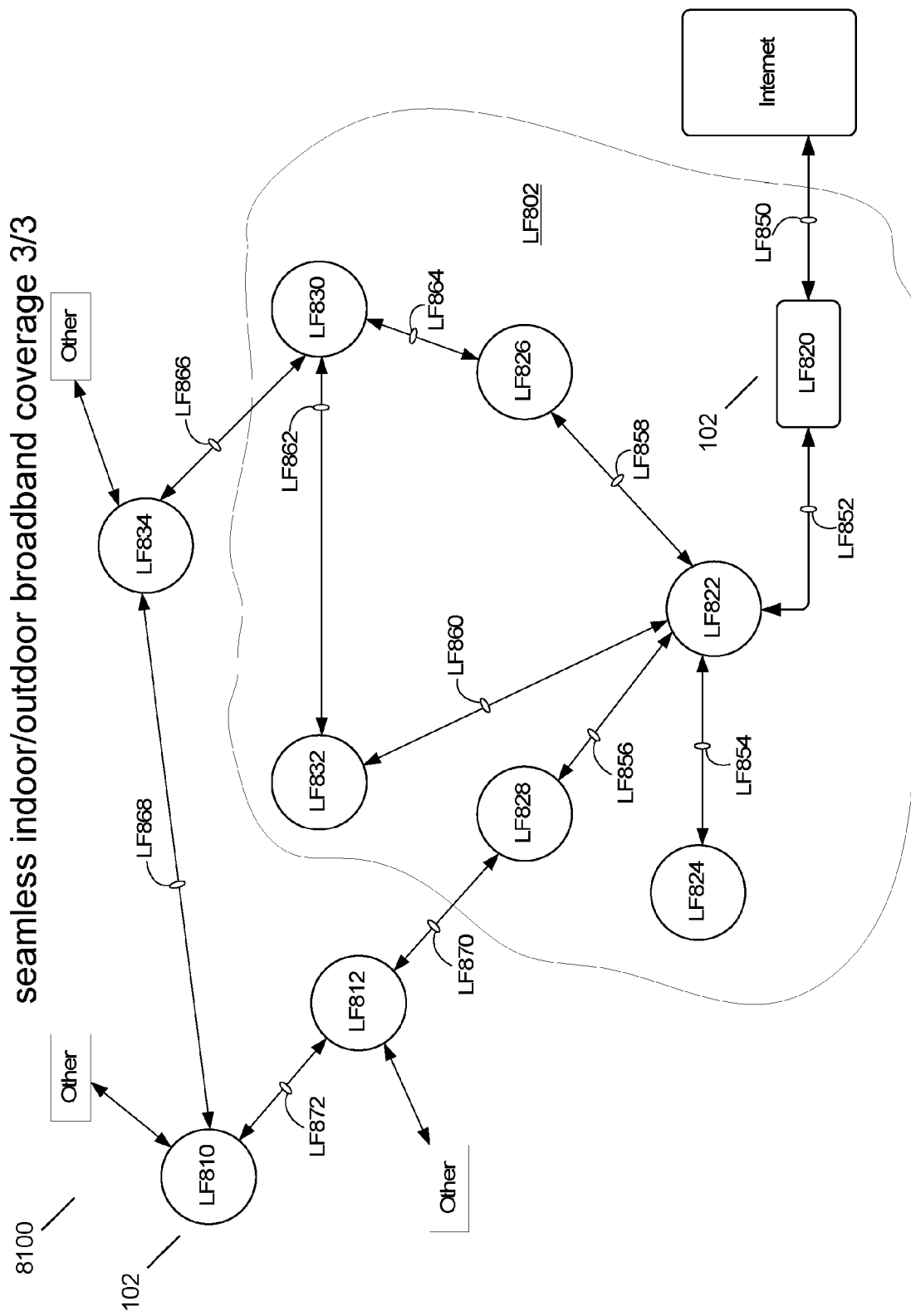
FIG. 81 depicts a third embodiment for seamless indoor/outdoor broadband coverage, showing the node topology.

FIG. 80 illustrates a further embodiment of seamless outdoor and indoor operation 8000. As shown, outdoor (LF810, LF812, LF834) MAP units may be deployed in a near proximity to a building (LF802) having its structural features removed (or washed out) to exemplify radio link connectivity between various MAP/BAP units. In some deployment scenarios it may be desirable to have outdoor units to be camouflaged or disguised as common street fixtures or so as to appear as a part of building architectural features. For example, a MAP (LF810) unit may be installed on top of light stand (LF804). In another instance a wall sconce light fixture (LF806) may be integrated with MAP (LF812), thus essentially camouflaging the MAP. In other circumstances MAP (LF834) may be mounted in a secured location, away from unauthorized access, in a ruggedized weather resistant enclosure. In building (LF824, 826, 828, 830 & 834) MAP units may be mounted in storage closets or on the back side of the ceiling tiles to reduce unauthorized access. Building installation may bring in additional complications since radio way propagation may be difficult to predict and full coverage may be difficult to attain. Node LF822 may be installed in near proximity of a stairwell. Stairwell along with ventilation shafts can provide suitable radio signal path to adjacent MAP units deployed on different floors. Appropriate signal strength and link quality may need to be attained between MAP/BAP units for satisfactory network performance. FIG. 81 provides an interconnection diagram 8100 for the FIG. 80 illustration.

In embodiments, the present invention may provide for network end-user deployment participation. The MBRI indoor premises located CAP, when operationally associated with the outdoor fixed radio MAP and BAP access side and backhaul side mesh routing capabilities, backhaul load balancing, RF propagation and routing capabilities, size, weight, form-factors, antennae options and powering, including ad-hoc, self-healing and self-forming attributes may enable end-user subscriber effectuated seamless indoor coverage as indoor located CAPs purchased (e.g. retail equipment purchase of service provider provided) by consumers and installed indoors by consumers as "plug and play," "always-on" customer premises located devices that may reach and connect with outdoor located MAPs and may be employed for indoor network coverage and indoor device connectivity.

In embodiments, the present invention may provide for integration and coexistence with existing network and communications infrastructure. MBRI, which may be considered a mobile Internet, may become a natural extension of the fixed Internet, integrating with the existing infrastructure through BAP, MAP, and CAP access points in a seamless manner. The MBRI may provide an efficient use of existing backbone communications infrastructure, such as fiber, wire, microwave, radio, cellular, and the like, where BAP, MAP, and CAP access points may connect through fixed Internet resources to utilize the existing infrastructure. In addition, MBRI may provide a seamless integration with Internet communications facilities, such as WiMax, Wi-Fi, home networks, home routers, fiber to home optical network terminals, wired Internet, public safety network, enterprise network, machine to machine networks, municipal networks, fixed wireless, and the like.

MBRI may also coexist and utilize other communications facilities, such as with the cellular spectrum, LTE, GSM, Cable (HFC), electrical, satellite, unlicensed bands, and the like. In embodiments, a carrier may utilize MBRI to improve or expand their service. For example, if a carrier decides to use MBRI as a means to provide high bandwidth data services and continue voice services via their existing network solution, that may free up bandwidth at the tower and eliminate infrastructure cost otherwise required for upgrades. In another example, if a carrier has significant backhaul capacity at a tower this may be reused to support a MBRI operation. Since MBRI allows for direct P2P communication only external traffic may require the backhaul bandwidth, thus allowing for a greater number of connections compared to cellular. In another example, the carrier may add DYSAN capability to the tower to enable MRBI to co-share the cellular spectrum. In embodiments, MBRI may provide interfaces with operation support systems (OSS), which may be computer systems used by telecommunications service providers, and may describe the network systems dealing with the telecom network itself, supporting processes such as maintaining network inventory, provisioning services, configuring network components, managing faults, and the like. The MBRI may additionally interface with other existing network facilities, such as network management systems, network operations centers, and the like.

In embodiments, the MBRI may provide services in an improved manner over services offered in a cellular regime, such as providing Internet equivalent routing to mobile devices outside the cellular regime, direct access to applications that would otherwise be included in a controlled environment, such as in the case of a 'walled garden', IP application deployment to mobile devices outside the cellular regime, and the like. Mobile devices operating within a cellular system are often restricted in their access to applications. MBRI may provide users with the benefits of more direct routing and connectivity with applications, and as such, may provide MBRI enabled users with greater freedom of use with respect to applications than is typically available through a cellular system.

In embodiments, the MBRI may provide for node to node communications that may improve the performance within the network, including the use of node weight metrics, dynamic sharing of communications, dynamic data link segmentation and reassembly, nested weighted round robin queuing, multi-metric based multicast and unicast routing, and the like.

In embodiments, MBRI may provide for a communications system that may increase the successful outcome of a fair coin flip using a node weight metric. Channel access in a wireless ad-hoc communications network may pose the challenge of fair access and efficient use of channel bandwidth. That is, desired properties of a channel access protocol may include fairness (e.g. each node has the opportunity to transmit), and efficient use of channel bandwidth (e.g. bandwidth is utilized fully by the nodes with data to transmit). In embodiments, utilizing a 'node weight' may improve the efficiency and fairness of channel access. Node weight may include the notion of a metric that indicates the level of data activity at a given node. Each node in the network may compute its own node weight. A node may share this information with its one-hop neighbors (e.g. those that it can communicate with directly via wireless media). In turn, neighboring nodes may share node weight amongst the nodes within a two-hop neighborhood to enable distributed (vices centralized) scheduling. Node weight may be used to skew the distribution of channel access to those nodes with the most data to transmit (i.e. those with more 'weight'). By utilizing a 'fair coin flip' to ensure a degree of fairness coupled with node weight to allocate bandwidth appropriately MBRI may better assure an efficient use of the wireless channel.

In embodiments, MBRI may provide for dynamic sharing of a communication channel based on nodal transmit and receive requirements using a set of bandwidth metrics in a communication system. Channel access in a wireless ad-hoc communications network may pose the challenge of fair access and efficient use of channel bandwidth. That is, desired properties of a channel access protocol may include fairness (e.g. each node has the opportunity to transmit) and efficient use of channel bandwidth (e.g. bandwidth is utilized fully by the nodes with data to transmit). In embodiments, MBRI may utilize a 'bandwidth' facility for improving the efficiency and fairness of channel access. Bandwidth may include the notion of metrics that indicate the level of data activity at a given node. Each node in the network may compute its own bandwidth in and bandwidth out for each of its 1 hop neighbors (e.g. all of the nodes within direct communication range of a transmitter). In turn, neighboring nodes may share bandwidth in and bandwidth out amongst the nodes within a two-hop neighborhood to enable distributed (vices centralized) scheduling. Bandwidth may be used in the calculation to skew the distribution of channel access to those nodes with the most data to transmit (i.e. those with a higher bandwidth out). By utilizing bandwidth out and bandwidth in to compute node weight for use in a 'fair coin flip', MBRI may better ensure a degree of fairness and efficient use of the wireless channel. In embodiments, MBRI may compute a link weight for use in a 'fair coin flip' instead of a node weight in order to emphasize certain links in the network over others.

In embodiments, MBRI may prioritize nested weighted round robin queuing. Prioritized nested weighted round robin queuing may be associated with a parameterized mechanism to provide nodal quality of service for class-based traffic types. In embodiments, weights may meter the traffic onto the communication channel by class with a preemptive priority class of service provided. In embodiments, other queuing disciplines may be used in the MBRI, such as strict priority, simple round robin, and the like.

In embodiments, MBRI may provide for multi-metric based multicast and unicast routing. Heuristics may be developed, utilizing information from both the data link and physical layers, to create minimum cost routes utilizing delay, reliability, data rate capability, and the like, as metrics for the SLSR algorithm. The SLSR algorithm may perform the calculation on the heuristics to determine the minimum cost path. The creation of the heuristics may provide routes over the most reliable, least delay, and highest data rate links between any source and destination in a network. Additionally, tie breaking mechanisms for unicast routing may be added to eliminate the overload of the highest IP address mechanism.

In embodiments, the present invention may provide a method for operation of an all IP mobile ad hoc network with carrier grade network performance and improved spectrum utilization through IP transparent routing, media access control, and physical layer convergence protocols on a plurality of wireless mobile nodes and a plurality of wireless communication links connecting the plurality of nodes. The present invention may facilitate, at the node level, network wide and interoperable time synchronization for packet level and frame level transmission/reception peer to peer, peer to network and network to peer; support a variety of wireless access protocols using TDD or FDD transmission based on symmetrical waveforms optimized for peer to peer communications in a mobile ad-hoc network; support a physical layer convergence protocol that allows for symmetrically optimized waveforms based on OFDM, OFDMA, SC-OFDMA, QAM, CDMA and TDMA protocols; facilitate link-by-link autonomous data rate selection; provide a slotted MAC protocol for peer to peer, peer to network and network to peer frame transmission/reception; provide for autonomous network entry/exit for nodes entering or exiting the network, and transparently allowing new nodes to utilize ARP for end route translation, DHCP for authentication, authorization and IP address resolution; provide peer to peer packet routing with facilities for packet segmentation and reassembly, Quality of Service based routing and traffic type based routing; provide MAC layer and network layer fairness algorithms designed to optimize and prioritize traffic based on nodal queue build-up, traffic type latencies, bandwidth optimization and spectrum optimization; provide unicast and multicast routing of packet data through the mobile ad hoc network; facilitate peer-to-peer connections to selectively bypass network infrastructure; provide for remote monitoring, control, and upgrade of the wireless mobile nodes; provide location estimates of neighboring nodes to each node in the network; facilitate adaptive control of transmission power of a node based on location of the node; dynamically adapted packet routing according to network and spectrum conditions; prioritize delay sensitive traffic across the mobile ad hoc network; provide multiple connections of the mobile ad hoc network to a fixed network; enable automatic re-transmission of loss-sensitive traffic; provide secure connections and supporting existing IP security standards; facilitate spectrum independence; support multi-session support at individual node, and the like.

In embodiments, the present invention may prioritize delay sensitive traffic across the network protocol comprises providing priority queuing and priority channel access by differentiating data traffic across the protocol stack. In embodiments, the present invention may dynamically adapt bandwidth usage according to network and backhaul conditions comprises making distributed decisions regarding local bandwidth usage by individual wireless nodes. In embodiments, the present invention may dynamically assign IP addresses to new entry nodes or terminating IP addresses for exiting nodes according to network requests for service and comprises making distributed decisions regarding local resource usage by individual wireless nodes. In embodiments, the present invention may facilitate adaptive control of the transmission power of a node based on the location of a node in the mobile ad hoc network. In embodiments, the present invention may facilitate mobile ad hoc network creation and self forming networks made up of individual nodes based on their relative position with respect to each other in the mobile ad hoc network. In embodiments, the present invention may facilitate mobile ad hoc self healing networks made up of individual nodes based on their relative position with respect to each other in the mobile ad hoc network. In embodiments, the present invention may facilitate mobile ad hoc load leveling networks according to network requests for service and comprises making distributed decisions regarding local resource usage by individual wireless nodes. In embodiments, the present invention may facilitate mobile ad hoc networks where the nodes and network are packet size indifferent and comprises making distributed decisions regarding local resource usage by individual wireless nodes. In embodiments, the present invention may facilitate Unicast routing in mobile ad networks according to network requests for service and comprises making distributed decisions regarding local resource usage by individual wireless nodes. In embodiments, the present invention may facilitate mobile ad hoc networks that are Internet Protocol Plug Compatible. In embodiments, the present invention may facilitate mobile ad hoc networks that are neighbor aware to requests for service and comprises making distributed decisions regarding local resource usage by individual wireless nodes. In embodiments, the present invention may facilitate mobile ad hoc networks according that are geo location aware for network requests for geo location information. In embodiments, the present invention may facilitate mobile ad hoc networks that are unconditionally open for Java Web applications. In embodiments, the present invention may facilitate mobile ad hoc networks that are configured for private or public network usage.

In embodiments, the present invention may provide a method for operating a mobile ad hoc network with carrier grade network performance and improved spectrum utilization through dynamic spectrum awareness algorithms comprising a plurality of wireless mobile nodes and a plurality of wireless communication links connecting the plurality of nodes. The present invention may facilitate link-by-link autonomous data rate selection; provide unicast and multicast routing of data through the mobile ad hoc network; facilitate peer-to-peer connections to selectively bypass network infrastructure; provide for remote monitoring, control, and upgrade of the wireless mobile nodes; provide location estimates of neighboring nodes to each node in the network; facilitate adaptive control of transmission power of a node based on location of the node; dynamically adapt spectrum usage according to network and spectrum conditions; prioritize delay sensitive traffic across the mobile ad hoc network; provide multiple connections of the mobile ad hoc network to a fixed network; enable automatic re-transmission of loss-sensitive traffic; and the like.

In embodiments, the present invention may prioritize delay sensitive traffic across the network protocol providing priority queuing and priority channel access by differentiating data traffic across the protocol stack. In embodiments, the present invention may dynamically adapt spectrum usage according to network and spectrum conditions comprises making distributed decisions regarding local spectrum usage by individual wireless nodes. In embodiments, the present invention may prevent unauthorized network access to protect control-plane and user data.

In embodiments, the present invention may provide a method for enabling at least partially wireless communications by providing a mobile ad hoc network having a plurality of nodes, the nodes configured to self-route network traffic among the nodes, the nodes configured to use selectable parts of the telecommunications spectrum; dynamically allocating use of the spectrum by a plurality of the nodes based on the condition of selectable parts of the spectrum, and the like. In embodiments, the present invention may facilitate adaptive control of the transmission power of a node based on the location of a node in the mobile ad hoc network.

In embodiments, the present invention may provide a system for operating an all IP mobile ad hoc network with carrier grade network performance and improved spectrum utilization through IP transparent routing, media access control and physical layer convergence protocols comprising a plurality of wireless mobile nodes and a plurality of wireless communication links connecting the plurality of nodes. In embodiments, the present invention may consist of nodes with network wide and interoperable time synchronization for packet level and frame level transmission/reception peer to peer, peer to network and network to peer; the network capable of supporting a variety of wireless access protocols using TDD or FDD transmission based on symmetrical waveforms optimized for peer to peer communications in the mobile ad-hoc network; the network capable of supporting a physical layer convergence protocol that allows for symmetrically optimized waveforms based on OFDM, OFDMA, SC-OFDMA, QAM, CDMA and TDMA protocols; the network capable of facilitating link-by-link autonomous data rate selection; the network capable of providing a slotted MAC protocol for peer to peer, peer to network and network to peer frame transmission/reception; the network capable of providing for autonomous network entry/exit for nodes entering or exiting the network, and transparently allowing new nodes to utilize ARP for end route translation, DHCP for authentication, authorization and IP address resolution; the network capable of providing peer to peer packet routing with facilities for packet segmentation and reassembly, Quality of Service based routing and traffic type based routing; MAC layer and network layer fairness algorithms designed to optimize and prioritize traffic based on nodal queue build-up, traffic type latencies, bandwidth optimization and spectrum optimization; the network capable of providing unicast and multicast routing of packet data through the mobile ad hoc network; the network capable of facilitating peer-to-peer connections to selectively bypass network infrastructure; the network capable of providing for remote monitoring, control, and upgrade of the wireless mobile nodes; the network capable of providing location estimates of neighboring nodes to each node in the network; the network capable of facilitating adaptive control of transmission power of a node based on location of the node; the network capable of dynamically adapting packet routing according to network and spectrum conditions; the network capable of prioritizing delay sensitive traffic across the mobile ad hoc network; the network capable of providing multiple connections of the mobile ad hoc network to a fixed network; the network capable of enabling automatic re-transmission of loss-sensitive traffic; the network capable of providing secure connections and supporting existing IP security standards; the network capable of facilitating spectrum independence; the network capable of supporting multi-session support at individual node; and the like.

In embodiments, the present invention may include a network component in the system for prioritizing delay sensitive traffic across the network protocol comprises providing priority queuing and priority channel access by differentiating data traffic across the protocol stack. In embodiments, the present invention may include a network component in the system for dynamically adapting bandwidth usage according to network and backhaul conditions comprises making distributed decisions regarding local bandwidth usage by individual wireless nodes. In embodiments, the present invention may include a network component in the system for dynamically assigning IP addresses to new entry nodes or terminating IP addresses for exiting nodes according to network requests for service and comprises making distributed decisions regarding local resource usage by individual wireless nodes. In embodiments, the present invention may include a network component in the system for facilitating adaptive control of the transmission power of a node based on the location of a node in the mobile ad hoc network. In embodiments, the present invention may include a network component in the system for facilitating mobile ad hoc network creation and self forming networks made up of individual nodes based on their relative position with respect to each other in the mobile ad hoc network. In embodiments, the present invention may include a network component in the system for facilitating mobile ad hoc self healing networks made up of individual nodes based on their relative position with respect to each other in the mobile ad hoc network. In embodiments, the present invention may include a network component in the system for facilitating mobile ad hoc load leveling networks according to network requests for service and comprises making distributed decisions regarding local resource usage by individual wireless nodes. In embodiments, the present invention may include a network component in the system for facilitating mobile ad hoc networks where the nodes and network are packet size indifferent and comprises making distributed decisions regarding local resource usage by individual wireless nodes. In embodiments, the present invention may include a network component in the system for facilitating unicast routing in mobile ad hoc networks according to network requests for service and comprises making distributed decisions regarding local resource usage by individual wireless nodes. In embodiments, the present invention may include a network component in the system for facilitating mobile ad hoc networks that are Internet Protocol Plug Compatible. In embodiments, the present invention may include a network component in the system for facilitating mobile ad hoc networks that are neighbor aware to requests for service and comprises making distributed decisions regarding local resource usage by individual wireless nodes. In embodiments, the present invention may include a network component in the system for facilitating mobile ad hoc networks according that are geo location aware for network requests for geo location information. In embodiments, the present invention may include a network component in the system for facilitating mobile ad hoc networks that are unconditionally open for Java Web applications. In embodiments, the present invention may include a network component in the system for facilitating mobile ad hoc networks that are configured for private or public network usage.

In embodiments, the present invention may provide a system for operating a mobile ad hoc network with carrier grade network performance and improved spectrum utilization through dynamic spectrum awareness algorithms comprising a plurality of wireless mobile nodes and a plurality of wireless communication links connecting the plurality of nodes. In embodiments, the present invention may include a network component in the system for facilitating link-by-link autonomous data rate selection; providing unicast and multicast routing of data through the mobile ad hoc network; facilitating peer-to-peer connections to selectively bypass network infrastructure; the network capable of providing for remote monitoring, control, and upgrade of the wireless mobile nodes; providing location estimates of neighboring nodes to each node in the network; facilitating adaptive control of transmission power of a node based on location of the node; dynamically adapting spectrum usage according to network and spectrum conditions; prioritizing delay sensitive traffic across the mobile ad hoc network; providing multiple connections of the mobile ad hoc network to a fixed network; enabling automatic re-transmission of loss-sensitive traffic; and the like.

In embodiments, the present invention may include a network component in the system for prioritizing delay sensitive traffic across the network protocol comprises providing priority queuing and priority channel access by differentiating data traffic across the protocol stack. In embodiments, the present invention may include a network component in the system for dynamically adapting spectrum usage according to network and spectrum conditions comprises making distributed decisions regarding local spectrum usage by individual wireless nodes. In embodiments, the present invention may include a network component in the system for preventing unauthorized network access to protect control-plane and user data.

In embodiments, the present invention may provide a system for enabling at least partially wireless communications, including a mobile ad hoc network having a plurality of nodes, the nodes configured to self-route network traffic among the nodes, the nodes configured to use selectable parts of the telecommunications spectrum; and a plurality of nodes capable of dynamically allocating use of the spectrum based on the condition of selectable parts of the spectrum. In embodiments, the system may include the network capable of facilitating adaptive control of the transmission power of a node based on the location of a node in the mobile ad hoc network.

In embodiments, the present invention may implement a method for providing a mobile, broadband, routable internet, in which a plurality of mobile devices interact as sending and receiving nodes in a mobile ad hoc network and in which packets are IP routable to the individual devices independent of fixed infrastructure elements; and providing routing priority within the network, wherein the routing priority is provided by granting channel access to a node for which prioritized routing is identified and sending delay-sensitive data from the node before sending delay-tolerant data from the node.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing support for peer-to-peer traffic within the network.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing peer to peer connectivity within the mobile broadband routable internet.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing file sharing over the mobile broadband routable internet.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing user-generated applications over the mobile broadband routable internet.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing peer-to-peer applications over the mobile broadband routable internet.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing direct device-to-device peering with symmetrical throughput between at least two nodes of the mobile broadband routable internet.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and facilitating direct-to-device application deployment over the mobile broadband routable internet.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing a facility for distributing data among a plurality of mobile broadband routable internet devices.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing a facility for distributing application components among a plurality of mobile broadband routable internet devices.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing multicast routing within the network by allowing a data object to be transmitted by a device to a plurality of destinations over a plurality of routes.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing remote monitoring of at least one of software and services associated with the network.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing remote control of at least one of software and services associated with the network.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing remote upgrade of at least one of software and services associated with the network.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing an adaptive transmit power control facility for a device within the network, the adaptive transmit power control facility adapted to adjust transmission power of the device based on at least one of the density of proximate devices in the network, the condition of a neighboring device on the network, a channel condition of the network, a service level condition, a network performance condition, an environmental condition of the device and an application requirement of the device.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing forwarding error correction on at least long IP packets.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing a facility for enabling adaptation of the data rate provided for links among devices within the network, the adaptation based on at least one of the density of devices in the network, the condition neighboring devices in the network, a channel condition of the network, a service level condition, a network performance condition, an environmental condition and an application requirement.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing dynamic spectrum access capabilities within the network by determining communication spectrum quality and adjusting use of time frequency rectangles within the communication spectrum based on the determination.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and communicating among the plurality of devices over a radio communication spectrum and reusing portions of the spectrum for communication based on availability of time frequency rectangles within portions of the spectrum.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and communicating wirelessly among at least a portion of the plurality of mobile devices, wherein the at least a portion of the plurality of mobile devices communicate independent of which radio frequency is used for the wireless communication.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing geo-location coding of device nodes in the network, wherein geo-location is based at least in part based on a network location of a device node relative to other devices in the network.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing multimedia support within the network through a hybrid frame structure that includes variable slot duration and sub-channelization of bandwidth.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing time synchronization among nodes of the network, wherein the time synchronization is provided by communicating a representation of network timing at all the nodes with sufficient accuracy to enable reliable communications.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing seamless outdoor and indoor operation over the network.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing fixed radio installations that facilitate connection of the plurality of mobile devices, wherein the fixed radio installations are based at least in part on meeting a criteria associated with network radio propagation and performance.

In embodiments, the present invention may implement a method for providing a mobile, broadband, routable internet, in which a plurality of mobile devices interact as nodes in a mobile ad hoc network and in which packets are IP routable to the individual device independent of fixed infrastructure elements; and providing an IP-compatible plug connection to at least one wired infrastructure type.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing multiple fixed-network gateway interfaces connecting the mobile ad hoc network to a fixed network.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing an automated network design tool to facilitate low cost and fast network design engineering and deployment planning of the fixed infrastructure elements of the network.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and deploying a plurality of low cost mesh access points to provide network coverage in a geography.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing small form factor nodes that allow for low cost and fast capacity expansion and network upgrade.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and routing communications between a mobile device and a device on a remote network so as to substantially favor routes through the mobile, broadband, routable Internet that have fewer hops between the mobile device and a backhaul access point.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing a user deployable access point that connects to the network.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing at least one base station controller function in at least one subscriber device, the base station controller function including at least one of an air interface management function, a signaling function, a concentration logic function, and a signal propagation function.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing service provider tools to manage resource consumption of at least one device on the ad hoc network, wherein the tools are deployed on at least one of the plurality of mobile devices and use at least one management path for reporting usage of the at least one device.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing full radio resource management functions in at least one device, the radio resource management functions including at least one of radio management, handover, handoff, and foreign device cooperation functions, wherein the at least one device is a subscriber device.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing multi-session functions in at least one of the plurality of devices, wherein the at least one device is a subscriber device.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing cost-based routing functions in the network through dynamic forming and reforming of links and routes, wherein the cost-based routing functions are provided in a plurality of subscriber devices.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing IP router functions at individual mobile devices of the network, wherein the individual mobile devices are subscriber devices.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing, in at least one of the plurality of mobile devices, media access control layer capabilities including sub-network layer convergence functions selected from a list consisting of segmentation and reassembly, quality of service, throughput fairness, adaptive data rate control, and transmit power control, wherein the at least one mobile device is a subscriber device.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing route diversity within the network to facilitate assurance of packet communication, wherein route diversity is based at least on a number of network devices in a geographic area.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and allowing layer 2 forwarding among at least some of the plurality of mobile devices.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing the routable internet to a node in the network, wherein the node also communicates with a cellular network through at least one of the fixed infrastructure elements and the routable internet is provided outside the cellular network.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and providing IP application deployment to a device in the network, wherein the device also communicates with a cellular network through at least one of the fixed infrastructure elements and the IP application is deployed outside the cellular network.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and routing data packets through the mobile ad hoc network.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and routing data packets through the mobile ad hoc network absent communications with the fixed infrastructure elements.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements, communications to the nodes having a throughput of at least 768 kbit/sec during normal operation.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements, communications to the nodes having a throughput of at least 768 kbit/set when the nodes are in motion at vehicular speeds.

In embodiments, the present invention may implement a method for providing a mobile, broadband, routable internet, in which a plurality of mobile devices interact as nodes in a mobile ad hoc network and in which packets are IP routable to each of mobile devices of fixed infrastructure elements.

In embodiments, the present invention may implement a method for providing a mobile, broadband, routable internet, in which a plurality of mobile devices interact as nodes in a mobile ad hoc network and in which packets are IP routable to each of the devices independent of fixed infrastructure elements; and applying swarm intelligence to determine at least some parts of at least some routes through the mobile, broadband, routable internet.

In embodiments, the present invention may implement a system for a mobile, broadband, routable internet, in which a plurality of mobile devices interact as sending and receiving nodes in a mobile ad hoc network and in which packets are IP routable to the individual devices independent of fixed infrastructure elements; and the network capable of providing routing priority within the network, wherein the routing priority is provided by granting channel access to a node for which prioritized routing is identified and sending delay-sensitive data from the node before sending delay-tolerant data from the node.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing support for peer-to-peer traffic within the network.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing peer to peer connectivity within the mobile broadband routable internet.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing file sharing over the mobile broadband routable internet.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing user-generated applications over the mobile broadband routable internet.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing direct device-to-device peering with symmetrical throughput between at least two nodes of the mobile broadband routable internet.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of facilitating direct-to-device application deployment over the mobile broadband routable internet.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing a facility for distributing data among a plurality of mobile broadband routable internet devices.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing a facility for distributing application components among a plurality of mobile broadband routable internet devices.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing multicast routing within the network by allowing a data object to be transmitted by a device to a plurality of destinations over a plurality of routes.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing remote monitoring of at least one of software and services associated with the network.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing remote control of at least one of software and services associated with the network.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing remote upgrade of at least one of software and services associated with the network.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing an adaptive transmit power control facility for a device within the network, the adaptive transmit power control facility adapted to adjust transmission power of the device based on at least one of the density of proximate devices in the network, the condition of a neighboring device on the network, a channel condition of the network, a service level condition, a network performance condition, an environmental condition of the device and an application requirement of the device.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing forwarding error correction on at least long IP packets.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing a facility for enabling adaptation of the data rate provided for links among devices within the network, the adaptation based on at least one of the density of devices in the network, the condition neighboring devices in the network, a channel condition of the network, a service level condition, a network performance condition, an environmental condition and an application requirement.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing dynamic spectrum access capabilities within the network by determining communication spectrum quality and adjusting use of time frequency rectangles within the communication spectrum based on the determination.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of communicating among the plurality of devices over a radio communication spectrum and reusing portions of the spectrum for communication based on availability of time frequency rectangles within portions of the spectrum.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of communicating wirelessly among at least a portion of the plurality of mobile devices, wherein the at least a portion of the plurality of mobile devices communicate independent of which radio frequency is used for the wireless communication.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing geo-location coding of device nodes in the network, wherein geo-location is based at least in part based on a network location of a device node relative to other devices in the network.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing multimedia support within the network through a hybrid frame structure that includes variable slot duration and sub-channelization of bandwidth.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing time synchronization among nodes of the network, wherein the time synchronization is provided by communicating a representation of network timing at all the nodes with sufficient accuracy to enable reliable communications.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing seamless outdoor and indoor operation over the network.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing fixed radio installations that facilitate connection of the plurality of mobile devices, wherein the fixed radio installations are based at least in part on meeting a criteria associated with network radio propagation and performance.

In embodiments, the present invention may implement a system for a mobile, broadband, routable internet, in which a plurality of mobile devices interact as nodes in a mobile ad hoc network and in which packets are IP routable to the individual device independent of fixed infrastructure elements; and the network capable of providing an IP-compatible plug connection to at least one wired infrastructure type.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing multiple fixed-network gateway interfaces connecting the mobile ad hoc network to a fixed network.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing an automated network design tool to facilitate low cost and fast network design engineering and deployment planning of the fixed infrastructure elements of the network.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of deploying a plurality of low cost mesh access points to provide network coverage in a geography.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing small form factor nodes that allow for low cost and fast capacity expansion and network upgrade.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of routing communications between a mobile device and a device on a remote network so as to substantially favor routes through the mobile, broadband, routable Internet that have fewer hops between the mobile device and a backhaul access point.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing a user deployable access point that connects to the network.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing at least one base station controller function in at least one subscriber device, the base station controller function including at least one of an air interface management function, a signaling function, a concentration logic function, and a signal propagation function.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing service provider tools to manage resource consumption of at least one device on the ad hoc network, wherein the tools are deployed on at least one of the plurality of mobile devices and use at least one management path for reporting usage of the at least one device.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing full radio resource management functions in at least one device, the radio resource management functions including at least one of radio management, handover, handoff, and foreign device cooperation functions, wherein the at least one device is a subscriber device.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing multi-session functions in at least one of the plurality of devices, wherein the at least one device is a subscriber device.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing cost-based routing functions in the network through dynamic forming and reforming of links and routes, wherein the cost-based routing functions are provided in a plurality of subscriber devices.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing IP router functions at individual mobile devices of the network, wherein the individual mobile devices are subscriber devices.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing, in at least one of the plurality of mobile devices, media access control layer capabilities including sub-network layer convergence functions selected from a list consisting of segmentation and reassembly, quality of service, throughput fairness, adaptive data rate control, and transmit power control, wherein the at least one mobile device is a subscriber device.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing route diversity within the network to facilitate assurance of packet communication, wherein route diversity is based at least on a number of network devices in a geographic area.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of allowing layer 2 forwarding among at least some of the plurality of mobile devices.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing the routable internet to a node in the network, wherein the node also communicates with a cellular network through at least one of the fixed infrastructure elements and the routable internet is provided outside the cellular network.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of providing IP application deployment to a device in the network, wherein the device also communicates with a cellular network through at least one of the fixed infrastructure elements and the IP application is deployed outside the cellular network.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of routing data packets through the mobile ad hoc network.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of routing data packets through the mobile ad hoc network absent communications with the fixed infrastructure elements.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements, communications to the nodes having a throughput of at least 768 kbit/sec during normal operation.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements, communications to the nodes having a throughput of at least 768 kbit/set when the nodes are in motion at vehicular speeds.

In embodiments, the present invention may implement a system for a mobile, broadband, routable internet, in which a plurality of mobile devices interact as nodes in a mobile ad hoc network and in which packets are IP routable to each of mobile devices of fixed infrastructure elements.

In embodiments, the present invention may implement a system for a mobile, broadband, routable internet, in which a plurality of mobile devices interact as nodes in a mobile ad hoc network and in which packets are IP routable to each of the devices independent of fixed infrastructure elements; and the network capable of applying swarm intelligence to determine at least some parts of at least some routes through the mobile, broadband, routable internet.

Figure 82:
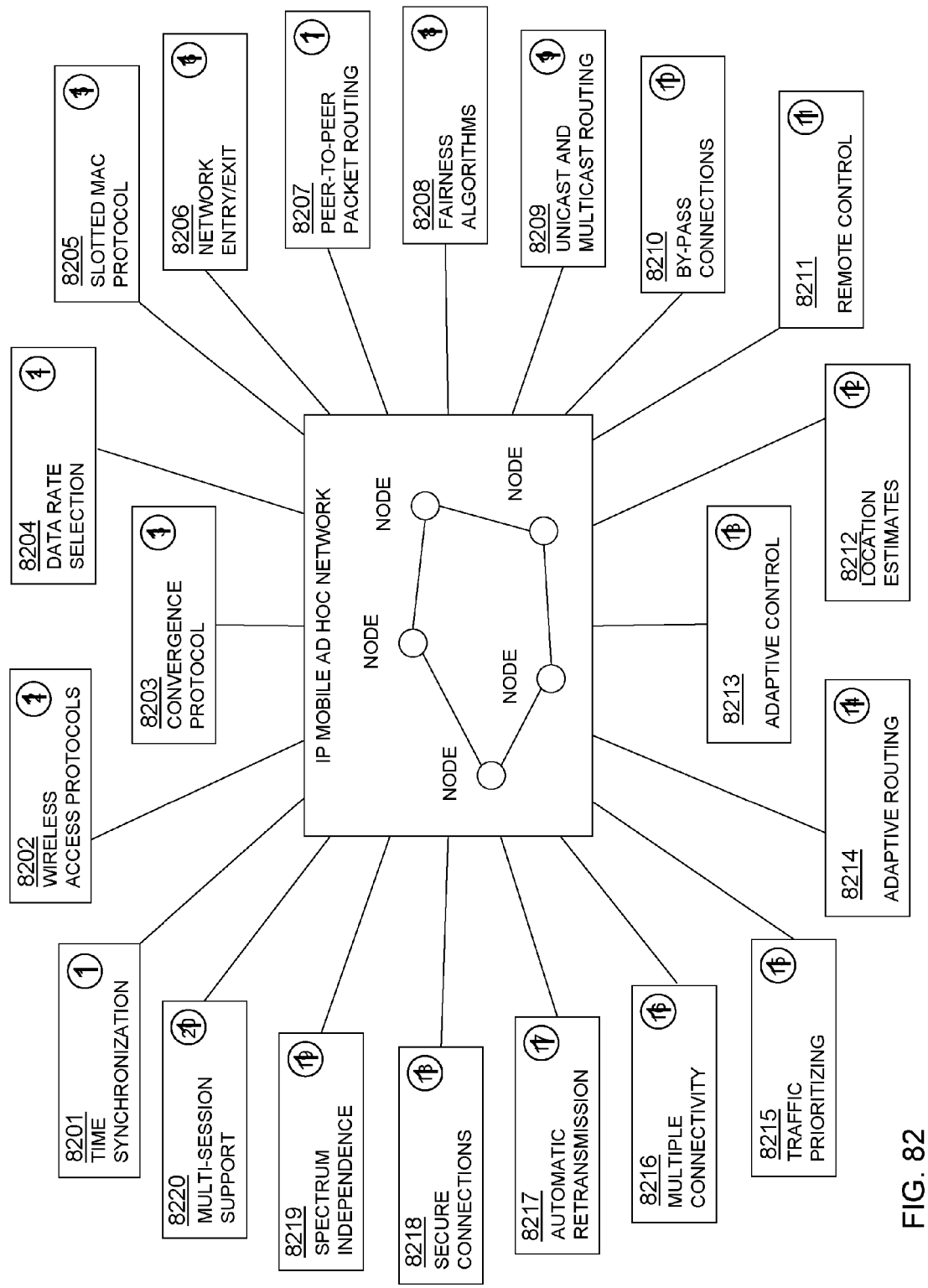
FIG. 82 depicts an embodiment of an IP mobile ad hoc network with carrier grade network performance and improved spectrum utilization.

Referring to FIG. 82, methods and systems are provided herein for operating an all IP mobile ad hoc network with carrier grade network performance and improved spectrum utilization through IP transparent routing, media access control and physical layer convergence protocols including a plurality of wireless mobile nodes and a plurality of wireless communication links connecting the plurality of nodes. The methods and systems may include a range of features, including, for example, one or more of: (1) facilitating node level, network wide and interoperable time synchronization for packet level and frame level transmission/reception peer to peer, peer to network and network to peer 8201; (2) supporting a variety of wireless access protocols using TDD or FDD transmission based on symmetrical waveforms optimized for peer to peer communications in a mobile ad-hoc network 8202; (3) supporting a physical layer convergence protocol that allows for symmetrically optimized waveforms based on OFDM, OFDMA, SC-OFDMA, QAM, CDMA and TDMA protocols 8203; (4) facilitating link-by-link autonomous data rate selection 8204; (5) providing a slotted MAC protocol for peer to peer, peer to network and network to peer frame transmission/reception 8205; (6) providing for autonomous network entry/exit for nodes entering or exiting the network, and transparently allowing new nodes to utilize ARP for end route translation, DHCP for authentication, authorization and IP address resolution 8206; (7) providing peer to peer packet routing with facilities for packet segmentation and reassembly, Quality of Service based routing and traffic type based routing 8207; (8) MAC layer and network layer fairness algorithms designed to optimize and prioritize traffic based on nodal queue build-up, traffic type latencies, bandwidth optimization and spectrum optimization 8208; (9) providing unicast and multicast routing of packet data through the mobile ad hoc network 8209; (10) facilitating peer-to-peer connections to selectively bypass network infrastructure 8210; (11) providing for remote monitoring, control, and upgrade of the wireless mobile nodes 8211; (12) providing location estimates of neighboring nodes to each node in the network 8212; (13) facilitating adaptive control of transmission power of a node based on location of the node 8213; (14) dynamically adapting packet routing according to network and spectrum conditions 8214; (15) prioritizing delay sensitive traffic across the mobile ad hoc network 8215; (16) providing multiple connections of the mobile ad hoc network to a fixed network 8216; (17) enabling automatic re-transmission of loss-sensitive traffic 8217; (18) providing secure connections and supporting existing IP security standards 8218; (19) facilitating spectrum independence 8219; and/or (20) Supporting multi-session support at individual node 8220.

In embodiments prioritizing delay sensitive traffic across the network protocol may include providing priority queuing and priority channel access by differentiating data traffic across the protocol stack. In embodiments dynamically adapting bandwidth usage according to network and backhaul conditions may include making distributed decisions regarding local bandwidth usage by individual wireless nodes. In other embodiments dynamically assigning IP addresses to new entry nodes or terminating IP addresses for exiting nodes according to network requests for service may include making distributed decisions regarding local resource usage by individual wireless nodes. In embodiments facilitating adaptive control of the transmission power of a node based on the location of a node in the mobile ad hoc network. In embodiments methods and systems may include facilitating mobile ad hoc network creation and self-forming networks made up of individual nodes based on their relative position with respect to each other in the mobile ad hoc network. In embodiments, method and systems may include facilitating mobile ad hoc self healing networks made up of individual nodes based on their relative position with respect to each other in the mobile ad hoc network. In embodiments, method and systems may include facilitating mobile ad hoc self healing networks made up of individual nodes based on their relative position with respect to each other in the mobile ad hoc network. In embodiments, methods and system may include facilitating mobile ad hoc load leveling networks according to network requests for service and comprises making distributed decisions regarding local resource usage by individual wireless nodes. In embodiments methods and systems may include facilitating mobile ad hoc networks where the nodes and network are packet size indifferent and comprises making distributed decisions regarding local resource usage by individual wireless nodes. In embodiments methods and systems may include facilitating Unicast routing in mobile ad networks according to network requests for service and comprises making distributed decisions regarding local resource usage by individual wireless nodes. In embodiments methods and systems may include facilitating mobile ad hoc networks that are Internet Protocol Plug Compatible. In embodiments methods and systems may include facilitating mobile ad hoc networks that are neighbor aware to requests for service and comprises making distributed decisions regarding local resource usage by individual wireless nodes. In embodiments methods and systems may include facilitating mobile ad hoc networks according that are geo location aware for network requests for geo location information. In embodiments methods and systems may include facilitating mobile ad hoc networks that are unconditionally open for Java Web applications. In embodiments, methods and systems may include facilitating mobile ad hoc networks that are configured for private or public network usage.

MBRI distributes network, routing and switching intelligence to the subscriber device and to spanning network elements that enable subscriber devices to interconnect with the "wired" Internet. By doing this each subscriber device can autonomously determine its own path to transmitting/receiving information to/from other peer devices in the network and with the Internet. In addition, route diversity increases exponentially commensurate with the number of devices in a given geographic area thereby increasing Quality of Service, increasing bandwidth switching capability through improved spectrum reuse and increased spectrum tele-density. Furthermore, MBRI automatically load levels the access side traffic across all the available backhaul points of presence (which are also MBRI nodes that have fixed wired connections to the Internet).

Major benefits of MBRI include improved QoS, better scalability for traffic carrying capacity, an ability to increase spectrum reuse for a given geography by an order of magnitude more than cellular systems used over the same geography. MBRI allows each node to optimize the network resources and each other on a packet by packet basis for sending/receiving traffic from one device to another or to/from the wired Internet. The technology takes advantage of access side hopping/routing and backhaul hopping/routing to optimize packet forwarding.

Mobile ad-hoc networks have generally been used in standalone specialized non-public communications environments. This is the first network technology to scale, commercialize, and optimize both unlicensed and licensed spectrum band operations for the public communications marketplace including voice, video and data services through an all IP mobile ad-hoc routing network, where each node is a standalone router able to make unilateral routing decisions through unique mobile ad-hoc protocols that are equivalent and transparent to the standard IP protocols used in the public wired Internet.

MBRI is very difficult to replicate in other systems because in embodiments the end user device in the MBRI is capable of acting as a full IP router. Normally, the orientation of wireless device and network equipment companies, wireless product designers and carriers is a cellular orientation where the network designers have always been oriented to maximizing computation horse power in the base station for network simplicity. The cellular network is already 30 years old. 30 years ago CPU power was expensive and therefore concentrated in the base station. To improve throughput in the network the signal complexity has increased from QPSK to QAM64. At QAM64 the waveform is very fragile and requires significant processing power in the base station. In the MBRI architecture the methods and systems can trade computational complexity for signal simplicity and robustness, and 30 years later it allows MBRI methods and systems to take advantage of Moore's law in the CPU chips (smaller size, lower power and greater gate counts) and reducing the signal complexity to QPSK or QAM16 (with short range symmetrical waveforms). Optional alternative methods and systems encompassed herein include building an equivalent mobile ad-hoc router technology using symmetrical waveforms.

Figure 83:
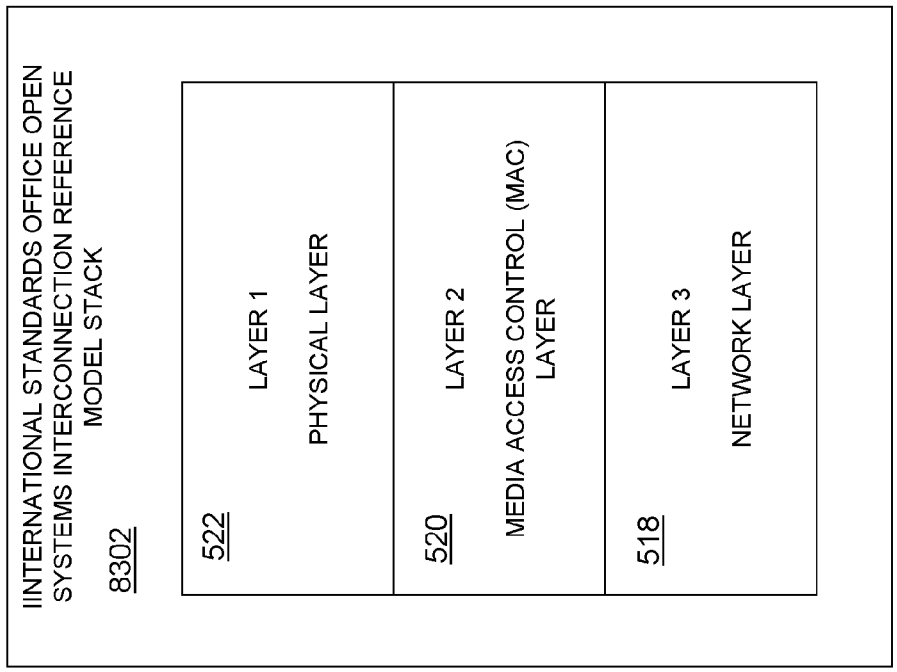
FIG. 83 depicts an embodiment of an MBRI technology as embodied in a 3 layer ISO (international standards office) OSI (open systems interconnection) reference model stack.

Referring to FIG. 83, the MBRI technology may be embodied in a 3 layer ISO (international standards office) OSI (open systems interconnection) reference model stack 8302. Layer 1, the physical layer 522, uses a symmetrical waveform based on OFDMA, QAM, SC-OFDMA, CDMA or TDMA technology. The waveform allows for bi directional communications without a downlink or uplink protocol difference and relies on higher layer entities to manage output power, transmission mode, traffic types and time synchronization functions. Layer 2, the media access control (MAC) layer 520, provides a high quality peer to peer packet transmission/reception protocol for passing frames between nodes and for distinguishing between peer to peer, peer to network, and network to peer traffic. The MAC layer also manages the radio resources of a single node and control sub-network layer convergence functions such as segmentation and reassembly, QoS, throughput fairness, adaptive data rate control and transmit power control. Layer 3 the network layer 518 provides for full transparency with the internet through a border gateway protocol edge router, and makes transparent all TCP/IP and UDP functions at the routing level viz. OSPF. The router is also responsible for application awareness, multicast and unicast operations and IPv4 and IPv6 transparency.

The methods and systems disclosed herein allow, among other advantages, the capability to move routability into a mobile access network, in turn allowing intelligent routing, optionally including providing a network that is routable, such as IP-routable, down to the individual device in a mobile ad hoc network, with necessity of a base station to perform the routing. Thus, the methods and systems disclosed herein allow peer-to-peer Internet communications in a mobile ad hoc network, without the need for intervention by a base station or similar controller. Methods and systems disclosed herein also include disposing a MAC layer in a mobile subscriber device. Methods and systems disclosed herein also include mobile networks in which the subscriber device is both multi-cast and unicast. Methods and systems disclosed herein further include providing multi-session subscriber devices.

Figure 84:
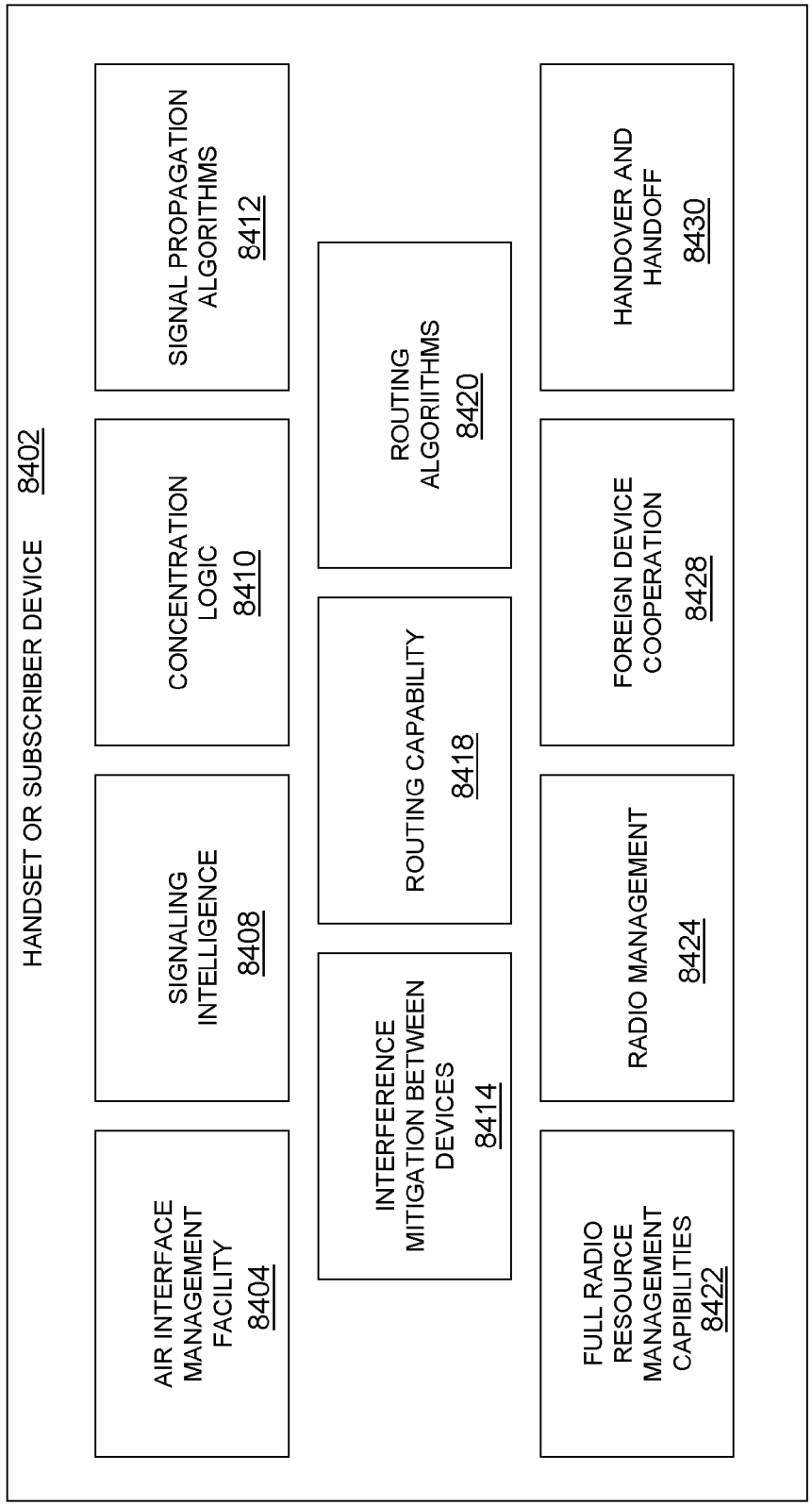
FIG. 84 depicts an embodiment of the present invention for functions that have historically been provided as part of a base station in the handset or subscriber device in a mobile ad hoc network.

Referring to FIG. 84, methods and systems disclosed herein also include providing a range of functions that have historically been provided as part of a base station in the handset or subscriber device in a mobile ad hoc network work 8402, optionally including one or more of an air interface management facility 8404, signaling intelligence 8408, concentration logic 8410, signal propagation algorithms 8412, interference mitigation between devices 8414, and routing capability 8418 (including least cost or similar routing algorithms 8420 located entirely on the subscriber device). Methods and systems disclosed herein may include full radio resource management capabilities 8422 in a subscriber device, such as a handset, including management of the radio 8424 of the device itself, management of how the device cooperates with foreign devices 8428, and handover and handoff by the subscriber device 8430.

Methods and systems disclosed herein also include providing an architecture with fixed radios associated with mobile radios. The fixed radios may include various access points to nodes of an MBRI. Methods and systems disclosed herein include methods and systems for providing backhaul to the Internet from a MANET network, such as an MBRI. Backhaul may include a diversity of backhaul types, including connection to the Internet backbone, as well as optional interconnection into a fiber access point.

Figure 85:
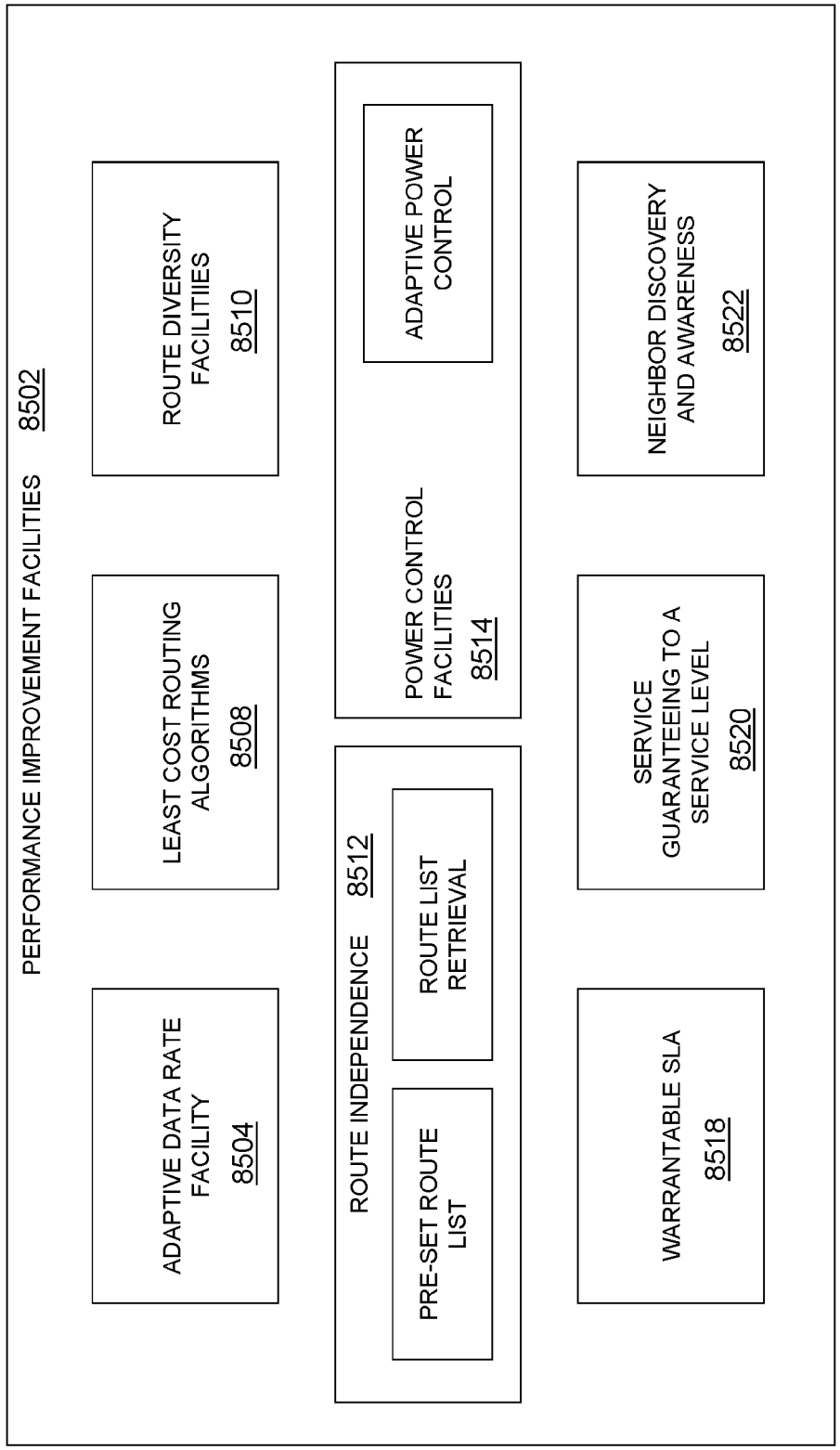
FIG. 85 depicts a range of performance improvement facilities according to an embodiment of the present invention.

Referring to FIG. 85, methods and systems disclosed herein may include a range of performance improvement facilities 8502, including, without limitation power control facilities 8514 (optionally including adaptive power control of radio transmission power, such as for increasing radio saturation and for graceful degradation (with nearby devices whispering to each other)), ADR (adaptive data rate) facilities 8504, least cost routing algorithms 8508 (such as that assign link cost to links involved in a route), route diversity facilities 8510 (for providing a very high or specified level of QOS), independence 8512 from a pre-set route list and independence of the need to retrieve a route list, warrantable SLAs 8518, guaranteeing a service to a service level in an entirely mobile network 8520, and neighbor discovery and awareness 8522.

Methods and systems may include facilities for registration of users, such as using DHCP for registration, optionally including registration independent of HLR or VLR. Management facilities may include management independent of cellular back office, such as for billing for data, authentication, provisioning, switching and the like.

In embodiments, methods and systems disclosed herein allow effective equivalency between a mobile ad hoc network and the various layers of the fixed Internet. Thus, applications designed for the fixed Internet can be deployed on the MBRI, and vice versa, without requiring intervention, such as of a carrier or service provider. In embodiments a router layer may use Ipv4/RFC 791, BGP4/RFC 4271, SLSR—scoped link state routing, and ROM—Receiver Oriented Multicast routing. In embodiments a MAC layer may use one or more of encapsulation/RFC's 894/1042, MAC 802.3, NDM—neighbor discovery management, ADR—adaptive data rate, queue serving, ARP/RFC 826, DHCP, NAMA Channel Access and LANTA—Network timing. In embodiments a physical layer may include SAR—segmentation and reassembly, a configurable waveform slot-by-slot, OFDMA waveform modes, and OFDMA.

Methods and systems may include openness to a wide range of applications, including capability, for example, to download an Internet application directly on the subscriber device. Methods and systems may also include facilities for geo-location, thereby enabling location with respect to a global position, including location of a mobile device within a swarm of mobile devices.

In embodiments, in contrast to conventional wireless and fixed wired access networks, methods and systems are provided for a mobile broadband internet network solution where every subscriber device and infrastructure node has routing capabilities to allow for intelligent routing decisions enabling intra-network peer to peer communications. Traffic between nodes of the MBRI does not need to leave the MANET network for routing or switching purposes. Instead, because MBRI is routing enabled, local traffic including required signaling will stay within the MBRI. In addition, because of its unique Neighbor Discovery Management and Adaptive Data Rate and Power Management Capabilities the MBRI enables local intelligence to be shared across its member nodes leading to the creation and deployment of new classes of services and applications. Further, because of its MANET characteristic the MBRI is independent of fixed traffic aggregation points such as Base Stations or Cell Towers, and instead can leverage multiple backhaul access points in a load leveling and self-healing manner. Because of the MANET waveform characteristics and the MANET architectural flexibility to deploy additional Backhaul Access Points or to upgrade existing MANET Access Points with backhaul capability the MBRI assures broadband bandwidth to the individual SD/MAP nodes in excess of conventional 3G/4G networks. If combined with DYSAN technology the MBRI can coexist within existing defined spectrum with associated active network operations.

In embodiments, there may be distinct MBRI variants: (MBRI Basic (MBRI-B), which contains the PCOG MANET protocol stack that brings Internet access and routing capability to the Subscriber Device (SD); MBRI Enhanced (MBRI-E), which may include the combination of MBRI Basic and individual selected media transport enhancements to improve multimedia transport of the MBRI network; MBRI Comprehensive (MBRI-C), which may include MBRI-B coupled with the cumulative PCOG conceived transport enhancements targeted at high quality service for multimedia, multi-session applications; and a combination of MBRI-C with Dynamic Spectrum Awareness (MBRI-D), which consists of enhancements to the PCOG MANET protocol stack that allows for spectrum co-sharing between non-cooperative spectrum users or dissimilar spectrum technologies, and coordination between cooperative systems.

In embodiments, a basic MBRI may include ad-hoc network creation and self forming, Self healing, Load leveling, packet size indifferent, Unicast, Routing enabled and Peer to peer communication, Mobile, Broadband, Internet Protocol Plug Compatible, Neighbor aware, Geo Location, Radio Resource Management, Unconditionally Open for Java Web Applications, Private or public network, Secure, Spectrum independent, Scalable (e.g. Bandwidth, Backhaul, Users), Structured or unstructured network architecture, Different levels of spanning network, Waveform variants (e.g. Slotted/half duplex, synchronization on each slot separately), Multi-session, and the like.

In embodiments an enhanced MBRI may include ADR, QoS Flexible transport for both time sensitive and delay tolerant traffic, Sub-queues, Traffic based scheduling, Mange optimized short/medium/large packet support, SLSR Link cost based routing, SLSR Domain Management, Multicast, Layer 2 forwarding, Layer 3 fast pipe, SAR, Hybrid slot structure, Multi-channel MAC, Adaptive Power Control, Distributed Data for Web Apps in the MBRI Device, Local Intelligence (e.g. Caching, local content and services, and the like), Distributed applications, Non server based applications, Vehicular mobility-vector based routing, Sleep Mode, Assured Bandwidth/Admission Control, Traffic policing, traffic shaping (e.g. Per flow, Per node, Per MAP/BAP, and the like), Automatic Retransmission Request (ARQ), FEC on long IP packets, Proactive Router Handoff, and the like. In embodiments a more comprehensive MBRI may include the totality of MBRI-Enhancements and MBRI Basic capabilities. In embodiments any of the MBRI capabilities may be combined with DYSAN capabilities.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium that, when executing on one or more computers, operates a mobile ad hoc network (MANET) by performing the steps of:

providing a mobile, broadband, routable internet (MBRI), in which a plurality of mobile devices interact as nodes in the MANET and in which packets are IP routable to the individual device independent of fixed infrastructure elements, wherein the nodes provide functional interaction with other nodes within the MANET to enhance MBRI operability.

2. The computer program product of claim 1, wherein the functional interaction is the use of dynamic adaptation of the operating spectrum and disseminating spectrum access decisions through use of a logical control channel.

3. The computer program product of claim 1, wherein the functional interaction is by adjusting transmit power levels.

4. The computer program product of claim 1, wherein the functional interaction is adapting link data rate.

5. The computer program product of claim 1, wherein the functional interaction is to transport multimedia, multi-session application data by providing a hybrid TDMA slot structure that contains a plurality of slot lengths and slot widths forming logical sub-channels.

6. The computer program product of claim 1, wherein the functional interaction is peer-to-peer communications support.

7. The computer program product of claim 1, wherein the functional interaction is support for multiple transmission channel access structure types.

8. The computer program product of claim 1, wherein the functional interaction is a facility to allow the nodes to gracefully enter and exit the MANET and to retrieve their IP addresses upon first time entry into the MANET.

9. The computer program product of claim 1, wherein the functional interaction is providing logical layer to physical layer segmentation and reassembly functions to pack control and data payload efficiently in the air interface payload time slots and frequency segments or sub-channels.

10. The computer program product of claim 1, wherein the functional interaction is providing MAC level algorithms that warrant statistical fairness amongst all cooperating nodes within a particular access point domain for access to payload transmission time slots and frequency segments or sub-channels within the access point domain.

11. The computer program product of claim 1, wherein the functional interaction is providing facilities to simultaneously support unicast and multicast data streams peer-to-peer, peer-to-network, and network-to-peer in the MANET.

12. The computer program product of claim 1, wherein the functional interaction is providing remote download capabilities for seamless upgrade of node and access point software during MANET operations.

13. The computer program product of claim 1, wherein the functional interaction is providing logical layer and data link layer control functions and algorithms that set a node transmit power level for at least one payload characteristic.

14. The computer program product of claim 1, wherein the functional interaction is providing load level peer-to-network traffic amongst the available backhaul access points through traffic based link scheduling within access point domains and across domains that subtend a backhaul access point.

15. The computer program product of claim 1, wherein the functional interaction is providing node level metrics that use neighbor RF information and link level routing information to allow nodes to asynchronously optimize for the maximum throughput and transmit opportunities within an access point domain on a per slot schedule basis.

16. The computer program product of claim 1, wherein the functional interaction is providing at least one of signaling, network routing, link scheduling, and slot scheduling intelligence to allow the node to self-route and self-manage air interface resources.

17. The computer program product of claim 1, wherein the functional interaction is providing differentiated quality of service in the MBRI through prioritization.

18. The computer program product of claim 1, wherein the functional interaction is dividing application data into smaller fragments for transmission over the MBRI, including a timer to eliminate partial fragments when one of the fragments is lost or delayed beyond a tolerable amount.

19. The computer program product of claim 1, wherein the functional interaction is using a waveform definition in association with the MBRI physical layer, wherein each piece of configuration information is defined independently on pairs of consecutive slots such that there is complete independence, and specifying the waveform parameters in a manner that allows implementation of an adaptive modulation capability.

20. The computer program product of claim 1, wherein the functional interaction is exchanging data-link control messages to develop and maintain neighborhood and RF environmental information for all one-hop and two-hop lists of nodes within direct communication range of the first node, and making routing, adaptive data rate, and modulation decisions based on the information in at least one of the one-hop list and two-hop list.

21. The computer program product of claim 1, wherein the functional interaction is computing a TDMA schedule in a distributed manner in a plurality of nodes that avoids collisions between transmissions and provides statistically fair channel access, providing a capability to reallocate channel access to a subset of the plurality of nodes within the network topology, and commanding a modem to communicate according to the computed schedule.

22. The computer program product of claim 1, wherein the functional interaction is providing enhanced support for simultaneous transport of various multimedia, multi-session applications, using dynamic spectrum awareness to manage traffic based on channel conditions, enabling co-sharing between non-cooperative spectrum users, and coordinating between cooperative systems.

23. The computer program product of claim 1, wherein the functional interaction is dynamically adjusting operating frequency to match temporal and spatial spectrum availability.

24. The computer program product of claim 1, wherein the functional interaction is to improve quality of service by providing flexible transport capabilities.

25. The computer program product of claim 1, wherein the functional interaction is coordinating node transmissions across multiple channels.

26. The computer program product of claim 1, wherein the functional interaction is providing at least two layers of forward error correction on long data packets to improve data transmission.

27. The computer program product of claim 1, wherein the functional interaction is providing degrees of freedom in preselecting real estate locations and allowing MBRI's self forming, self healing properties to provide coverage solutions.

28. The computer program product of claim 1, wherein the functional interaction is providing distributed data services.

29. The computer program product of claim 1, wherein the functional interaction is storing data segments across a plurality of nodes as a distributed data store.

30. The computer program product of claim 1, wherein the functional interaction is providing hash maps for data stores, where the hash maps permit the real-time creation of database schemas.

31. The computer program product of claim 1, wherein the functional interaction is providing low latency data delivery.

32. The computer program product of claim 1, wherein the functional interaction is providing incremental scaling of distributed data capacity as additional nodes join the network, where additional nodes provide a net increase in available processing power to deliver data services across the network.

33. The computer program product of claim 1, wherein the functional interaction is delivering local node-by-node intelligence, where intelligence is implemented in association with at least one application.

34. The computer program product of claim 1, wherein the functional interaction is providing cooperative processing.

35. The computer program product of claim 1, wherein the functional interaction is providing a native-IP context, where the native-IP context is indistinguishable from fixed IP networks.

36. The computer program product of claim 1, wherein the functional interaction is using nodes to serve Internet web applications directly to other nodes in a peer-to-peer fashion.

37. The computer program product of claim 1, wherein the functional interaction is adapting selected routes based on anticipated future position of mobile network nodes.

38. The computer program product of claim 37, wherein the adapting is based on interpretation of the rate of change of certain link state variables.

39. A computer program product embodied in a non-transitory computer readable medium that, when executing on one or more computers, operates a mobile ad hoc network (MANET) by performing the steps of:

providing a mobile, broadband, routable internet, in which a plurality of mobile devices interact as nodes in the MANET and in which packets are IP routable to the individual device independent of fixed infrastructure elements; and providing an adaptive transmit power control facility for a device within the network, the adaptive transmit power control facility adapted to adjust transmission power of the device based on at least one of the density of proximate devices in the network, the condition of a neighboring device on the network, a channel condition of the network, a service level condition, a network performance condition, an environmental condition of the device and an application requirement of the device.

40. A computer program product embodied in a non-transitory computer readable medium that, when executing on one or more computers, operates a mobile ad hoc network (MANET) by performing the steps of:

providing a mobile, broadband, routable internet, in which a plurality of mobile devices interact as nodes in the MANET and in which packets are IP routable to each of the devices independent of fixed infrastructure elements; and applying swarm intelligence to determine at least some parts of at least some routes through the mobile, broadband, routable internet.

* * * * *